US008473317B2

(12) United States Patent
Santoso et al.

(10) Patent No.: US 8,473,317 B2
(45) Date of Patent: Jun. 25, 2013

(54) MANAGING CONSISTENT INTERFACES FOR SERVICE PART BUSINESS OBJECTS ACROSS HETEROGENEOUS SYSTEMS

(75) Inventors: Budi Santoso, Wiesloch (DE); Iouri Loukachev, Karlsruhe (DE); Andreas Schoknecht, Linkenheim-Hochstetten (DE); Michael Schweitzer, Leimen (DE); Matthias Horn, Sandhausen (DE); Sameer Verma, Walldorf (DE); Yue Chen, Karlsruhe (DE); Andreas Huber-Buschbeck, Heiligkreuzsteinach (DE); Marton Daniel Nagy, Budapest (HU)

(73) Assignee: SAP AG, Walldorf (DE)

( * ) Notice: Subject to any disclaimer, the term of this patent is extended or adjusted under 35 U.S.C. 154(b) by 1266 days.

(21) Appl. No.: 12/060,144

(22) Filed: Mar. 31, 2008

(65) Prior Publication Data

US 2009/0248487 A1 Oct. 1, 2009

(51) Int. Cl.
*G06Q 10/00* (2012.01)

(52) U.S. Cl.
CPC .................................... *G06Q 10/00* (2013.01)
USPC .................................................... 705/7.11

(58) Field of Classification Search
CPC .................................................. G06Q 10/063
USPC .................................................. 705/7.11
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,463,555 | A | 10/1995 | Ward et al. |
| 5,787,237 | A | 7/1998 | Reilly |
| 5,812,987 | A | 9/1998 | Luskin et al. |
| 5,966,695 | A | 10/1999 | Melchione et al. |
| 5,970,465 | A | 10/1999 | Dietrich et al. |

(Continued)

FOREIGN PATENT DOCUMENTS

| | | |
|---|---|---|
| CN | 1501296 | 6/2004 |
| CN | 1609866 | 4/2005 |
| CN | 1632806 | 6/2005 |
| CN | 1767537 | 5/2006 |
| CN | 101174957 | 5/2008 |

OTHER PUBLICATIONS

Jian Yang and Mike P. Papazoglou, Interoperation Support for Electronic Business, Communications of the ACM, Jun. 2000/vol. 43, No. 6, pp. 39-47.*

(Continued)

*Primary Examiner* — Romain Jeanty
*Assistant Examiner* — Kurtis Gills
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a service part demand forecast, a service part demand history, a service part inventory replenishment rule, a service part order history, and/or a service part supply plan business object.

27 Claims, 288 Drawing Sheets

U.S. PATENT DOCUMENTS 5,970,475 A 10/1999 Barnes et al.
5,983,284 A 11/1999 Argade
6,047,264 A 4/2000 Fisher et al.
6,073,137 A 6/2000 Brown et al.
6,092,196 A 7/2000 Reiche
6,104,393 A 8/2000 Santos-Gomez
6,115,690 A 9/2000 Wong
6,125,391 A 9/2000 Meltzer et al.
6,138,118 A 10/2000 Koppstein et al.
6,154,732 A 11/2000 Tarbox
6,222,533 B1 4/2001 Notani et al.
6,226,675 B1 5/2001 Meltzer et al.
6,229,551 B1 5/2001 Huang
6,327,700 B1 12/2001 Chen et al.
6,331,972 B1 12/2001 Harris et al.
6,332,163 B1 12/2001 Bowman-Amuah
6,424,979 B1 7/2002 Livingston et al.
6,434,159 B1 8/2002 Woodward et al.
6,438,594 B1 8/2002 Bowman-Amuah
6,542,912 B2 4/2003 Meltzer et al.
6,591,260 B1 7/2003 Schwartzhoff et al.
6,725,122 B2 4/2004 Mori et al.
6,738,747 B1 5/2004 Tanaka et al.
6,745,229 B1 6/2004 Gobin et al.
6,763,353 B2 7/2004 Li et al.
6,775,647 B1 8/2004 Evans et al.
6,868,370 B1 3/2005 Burbridge et al.
6,937,992 B1 8/2005 Benda et al.
6,970,844 B1 11/2005 Bierenbaum
7,020,594 B1 3/2006 Chacon
7,039,606 B2 5/2006 Hoffman et al.
7,076,449 B2 7/2006 Tsunenari et al.
7,131,069 B1 10/2006 Rush et al.
7,206,768 B1 4/2007 deGroeve et al.
7,249,157 B2 7/2007 Stewart et al.
7,269,569 B2 9/2007 Spira et al.
7,292,965 B1 11/2007 Mehta et al.
7,321,864 B1 1/2008 Gendler
7,363,271 B2 4/2008 Morimoto
7,379,931 B2 5/2008 Morinville
7,383,990 B2 6/2008 Veit
7,406,358 B2 7/2008 Preiss
7,481,367 B2 1/2009 Fees et al.
7,509,278 B2 3/2009 Jones
7,515,697 B2 4/2009 Eng et al.
7,516,088 B2 4/2009 Johnson et al.
7,574,383 B1 8/2009 Parasnis et al.
7,627,504 B2 12/2009 Brady et al.
7,634,482 B2 12/2009 Mukherjee et al.
7,788,319 B2 8/2010 Schmidt et al.
7,805,383 B2 9/2010 Veit et al.
7,853,491 B2 12/2010 Wittmer et al.
7,865,426 B2 1/2011 Volpert
7,873,965 B2 1/2011 Hayton et al.
7,941,236 B2 5/2011 Spearman
8,326,795 B2 * 12/2012 Markovic ...................... 707/600
RE43,905 E * 1/2013 Bierenbaum ................... 705/39
2001/0042032 A1 11/2001 Crawshaw et al.
2002/0013721 A1 1/2002 Dabbiere et al.
2002/0026394 A1 2/2002 Savage et al.
2002/0046053 A1 4/2002 Hare et al.
2002/0052754 A1 5/2002 Joyce et al.
2002/0072988 A1 6/2002 Aram
2002/0087481 A1 7/2002 Harif
2002/0087483 A1 7/2002 Harif
2002/0107765 A1 8/2002 Walker
2002/0112171 A1 8/2002 Ginter et al.
2002/0138318 A1 9/2002 Ellis et al.
2002/0147668 A1 10/2002 Smith et al.
2002/0152104 A1 10/2002 Ojha et al.
2002/0152145 A1 10/2002 Wanta et al.
2002/0156693 A1 * 10/2002 Stewart et al. ................. 705/26
2002/0156930 A1 10/2002 Velasquez
2002/0157017 A1 10/2002 Mi et al.
2002/0169657 A1 11/2002 Singh et al.
2002/0184070 A1 12/2002 Chen et al.
2002/0186876 A1 12/2002 Jones et al.
2002/0194045 A1 12/2002 Shay et al.
2003/0004799 A1 1/2003 Kish
2003/0069648 A1 4/2003 Douglas et al.
2003/0086594 A1 5/2003 Gross
2003/0120502 A1 6/2003 Robb et al.
2003/0126077 A1 7/2003 Kantor et al.
2003/0167193 A1 9/2003 Jones et al.
2003/0171962 A1 9/2003 Hirth et al.
2003/0172007 A1 9/2003 Helmolt et al.
2003/0172135 A1 9/2003 Bobick et al.
2003/0195815 A1 10/2003 Li et al.
2003/0204452 A1 10/2003 Wheeler
2003/0208389 A1 11/2003 Kurihara et al.
2003/0212614 A1 11/2003 Chu et al.
2003/0216978 A1 11/2003 Sweeney et al.
2003/0220875 A1 11/2003 Lam et al.
2003/0229550 A1 12/2003 DiPrima et al.
2003/0233295 A1 12/2003 Tozawa et al.
2003/0236748 A1 12/2003 Gressel et al.
2004/0002883 A1 * 1/2004 Andrews et al. .................. 705/8
2004/0024662 A1 2/2004 Gray et al.
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0138942 A1 7/2004 Pearson et al.
2004/0148227 A1 7/2004 Tabuchi et al.
2004/0172360 A1 9/2004 Mabrey et al.
2004/0220910 A1 * 11/2004 Zang et al. ........................ 707/3
2004/0254945 A1 12/2004 Schmidt et al.
2004/0267714 A1 12/2004 Frid et al.
2005/0015273 A1 1/2005 Iyer
2005/0021366 A1 1/2005 Pool et al.
2005/0033588 A1 2/2005 Ruiz et al.
2005/0038744 A1 2/2005 Viijoen
2005/0049903 A1 3/2005 Raja
2005/0071262 A1 3/2005 Kobeh et al.
2005/0080640 A1 * 4/2005 Bhaskaran et al. ............... 705/1
2005/0108085 A1 5/2005 Dakar et al.
2005/0131947 A1 6/2005 Laub et al.
2005/0159997 A1 7/2005 John
2005/0171833 A1 8/2005 Jost et al.
2005/0182639 A1 8/2005 Dale
2005/0187797 A1 8/2005 Johnson
2005/0187866 A1 8/2005 Lee
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0246240 A1 11/2005 Padilla
2005/0256753 A1 11/2005 Veit et al.
2006/0004934 A1 1/2006 Guldner et al.
2006/0005098 A1 1/2006 Lotz et al.
2006/0020515 A1 1/2006 Lee et al.
2006/0026586 A1 2/2006 Remmel et al.
2006/0047574 A1 3/2006 Sundaram et al.

2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1* 4/2006 Seubert et al. ................ 707/100
2006/0089885 A1 4/2006 Finke et al.
2006/0095373 A1 5/2006 Venkatasubramanian et al.
2006/0184435 A1 8/2006 Mostowfi
2006/0212376 A1 9/2006 Snyder et al.
2006/0280302 A1 12/2006 Baumann et al.
2006/0282360 A1 12/2006 Kahn et al.
2007/0027742 A1* 2/2007 Emuchay et al. ............... 705/10
2007/0043583 A1 2/2007 Davulcu et al.
2007/0055688 A1* 3/2007 Blattner ........................ 707/102
2007/0078799 A1 4/2007 Huber-Buschbeck et al.
2007/0112574 A1 5/2007 Greene
2007/0124227 A1 5/2007 Dembo et al.
2007/0129978 A1 6/2007 Shirasu et al.
2007/0132585 A1 6/2007 Llorca et al.
2007/0150387 A1 6/2007 Seubert et al.
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0214065 A1 9/2007 Kahlon et al.
2007/0225949 A1 9/2007 Sundararajan et al.
2007/0226090 A1 9/2007 Stratton
2007/0255639 A1 11/2007 Seifert
2007/0265860 A1 11/2007 Herrmann et al.
2007/0265862 A1 11/2007 Freund et al.
2007/0294159 A1 12/2007 Cottle
2008/0005012 A1 1/2008 Deneef
2008/0021754 A1* 1/2008 Horn et al. ........................ 705/8
2008/0040243 A1 2/2008 Chang et al.
2008/0046104 A1 2/2008 Van Camp et al.
2008/0046421 A1 2/2008 Bhatia et al.
2008/0065443 A1* 3/2008 Gorur et al. ....................... 705/7
2008/0120129 A1 5/2008 Seubert et al.
2008/0120190 A1 5/2008 Joao et al.
2008/0120204 A1 5/2008 Conner et al.
2008/0133303 A1 6/2008 Singh et al.
2008/0154969 A1 6/2008 DeBie
2008/0162266 A1 7/2008 Griessmann et al.
2008/0196108 A1 8/2008 Dent et al.
2008/0215354 A1 9/2008 Halverson et al.
2008/0243578 A1 10/2008 Veit
2008/0288317 A1 11/2008 Kakar
2009/0006203 A1 1/2009 Fordyce et al.
2009/0063287 A1 3/2009 Tribout et al.
2009/0077074 A1 3/2009 Hosokawa
2009/0089198 A1 4/2009 Kroutik
2009/0192926 A1 7/2009 Tarapata
2009/0222360 A1 9/2009 Schmitt et al.
2009/0248431 A1 10/2009 Schoknecht et al.
2009/0248547 A1 10/2009 Doenig et al.
2009/0271245 A1 10/2009 Joshi et al.
2009/0326988 A1 12/2009 Barth et al.
2010/0014510 A1 1/2010 Boreli et al.
2010/0070391 A1 3/2010 Storr et al.
2010/0070395 A1 3/2010 Elkeles et al.
2010/0106555 A1 4/2010 Mneimneh et al.
2010/0161425 A1 6/2010 Sideman
2011/0046775 A1 2/2011 Bailey et al.

OTHER PUBLICATIONS

Intersystems, Evaluating Integration Software, Ensemble White Paper, 2007, http://www.intersystems.com/ensemble/whitepapers/pdf/evaluating-integration-software.pdf.*

He, Ning et al.; "B2B Contract Implementation Using Windows DNS"; 2001; pp. 71-79.

FSML—Financial Services Markup Language (Jul. 14, 1999) http://xml.coverpages.org/FSML-v1500a.pdf; pp. 1-159.

Webster's Revised Unabridged Dictionary (1913+1828); Def. "merchandise".

Statement in Accordance with the Notice from the European Patent Office dated Oct. 1, 2007 Concerning Business Methods—EPC; Official Journal of the European Patent Office; Munich; Nov. 1, 2007; pp. 592-593.

Lynn, Chris; "Sony Enters Brand Asset Management Market"; The Seybold Report; Analyzing Publishing Technologies; Aug. 4, 2004; <www.Seybold365.com>; 3 pages.

Office Action issued in related U.S. Appl. No. 11/640,422 on Apr. 2, 2009; 13 pages.

Office Action issued in related U.S. Appl. No. 11/640,422 on Dec. 30, 2009; 9 pages.

Office Action issued in related U.S. Appl. No. 11/803,178 on Jun. 29, 2009; 5 pages.

Office Action issued in related U.S. Appl. No. 11/803,178 on Mar. 4, 2010; 43 pages.

Office Action issued in related U.S. Appl. No. 11/775,821 on Jan. 22, 2010; 16 pages.

Office Action issued in related U.S. Appl. No. 11/364,538 on Aug. 4, 2009; 5 pages.

Office Action issued in related U.S. Appl. No. 11/364,538 on Mar. 4, 2010; 40 pages.

Office Action issued in related U.S. Appl. No. 11/731,857 on May 15, 2009; 11 pages.

Office Action issued in related U.S. Appl. No. 11/731,857 on Feb. 4, 2010; 22 pages.

Office Action issued in related U.S. Appl. No. 11/864,786 on Jun. 22, 2009; 7 pages.

Office Action issued in related U.S. Appl. No. 11/864,786 on Mar. 3, 2010; 12 pages.

Office Action issued in related U.S. Appl. No. 11/864,832 on Sep. 18, 2009; 14 pages.

Notice of Allowance issued in related U.S. Appl. No. 11/864,832 on Mar. 24, 2010; 11 pages.

Office Action issued in related U.S. Appl. No. 12/059,867 on Aug. 18, 2009; 37 pages.

Office Action issued in related U.S. Appl. No. 12/059,867 on Feb. 22, 2010; 24 pages.

Office Action issued in related U.S. Appl. No. 12/060,178 on Dec. 7, 2009; 6 pages.

Office Action issued in related U.S. Appl. No. 12/060,171 on Aug. 11, 2009; 11 pages.

Office Action issued in related U.S. Appl. No. 12/060,171 on Mar. 19, 2010; 10 pages.

Office Action issued in related U.S. Appl. No. 11/145,464 on Aug. 5, 2009; 31 pages.

Office Action issued in related U.S. Appl. No. 11/145,464 on Feb. 5, 2010; 57 pages.

Office Action issued in related U.S. Appl. No. 11/155,368 on May 14, 2009; 6 pages.

Office Action issued in related U.S. Appl. No. 11/155,368 on Dec. 10, 2009; 43 pages.

Office Action issued in related U.S. Appl. No. 11/166,065 on Jun. 24, 2009; 6 pages.

Office Action issued in related U.S. Appl. No. 11/166,065 on Mar. 3, 2010; 25 pages.

Communication Pursuant to Article 94(3) EPC issued in related European Application No. 05757432.9 on Jan. 26, 2009; 4 pages.

Supplementary European Search Report issued in related European Application No. 05823434.5 on Sep. 28, 2009; 3 pages.

Supplementary European Search Report issued in related European Application No. 05766672.9 on Oct. 6, 2009; 3 pages.

SAP Structured Entity Relationship Model (SAP-SERM) for R/3 System Release 4.0 Introduction and Index; Dec. 1998; 26 pages.

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.

com/community/pub/webcast/2006_01_16_Analyst_Summit_Vegas/2006_01_16_Analyst_Summit_Vegas_009.pdf ; 36 pages.
"UML in the .com Enterprise: Modeling CORBA, Components, XML/XMI and Metadata Workshop"; http://www.omg.org/news/meetings/workshops/uml_presentations.htm.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.

International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
Newton's Telecom Dictionary; 18th Edition; 2002; pp. 347, 454.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; 8 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursant to Article 94(3) issued in European Application No. 05757432.9 on Apr. 12, 2011; 5 pages.
Communication Pursuant to Article 94(3) issued in European Application No. 05766672.9 on Jul. 14, 2011; 4 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in related U.S. Appl. No. 11/864,871 on Oct. 1, 2010; 30 pages.
Office Action issued in U.S. Appl. No. 12/147,414 on Apr. 14, 2011; 30 pages.
Office Action issued in U.S. Appl. No. 12/147,414 on Oct. 26, 2011; 27 pages.
Office Action issued in U.S. Appl. No. 12/147,378 on Jun. 17, 2011; 10 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Notice of Allowance issued in U.S. Appl. No. 12/323,139 on Mar. 4, 2011; 13 pages.
Office Action issued in U.S. Appl. No. 12/571,140 on Sep. 26, 2011; 14 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in related U.S. Appl. No. 12/060,054 on Dec. 7, 2011; 15 pages.
Office Action issued in related U.S. Appl. No. 12/059,804 on Apr. 28, 2011; 14 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,192 on Sep. 6, 2011; 18 pages.
Notice of Allowance issued in related U.S. Appl. No. 12/060,178 on Dec. 6, 2010; 4 pages.
Notice of Allowance issued in related U.S. Appl. No. 12/060,178 on Sep. 2, 2011; 9 pages.
Office Action issued in related U.S. Appl. No. 12/060,062 on Jul. 13, 2011; 16 pages.
Office Action issued in related U.S. Appl. No. 12/060,155 on May 10, 2011; 8 pages.

Office Action issued in related U.S. Appl. No. 12/060,155 on Oct. 31, 2011; 15 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Notice of Allowance issued in U.S. Appl. No. 11/155,368 on Nov. 8, 2011; 7 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in U.S. Appl. No. 11/775,821 on Sep. 21, 2011; 5 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in U.S. Appl. No. 11/864,811 on Nov. 14, 2011; 8 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Notice of Allowance issued in U.S. Appl. No. 11/640,422 on Sep. 29, 2011; 7 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Notice of Allowance issued in related U.S. Appl. No. 11/731,857 on Dec. 14, 2011; 7 pages.
Office Action issued in U.S. Appl. No. 12/323,116 on Jan. 27, 2012; 7 pages.
Office Action issued in related U.S. Appl. No. 12/059,860 on Jan. 23, 2012; 16 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Notice of Allowance issued in U.S. Appl. No. 11/775,821 on Dec. 30, 2011; 5 pages.
Notice of Allowance issued in related U.S. Appl. No. 11/864,832 on Jan. 9, 2012;12 pages.
Office Action issued in related U.S. Appl. No. 11/864,863 on Dec. 22, 2011; 20 pages.

* cited by examiner

FIG. 27E
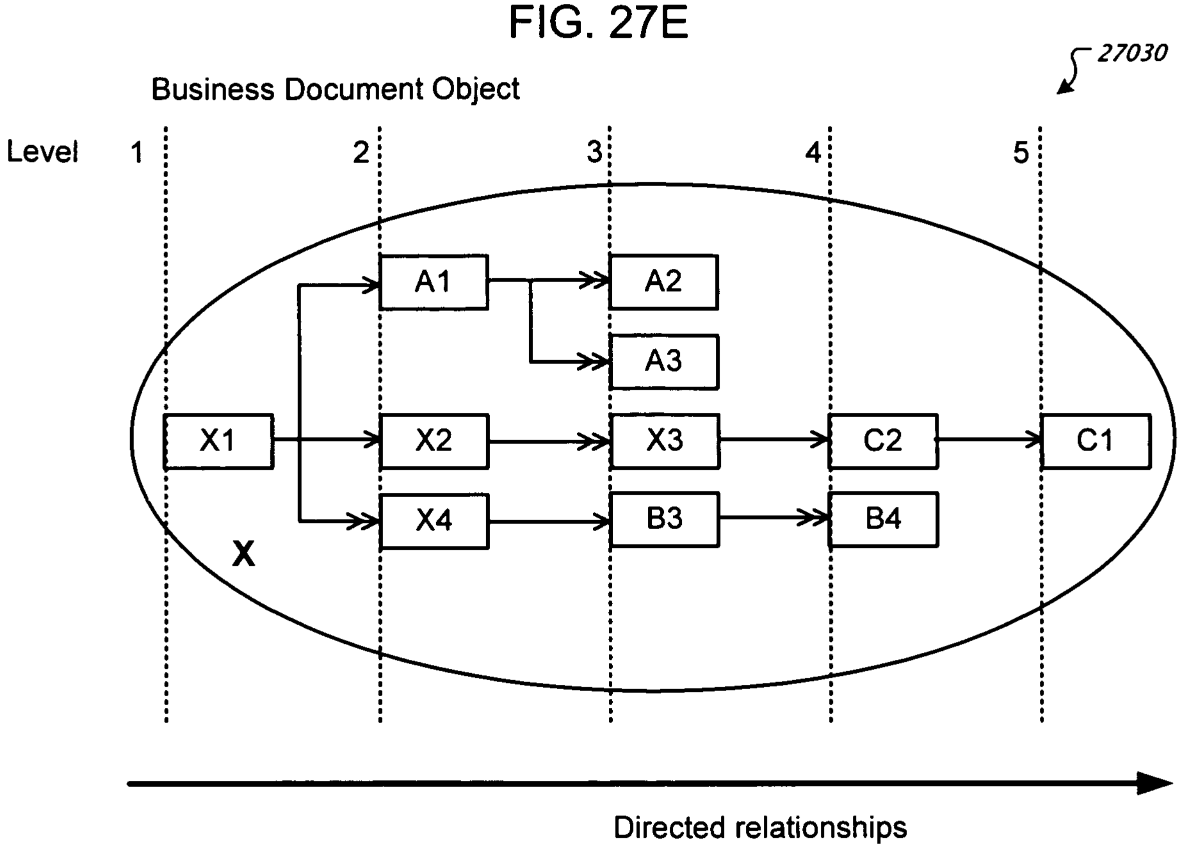
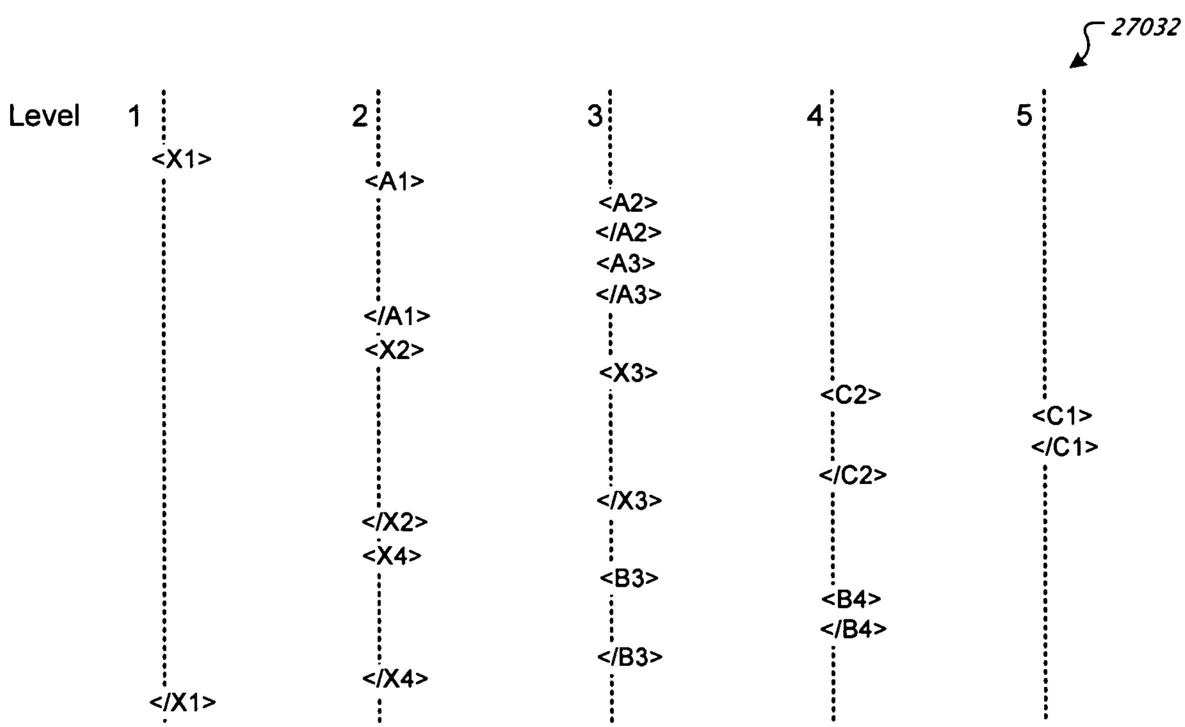

FIG. 37-1

| Package | | level1 | level2 | level3 | level4 | Cardinality | Data Type Name |
|---|---|---|---|---|---|---|---|
| ServicePartDemandForecastSCMForApprovalByElementsQueryMessage_sync 37000 | | ServicePartDemandForecastSCMForApprovalByElementsQueryMessage_sync 37002 | | | | | <MessageDataType> 37004 |
| | Selection 37006 | | ServicePartDemandForecastSCMForApprovalSelectionByElements 37008 | | | 1 37010 | ... |
| | | | | PlanningVersionID 37012 | | 1 37014 | PlanningVersionID 37016 |
| | | | | SelectionByMaterialInternalID 37018 | | 1..n 37020 | SelectionByProductInternalID 37022 |

FIG. 37-2

| Package | | level1 | level2 | level3 | level4 | Cardinality | Data Type Name |
|---|---|---|---|---|---|---|---|
| | | | | | InclusionExclu-sionCode 37024 | 1 37026 | InclusionExclu-sionCode 37028 |
| | | | | | IntervalBound-aryTypeCode 37030 | 1 37032 | IntervalBound-aryTypeCode 37034 |
| | | | | | LowerBoundary-MaterialInternalID 37036 | 1 37038 | ProductInternalID 37040 |
| | | | | | UpperBoundary-MaterialInternalID 37042 | 0..1 37044 | ProductInternalID 37046 |
| | | | | SelectionBySup-plyPlanningAreaID 37048 | | 1..n 37050 | SelectionBySup-plyPlanningAreaID 37052 |

FIG. 37-3

| Package | | level1 | level2 | level3 | level4 | Cardinality | Data Type Name |
|---|---|---|---|---|---|---|---|
| | | | | | InclusionExclu-sionCode 37054 | 1 37056 | InclusionExclu-sionCode 37058 |
| | | | | | IntervalBound-aryTypeCode 37060 | 1 37062 | IntervalBound-aryTypeCode 37064 |
| | | | | | LowerBoundary-SupplyPlanningA-realD 37066 | 1 37068 | SupplyPlanningA-realD 37070 |
| | | | | | UpperBoundary-SupplyPlanningA-realD 37072 | 0..1 37074 | SupplyPlanningA-realD 37076 |
| | | | | VirtualChildIndica-tor 37078 | | 0..1 37080 | Indica-tor,Qualifier:BODVirtualChildIndicator 37082 |

FIG. 37-4

| Package | | level1 | level2 | level3 | level4 | Cardinality | Data Type Name |
|---|---|---|---|---|---|---|---|
| | | | | ThirdPartyOrder-ProcessingIndica-tor 37084 | | 0..1 37086 | Indica-tor,Qualifier:BusinessTransaction-DocumentItem-ThirdParty 37088 |
| | | | | SelectionByDe-mandForecastDe-viationFactorValue 37090 | | 0..1 37092 | SelectionByDe-mandForecastDe-viationFactorValue 37094 |
| | | | | | LowerBoundary-DemandForecast-DeviationFactor-Value 37096 | 1 37098 | DemandForecast-DeviationFactor-Value 37100 |
| | | | | | UpperBoundary-DemandForecast-DeviationFactor-Value 37102 | 0..1 37104 | DemandForecast-DeviationFactor-Value 37106 |

FIG. 38-1

| Package | | level1 | level2 | level3 | Cardinality | Data Type Name |
|---|---|---|---|---|---|---|
| ServicePartDemandForecastSCMForApprovalByElementsResponseMessage_sync 38000 | | ServicePartDemandForecastSCMForApprovalByElementsResponseMessage_sync 38002 | | | | ServicePartDemandForecastSCMForApprovalByElementsResponseMessage_sync 38004 |
| | ServicePartDemand-Forecast 38006 | | ServicePartDemand-Forecast 38008 | | 0..n 38010 | |
| | | | | PlanningVersionID 38012 | 1 38014 | PlanningVersionID 38016 |
| | | | | MaterialInternalID 38018 | 1 38020 | ProductInternalID 38022 |
| | | | | SupplyPlanningAreaID 38024 | 1 38026 | SupplyPlanningAreaID 38028 |

FIG. 38-2

| Package | | level1 | level2 | level3 | Cardinality | Data Type Name |
|---|---|---|---|---|---|---|
| | | | | VirtualChildIndicator 38030 | 1 38032 | Indicator 38034 |
| | | | | ThirdPartyOrder-ProcessingIndicator 38036 | 1 38038 | Indicator 38040 |
| | | | | DemandForecastDe-viationFactorValue 38042 | 1 38044 | DemandForecastDe-viationFactorValue 38046 |
| | Log 38048 | | Log 38050 | | 1 38052 | Log 38054 |

FIG. 64-1

| Package | level1 | level2 | level3 | level4 | Cardinality | Data Type Name |
|---|---|---|---|---|---|---|
| ServicePartDemandHistoriesCancelConfirmationMessage 64000 | ServicePart-DemandHistoriesCancel-Confirmation-Message 64002 | | | | | ServicePart-DemandHistoriesCancel-Confirmation-Message 64004 |
| MessageHeader 64006 | | Message-Header 64008 | | | 1 64010 | Business-Document-Message-Header 64012 |
| ServicePartDemandHistoryCancelConfirmationMessage 64014 | | ServicePart-DemandHistoryCancel-Confirmation-Message 64016 | | | 0..n 64018 | ServicePart-DemandHistoryCancel-Confirmation-Message 64020 |
| ServicePartDemandHistory 64022 | | | ServicePart-DemandHistory 64024 | | 0..1 64026 | |

FIG. 64-2

| Package | | | | level1 | level2 | level3 | level4 | Cardinality | Data Type Name |
|---|---|---|---|---|---|---|---|---|---|
| | | | | | | | HistoryID 64028 | 1 64030 | ServicePart-DemandHisto-ryID 64032 |
| | | | | | | | PlanningVer-sionID 64034 | 1 64036 | PlanningVer-sionID 64038 |
| | | | | | | | ProductID 64040 | 1 64042 | ProductID 64044 |
| | | | | | | | LocationID 64046 | 1 64048 | LocationID 64050 |
| | | | | | | | VirtualChildIn-dicator 64052 | 1 64054 | Indicator 64056 |

FIG. 64-3

| Package | | | | level1 | level2 | level3 | level4 | Cardinality | Data Type Name |
|---|---|---|---|---|---|---|---|---|---|
| | | | | | | | ThirdPartyOrderProcessingIndicator 64058 | 1 64060 | Indicator 64062 |
| | | Log 64064 | | | | Log 64066 | | 0..1 64068 | Log 64070 |
| | Log 64072 | | | | Log 64074 | | | 0..1 64076 | Log 64078 |

FIG. 65-1

| Package | level1 | level2 | level3 | level4 | Cardinality | Data Type Name |
|---|---|---|---|---|---|---|
| ServicePartDemandHistoriesCancelRequestMessage 65000 | ServicePart-DemandHisto-riesCancelRe-questMessage 65002 | | | | | ServicePart-DemandHisto-riesCancelRe-questMessage 65004 |
| MessageHeader 65006 | | Message-Header 65008 | | | 1 65010 | Business-Document-Message-Header 65012 |
| ServicePartDemandHistoryCancelRequest-Message 65014 | | ServicePart-DemandHis-toryCancelRe-questMessage 65016 | | | 1..n 65018 | ServicePart-DemandHis-toryCancelRe-questMessage 65020 |
| ServicePartDemandHistory 65022 | | | ServicePart-DemandHis-tory 65024 | | 1 65026 | |

FIG. 65-2

| Package | | | | level1 | level2 | level3 | level4 | Cardinality | Data Type Name |
|---|---|---|---|---|---|---|---|---|---|
| | | | | | | | HistoryID 65028 | 0..1 65030 | ServicePart-DemandHisto-ryID 65032 |
| | | | | | | | PlanningVer-sionID 65034 | 0..1 65036 | PlanningVer-sionID 65038 |
| | | | | | | | ProductID 65040 | 0..1 65042 | ProductID 65044 |
| | | | | | | | LocationID 65046 | 0..1 65048 | LocationID 65050 |
| | | | | | | | VirtualChildIn-dicator 65052 | 0..1 65054 | Indicator 65056 |

FIG. 65-3

| Package | | | | level1 | level2 | level3 | level4 | Cardinality | Data Type Name |
|---|---|---|---|---|---|---|---|---|---|
| | | | | | | | ThirdPartyOrderProcessingIndicator 65058 | 0..1 65060 | Indicator 65062 |

FIG. 66-1

| Package | level1 | level2 | level3 | level4 | Cardinality | Data Type Name |
|---|---|---|---|---|---|---|
| ServicePartDemandHistoriesChangeConfirmationMessage 66000 | ServicePart-DemandHistoriesChange-Confirmation-Message 66002 | | | | | ServicePart-DemandHistoriesChange-Confirmation-Message 66004 |
| MessageHeader 66006 | | Message-Header 66008 | | | 1 66010 | Business-Document-Message-Header 66012 |
| ServicePartDemandHistoryChangeConfirmationMessage 66014 | | ServicePart-DemandHistoryChange-Confirmation-Message 66016 | | | 0..n 66018 | ServicePart-DemandHistoryChange-Confirmation-Message 66020 |
| ServicePartDemandHistory 66022 | | | ServicePart-DemandHistory 66024 | | 0..1 66026 | |

FIG. 66-2

| Package | | | | level1 | level2 | level3 | level4 | Cardinality | Data Type Name |
|---|---|---|---|---|---|---|---|---|---|
| | | | | | | | HistoryID 66028 | 1 66030 | ServicePart-DemandHistoryID 66032 |
| | | | | | | | PlanningVersionID 66034 | 1 66036 | PlanningVersionID 66038 |
| | | | | | | | ProductID 66040 | 1 66042 | ProductID 66044 |
| | | | | | | | LocationID 66046 | 1 66048 | LocationID 66050 |
| | | | | | | | VirtualChildIndicator 66052 | 1 66054 | Indicator 66056 |

FIG. 66-3

| Package | | | | level1 | level2 | level3 | level4 | Cardinality | Data Type Name |
|---|---|---|---|---|---|---|---|---|---|
| | | | | | | | ThirdPartyOrderProcessingIndicator 66058 | 1 66060 | Indicator 66062 |
| | | Log 66064 | | | | Log 66066 | | 0..1 66068 | Log 66070 |
| | Log 66072 | | | | Log 66074 | | | 0..1 66076 | Log 66078 |

FIG. 67-1

| Package | level1 | level2 | level3 | level4 | level5 | level6 | Cardinality | Data Type Name |
|---|---|---|---|---|---|---|---|---|
| ServicePartDemandHistoriesChangeRequestMessage 67000 | ServicePartDemandHistoriesChangeRequestMessage 67002 | | | | | | | ServicePartDemandHistoriesChangeRequestMessage 67004 |
| MessageHeader 67006 | | MessageHeader 67008 | | | | | 1 67010 | BusinessDocumentMessageHeader 67012 |
| ServicePartDemandHistoryChangeRequestMessage 67014 | | ServicePartDemandHistoryChangeRequestMessage 67016 | | | | | 1..n 67018 | ServicePartDemandHistoryChangeRequestMessage 67020 |

FIG. 67-2

| Package | | | | level1 | level2 | level3 | level4 | level5 | level6 | Cardinality | Data Type Name |
|---|---|---|---|---|---|---|---|---|---|---|---|
| | | ServicePartDemandHistory 67022 | | | | ServicePartDemandHistory 67024 | | | | 1 67026 | |
| | | | | | | | HistoryID 67028 | | | 0..1 67030 | ServicePartDemandHistoryID 67032 |
| | | | | | | | PlanningVersionID 67034 | | | 0..1 67036 | PlanningVersionID 67038 |
| | | | | | | | ProductID 67040 | | | 0..1 67042 | ProductID 67044 |
| | | | | | | | LocationID 67046 | | | 0..1 67048 | LocationID 67050 |

FIG. 67-3

| Package | | | | level1 | level2 | level3 | level4 | level5 | level6 | Cardinality | Data Type Name |
|---|---|---|---|---|---|---|---|---|---|---|---|
| | | | | | | | VirtualChild-Indicator 67052 | | | 0..1 67054 | Indicator 67056 |
| | | | | | | | ThirdParty-OrderProc-essingIndi-cator 67058 | | | 0..1 67060 | Indicator 67062 |
| | | | TimeSeries 67064 | | | | KeyFigure 67066 | | | 1..n 67068 | TimeSeri-esKeyFig-ure 67070 |
| | | | | | | | | Code 67072 | | 1 67074 | TimeSeri-esKeyFig-ureCode 67076 |
| | | | | | | | | UnitOf-Measure 67078 | | 0..1 67080 | Measure-UnitCode 67082 |

FIG. 67-4

| Package | | | | level1 | level2 | level3 | level4 | level5 | level6 | Cardinality | Data Type Name |
|---|---|---|---|---|---|---|---|---|---|---|---|
| | | | | | | | | KeyFigure-Value 67084 | | 0..n 67086 | TimeSeri-esKeyFig-ureTime-Bucket-Value 67088 |
| | | | | | | | | | TimeBuck-etNumber-IntValue 67090 | 1 67092 | Integer-Value 67094 |
| | | | | | | | | | KeyFigure-FloatValue 67096 | 1 67098 | FloatValue 67100 |
| | | | | | | | Period-BucketAs-signment 67102 | | | 1..n 67104 | TimeSeri-esPeriod-TimeBuck-etAssign-ment 67106 |

FIG. 67-5

| Package | | | | level1 | level2 | level3 | level4 | level5 | level6 | Cardinality | Data Type Name |
|---|---|---|---|---|---|---|---|---|---|---|---|
| | | | | | | | | TimeBucketNumberIntValue 67108 | | 1 67110 | IntValue 67112 |
| | | | | | | | | StartDateTime 67114 | | 1 67116 | GLOBAL_DateTime 67118 |
| | | | | | | | | EndDateTime 67120 | | 1 67122 | GLOBAL_DateTime 67124 |

FIG. 68-1

| Package | | | level1 | level2 | level3 | level4 | Cardinality | Data Type Name |
|---|---|---|---|---|---|---|---|---|
| ServicePartDemandHistoriesCreateConfirmationMessage 68000 | | | ServicePart-DemandHisto-riesCreate-Confirmation-Message 68002 | | | | | ServicePart-DemandHisto-riesCreate-Confirmation-Message 68004 |
| | MessageHeader 68006 | | | Message-Header 68008 | | | 1 68010 | Business-Document-Message-Header 68012 |
| | ServicePartDemandHistoryCreateConfirma-tionMessage 68014 | | | ServicePart-DemandHis-toryCreate-Confirmation-Message 68016 | | | 0..n 68018 | ServicePart-DemandHis-toryCreate-Confirmation-Message 68020 |
| | | ServicePartDemandHistory 68022 | | | ServicePart-DemandHis-tory 68024 | | 0..1 68026 | |

FIG. 68-2

| Package | | | | level1 | level2 | level3 | level4 | Cardinality | Data Type Name |
|---|---|---|---|---|---|---|---|---|---|
| | | | | | | | HistoryID 68028 | 1 68030 | ServicePart-DemandHisto-ryID 68032 |
| | | | | | | | PlanningVer-sionID 68034 | 1 68036 | PlanningVer-sionID 68038 |
| | | | | | | | ProductID 68040 | 1 68042 | ProductID 68044 |
| | | | | | | | LocationID 68046 | 1 68048 | LocationID 68050 |
| | | | | | | | VirtualChildIn-dicator 68052 | 1 68054 | Indicator 68056 |

FIG. 68-3

| Package | | | | level1 | level2 | level3 | level4 | Cardinality | Data Type Name |
|---|---|---|---|---|---|---|---|---|---|
| | | | | | | | ThirdPartyOrderProcessingIndicator 68058 | 1 68060 | Indicator 68062 |
| | | Log 68064 | | | | Log 68066 | | 0..1 68068 | Log 68070 |
| | Log 68072 | | | | Log 68074 | | | 0..1 68076 | Log 68078 |

FIG. 69-1

| Package | | level1 | level2 | level3 | level4 | level5 | level6 | Cardinality | Data Type Name |
|---|---|---|---|---|---|---|---|---|---|
| ServicePartDemandHistoriesCreateRequestMessage 69000 | | ServicePartDemandHistoriesCreateRequestMessage 69002 | | | | | | | ServicePartDemandHistoriesCreateRequestMessage 69004 |
| | MessageHeader 69006 | | MessageHeader 69008 | | | | | 1 69010 | BusinessDocumentMessageHeader 69012 |
| | ServicePartDemandHistoryCreateRequestMessage 69014 | | ServicePartDemandHistoryCreateRequestMessage 69016 | | | | | 1..n 69018 | ServicePartDemandHistoryCreateRequestMessage 69020 |

FIG. 69-2

| Package | | | | level1 | level2 | level3 | level4 | level5 | level6 | Cardinality | Data Type Name |
|---|---|---|---|---|---|---|---|---|---|---|---|
| | | ServicePartDemandHistory 69022 | | | | ServicePartDemandHistory 69024 | | | | 1 69026 | |
| | | | | | | | PlanningVersionID 69028 | | | 1 69030 | PlanningVersionID 69032 |
| | | | | | | | ProductID 69034 | | | 1 69036 | ProductID 69038 |
| | | | | | | | LocationID 69040 | | | 1 69042 | LocationID 69044 |
| | | | | | | | VirtualChildIndicator 69046 | | | 1 69048 | Indicator 69050 |

FIG. 69-3

| Package | | | | level1 | level2 | level3 | level4 | level5 | level6 | Cardinality | Data Type Name |
|---|---|---|---|---|---|---|---|---|---|---|---|
| | | | | | | | ThirdParty-OrderProc-essingIndi-cator 69052 | | | 1 69054 | Indicator 69056 |
| | | | TimeSeries 69058 | | | | KeyFigure 69060 | | | 1..n 69062 | TimeSeri-esKeyFig-ure 69064 |
| | | | | | | | | Code 69066 | | 1 69068 | TimeSeri-esKeyFig-ureCode 69070 |
| | | | | | | | | UnitOf-Measure 69072 | | 0..1 69074 | Measure-UnitCode 69076 |

FIG. 69-4

| Package | | | | level1 | level2 | level3 | level4 | level5 | level6 | Cardinality | Data Type Name |
|---|---|---|---|---|---|---|---|---|---|---|---|
| | | | | | | | | KeyFigure-Value 69078 | | 1.nn 69080 | TimeSeri-esKeyFig-ureTime-Bucket-Value 69082 |
| | | | | | | | | | TimeBuck-etNumber-IntValue 69084 | 1 69086 | Integer-Value 69088 |
| | | | | | | | | | KeyFigure-FloatValue 69090 | 1 69092 | FloatValue 69094 |
| | | | | | | | Period-BucketAs-signment 69096 | | | 1.nn 69098 | TimeSeri-esPeriod-TimeBuck-etAssign-ment 69100 |

FIG. 69-5

| Package | | | | level1 | level2 | level3 | level4 | level5 | level6 | Cardinality | Data Type Name |
|---|---|---|---|---|---|---|---|---|---|---|---|
| | | | | | | | | TimeBuck-etNumber-IntValue 69102 | | 1 69104 | IntValue 69106 |
| | | | | | | | | Start-DateTime 69108 | | 1 69110 | GLOBAL_DateTime 69112 |
| | | | | | | | | End-DateTime 69114 | | 1 69116 | GLOBAL_DateTime 69118 |

FIG. 70-1

| Package | | level1 | level2 | level3 | level4 | Cardinality | Data Type Name |
|---|---|---|---|---|---|---|---|
| ServicePartDemandHistoriesKeyFigureCancelConfirmation-Message 70000 | | ServicePart-DemandHisto-riesKeyFig-ureCancel-Confirmation-Message 70002 | | | | | ServicePart-DemandHisto-riesKeyFig-ureCancel-Confirmation-Message 70004 |
| | MessageHeader 70006 | | Message-Header 70008 | | | 1 70010 | Business-Document-Message-Header 70012 |
| | ServicePartDemandHistoryKeyFigureCan-celConfirmationMessage 70014 | | ServicePart-DemandHis-toryKeyFig-ureCancel-Confirmation-Message 70016 | | | 0..n 70018 | ServicePart-DemandHis-toryKeyFig-ureCancel-Confirmation-Message 70020 |

FIG. 70-2

| Package | | | | level1 | level2 | level3 | level4 | Cardinality | Data Type Name |
|---|---|---|---|---|---|---|---|---|---|
| | | ServicePartDemandHistory 70022 | | | | ServicePart-DemandHis-tory 70024 | | 0..1 70026 | |
| | | | | | | | HistoryID 70028 | 1 70030 | ServicePart-DemandHisto-ryID 70032 |
| | | | | | | | PlanningVer-sionID 70034 | 1 70036 | PlanningVer-sionID 70038 |
| | | | | | | | ProductID 70040 | 1 70042 | ProductID 70044 |
| | | | | | | | LocationID 70046 | 1 70048 | LocationID 70050 |

FIG. 70-3

| Package | | | | level1 | level2 | level3 | level4 | Cardinality | Data Type Name |
|---|---|---|---|---|---|---|---|---|---|
| | | | | | | | VirtualChildIn-dicator 70052 | 1 70054 | Indicator 70056 |
| | | | | | | | ThirdPartyOr-derProcess-ingIndicator 70058 | 1 70060 | Indicator 70062 |
| | | Log 70064 | | | | Log 70066 | | 0..1 70068 | Log 70070 |
| | Log 70072 | | | | Log 70074 | | | 0..1 70076 | Log 70078 |

FIG. 71-1

| Package | | level1 | level2 | level3 | level4 | level5 | Cardinality | Data Type Name |
|---|---|---|---|---|---|---|---|---|
| ServicePartDemandHistoriesKeyFigureCancelRequestMessage 71000 | | ServicePartDemandHistoriesKeyFigureCancelRequestMessage 71002 | | | | | | ServicePartDemandHistoriesKeyFigureCancelRequestMessage 71004 |
| | MessageHeader 71006 | | MessageHeader 71008 | | | | 1 71010 | BusinessDocumentMessageHeader 71012 |
| | ServicePartDemandHistoryKeyFigureCancelRequestMessage 71014 | | ServicePartDemandHistoryKeyFigureCancelRequestMessage 71016 | | | | 1..n 71018 | ServicePartDemandHistoryKeyFigureCancelRequestMessage 71020 |

FIG. 71-2

| Package | | | | level1 | level2 | level3 | level4 | level5 | Cardinality | Data Type Name |
|---|---|---|---|---|---|---|---|---|---|---|
| | | ServicePartDemandHistory 71022 | | | | ServicePart-DemandHis-tory 71024 | | | 1 71026 | |
| | | | | | | | HistoryID 71028 | | 0..1 71030 | ServicePart-DemandHis-toryID 71032 |
| | | | | | | | PlanningVer-sionID 71034 | | 0..1 71036 | PlanningVer-sionID 71038 |
| | | | | | | | ProductID 71040 | | 0..1 71042 | ProductID 71044 |
| | | | | | | | LocationID 71046 | | 0..1 71048 | LocationID 71050 |

FIG. 71-3

| Package | | | | level1 | level2 | level3 | level4 | level5 | Cardinality | Data Type Name |
|---|---|---|---|---|---|---|---|---|---|---|
| | | | | | | | VirtualChild-Indicator 71052 | | 0..1 71054 | Indicator 71056 |
| | | | | | | | ThirdParty-OrderProc-essingIndica-tor 71058 | | 0..1 71060 | Indicator 71062 |
| | | | TimeSeries 71064 | | | | KeyFigure 71066 | | 1..n 71068 | TimeSeries-KeyFigure 71070 |
| | | | | | | | | Code 71072 | 1 71074 | TimeSeries-KeyFigure-Code 71076 |

FIG. 72-1

| Package | | level1 | level2 | level3 | level4 | Cardinality | Data Type Name |
|---|---|---|---|---|---|---|---|
| ServicePartDemandHistoriesKeyFigureCreateConfirmation-Message 72000 | | ServicePart-DemandHisto-riesKeyFig-ureCreateCon-firmationMes-sage 72002 | | | | | ServicePart-DemandHisto-riesKeyFig-ureCreateCon-firmationMes-sage 72004 |
| | MessageHeader 72006 | | Message-Header 72008 | | | 1 72010 | Business-Document-Message-Header 72012 |
| | ServicePartDemandHistoryKeyFigureCreate-ConfirmationMessage 72014 | | ServicePart-DemandHis-toryKeyFig-ureCreateCon-firmationMes-sage 72016 | | | 0..n 72018 | ServicePart-DemandHis-toryKeyFig-ureCreateCon-firmationMes-sage 72020 |

FIG. 72-2

| Package | | | | level1 | level2 | level3 | level4 | Cardinality | Data Type Name |
|---|---|---|---|---|---|---|---|---|---|
| | | ServicePartDemandHistory 72022 | | | | ServicePart-DemandHis-tory 72024 | | 0..1 72026 | |
| | | | | | | | HistoryID 72028 | 1 72030 | ServicePart-DemandHisto-ryID 72032 |
| | | | | | | | PlanningVer-sionID 72034 | 1 72036 | PlanningVer-sionID 72038 |
| | | | | | | | ProductID 72040 | 1 72042 | ProductID 72044 |
| | | | | | | | LocationID 72046 | 1 72048 | LocationID 72050 |

FIG. 72-3

| Package | | | | level1 | level2 | level3 | level4 | Cardinality | Data Type Name |
|---|---|---|---|---|---|---|---|---|---|
| | | | | | | | VirtualChildIndicator 72052 | 1 72054 | Indicator 72056 |
| | | | | | | | ThirdPartyOrderProcessingIndicator 72058 | 1 72060 | Indicator 72062 |
| | | Log 72064 | | | | Log 72066 | | 0..1 72068 | Log 72070 |
| | Log 72072 | | | | Log 72074 | | | 0..1 72076 | Log 72078 |

FIG. 73-1

| Package | level1 | level2 | level3 | level4 | level5 | level6 | Cardinality | Data Type Name |
|---|---|---|---|---|---|---|---|---|
| ServicePartDemandHistoriesKeyFigureCreateRequestMessage 73000 | ServicePartDemandHistoriesKeyFigureCreateRequestMessage 73002 | | | | | | | ServicePartDemandHistoriesKeyFigureCreateRequestMessage 73004 |
| MessageHeader 73006 | | MessageHeader 73008 | | | | | 1 73010 | BusinessDocumentMessageHeader 73012 |
| ServicePartDemandHistoryKeyFigureCreateRequestMessage 73014 | | ServicePartDemandHistoryKeyFigureCreateRequestMessage 73016 | | | | | 1..n 73018 | ServicePartDemandHistoryKeyFigureCreateRequestMessage 73020 |

FIG. 73-2

| Package | | | | level1 | level2 | level3 | level4 | level5 | level6 | Cardinality | Data Type Name |
|---|---|---|---|---|---|---|---|---|---|---|---|
| | | ServicePartDemandHistory 73022 | | | | Service-PartDe-mandHis-tory 73024 | | | | 1 73026 | |
| | | | | | | | HistoryID 73028 | | | 0..1 73030 | Service-PartDe-mandHisto-ryID 73032 |
| | | | | | | | Planning-VersionID 73034 | | | 0..1 73036 | Planning-VersionID 73038 |
| | | | | | | | ProductID 73040 | | | 0..1 73042 | ProductID 73044 |
| | | | | | | | LocationID 73046 | | | 0..1 73048 | LocationID 73050 |

FIG. 73-3

| Package | | | | level1 | level2 | level3 | level4 | level5 | level6 | Cardinality | Data Type Name |
|---|---|---|---|---|---|---|---|---|---|---|---|
| | | | | | | | VirtualChild-Indicator 73052 | | | 0..1 73054 | Indicator 73056 |
| | | | | | | | ThirdParty-OrderProc-essingIndi-cator 73058 | | | 0..1 73060 | Indicator 73062 |
| | | | TimeSeries 73064 | | | | KeyFigure 73066 | | | 1..n 73068 | TimeSeri-esKeyFig-ure 73070 |
| | | | | | | | | Code 73072 | | 1 73074 | TimeSeri-esKeyFig-ureCode 73076 |
| | | | | | | | | UnitOf-Measure 73078 | | 0..1 73080 | Measure-UnitCode 73082 |

FIG. 73-4

| Package | | | | level1 | level2 | level3 | level4 | level5 | level6 | Cardinality | Data Type Name |
|---|---|---|---|---|---|---|---|---|---|---|---|
| | | | | | | | | KeyFigure-Value 73084 | | 1..n 73086 | TimeSeri-esKeyFig-ureTime-Bucket-Value 73088 |
| | | | | | | | | | TimeBuck-etNumber-IntValue 73090 | 1 73092 | Integer-Value 73094 |
| | | | | | | | | | KeyFigure-FloatValue 73096 | 1 73098 | FloatValue 73100 |

FIG. 74-1

| Package | | level1 | level2 | level3 | level4 | Cardinality | Data Type Name |
|---|---|---|---|---|---|---|---|
| ServicePartDemandHistoryByElementsQueryMessage 74000 | | ServicePartDemandHistoryByElementsQueryMessage 74002 | | | | | <MessageDataType> 74004 |
| | MessageHeader 74006 | | MessageHeader 74008 | | | 1 74010 | BusinessDocumentMessageHeader 74012 |
| | Selection 74014 | | ServicePartDemandHistorySelectionByElements 74016 | | | 1 74018 | ... |
| | | | | ServicePartDemandHistoryID 74020 | | 0..1 74022 | ServicePartDemandHistoryID 74024 |
| | | | | PlanningVersionID 74026 | | 0..1 74028 | PlanningVersionID 74030 |

FIG. 74-2

| Package | | level1 | level2 | level3 | level4 | Cardinality | Data Type Name |
|---|---|---|---|---|---|---|---|
| | | | | SelectionByProductInternalID 74032 | | 0..1 74034 | SelectionByProductInternalID 74036 |
| | | | | | InclusionExclusionCode 74038 | 1 74040 | InclusionExclusionCode 74042 |
| | | | | | IntervalBoundaryTypeCode 74044 | 1 74046 | IntervalBoundaryTypeCode 74048 |
| | | | | | LowerBoundaryProductInternalID 74050 | 1 74052 | ProductInternalID 74054 |
| | | | | | UpperBoundaryProductInternalID 74056 | 1 74058 | ProductInternalID 74060 |

FIG. 74-3

| Package | | level1 | level2 | level3 | level4 | Cardinality | Data Type Name |
|---|---|---|---|---|---|---|---|
| | | | | SelectionByLocationInternalID 74062 | | 0..1 74064 | SelectionByLocationInternalID 74066 |
| | | | | | InclusionExclusionCode 74068 | 1 74070 | InclusionExclusionCode 74072 |
| | | | | | IntervalBoundaryTypeCode 74074 | 1 74076 | IntervalBoundaryTypeCode 74078 |
| | | | | | LowerBoundary-LocationInternalID 74080 | 1 74082 | LocationInternalID 74084 |
| | | | | | UpperBoundary-LocationInternalID 74086 | 1 74088 | LocationInternalID 74090 |

FIG. 74-4

| Package | | level1 | level2 | level3 | level4 | Cardinality | Data Type Name |
|---|---|---|---|---|---|---|---|
| | | | | VirtualChildIndicator 74092 | | 0..1 74094 | Indicator,Qualifier:BODVirtualChildIndicator 74096 |
| | | | | ThirdPartyOrderProcessingIndicator 74098 | | 0..1 74100 | Indicator,Qualifier:BusinessTransactionDocumentItemThirdParty 74102 |
| | | | | SelectionByPeriod 74104 | | 0..1 74106 | SelectionByPeriod 74108 |
| | | | | | LowerBoundaryDateTime 74110 | 1 74112 | GLOBAL_DateTime 74114 |
| | | | | | UpperBoundaryDateTime 74116 | 1 74118 | GLOBAL_DateTime 74120 |

FIG. 74-5

| Package | | level1 | level2 | level3 | level4 | Cardinality | Data Type Name |
|---|---|---|---|---|---|---|---|
| | | | | ChangeDateTime 74122 | | 0..1 74124 | GLOBAL_DateTime,Qualifier:Change 74126 |

FIG. 75-1

| Package | level1 | level2 | level3 | level4 | level5 | Cardinality | Data Type Name |
|---|---|---|---|---|---|---|---|
| ServicePartDemandHistoryByElementsResponseMessage 75000 | ServicePartDemandHistoryByElementsResponseMessage 75002 | | | | | | ServicePartDemandHistoryByElementsResponseMessage 75004 |
| MessageHeader 75006 | | MessageHeader 75008 | | | | 1 75010 | BusinessDocumentMessageHeader 75012 |
| ServicePartDemandHistory 75014 | | ServicePartDemandHistory 75016 | | | | 0..n 75018 | |
| | | | HistoryID 75020 | | | 1 75022 | ServicePartDemandHistoryID 75024 |

FIG. 75-2

| Package | | level1 | level2 | level3 | level4 | level5 | Cardinality | Data Type Name |
|---|---|---|---|---|---|---|---|---|
| | | | | PlanningVer-sionID 75026 | | | 1 75028 | PlanningVer-sionID 75030 |
| | | | | ProductID 75032 | | | 1 75034 | ProductID 75036 |
| | | | | LocationID 75038 | | | 1 75040 | LocationID 75042 |
| | | | | VirtualChild-Indicator 75044 | | | 1 75046 | Indicator 75048 |
| | | | | ThirdParty-OrderProc-essingIndica-tor 75050 | | | 1 75052 | Indicator 75054 |

FIG. 75-3

| Package | | | | level1 | level2 | level3 | level4 | level5 | Cardinality | Data Type Name |
|---|---|---|---|---|---|---|---|---|---|---|
| | | TimeSeries 75056 | | | | KeyFigure 75058 | | | 1..n 75060 | TimeSeries-KeyFigure 75062 |
| | | | | | | | Code 75064 | | 1 75066 | TimeSeries-KeyFigure-Code 75068 |
| | | | | | | | UnitOfMeasure 75070 | | 1 75072 | MeasureUnitCode 75074 |
| | | | | | | | KeyFigure-Value 75076 | | 0..n 75078 | TimeSeries-KeyFigure-TimeBucket-Value 75080 |
| | | | | | | | | TimeBucket-NumberInt-Value 75082 | 1 75084 | IntegerValue 75086 |

FIG. 75-4

| Package | | | | level1 | level2 | level3 | level4 | level5 | Cardinality | Data Type Name |
|---|---|---|---|---|---|---|---|---|---|---|
| | | | | | | | | KeyFigure-FloatValue 75088 | 1 75090 | FloatValue 75092 |
| | | | | | | PeriodBuck-etAssignment 75094 | | | 1..n 75096 | TimeSeries-PeriodTime-BucketAs-signment 75098 |
| | | | | | | | TimeBucket-NumberInt-Value 75100 | | 1 75102 | IntValue 75104 |
| | | | | | | | Start-DateTime 75106 | | 1 75108 | GLOBAL_DateTime 75110 |
| | | | | | | | End-DateTime 75112 | | 1 75114 | GLOBAL_DateTime 75116 |

FIG. 75-5

| Package | | level1 | level2 | level3 | level4 | level5 | Cardinality | Data Type Name |
|---|---|---|---|---|---|---|---|---|
| | Log 75118 | | Log 75120 | | | | 0..1 75122 | Log 75124 |

FIG. 76-1

| Package | | level1 | level2 | level3 | Cardinality | Data Type Name |
|---|---|---|---|---|---|---|
| ServicePartDemandHistoryCancelConfirmationMessage 76000 | | ServicePartDemandHistoryCancelConfirmationMessage 76002 | | | | ServicePartDemandHistoryCancelConfirmationMessage 76004 |
| | MessageHeader 76006 | | MessageHeader 76008 | | 1 76010 | BusinessDocumentMessageHeader 76012 |
| | ServicePartDemandHistory 76014 | | ServicePartDemandHistory 76016 | | 0..1 76018 | |
| | | | | HistoryID 76020 | 1 76022 | ServicePartDemandHistoryID 76024 |
| | | | | PlanningVersionID 76026 | 1 76028 | PlanningVersionID 76030 |

FIG. 76-2

| Package | | level1 | level2 | level3 | Cardinality | Data Type Name |
|---|---|---|---|---|---|---|
| | | | | ProductID 76032 | 1 76034 | ProductID 76036 |
| | | | | LocationID 76038 | 1 76040 | LocationID 76042 |
| | | | | VirtualChildIndicator 76044 | 1 76046 | Indicator 76048 |
| | | | | ThirdPartyOrder-ProcessingIndicator 76050 | 1 76052 | Indicator 76054 |
| | Log 76056 | | Log 76058 | | 0..1 76060 | Log 76062 |

FIG. 77-1

| Package | | level1 | level2 | level3 | Cardinality | Data Type Name |
|---|---|---|---|---|---|---|
| ServicePartDemandHistoryCancelRequestMessage 77000 | | ServicePartDemandHistoryCancelRequestMessage 77002 | | | | ServicePartDemandHistoryCancelRequestMessage 77004 |
| | MessageHeader 77006 | | MessageHeader 77008 | | 1 77010 | BusinessDocumentMessageHeader 77012 |
| | ServicePartDemandHistory 77014 | | ServicePartDemandHistory 77016 | | 1 77018 | |
| | | | | HistoryID 77020 | 0..1 77022 | ServicePartDemandHistoryID 77024 |
| | | | | PlanningVersionID 77026 | 0..1 77028 | PlanningVersionID 77030 |

FIG. 77-2

| Package | | level1 | level2 | level3 | Cardinality | Data Type Name |
|---|---|---|---|---|---|---|
| | | | | ProductID 77032 | 0..1 77034 | ProductID 77036 |
| | | | | LocationID 77038 | 0..1 77040 | LocationID 77042 |
| | | | | VirtualChildIndicator 77044 | 0..1 77046 | Indicator 77048 |
| | | | | ThirdPartyOrder-ProcessingIndicator 77050 | 0..1 77052 | Indicator 77054 |

FIG. 78-1

| Package | | level1 | level2 | level3 | Cardinality | Data Type Name |
|---|---|---|---|---|---|---|
| ServicePartDemandHistoryChangeConfirmationMessage 78000 | | ServicePartDemandHistoryChangeConfirmationMessage 78002 | | | | ServicePartDemandHistoryChangeConfirmationMessage 78004 |
| | MessageHeader 78006 | | MessageHeader 78008 | | 1 78010 | BusinessDocumentMessageHeader 78012 |
| | ServicePartDemandHistory 78014 | | ServicePartDemandHistory 78016 | | 0..1 78018 | |
| | | | | HistoryID 78020 | 1 78022 | ServicePartDemandHistoryID 78024 |
| | | | | PlanningVersionID 78026 | 1 78028 | PlanningVersionID 78030 |

FIG. 78-2

| Package | | level1 | level2 | level3 | Cardinality | Data Type Name |
|---|---|---|---|---|---|---|
| | | | | ProductID 78032 | 1 78034 | ProductID 78036 |
| | | | | LocationID 78038 | 1 78040 | LocationID 78042 |
| | | | | VirtualChildIndicator 78044 | 1 78046 | Indicator 78048 |
| | | | | ThirdPartyOrder-ProcessingIndicator 78050 | 1 78052 | Indicator 78054 |
| | Log 78056 | | Log 78058 | | 0..1 78060 | Log 78062 |

FIG. 79-1

| Package | | level1 | level2 | level3 | level4 | level5 | Cardinality | Data Type Name |
|---|---|---|---|---|---|---|---|---|
| ServicePartDemandHistoryChangeRequestMessage 79000 | | ServicePart-DemandHis-toryChangeRequestMes-sage 79002 | | | | | | ServicePart-DemandHis-toryChangeRequestMes-sage 79004 |
| | MessageHeader 79006 | | Message-Header 79008 | | | | 1 79010 | Business-Document-Message-Header 79012 |
| | ServicePartDemandHistory 79014 | | ServicePart-DemandHis-tory 79016 | | | | 1 79018 | |
| | | | | HistoryID 79020 | | | 0..1 79022 | ServicePart-DemandHis-toryID 79024 |

FIG. 79-2

| Package | | level1 | level2 | level3 | level4 | level5 | Cardinality | Data Type Name |
|---|---|---|---|---|---|---|---|---|
| | | | | PlanningVersionID 79026 | | | 0..1 79028 | PlanningVersionID 79030 |
| | | | | ProductID 79032 | | | 0..1 79034 | ProductID 79036 |
| | | | | LocationID 79038 | | | 0..1 79040 | LocationID 79042 |
| | | | | VirtualChildIndicator 79044 | | | 0..1 79046 | Indicator 79048 |
| | | | | ThirdPartyOrderProcessingIndicator 79050 | | | 0..1 79052 | Indicator 79054 |

FIG. 79-3

| Package | | | | level1 | level2 | level3 | level4 | level5 | Cardinality | Data Type Name |
|---|---|---|---|---|---|---|---|---|---|---|
| | | TimeSeries 79056 | | | | KeyFigure 79058 | | | 1..n 79060 | TimeSeries-KeyFigure 79062 |
| | | | | | | | Code 79064 | | 1 79066 | TimeSeries-KeyFigure-Code 79068 |
| | | | | | | | UnitOfMeasure 79070 | | 0..1 79072 | Measure-UnitCode 79074 |
| | | | | | | | KeyFigure-Value 79076 | | 0..n 79078 | TimeSeries-KeyFigure-TimeBucket-Value 79080 |
| | | | | | | | | TimeBucket-NumberInt-Value 79082 | 1 79084 | IntegerValue 79086 |

FIG. 79-4

| Package | | | | level1 | level2 | level3 | level4 | level5 | Cardinality | Data Type Name |
|---|---|---|---|---|---|---|---|---|---|---|
| | | | | | | | | KeyFigure-FloatValue 79088 | 1 79090 | FloatValue 79092 |
| | | | | | | PeriodBucket-Assignment 79094 | | | 1..n 79096 | TimeSeries-PeriodTime-BucketAssignment 79098 |
| | | | | | | | TimeBucket-NumberInt-Value 79100 | | 1 79102 | IntValue 79104 |
| | | | | | | | Start-DateTime 79106 | | 1 79108 | GLOBAL_DateTime 79110 |
| | | | | | | | End-DateTime 79112 | | 1 79114 | GLOBAL_DateTime 79116 |

FIG. 80-1

| Package | | level1 | level2 | level3 | Cardinality | Data Type Name |
|---|---|---|---|---|---|---|
| ServicePartDemandHistoryCreateConfirmationMessage 80000 | | ServicePartDemandHistoryCreateConfirmationMessage 80002 | | | | ServicePartDemandHistoryCreateConfirmationMessage 80004 |
| | MessageHeader 80006 | | MessageHeader 80008 | | 1 80010 | BusinessDocumentMessageHeader 80012 |
| | ServicePartDemandHistory 80014 | | ServicePartDemandHistory 80016 | | 0..1 80018 | |
| | | | | HistoryID 80020 | 1 80022 | ServicePartDemandHistoryID 80024 |
| | | | | PlanningVersionID 80026 | 1 80028 | PlanningVersionID 80030 |

FIG. 80-2

| Package | | level1 | level2 | level3 | Cardinality | Data Type Name |
|---|---|---|---|---|---|---|
| | | | | ProductID 80032 | 1 80034 | ProductID 80036 |
| | | | | LocationID 80038 | 1 80040 | LocationID 80042 |
| | | | | VirtualChildIndicator 80044 | 1 80046 | Indicator 80048 |
| | | | | ThirdPartyOrder-ProcessingIndicator 80050 | 1 80052 | Indicator 80054 |
| | Log 80056 | | Log 80058 | | 0..1 80060 | Log 80062 |

FIG. 81-1

| Package | | level1 | level2 | level3 | level4 | level5 | Cardinality | Data Type Name |
|---|---|---|---|---|---|---|---|---|
| ServicePartDemandHistoryCreateRequestMessage 81000 | | ServicePart-DemandHis-toryCre-ateRequest-Message 81002 | | | | | | ServicePart-DemandHis-toryCre-ateRequest-Message 81004 |
| | MessageHeader 81006 | | Message-Header 81008 | | | | 1 81010 | Business-Document-Message-Header 81012 |
| | ServicePartDemandHistory 81014 | | ServicePart-DemandHis-tory 81016 | | | | 1 81018 | |
| | | | | PlanningVer-sionID 81020 | | | 1 81022 | PlanningVer-sionID 81024 |

FIG. 81-2

| Package | | | level1 | level2 | level3 | level4 | level5 | Cardinality | Data Type Name |
|---|---|---|---|---|---|---|---|---|---|
| | | | | | ProductID 81026 | | | 1 81028 | ProductID 81030 |
| | | | | | LocationID 81032 | | | 1 81034 | LocationID 81036 |
| | | | | | VirtualChild-Indicator 81038 | | | 1 81040 | Indicator 81042 |
| | | | | | ThirdParty-OrderProc-essingIndica-tor 81044 | | | 1 81046 | Indicator 81048 |
| | | TimeSeries 81050 | | | KeyFigure 81052 | | | 1..n 81054 | TimeSeries-KeyFigure 81056 |

FIG. 81-3

| Package | | | | level1 | level2 | level3 | level4 | level5 | Cardinality | Data Type Name |
|---|---|---|---|---|---|---|---|---|---|---|
| | | | | | | | Code 81058 | | 1 81060 | TimeSeries-KeyFigure-Code 81062 |
| | | | | | | | UnitOfMeas-ure 81064 | | 0..1 81066 | Measure-UnitCode 81068 |
| | | | | | | | KeyFigure-Value 81070 | | 1.nn 81072 | TimeSeries-KeyFigure-TimeBucket-Value 81074 |
| | | | | | | | | TimeBucket-NumberInt-Value 81076 | 1 81078 | IntegerValue 81080 |
| | | | | | | | | KeyFigure-FloatValue 81082 | 1 81084 | FloatValue 81086 |

FIG. 81-4

| Package | | | | level1 | level2 | level3 | level4 | level5 | Cardinality | Data Type Name |
|---|---|---|---|---|---|---|---|---|---|---|
| | | | | | | PeriodBucketAssignment 81088 | | | 1.nn 81090 | TimeSeriesPeriodTimeBucketAssignment 81092 |
| | | | | | | | TimeBucketNumberIntValue 81094 | | 1 81096 | IntValue 81098 |
| | | | | | | | StartDateTime 81100 | | 1 81102 | GLOBAL_DateTime 81104 |
| | | | | | | | EndDateTime 81106 | | 1 81108 | GLOBAL_DateTime 81110 |

FIG. 82-1

| Package | level1 | level2 | level3 | Cardinality | Data Type Name |
|---|---|---|---|---|---|
| ServicePartDemandHistoryKeyFigureCancelConfirmationMessage 82000 | ServicePartDemandHistoryKeyFigureCancelConfirmationMessage 82002 | | | | ServicePartDemandHistoryKeyFigureCancelConfirmationMessage 82004 |
| MessageHeader 82006 | | MessageHeader 82008 | | 1 82010 | BusinessDocumentMessageHeader 82012 |
| ServicePartDemandHistory 82014 | | ServicePartDemandHistory 82016 | | 0..1 82018 | |
| | | | HistoryID 82020 | 1 82022 | ServicePartDemandHistoryID 82024 |
| | | | PlanningVersionID 82026 | 1 82028 | PlanningVersionID 82030 |

FIG. 82-2

| Package | | level1 | level2 | level3 | Cardinality | Data Type Name |
|---|---|---|---|---|---|---|
| | | | | ProductID 82032 | 1 82034 | ProductID 82036 |
| | | | | LocationID 82038 | 1 82040 | LocationID 82042 |
| | | | | VirtualChildIndicator 82044 | 1 82046 | Indicator 82048 |
| | | | | ThirdPartyOrder-ProcessingIndicator 82050 | 1 82052 | Indicator 82054 |
| | Log 82056 | | Log 82058 | | 0..1 82060 | Log 82062 |

FIG. 83-1

| Package | level1 | level2 | level3 | level4 | Cardinality | Data Type Name |
|---|---|---|---|---|---|---|
| ServicePartDemandHistoryKeyFigureCancelRequestMessage 83000 | ServicePartDemandHistoryKeyFigureCancelRequestMessage 83002 | | | | | ServicePartDemandHistoryKeyFigureCancelRequestMessage 83004 |
| MessageHeader 83006 | | MessageHeader 83008 | | | 1 83010 | BusinessDocumentMessageHeader 83012 |
| ServicePartDemandHistory 83014 | | ServicePartDemandHistory 83016 | | | 1 83018 | |
| | | | HistoryID 83020 | | 0..1 83022 | ServicePartDemandHistoryID 83024 |

FIG. 83-2

| Package | | level1 | level2 | level3 | level4 | Cardinality | Data Type Name |
|---|---|---|---|---|---|---|---|
| | | | | PlanningVersionID 83026 | | 0..1 83028 | PlanningVersionID 83030 |
| | | | | ProductID 83032 | | 0..1 83034 | ProductID 83036 |
| | | | | LocationID 83038 | | 0..1 83040 | LocationID 83042 |
| | | | | VirtualChildIndicator 83044 | | 0..1 83046 | Indicator 83048 |
| | | | | ThirdPartyOrderProcessingIndicator 83050 | | 0..1 83052 | Indicator 83054 |

FIG. 83-3

| Package | | | | level1 | level2 | level3 | level4 | Cardinality | Data Type Name |
|---|---|---|---|---|---|---|---|---|---|
| | | TimeSeries 83056 | | | | KeyFigure 83058 | | 1..n 83060 | TimeSeries-KeyFigure 83062 |
| | | | | | | | Code 83064 | 1 83066 | TimeSeries-KeyFigure-Code 83068 |

FIG. 84-1

| Package | | level1 | level2 | level3 | Cardinality | Data Type Name |
|---|---|---|---|---|---|---|
| ServicePartDemandHistoryKeyFigureCreateConfirmationMessage 84000 | | ServicePartDemandHistoryKeyFigureCreateConfirmationMessage 84002 | | | | ServicePartDemandHistoryKeyFigureCreateConfirmationMessage 84004 |
| | MessageHeader 84006 | | MessageHeader 84008 | | 1 84010 | BusinessDocumentMessageHeader 84012 |
| | ServicePartDemandHistory 84014 | | ServicePartDemandHistory 84016 | | 0..1 84018 | |
| | | | | HistoryID 84020 | 1 84022 | ServicePartDemandHistoryID 84024 |
| | | | | PlanningVersionID 84026 | 1 84028 | PlanningVersionID 84030 |

FIG. 84-2

| Package | | level1 | level2 | level3 | Cardinality | Data Type Name |
|---|---|---|---|---|---|---|
| | | | | ProductID 84032 | 1 84034 | ProductID 84036 |
| | | | | LocationID 84038 | 1 84040 | LocationID 84042 |
| | | | | VirtualChildIndicator 84044 | 1 84046 | Indicator 84048 |
| | | | | ThirdPartyOrder-ProcessingIndicator 84050 | 1 84052 | Indicator 84054 |
| | Log 84056 | | Log 84058 | | 0..1 84060 | Log 84062 |

FIG. 85-1

| Package | | level1 | level2 | level3 | level4 | level5 | Cardinality | Data Type Name |
|---|---|---|---|---|---|---|---|---|
| ServicePartDemandHistoryKeyFigureCreateRequest-Message 85000 | | ServicePart-DemandHis-toryKeyFig-ureCre-ateRequest-Message 85002 | | | | | | ServicePart-DemandHis-toryKeyFig-ureCre-ateRequest-Message 85004 |
| | MessageHeader 85006 | | Message-Header 85008 | | | | 1 85010 | Business-Document-Message-Header 85012 |
| | ServicePartDemandHistory 85014 | | ServicePart-DemandHis-tory 85016 | | | | 1 85018 | |
| | | | | HistoryID 85020 | | | 0..1 85022 | ServicePart-DemandHis-toryID 85024 |

FIG. 85-2

| Package | | level1 | level2 | level3 | level4 | level5 | Cardinality | Data Type Name |
|---|---|---|---|---|---|---|---|---|
| | | | | PlanningVersionID 85026 | | | 0..1 85028 | PlanningVersionID 85030 |
| | | | | ProductID 85032 | | | 0..1 85034 | ProductID 85036 |
| | | | | LocationID 85038 | | | 0..1 85040 | LocationID 85042 |
| | | | | VirtualChildIndicator 85044 | | | 0..1 85046 | Indicator 85048 |
| | | | | ThirdPartyOrderProcessingIndicator 85050 | | | 0..1 85052 | Indicator 85054 |

FIG. 85-3

| Package | | | | level1 | level2 | level3 | level4 | level5 | Cardinality | Data Type Name |
|---|---|---|---|---|---|---|---|---|---|---|
| | | TimeSeries 85056 | | | | KeyFigure 85058 | | | 1..n 85060 | TimeSeries-KeyFigure 85062 |
| | | | | | | | Code 85064 | | 1 85066 | TimeSeries-KeyFigure-Code 85068 |
| | | | | | | | UnitOfMeas-ure 85070 | | 0..1 85072 | Measure-UnitCode 85074 |
| | | | | | | | KeyFigure-Value 85076 | | 1..n 85078 | TimeSeries-KeyFigure-TimeBucket-Value 85080 |
| | | | | | | | | TimeBucket-NumberInt-Value 85082 | 1 85084 | IntegerValue 85086 |

FIG. 85-4

| Package | | | | level1 | level2 | level3 | level4 | level5 | Cardinality | Data Type Name |
|---|---|---|---|---|---|---|---|---|---|---|
| | | | | | | | | KeyFigure-FloatValue 85088 | 1 85090 | FloatValue 85092 |

FIG. 111-1

| Package | | level1 | level2 | level3 | Cardinality | Data Type Name |
|---|---|---|---|---|---|---|
| ServicePartInventoryReplenishmentRule-CancelConfirmationMessage 111000 | | ServicePartInven-toryReplenishmen-tRuleCancelConfir-mationMessage 111002 | | | | ServicePartInven-toryReplenishmen-tRuleCancelConfir-mationMessage 111004 |
| | MessageHeader 111006 | | MessageHeader 111008 | | 1 111010 | BusinessDocument-MessageHeader 111012 |
| | ServicePartInven-toryReplenishmen-tRule 111014 | | ServicePartInven-toryReplenishmen-tRule 111016 | | 0..1 111018 | |
| | | | | InventoryReplenish-mentRuleID 111020 | 1 111022 | ServicePartInven-toryReplenishmen-tRuleID 111024 |
| | | | | PlanningVersionID 111026 | 1 111028 | PlanningVersionID 111030 |

FIG. 111-2

| Package | | level1 | level2 | level3 | Cardinality | Data Type Name |
|---|---|---|---|---|---|---|
| | | | | ProductID 111032 | 1 111034 | ProductID 111036 |
| | | | | LocationID 111038 | 1 111040 | LocationID 111042 |
| | | | | VirtualChildIndicator 111044 | 1 111046 | Indicator 111048 |
| | | | | ThirdPartyOrder-ProcessingIndicator 111050 | 1 111052 | Indicator 111054 |
| | Log 111056 | | Log 111058 | | 0..1 111060 | Log 111062 |

FIG. 112-1

| Package | | level1 | level2 | level3 | Cardinality | Data Type Name |
|---|---|---|---|---|---|---|
| ServicePartInventoryReplenishmentRule-CancelRequestMessage 112000 | | ServicePartInventoryReplenishmentRuleCancelRequestMessage 112002 | | | | ServicePartInventoryReplenishmentRuleCancelRequestMessage 112004 |
| | MessageHeader 112006 | | MessageHeader 112008 | | 1 112010 | BusinessDocument-MessageHeader 112012 |
| | ServicePartInventoryReplenishmentRule 112014 | | ServicePartInventoryReplenishmentRule 112016 | | 1 112018 | |
| | | | | InventoryReplenishmentRuleID 112020 | 0..1 112022 | ServicePartInventoryReplenishmentRuleID 112024 |
| | | | | PlanningVersionID 112026 | 0..1 112028 | PlanningVersionID 112030 |

FIG. 112-2

| Package | | level1 | level2 | level3 | Cardinality | Data Type Name |
|---|---|---|---|---|---|---|
| | | | | ProductID 112032 | 0..1 112034 | ProductID 112036 |
| | | | | LocationID 112038 | 0..1 112040 | LocationID 112042 |
| | | | | VirtualChildIndicator 112044 | 0..1 112046 | Indicator 112048 |
| | | | | ThirdPartyOrder-ProcessingIndicator 112050 | 0..1 112052 | Indicator 112054 |

FIG. 113-1

| Package | | level1 | level2 | level3 | Cardinality | Data Type Name |
|---|---|---|---|---|---|---|
| ServicePartInventoryReplenishmentRule-ChangeConfirmationMessage 113000 | | ServicePartInven-toryReplenishmen-tRuleChangeConfir-mationMessage 113002 | | | | ServicePartInven-toryReplenishmen-tRuleChangeConfir-mationMessage 113004 |
| | MessageHeader 113006 | | MessageHeader 113008 | | 1 113010 | BusinessDocument-MessageHeader 113012 |
| | ServicePartInven-toryReplenishmen-tRule 113014 | | ServicePartInven-toryReplenishmen-tRule 113016 | | 0..1 113018 | |
| | | | | InventoryReplenish-mentRuleID 113020 | 1 113022 | ServicePartInven-toryReplenishmen-tRuleID 113024 |
| | | | | PlanningVersionID 113026 | 1 113028 | PlanningVersionID 113030 |

FIG. 113-2

| Package | | level1 | level2 | level3 | Cardinality | Data Type Name |
|---|---|---|---|---|---|---|
| | | | | ProductID 113032 | 1 113034 | ProductID 113036 |
| | | | | LocationID 113038 | 1 113040 | LocationID 113042 |
| | | | | VirtualChildIndicator 113044 | 1 113046 | Indicator 113048 |
| | | | | ThirdPartyOrder-ProcessingIndicator 113050 | 1 113052 | Indicator 113054 |
| | Log 113056 | | Log 113058 | | 0..1 113060 | Log 113062 |

FIG. 114-1

| Package | level1 | level2 | level3 | level4 | level5 | Cardinality | Data Type Name |
|---|---|---|---|---|---|---|---|
| ServicePartInventoryReplenishmentRuleChangeRequestMessage 114000 | ServicePartInventoryReplenishmentRuleChangeRequestMessage 114002 | | | | | | ServicePartInventoryReplenishmentRuleChangeRequestMessage 114004 |
| MessageHeader 114006 | | MessageHeader 114008 | | | | 1 114010 | BusinessDocumentMessageHeader 114012 |
| ServicePartInventoryReplenishmentRule 114014 | | ServicePartInventoryReplenishmentRule 114016 | | | | 1 114018 | |

FIG. 114-2

| Package | | level1 | level2 | level3 | level4 | level5 | Cardinality | Data Type Name |
|---|---|---|---|---|---|---|---|---|
| | | | | InventoryReplenishmentRuleID 114020 | | | 0..1 114022 | ServicePartInventoryReplenishmentRuleID 114024 |
| | | | | PlanningVersionID 114026 | | | 0..1 114028 | PlanningVersionID 114030 |
| | | | | ProductID 114032 | | | 0..1 114034 | ProductID 114036 |
| | | | | LocationID 114038 | | | 0..1 114040 | LocationID 114042 |
| | | | | VirtualChildIndicator 114044 | | | 0..1 114046 | Indicator 114048 |

FIG. 114-3

| Package | | | | level1 | level2 | level3 | level4 | level5 | Cardinality | Data Type Name |
|---|---|---|---|---|---|---|---|---|---|---|
| | | | | | | ThirdParty-OrderProcessingIndicator 114050 | | | 0..1 114052 | Indicator 114054 |
| | | TimeSeries 114056 | | | | KeyFigure 114058 | | | 1..n 114060 | TimeSeries-KeyFigure 114062 |
| | | | | | | | Code 114064 | | 1 114066 | TimeSeries-KeyFigure-Code 114068 |
| | | | | | | | UnitOfMeasure 114070 | | 0..1 114072 | Measure-UnitCode 114074 |

FIG. 114-4

| Package | | | | level1 | level2 | level3 | level4 | level5 | Cardinality | Data Type Name |
|---|---|---|---|---|---|---|---|---|---|---|
| | | | | | | | KeyFigure-Value 114076 | | 0..n 114078 | TimeSeries-KeyFigure-TimeBucket-Value 114080 |
| | | | | | | | | TimeBucket-NumberInt-Value 114082 | 1 114084 | IntegerValue 114086 |
| | | | | | | | | KeyFigure-FloatValue 114088 | 1 114090 | FloatValue 114092 |
| | | | | | | PeriodBuck-etAssignment 114094 | | | 1..n 114096 | TimeSeries-PeriodTime-BucketAs-signment 114098 |

FIG. 114-5

| Package | | | | level1 | level2 | level3 | level4 | level5 | Cardinality | Data Type Name |
|---|---|---|---|---|---|---|---|---|---|---|
| | | | | | | | TimeBucket-NumberInt-Value 114100 | | 1 114102 | IntValue 114104 |
| | | | | | | | Start-DateTime 114106 | | 1 114108 | GLOBAL_DateTime 114110 |
| | | | | | | | End-DateTime 114112 | | 1 114114 | GLOBAL_DateTime 114116 |

FIG. 115-1

| Package | | level1 | level2 | level3 | Cardinality | Data Type Name |
|---|---|---|---|---|---|---|
| ServicePartInventoryReplenishmentRule-CreateConfirmationMessage 115000 | | ServicePartInven-toryReplenishmen-tRuleCreateConfir-mationMessage 115002 | | | | ServicePartInven-toryReplenishmen-tRuleCreateConfir-mationMessage 115004 |
| | MessageHeader 115006 | | MessageHeader 115008 | | 1 115010 | BusinessDocument-MessageHeader 115012 |
| | ServicePartInven-toryReplenishmen-tRule 115014 | | ServicePartInven-toryReplenishmen-tRule 115016 | | 0..1 115018 | |
| | | | | InventoryReplenish-mentRuleID 115020 | 1 115022 | ServicePartInven-toryReplenishmen-tRuleID 115024 |
| | | | | PlanningVersionID 115026 | 1 115028 | PlanningVersionID 115030 |

FIG. 115-2

| Package | | level1 | level2 | level3 | Cardinality | Data Type Name |
|---|---|---|---|---|---|---|
| | | | | ProductID 115032 | 1 115034 | ProductID 115036 |
| | | | | LocationID 115038 | 1 115040 | LocationID 115042 |
| | | | | VirtualChildIndicator 115044 | 1 115046 | Indicator 115048 |
| | | | | ThirdPartyOrder-ProcessingIndicator 115050 | 1 115052 | Indicator 115054 |
| | Log 115056 | | Log 115058 | | 0..1 115060 | Log 115062 |

FIG. 116-1

| Package | level1 | level2 | level3 | level4 | level5 | Cardinality | Data Type Name |
|---|---|---|---|---|---|---|---|
| ServicePartInventoryReplenishmentRuleCreateRequestMessage 116000 | ServicePartInventoryReplenishmentRuleCreateRequestMessage 116002 | | | | | | ServicePartInventoryReplenishmentRuleCreateRequestMessage 116004 |
| MessageHeader 116006 | | MessageHeader 116008 | | | | 1 116010 | BusinessDocumentMessageHeader 116012 |
| ServicePartInventoryReplenishmentRule 116014 | | ServicePartInventoryReplenishmentRule 116016 | | | | 1 116018 | |
| | | | PlanningVersionID 116020 | | | 1 116022 | PlanningVersionID 116024 |

FIG. 116-2

| Package | | | level1 | level2 | level3 | level4 | level5 | Cardinality | Data Type Name |
|---|---|---|---|---|---|---|---|---|---|
| | | | | | ProductID 116026 | | | 1 116028 | ProductID 116030 |
| | | | | | LocationID 116032 | | | 1 116034 | LocationID 116036 |
| | | | | | VirtualChild-Indicator 116038 | | | 1 116040 | Indicator 116042 |
| | | | | | ThirdParty-OrderProc-essingIndica-tor 116044 | | | 1 116046 | Indicator 116048 |
| | | TimeSeries 116050 | | | KeyFigure 116052 | | | 1..n 116054 | TimeSeries-KeyFigure 116056 |

FIG. 116-3

| Package | | | | level1 | level2 | level3 | level4 | level5 | Cardinality | Data Type Name |
|---|---|---|---|---|---|---|---|---|---|---|
| | | | | | | | Code 116058 | | 1 116060 | TimeSeries-KeyFigure-Code 116062 |
| | | | | | | | UnitOfMeasure 116064 | | 0..1 116066 | Measure-UnitCode 116068 |
| | | | | | | | KeyFigure-Value 116070 | | 1.nn 116072 | TimeSeries-KeyFigure-TimeBucket-Value 116074 |
| | | | | | | | | TimeBucket-NumberInt-Value 116076 | 1 116078 | IntegerValue 116080 |
| | | | | | | | | KeyFigure-FloatValue 116082 | 1 116084 | FloatValue 116086 |

FIG. 116-4

| Package | | | | level1 | level2 | level3 | level4 | level5 | Cardinality | Data Type Name |
|---|---|---|---|---|---|---|---|---|---|---|
| | | | | | | PeriodBucketAssignment 116088 | | | 1.nn 116090 | TimeSeriesPeriodTimeBucketAssignment 116092 |
| | | | | | | | TimeBucketNumberIntValue 116094 | | 1 116096 | IntValue 116098 |
| | | | | | | | StartDateTime 116100 | | 1 116102 | GLOBAL_DateTime 116104 |
| | | | | | | | EndDateTime 116106 | | 1 116108 | GLOBAL_DateTime 116110 |

FIG. 117-1

| Package | | level1 | level2 | level3 | Cardinality | Data Type Name |
|---|---|---|---|---|---|---|
| ServicePartInventoryReplenishmentRuleKeyFigureCancelConfirmationMessage 117000 | | ServicePartInventory Replenishmen-tRuleKeyFigureCan-celConfirmationMes-sage 117002 | | | | ServicePartInventory Replenishmen-tRuleKeyFigureCan-celConfirmationMes-sage 117004 |
| | MessageHeader 117006 | | MessageHeader 117008 | | 1 117010 | BusinessDocument-MessageHeader 117012 |
| | ServicePartInven-toryReplenishmen-tRule 117014 | | ServicePartInven-toryReplenishmen-tRule 117016 | | 0..1 117018 | |
| | | | | InventoryReplenish-mentRuleID 117020 | 1 117022 | ServicePartInven-toryReplenishmen-tRuleID 117024 |
| | | | | PlanningVersionID 117026 | 1 117028 | PlanningVersionID 117030 |

FIG. 117-2

| Package | | level1 | level2 | level3 | Cardinality | Data Type Name |
|---|---|---|---|---|---|---|
| | | | | ProductID 117032 | 1 117034 | ProductID 117036 |
| | | | | LocationID 117038 | 1 117040 | LocationID 117042 |
| | | | | VirtualChildIndicator 117044 | 1 117046 | Indicator 117048 |
| | | | | ThirdPartyOrder-ProcessingIndicator 117050 | 1 117052 | Indicator 117054 |
| | Log 117056 | | Log 117058 | | 0..1 117060 | Log 117062 |

FIG. 118-1

| Package | | level1 | level2 | level3 | level4 | Cardinality | Data Type Name |
|---|---|---|---|---|---|---|---|
| ServicePartInventoryReplenishmentRuleKeyFigureCancelRequestMessage 118000 | | ServicePartInventoryReplenishmentRuleKeyFigureCancelRequestMessage 118002 | | | | | ServicePartInventoryReplenishmentRuleKeyFigureCancelRequestMessage 118004 |
| | MessageHeader 118006 | | MessageHeader 118008 | | | 1 118010 | BusinessDocumentMessageHeader 118012 |
| | ServicePartInventoryReplenishmentRule 118014 | | ServicePartInventoryReplenishmentRule 118016 | | | 1 118018 | |
| | | | | InventoryReplenishmentRuleID 118020 | | 0..1 118022 | ServicePartInventoryReplenishmentRuleID 118024 |

FIG. 118-2

| Package | | level1 | level2 | level3 | level4 | Cardinality | Data Type Name |
|---|---|---|---|---|---|---|---|
| | | | | PlanningVersionID 118026 | | 0..1  118028 | PlanningVersionID 118030 |
| | | | | ProductID 118032 | | 0..1 118034 | ProductID 118036 |
| | | | | LocationID 118038 | | 0..1 118040 | LocationID 118042 |
| | | | | VirtualChildIndicator 118044 | | 0..1 118046 | Indicator 118048 |
| | | | | ThirdPartyOrderProcessingIndicator 118050 | | 0..1 118052 | Indicator 118054 |

FIG. 118-3

| Package | | | | level1 | level2 | level3 | level4 | Cardinality | Data Type Name |
|---|---|---|---|---|---|---|---|---|---|
| | | TimeSeries 118056 | | | | KeyFigure 118058 | | 1..n 118060 | TimeSeries-KeyFigure 118062 |
| | | | | | | | Code 118064 | 1 118066 | TimeSeries-KeyFigure-Code 118068 |

FIG. 119-1

| Package | | level1 | level2 | level3 | Cardinality | Data Type Name |
|---|---|---|---|---|---|---|
| ServicePartInventoryReplenishmentRuleKeyFigureCreateConfirmationMessage 119000 | | ServicePartInventoryReplenishmentRuleKeyFigureCreateConfirmationMessage 119002 | | | | ServicePartInventoryReplenishmentRuleKeyFigureCreateConfirmationMessage 119004 |
| | MessageHeader 119006 | | MessageHeader 119008 | | 1 119010 | BusinessDocumentMessageHeader 119012 |
| | ServicePartInventoryReplenishmentRule 119014 | | ServicePartInventoryReplenishmentRule 119016 | | 0..1 119018 | |
| | | | | InventoryReplenishmentRuleID 119020 | 1 119022 | ServicePartInventoryReplenishmentRuleID 119024 |
| | | | | PlanningVersionID 119026 | 1 119028 | PlanningVersionID 119030 |

FIG. 119-2

| Package | | level1 | level2 | level3 | Cardinality | Data Type Name |
|---|---|---|---|---|---|---|
| | | | | ProductID 119032 | 1 119034 | ProductID 119036 |
| | | | | LocationID 119038 | 1 119040 | LocationID 119042 |
| | | | | VirtualChildIndicator 119044 | 1 119046 | Indicator 119048 |
| | | | | ThirdPartyOrder-ProcessingIndicator 119050 | 1 119052 | Indicator 119054 |
| | Log 119056 | | Log 119058 | | 0..1 119060 | Log 119062 |

FIG. 120-1

| Package | | level1 | level2 | level3 | level4 | level5 | Cardinality | Data Type Name |
|---|---|---|---|---|---|---|---|---|
| ServicePartInventoryReplenishmentRuleKeyFigureCreateRequestMessage 120000 | | ServicePartInventoryReplenishmentRuleKeyFigureCreateRequestMessage 120002 | | | | | | ServicePartInventoryReplenishmentRuleKeyFigureCreateRequestMessage 120004 |
| | MessageHeader 120006 | | MessageHeader 120008 | | | | 1 120010 | BusinessDocumentMessageHeader 120012 |
| | ServicePartInventoryReplenishmentRule 120014 | | ServicePartInventoryReplenishmentRule 120016 | | | | 1 120018 | |

FIG. 120-2

| Package | | level1 | level2 | level3 | level4 | level5 | Cardinality | Data Type Name |
|---|---|---|---|---|---|---|---|---|
| | | | | InventoryReplenishmentRuleID 120020 | | | 0..1 120022 | ServicePartInventoryReplenishmentRuleID 120024 |
| | | | | PlanningVersionID 120026 | | | 0..1 120028 | PlanningVersionID 120030 |
| | | | | ProductID 120032 | | | 0..1 120034 | ProductID 120036 |
| | | | | LocationID 120038 | | | 0..1 120040 | LocationID 120042 |
| | | | | VirtualChildIndicator 120044 | | | 0..1 120046 | Indicator 120048 |

FIG. 120-3

| Package | | | | level1 | level2 | level3 | level4 | level5 | Cardinality | Data Type Name |
|---|---|---|---|---|---|---|---|---|---|---|
| | | | | | | ThirdParty-OrderProc-essingIndica-tor 120050 | | | 0..1 120052 | Indicator 120054 |
| | | TimeSeries 120056 | | | | KeyFigure 120058 | | | 1..n 120060 | TimeSeries-KeyFigure 120062 |
| | | | | | | | Code 120064 | | 1 120066 | TimeSeries-KeyFigure-Code 120068 |
| | | | | | | | UnitOfMeas-ure 120070 | | 0..1 120072 | Measure-UnitCode 120074 |

FIG. 120-4

| Package | | | | level1 | level2 | level3 | level4 | level5 | Cardinality | Data Type Name |
|---|---|---|---|---|---|---|---|---|---|---|
| | | | | | | | KeyFigure-Value 120076 | | 1..n 120078 | TimeSeries-KeyFigure-TimeBucket-Value 120080 |
| | | | | | | | | TimeBucket-NumberInt-Value 120082 | 1 120084 | IntegerValue 120086 |
| | | | | | | | | KeyFigure-FloatValue 120088 | 1 120090 | FloatValue 120092 |

FIG. 121-1

| Package | | level1 | level2 | level3 | level4 | Cardinality | Data Type Name |
|---|---|---|---|---|---|---|---|
| ServicePartInventoryReplenishmentRulesCancelConfirmationMessage 121000 | | ServicePartInventoryReplenishmentRulesCancelConfirmationMessage 121002 | | | | | ServicePartInventoryReplenishmentRulesCancelConfirmationMessage 121004 |
| | MessageHeader 121006 | | MessageHeader 121008 | | | 1 121010 | BusinessDocumentMessageHeader 121012 |
| | ServicePartInventoryReplenishmentRuleCancelConfirmationMessage 121014 | | ServicePartInventoryReplenishmentRuleCancelConfirmationMessage 121016 | | | 0..n 121018 | ServicePartInventoryReplenishmentRuleCancelConfirmationMessage 121020 |

FIG. 121-2

| Package | | | | level1 | level2 | level3 | level4 | Cardinality | Data Type Name |
|---|---|---|---|---|---|---|---|---|---|
| | | ServicePartInventoryReplenishmentRule 121022 | | | | ServicePartInventoryReplenishmentRule 121024 | | 0..1 121026 | |
| | | | | | | | InventoryReplenishmentRuleID 121028 | 1 121030 | ServicePartInventoryReplenishmentRuleID 121032 |
| | | | | | | | PlanningVersionID 121034 | 1 121036 | PlanningVersionID 121038 |
| | | | | | | | ProductID 121040 | 1 121042 | ProductID 121044 |
| | | | | | | | LocationID 121046 | 1 121048 | LocationID 121050 |

FIG. 121-3

| Package | | | | level1 | level2 | level3 | level4 | Cardinality | Data Type Name |
|---|---|---|---|---|---|---|---|---|---|
| | | | | | | | VirtualChildIndicator 121052 | 1 121054 | Indicator 121056 |
| | | | | | | | ThirdPartyOrderProcessingIndicator 121058 | 1 121060 | Indicator 121062 |
| | | Log 121064 | | | | Log 121066 | | 0..1 121068 | Log 121070 |
| | Log 121072 | | | | Log 121074 | | | 0..1 121076 | Log 121078 |

FIG. 122-1

| Package | | level1 | level2 | level3 | level4 | Cardinality | Data Type Name |
|---|---|---|---|---|---|---|---|
| ServicePartInventoryReplenishmentRulesCancelRequest-Message 122000 | | ServicePartIn-ventoryRe-plenishmen-tRulesCancel-RequestMes-sage 122002 | | | | | ServicePartIn-ventoryRe-plenishmen-tRulesCancel-RequestMes-sage 122004 |
| | MessageHeader 122006 | | Message-Header 122008 | | | 1 122010 | Business-Document-Message-Header 122012 |
| | ServicePartInventoryReplenishmentRuleCan-celRequestMessage 122014 | | ServicePartIn-ventoryRe-plenishmen-tRuleCancel-RequestMes-sage 122016 | | | 1..n 122018 | ServicePartIn-ventoryRe-plenishmen-tRuleCancel-RequestMes-sage 122020 |

FIG. 122-2

| Package | | | | level1 | level2 | level3 | level4 | Cardinality | Data Type Name |
|---|---|---|---|---|---|---|---|---|---|
| | | ServicePartInventoryReplenishmentRule 122022 | | | | ServicePartInventoryReplenishmentRule 122024 | | 1 122026 | |
| | | | | | | | InventoryReplenishmentRuleID 122028 | 0..1 122030 | ServicePartInventoryReplenishmentRuleID 122032 |
| | | | | | | | PlanningVersionID 122034 | 0..1 122036 | PlanningVersionID 122038 |
| | | | | | | | ProductID 122040 | 0..1 122042 | ProductID 122044 |
| | | | | | | | LocationID 122046 | 0..1 122048 | LocationID 122050 |

FIG. 122-3

| Package | | | | level1 | level2 | level3 | level4 | Cardinality | Data Type Name |
|---|---|---|---|---|---|---|---|---|---|
| | | | | | | | VirtualChildIndicator 122052 | 0..1 122054 | Indicator 122056 |
| | | | | | | | ThirdPartyOrderProcessingIndicator 122058 | 0..1 122060 | Indicator 122062 |

FIG. 123-1

| Package | | level1 | level2 | level3 | level4 | Cardinality | Data Type Name |
|---|---|---|---|---|---|---|---|
| ServicePartInventoryReplenishmentRulesChangeConfirmationMessage 123000 | | ServicePartInventoryReplenishmentRulesChangeConfirmationMessage 123002 | | | | | ServicePartInventoryReplenishmentRulesChangeConfirmationMessage 123004 |
| | MessageHeader 123006 | | MessageHeader 123008 | | | 1 123010 | BusinessDocumentMessageHeader 123012 |
| | ServicePartInventoryReplenishmentRuleChangeConfirmationMessage 123014 | | ServicePartInventoryReplenishmentRuleChangeConfirmationMessage 123016 | | | 0..n 123018 | ServicePartInventoryReplenishmentRuleChangeConfirmationMessage 123020 |

FIG. 123-2

| Package | | | | level1 | level2 | level3 | level4 | Cardinality | Data Type Name |
|---|---|---|---|---|---|---|---|---|---|
| | | ServicePartInventoryReplenishmentRule 123022 | | | | ServicePartInventoryReplenishmentRule 123024 | | 0..1 123026 | |
| | | | | | | | InventoryReplenishmentRuleID 123028 | 1 123030 | ServicePartInventoryReplenishmentRuleID 123032 |
| | | | | | | | PlanningVersionID 123034 | 1 123036 | PlanningVersionID 123038 |
| | | | | | | | ProductID 123040 | 1 123042 | ProductID 123044 |
| | | | | | | | LocationID 123046 | 1 123048 | LocationID 123050 |

FIG. 123-3

| Package | | | | level1 | level2 | level3 | level4 | Cardinality | Data Type Name |
|---|---|---|---|---|---|---|---|---|---|
| | | | | | | | VirtualChildIndicator 123052 | 1 123054 | Indicator 123056 |
| | | | | | | | ThirdPartyOrderProcessingIndicator 123058 | 1 123060 | Indicator 123062 |
| | | Log 123064 | | | | Log 123066 | | 0..1 123068 | Log 123070 |
| | Log 123072 | | | | Log 123074 | | | 0..1 123076 | Log 123078 |

FIG. 124-1

| Package | level1 | level2 | level3 | level4 | level5 | level6 | Cardinality | Data Type Name |
|---|---|---|---|---|---|---|---|---|
| ServicePartInventoryReplenishmentRulesChangeRequestMessage 124000 | ServicePartInventoryReplenishmentRulesChangeRequestMessage 124002 | | | | | | | ServicePartInventoryReplenishmentRulesChangeRequestMessage 124004 |
| MessageHeader 124006 | | MessageHeader 124008 | | | | | 1 124010 | BusinessDocumentMessageHeader 124012 |
| ServicePartInventoryReplenishmentRuleChangeRequestMessage 124014 | | ServicePartInventoryReplenishmentRuleChangeRequestMessage 124016 | | | | | 1..n 124018 | ServicePartInventoryReplenishmentRuleChangeRequestMessage 124020 |

FIG. 124-2

| Package | | | | level1 | level2 | level3 | level4 | level5 | level6 | Cardinality | Data Type Name |
|---|---|---|---|---|---|---|---|---|---|---|---|
| | | ServicePartInventoryReplenishmentRule 124022 | | | | Service-PartInven-toryReplen-ishmen-tRule 124024 | | | | 1 124026 | |
| | | | | | | | Inven-toryReplen-ishmen-tRuleID 124028 | | | 0..1 124030 | Service-PartInven-toryReplen-ishmen-tRuleID 124032 |
| | | | | | | | Planning-VersionID 124034 | | | 0..1 124036 | Planning-VersionID 124038 |
| | | | | | | | ProductID 124040 | | | 0..1 124042 | ProductID 124044 |
| | | | | | | | LocationID 124046 | | | 0..1 124048 | LocationID 124050 |

FIG. 124-3

| Package | | | | level1 | level2 | level3 | level4 | level5 | level6 | Cardinality | Data Type Name |
|---|---|---|---|---|---|---|---|---|---|---|---|
| | | | | | | | VirtualChild-Indicator 124052 | | | 0..1 124054 | Indicator 124056 |
| | | | | | | | ThirdParty-OrderProc-essingIndi-cator 124058 | | | 0..1 124060 | Indicator 124062 |
| | | | TimeSeries 124064 | | | | KeyFigure 124066 | | | 1..n 124068 | TimeSeri-esKeyFig-ure 124070 |
| | | | | | | | | Code 124072 | | 1 124074 | TimeSeri-esKeyFig-ureCode 124076 |
| | | | | | | | | UnitOf-Measure 124078 | | 0..1 124080 | Measure-UnitCode 124082 |

FIG. 124-4

| Package | | | | level1 | level2 | level3 | level4 | level5 | level6 | Cardinality | Data Type Name |
|---|---|---|---|---|---|---|---|---|---|---|---|
| | | | | | | | | KeyFigure-Value 124084 | | 0..n 124086 | TimeSeri-esKeyFig-ureTime-Bucket-Value 124088 |
| | | | | | | | | | TimeBuck-etNumber-IntValue 124090 | 1 124092 | Integer-Value 124094 |
| | | | | | | | | | KeyFigure-FloatValue 124096 | 1 124098 | FloatValue 124100 |
| | | | | | | | Period-BucketAs-signment 124102 | | | 1..n 124104 | TimeSeri-esPeriod-TimeBuck-etAssign-ment 124106 |

FIG. 124-5

| Package | | | | level1 | level2 | level3 | level4 | level5 | level6 | Cardinality | Data Type Name |
|---|---|---|---|---|---|---|---|---|---|---|---|
| | | | | | | | | TimeBuck-etNumber-IntValue 124108 | | 1 124110 | IntValue 124112 |
| | | | | | | | | Start-DateTime 124114 | | 1 124116 | GLOBAL_DateTime 124118 |
| | | | | | | | | End-DateTime 124120 | | 1 124122 | GLOBAL_DateTime 124124 |

FIG. 125-1

| Package | | level1 | level2 | level3 | level4 | Cardinality | Data Type Name |
|---|---|---|---|---|---|---|---|
| ServicePartInventoryReplenishmentRulesCreateConfirmationMessage 125000 | | ServicePartInventoryReplenishmentRulesCreateConfirmationMessage 125002 | | | | | ServicePartInventoryReplenishmentRulesCreateConfirmationMessage 125004 |
| | MessageHeader 125006 | | MessageHeader 125008 | | | 1 125010 | BusinessDocumentMessageHeader 125012 |
| | ServicePartInventoryReplenishmentRuleCreateConfirmationMessage 125014 | | ServicePartInventoryReplenishmentRuleCreateConfirmationMessage 125016 | | | 0..n 125018 | ServicePartInventoryReplenishmentRuleCreateConfirmationMessage 125020 |

FIG. 125-2

| Package | | | | level1 | level2 | level3 | level4 | Cardinality | Data Type Name |
|---|---|---|---|---|---|---|---|---|---|
| | | ServicePartInventoryReplenishmentRule 125022 | | | | ServicePartInventoryReplenishmentRule 125024 | | 0..1 125026 | |
| | | | | | | | InventoryReplenishmentRuleID 125028 | 1 125030 | ServicePartInventoryReplenishmentRuleID 125032 |
| | | | | | | | PlanningVersionID 125034 | 1 125036 | PlanningVersionID 125038 |
| | | | | | | | ProductID 125040 | 1 125042 | ProductID 125044 |
| | | | | | | | LocationID 125046 | 1 125048 | LocationID 125050 |

FIG. 125-3

| Package | | | | level1 | level2 | level3 | level4 | Cardinality | Data Type Name |
|---|---|---|---|---|---|---|---|---|---|
| | | | | | | | VirtualChildIndicator 125052 | 1 125054 | Indicator 125056 |
| | | | | | | | ThirdPartyOrderProcessingIndicator 125058 | 1 125060 | Indicator 125062 |
| | | Log 125064 | | | | Log 125066 | | 0..1 125068 | Log 125070 |
| | Log 125072 | | | | Log 125074 | | | 0..1 125076 | Log 125078 |

FIG. 126-1

| Package | | level1 | level2 | level3 | level4 | level5 | level6 | Cardinality | Data Type Name |
|---|---|---|---|---|---|---|---|---|---|
| ServicePartInventoryReplenishmentRulesCreateRequestMessage 126000 | | ServicePartInventoryReplenishmentRulesCreateRequestMessage 126002 | | | | | | | ServicePartInventoryReplenishmentRulesCreateRequestMessage 126004 |
| | MessageHeader 126006 | | MessageHeader 126008 | | | | | 1 126010 | BusinessDocumentMessageHeader 126012 |
| | ServicePartInventoryReplenishmentRuleCreateRequestMessage 126014 | | ServicePartInventoryReplenishmentRuleCreateRequestMessage 126016 | | | | | 1..n 126018 | ServicePartInventoryReplenishmentRuleCreateRequestMessage 126020 |

FIG. 126-2

| Package | | | | level1 | level2 | level3 | level4 | level5 | level6 | Cardinality | Data Type Name |
|---|---|---|---|---|---|---|---|---|---|---|---|
| | | ServicePartInventoryReplenishmentRule 126022 | | | | Service-PartInventoryReplenishmentRule 126024 | | | | 1 126026 | |
| | | | | | | | Planning-VersionID 126028 | | | 1 126030 | Planning-VersionID 126032 |
| | | | | | | | ProductID 126034 | | | 1 126036 | ProductID 126038 |
| | | | | | | | LocationID 126040 | | | 1 126042 | LocationID 126044 |
| | | | | | | | VirtualChild-Indicator 126046 | | | 1 126048 | Indicator 126050 |

FIG. 126-3

| Package | | | | level1 | level2 | level3 | level4 | level5 | level6 | Cardinality | Data Type Name |
|---|---|---|---|---|---|---|---|---|---|---|---|
| | | | | | | | ThirdParty-OrderProc-essingIndi-cator 126052 | | | 1 126054 | Indicator 126056 |
| | | | TimeSeries 126058 | | | | KeyFigure 126060 | | | 1..n 126062 | TimeSeri-esKeyFig-ure 126064 |
| | | | | | | | | Code 126066 | | 1 126068 | TimeSeri-esKeyFig-ureCode 126070 |
| | | | | | | | | UnitOf-Measure 126072 | | 0..1 126074 | Measure-UnitCode 126076 |

FIG. 126-4

| Package | | | | level1 | level2 | level3 | level4 | level5 | level6 | Cardinality | Data Type Name |
|---|---|---|---|---|---|---|---|---|---|---|---|
| | | | | | | | | KeyFigure-Value 126078 | | 1.nn 126080 | TimeSeriesKeyFigureTimeBucket-Value 126082 |
| | | | | | | | | | TimeBucketNumber-IntValue 126084 | 1 126086 | Integer-Value 126088 |
| | | | | | | | | | KeyFigure-FloatValue 126090 | 1 126092 | FloatValue 126094 |
| | | | | | | | Period-BucketAssignment 126096 | | | 1.nn 126098 | TimeSeriesPeriod-TimeBucketAssignment 126100 |

FIG. 126-5

| Package | | | | level1 | level2 | level3 | level4 | level5 | level6 | Cardinality | Data Type Name |
|---|---|---|---|---|---|---|---|---|---|---|---|
| | | | | | | | | TimeBuck-etNumber-IntValue 126102 | | 1 126104 | IntValue 126106 |
| | | | | | | | | Start-DateTime 126108 | | 1 126110 | GLOBAL_DateTime 126112 |
| | | | | | | | | End-DateTime 126114 | | 1 126116 | GLOBAL_DateTime 126118 |

FIG. 127-1

| Package | | level1 | level2 | level3 | level4 | Cardinality | Data Type Name |
|---|---|---|---|---|---|---|---|
| ServicePartInventoryReplenishmentRulesKeyFigureCancelConfirmationMessage 127000 | | ServicePartInventoryReplenishmentRulesKeyFigureCancelConfirmationMessage 127002 | | | | | ServicePartInventoryReplenishmentRulesKeyFigureCancelConfirmationMessage 127004 |
| | MessageHeader 127006 | | MessageHeader 127008 | | | 1 127010 | BusinessDocumentMessageHeader 127012 |
| | ServicePartInventoryReplenishmentRuleKeyFigureCancelConfirmationMessage 127014 | | ServicePartInventoryReplenishmentRuleKeyFigureCancelConfirmationMessage 127016 | | | 0..n 127018 | ServicePartInventoryReplenishmentRuleKeyFigureCancelConfirmationMessage 127020 |

FIG. 127-2

| Package | | | | level1 | level2 | level3 | level4 | Cardinality | Data Type Name |
|---|---|---|---|---|---|---|---|---|---|
| | | ServicePartInventoryReplenishmentRule 127022 | | | | ServicePartInventoryReplenishmentRule 127024 | | 0..1 127026 | |
| | | | | | | | InventoryReplenishmentRuleID 127028 | 1 127030 | ServicePartInventoryReplenishmentRuleID 127032 |
| | | | | | | | PlanningVersionID 127034 | 1 127036 | PlanningVersionID 127038 |
| | | | | | | | ProductID 127040 | 1 127042 | ProductID 127044 |
| | | | | | | | LocationID 127046 | 1 127048 | LocationID 127050 |

FIG. 127-3

| Package | | | | level1 | level2 | level3 | level4 | Cardinality | Data Type Name |
|---|---|---|---|---|---|---|---|---|---|
| | | | | | | | VirtualChildIndicator 127052 | 1 127054 | Indicator 127056 |
| | | | | | | | ThirdPartyOrderProcessingIndicator 127058 | 1 127060 | Indicator 127062 |
| | | Log 127064 | | | | Log 127066 | | 0..1 127068 | Log 127070 |
| | Log 127072 | | | | Log 127074 | | | 0..1 127076 | Log 127078 |

FIG. 128-1

| Package | | level1 | level2 | level3 | level4 | level5 | Cardinality | Data Type Name |
|---|---|---|---|---|---|---|---|---|
| ServicePartInventoryReplenishmentRulesKeyFigureCancelRequestMessage 128000 | | ServicePartInventoryReplenishmentRulesKeyFigureCancelRequestMessage 128002 | | | | | | ServicePartInventoryReplenishmentRulesKeyFigureCancelRequestMessage 128004 |
| | MessageHeader 128006 | | MessageHeader 128008 | | | | 1 128010 | BusinessDocumentMessageHeader 128012 |
| | ServicePartInventoryReplenishmentRuleKeyFigureCancelRequestMessage 128014 | | ServicePartInventoryReplenishmentRuleKeyFigureCancelRequestMessage 128016 | | | | 1..n 128018 | ServicePartInventoryReplenishmentRuleKeyFigureCancelRequestMessage 128020 |

FIG. 128-2

| Package | | | | level1 | level2 | level3 | level4 | level5 | Cardinality | Data Type Name |
|---|---|---|---|---|---|---|---|---|---|---|
| | | ServicePartInventoryReplenishmentRule 128022 | | | | ServicePartInventoryReplenishmentRule 128024 | | | 1 128026 | |
| | | | | | | | InventoryReplenishmentRuleID 128028 | | 0..1 128030 | ServicePartInventoryReplenishmentRuleID 128032 |
| | | | | | | | PlanningVersionID 128034 | | 0..1 128036 | PlanningVersionID 128038 |
| | | | | | | | ProductID 128040 | | 0..1 128042 | ProductID 128044 |
| | | | | | | | LocationID 128046 | | 0..1 128048 | LocationID 128050 |

FIG. 128-3

| Package | | | | level1 | level2 | level3 | level4 | level5 | Cardinality | Data Type Name |
|---|---|---|---|---|---|---|---|---|---|---|
| | | | | | | | VirtualChild-Indicator 128052 | | 0..1 128054 | Indicator 128056 |
| | | | | | | | ThirdParty-OrderProc-essingIndica-tor 128058 | | 0..1 128060 | Indicator 128062 |
| | | | TimeSeries 128064 | | | | KeyFigure 128066 | | 1..n 128068 | TimeSeries-KeyFigure 128070 |
| | | | | | | | | Code 128072 | 1 128074 | TimeSeries-KeyFigure-Code 128076 |

FIG. 129-1

| Package | | level1 | level2 | level3 | level4 | Cardinality | Data Type Name |
|---|---|---|---|---|---|---|---|
| ServicePartInventoryReplenishmentRulesKeyFigureCreateConfirmationMessage 129000 | | ServicePartInventoryReplenishmentRulesKeyFigureCreateConfirmationMessage 129002 | | | | | ServicePartInventoryReplenishmentRulesKeyFigureCreateConfirmationMessage 129004 |
| | MessageHeader 129006 | | MessageHeader 129008 | | | 1 129010 | BusinessDocumentMessageHeader 129012 |
| | ServicePartInventoryReplenishmentRuleKeyFigureCreateConfirmationMessage 129014 | | ServicePartInventoryReplenishmentRuleKeyFigureCreateConfirmationMessage 129016 | | | 0..n 129018 | ServicePartInventoryReplenishmentRuleKeyFigureCreateConfirmationMessage 129020 |

FIG. 129-2

| Package | | | | level1 | level2 | level3 | level4 | Cardinality | Data Type Name |
|---|---|---|---|---|---|---|---|---|---|
| | | ServicePartInventoryReplenishmentRule 129022 | | | | ServicePartInventoryReplenishmentRule 129024 | | 0..1 129026 | |
| | | | | | | | InventoryReplenishmentRuleID 129028 | 1 129030 | ServicePartInventoryReplenishmentRuleID 129032 |
| | | | | | | | PlanningVersionID 129034 | 1 129036 | PlanningVersionID 129038 |
| | | | | | | | ProductID 129040 | 1 129042 | ProductID 129044 |
| | | | | | | | LocationID 129046 | 1 129048 | LocationID 129050 |

FIG. 129-3

| Package | | | | level1 | level2 | level3 | level4 | Cardinality | Data Type Name |
|---|---|---|---|---|---|---|---|---|---|
| | | | | | | | VirtualChildIndicator 129052 | 1 129054 | Indicator 129056 |
| | | | | | | | ThirdPartyOrderProcessingIndicator 129058 | 1 129060 | Indicator 129062 |
| | | Log 129064 | | | | Log 129066 | | 0..1 129068 | Log 129070 |
| | Log 129072 | | | | Log 129074 | | | 0..1 129076 | Log 129078 |

FIG. 130-1

| Package | | level1 | level2 | level3 | level4 | level5 | level6 | Cardinality | Data Type Name |
|---|---|---|---|---|---|---|---|---|---|
| ServicePartInventoryReplenishmentRulesKeyFigureCreateRequestMessage 130000 | | ServicePartInventoryReplenishmentRulesKeyFigureCreateRequestMessage 130002 | | | | | | | ServicePartInventoryReplenishmentRulesKeyFigureCreateRequestMessage 130004 |
| | MessageHeader 130006 | | MessageHeader 130008 | | | | | 1 130010 | BusinessDocumentMessageHeader 130012 |

FIG. 130-2

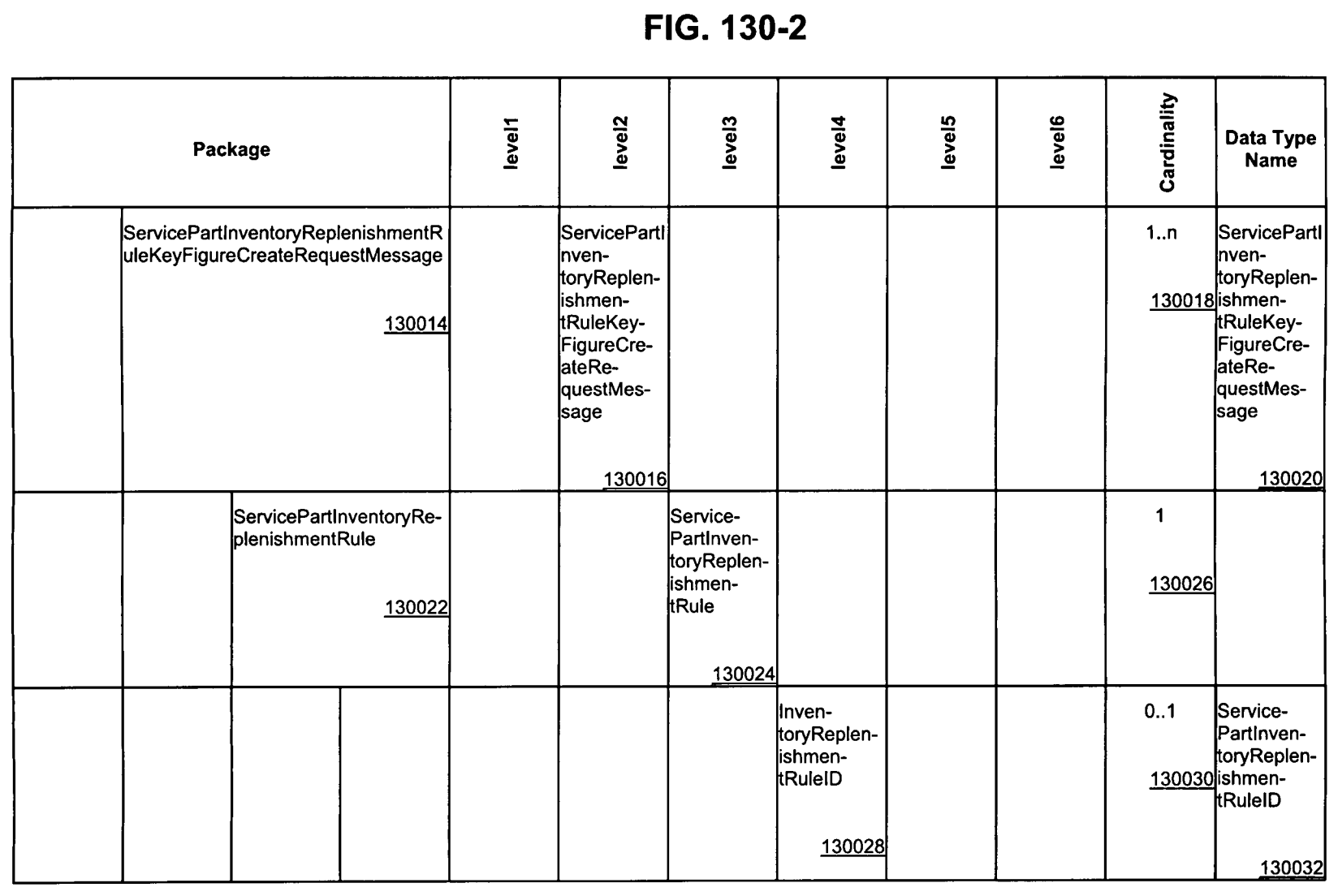

| Package | level1 | level2 | level3 | level4 | level5 | level6 | Cardinality | Data Type Name |
|---|---|---|---|---|---|---|---|---|
| ServicePartInventoryReplenishmentRuleKeyFigureCreateRequestMessage 130014 | | ServicePartInventoryReplenishmentRuleKeyFigureCreateRequestMessage 130016 | | | | | 1..n 130018 | ServicePartInventoryReplenishmentRuleKeyFigureCreateRequestMessage 130020 |
| ServicePartInventoryReplenishmentRule 130022 | | | ServicePartInventoryReplenishmentRule 130024 | | | | 1 130026 | |
| | | | | InventoryReplenishmentRuleID 130028 | | | 0..1 130030 | ServicePartInventoryReplenishmentRuleID 130032 |

FIG. 130-3

| Package | | | | level1 | level2 | level3 | level4 | level5 | level6 | Cardinality | Data Type Name |
|---|---|---|---|---|---|---|---|---|---|---|---|
| | | | | | | | Planning-VersionID 130034 | | | 0..1 130036 | Planning-VersionID 130038 |
| | | | | | | | ProductID 130040 | | | 0..1 130042 | ProductID 130044 |
| | | | | | | | LocationID 130046 | | | 0..1 130048 | LocationID 130050 |
| | | | | | | | VirtualChild-Indicator 130052 | | | 0..1 130054 | Indicator 130056 |
| | | | | | | | ThirdParty-OrderProc-essingIndi-cator 130058 | | | 0..1 130060 | Indicator 130062 |

FIG. 130-4

| Package | | | | level1 | level2 | level3 | level4 | level5 | level6 | Cardinality | Data Type Name |
|---|---|---|---|---|---|---|---|---|---|---|---|
| | | | TimeSeries 130064 | | | | KeyFigure 130066 | | | 1..n 130068 | TimeSeriesKeyFigure 130070 |
| | | | | | | | | Code 130072 | | 1 130074 | TimeSeriesKeyFigureCode 130076 |
| | | | | | | | | UnitOfMeasure 130078 | | 0..1 130080 | MeasureUnitCode 130082 |
| | | | | | | | | KeyFigureValue 130084 | | 1..n 130086 | TimeSeriesKeyFigureTimeBucketValue 130088 |

FIG. 130-5

| Package | | | | level1 | level2 | level3 | level4 | level5 | level6 | Cardinality | Data Type Name |
|---|---|---|---|---|---|---|---|---|---|---|---|
| | | | | | | | | | TimeBuck-etNumber-IntValue 130090 | 1 130092 | Integer-Value 130094 |
| | | | | | | | | | KeyFigure-FloatValue 130096 | 1 130098 | FloatValue 130100 |

FIG. 131-1

| Package | | level1 | level2 | level3 | level4 | level5 | Cardinality | Data Type Name |
|---|---|---|---|---|---|---|---|---|
| ServicePartInventoryReplenishmentRuleByElements-ResponseMessage 131000 | | Service-PartInven-toryReplen-ishmen-tRuleByEle-mentsRe-sponseMes-sage 131002 | | | | | | Service-PartInven-toryReplen-ishmen-tRuleByEle-mentsRe-sponseMes-sage 131004 |
| | MessageHeader 131006 | | Message-Header 131008 | | | | 1 131010 | Business-Document-Message-Header 131012 |
| | ServicePartInventoryReplenishmentRule 131014 | | Service-PartInven-toryReplen-ishmentRule 131016 | | | | 0..n 131018 | |

FIG. 131-2

| Package | | level1 | level2 | level3 | level4 | level5 | Cardinality | Data Type Name |
|---|---|---|---|---|---|---|---|---|
| | | | | InventoryReplenishmentRuleID 131020 | | | 1 131022 | ServicePartInventoryReplenishmentRuleID 131024 |
| | | | | PlanningVersionID 131026 | | | 1 131028 | PlanningVersionID 131030 |
| | | | | ProductID 131032 | | | 1 131034 | ProductID 131036 |
| | | | | LocationID 131038 | | | 1 131040 | LocationID 131042 |
| | | | | VirtualChildIndicator 131044 | | | 1 131046 | Indicator 131048 |

FIG. 131-3

| Package | | | | level1 | level2 | level3 | level4 | level5 | Cardinality | Data Type Name |
|---|---|---|---|---|---|---|---|---|---|---|
| | | | | | | ThirdParty-OrderProc-essingIndica-tor 131050 | | | 1 131052 | Indicator 131054 |
| | | TimeSeries 131056 | | | | KeyFigure 131058 | | | 1..n 131060 | TimeSeries-KeyFigure 131062 |
| | | | | | | | Code 131064 | | 1 131066 | TimeSeries-KeyFigure-Code 131068 |
| | | | | | | | UnitOfMeas-ure 131070 | | 1 131072 | Measure-UnitCode 131074 |

FIG. 131-4

| Package | | | | level1 | level2 | level3 | level4 | level5 | Cardinality | Data Type Name |
|---|---|---|---|---|---|---|---|---|---|---|
| | | | | | | | KeyFigure-Value 131076 | | 0..n 131078 | TimeSeries-KeyFigure-TimeBucket-Value 131080 |
| | | | | | | | | TimeBucket-NumberInt-Value 131082 | 1 131084 | IntegerValue 131086 |
| | | | | | | | | KeyFigure-FloatValue 131088 | 1 131090 | FloatValue 131092 |
| | | | | | | PeriodBuck-etAssignment 131094 | | | 1..n 131096 | TimeSeries-PeriodTime-BucketAs-signment 131098 |

FIG. 131-5

| Package | | | | level1 | level2 | level3 | level4 | level5 | Cardinality | Data Type Name |
|---|---|---|---|---|---|---|---|---|---|---|
| | | | | | | | TimeBucket-NumberInt-Value 131100 | | 1 131102 | IntValue 131104 |
| | | | | | | | Start-DateTime 131106 | | 1 131108 | GLOBAL_DateTime 131110 |
| | | | | | | | End-DateTime 131112 | | 1 131114 | GLOBAL_DateTime 131116 |
| | Log 131118 | | | | Log 131120 | | | | 0..1 131122 | Log 131124 |

FIG. 135-1

| Package | level1 | level2 | level3 | level4 | Cardinality | Data Type Name |
|---|---|---|---|---|---|---|
| ServicePartOrderHistorySCMByElementsQueryMessage 135000 | ServicePartOrderHistorySCMByElementsQueryMessage 135002 | | | | | |
| MessageHeader 135004 | | MessageHeader 135006 | | | 1 135008 | BusinessDocumentMessageHeader 135010 |
| Selection 135012 | | ServicePartOrderHistorySelectionByElements 135014 | | | 1 135016 | |
| | | | PlanningVersionID 135018 | | 1 135020 | PlanningVersionID 135022 |

FIG. 135-2

| Package | | | | level1 | level2 | level3 | level4 | Cardinality | Data Type Name |
|---|---|---|---|---|---|---|---|---|---|
| | | | | | | SelectionBy-MaterialInter-nalID 135024 | | 0..1 135026 | Selection-ByProduct-InternalID 135028 |
| | | | | | | | InclusionEx-clusionCode 135030 | 1 135032 | InclusionEx-clusionCode 135034 |
| | | | | | | | IntervalBound-aryTypeCode 135036 | 1 135038 | IntervalBound-aryTypeCode 135040 |
| | | | | | | | LowerBound-aryMaterialIn-ternalID 135042 | 1 135044 | ProductInter-nalID 135046 |
| | | | | | | | UpperBound-aryMaterialIn-ternalID 135048 | 0..1 135050 | ProductInter-nalID 135052 |

FIG. 135-3

| Package | | | | level1 | level2 | level3 | level4 | Cardinality | Data Type Name |
|---|---|---|---|---|---|---|---|---|---|
| | | | | | | SelectionBy-CustomerFac-ingLocationIn-ternalID 135054 | | 0..1 135056 | SelectionBy-CustomerFac-ingLocationIn-ternalID 135058 |
| | | | | | | | InclusionEx-clusionCode 135060 | 1 135062 | InclusionEx-clusionCode 135064 |
| | | | | | | | IntervalBound-aryTypeCode 135066 | 1 135068 | IntervalBound-aryTypeCode 135070 |
| | | | | | | | LowerBound-aryCustomer-FacingLoca-tionInternalID 135072 | 1 135074 | LocationInter-nalID(Qualifier: CustomerFac-ing) 135076 |

FIG. 135-4

| Package | | | | level1 | level2 | level3 | level4 | Cardinality | Data Type Name |
|---|---|---|---|---|---|---|---|---|---|
| | | | | | | | UpperBoundaryCustomerFacingLocationInternalID 135078 | 0..1 135080 | LocationInternalID(Qualifier:CustomerFacing) 135082 |
| | | | | | | CustomerFacingLocationVirtualChildIndicator 135084 | | 0..1 135086 | Indicator(Qulifier:BODVirtualChildIndicator) 135088 |
| | | | | | | SelectionByStockholdingLocationInternalID 135090 | | 0..1 135092 | SelectionByStockholdingLocationInternalID 135094 |
| | | | | | | | InclusionExclusionCode 135096 | 1 135098 | InclusionExclusionCode 135100 |

FIG. 135-5

| Package | | | | level1 | level2 | level3 | level4 | Cardinality | Data Type Name |
|---|---|---|---|---|---|---|---|---|---|
| | | | | | | | IntervalBoundaryTypeCode 135102 | 1 135104 | IntervalBoundaryTypeCode 135106 |
| | | | | | | | LowerBoundaryStockholdingLocationInternalID 135108 | 1 135110 | LocationInternalID(Qualifier: Stockholding) 135112 |
| | | | | | | | UpperBoundaryStockholdingLocationInternalID 135114 | 0..1 135116 | LocationInternalID(Qualifier: Stockholding) 135118 |
| | | | | | | StockholdingLocationVirtualChildIndicator 135120 | | 0..1 135122 | Indicator(Qulifier:BODVirtualChildIndicator) 135124 |

FIG. 135-6

| Package | | | | level1 | level2 | level3 | level4 | Cardinality | Data Type Name |
|---|---|---|---|---|---|---|---|---|---|
| | | | | | | ThirdPartyOrderProcessingIndicator 135126 | | 0..1 135128 | Indicator(Qualifier:BusinessTransactionDocumentItem-ThirdParty) 135130 |
| | | | | | | Selection-ByService-PartPlanning-Demand-GroupCode 135132 | | 0..1 135134 | Selection-ByService-PartPlanning-Demand-GroupCode 135136 |
| | | | | | | | InclusionExclusionCode 135138 | 1 135140 | InclusionExclusionCode 135142 |
| | | | | | | | IntervalBoundaryTypeCode 135144 | 1 135146 | IntervalBoundaryTypeCode 135148 |

FIG. 135-7

| Package | | | | level1 | level2 | level3 | level4 | Cardinality | Data Type Name |
|---|---|---|---|---|---|---|---|---|---|
| | | | | | | | LowerBoundaryService-PartPlanning-Demand-GroupCode 135150 | 1 135152 | ap-plied,inReview 135154 |
| | | | | | | | UpperBoundaryService-PartPlanning-Demand-GroupCode 135156 | 0..1 135158 | ap-plied,inReview 135160 |
| | | | | | | ForecastRele-vantIndicator 135162 | | 0..1 135164 | Indica-tor(Qulifier:RelevanceIndica-tor) 135166 |
| | | | | | | Changed-DateTime 135168 | | 0..1 135170 | GLOBAL_DateTime(Qualifier:changed) 135172 |

FIG. 135-8

| Package | | level1 | level2 | level3 | level4 | Cardinality | Data Type Name |
|---|---|---|---|---|---|---|---|
| | ProcessingConditions 135174 | | Processing-Conditions 135176 | | | 1 135178 | |
| | | | | QueryHits-Maximum-NumberValue 135180 | | 0..1 135182 | NumberValue 135184 |
| | | | | Unlimit-edHitsIndicator 135186 | | 1 135188 | Indicator 135190 |
| | | | | LastProvided-Business-Transaction-Documen-tReferen-celtemID 135192 | | 0..1 135194 | UUID 135196 |

FIG. 136-1

| Package | level1 | level2 | level3 | level4 | level5 | Cardinality | Data Type Name |
|---|---|---|---|---|---|---|---|
| ServicePartOrderHistorySCMByElementsResponse-Message 136000 | ServicePar-tOrderHis-torySCMByE-lementsRe-sponseMes-sage 136002 | | | | | | |
| MessageHeader 136004 | | Message-Header 136006 | | | | 1 136008 | Business-Document-Message-Header 136010 |
| ServicePartOrderHistory 136012 | | ServicePar-tOrderHistory 136014 | | | | 0..n 136016 | |
| | | | PlanningVer-sionID 136018 | | | 1 136020 | PlanningVer-sionID 136022 |

FIG. 136-2

| Package | | | | level1 | level2 | level3 | level4 | level5 | Cardinality | Data Type Name |
|---|---|---|---|---|---|---|---|---|---|---|
| | | | | | | MaterialInter-nalID 136024 | | | 1 136026 | ProductInter-nalID 136028 |
| | | | | | | StockHoldin-gLocationIn-ternalID 136030 | | | 1 136032 | LocationIn-ternalID(Qualifier:StockHolding) 136034 |
| | | | | | | Stocking-HoldingLoca-tionVirtual-ChildIndicator 136036 | | | 1 136038 | Indica-tor(Qualifier: BODVirtual-ChildIndica-tor,applied) 136040 |
| | | | | | | Customer-FacingLoca-tionInternalID 136042 | | | 1 136044 | LocationIn-ternalID(Qualifier:CustomerFacing) 136046 |

FIG. 136-3

| Package | | | | level1 | level2 | level3 | level4 | level5 | Cardinality | Data Type Name |
|---|---|---|---|---|---|---|---|---|---|---|
| | | | | | | CustomerFacingLocationVirtualChildIndicator 136048 | | | 1 136050 | Indicator(Qualifier: BODVirtualChildIndicator,applied) 136052 |
| | | | | | | ThirdPartyOrderProcessingIndicator 136054 | | | 1 136056 | Indicator(Qualifier: BusinessTransactionDocumentItemThirdParty) 136058 |
| | | | | | | ServicePartPlanningDemandGroupCode 136060 | | | 1 136062 | ServicePartPlanningDemandGroupCode 136064 |

FIG. 136-4

| Package | | | | level1 | level2 | level3 | level4 | level5 | Cardinality | Data Type Name |
|---|---|---|---|---|---|---|---|---|---|---|
| | | | | | | ServicePart-PlanningDe-mandGroup-Name 136066 | | | 0..1 136068 | LANGUAGEINDEPENDENT_MEDIUM_Name 136070 |
| | | | | | | Fore-castRelevan-tIndicator 136072 | | | 1 136074 | Indica-tor(Qulifier:RelevanceIndi-cator) 136076 |
| | | BTDReference 136078 | | | | BTDRefer-ence 136080 | | | 1..n 136082 | |
| | | | | | | | Business-Transaction-Documen-tReference 136084 | | 1 136086 | Business-Transaction-Documen-tReference 136088 |

FIG. 136-5

| Package | | | | level1 | level2 | level3 | level4 | level5 | Cardinality | Data Type Name |
|---|---|---|---|---|---|---|---|---|---|---|
| | | | | | | | ActualValues 136090 | | 1 136092 | |
| | | | | | | | | Business-Transaction-Document-Processing-TypeCode 136094 | 1 136096 | Business-Transaction-Document-Processing-TypeCode 136098 |
| | | | | | | | | ProductRe-cipientParty-InternalID 136100 | 1 136102 | PartyInter-nalID(Qualifier:ProductRecipientParty) 136104 |
| | | | | | | | | Abnormal-DemandIndi-cator 136106 | 1 136108 | Indica-tor(Qualifier: Abnormal-Demand) 136110 |

FIG. 136-6

| Package | | | | level1 | level2 | level3 | level4 | level5 | Cardinality | Data Type Name |
|---|---|---|---|---|---|---|---|---|---|---|
| | | | | | | | | RushOrder-Indicator 136112 | 1 136114 | Indica-tor(Qualifier:applied) 136116 |
| | | | | | | | | OrderCrea-tionDate 136118 | 1 136120 | Date(Qualifier:creation) 136122 |
| | | | | | | | | Requested-DeliveryDate 136124 | 1 136126 | Date(Qualifier:Delivery) 136128 |
| | | | | | | | | Order-LineNumber-Value 136130 | 1 136132 | NumberValue 136134 |
| | | | | | | | | Quantity 136136 | 1 136138 | Quantity 136140 |

FIG. 136-7

| Package | | | | level1 | level2 | level3 | level4 | level5 | Cardinality | Data Type Name |
|---|---|---|---|---|---|---|---|---|---|---|
| | | | | | | | | Quantity-RoleCode 136142 | 0..1 136144 | Quantity-RoleCode 136146 |
| | | | | | | | | Changed-DateTime 136148 | 1 136150 | GLOBAL_DateTime(Qualifier:changed) 136152 |
| | ProcessingConditions 136154 | | | | Processing-Conditions 136156 | | | | 1 136158 | |
| | | | | | | Returned-Query-HitsNumber-Value 136160 | | | 1 136162 | NumberValue 136164 |
| | | | | | | MoreEle-mentsAvail-ableIndicator 136166 | | | 1 136168 | Indicator 136170 |

FIG. 136-8

| Package | | | | level1 | level2 | level3 | level4 | level5 | Cardinality | Data Type Name |
|---|---|---|---|---|---|---|---|---|---|---|
| | | | | | | LastProvid-edBusiness-Transaction-Documen-tReferen-celtemID 136172 | | | 0..1 136174 | Business-Transaction-DocumentID 136176 |
| | Log 136178 | | | | Log 136180 | | | | 1 136182 | Log 136184 |

FIG. 142-1

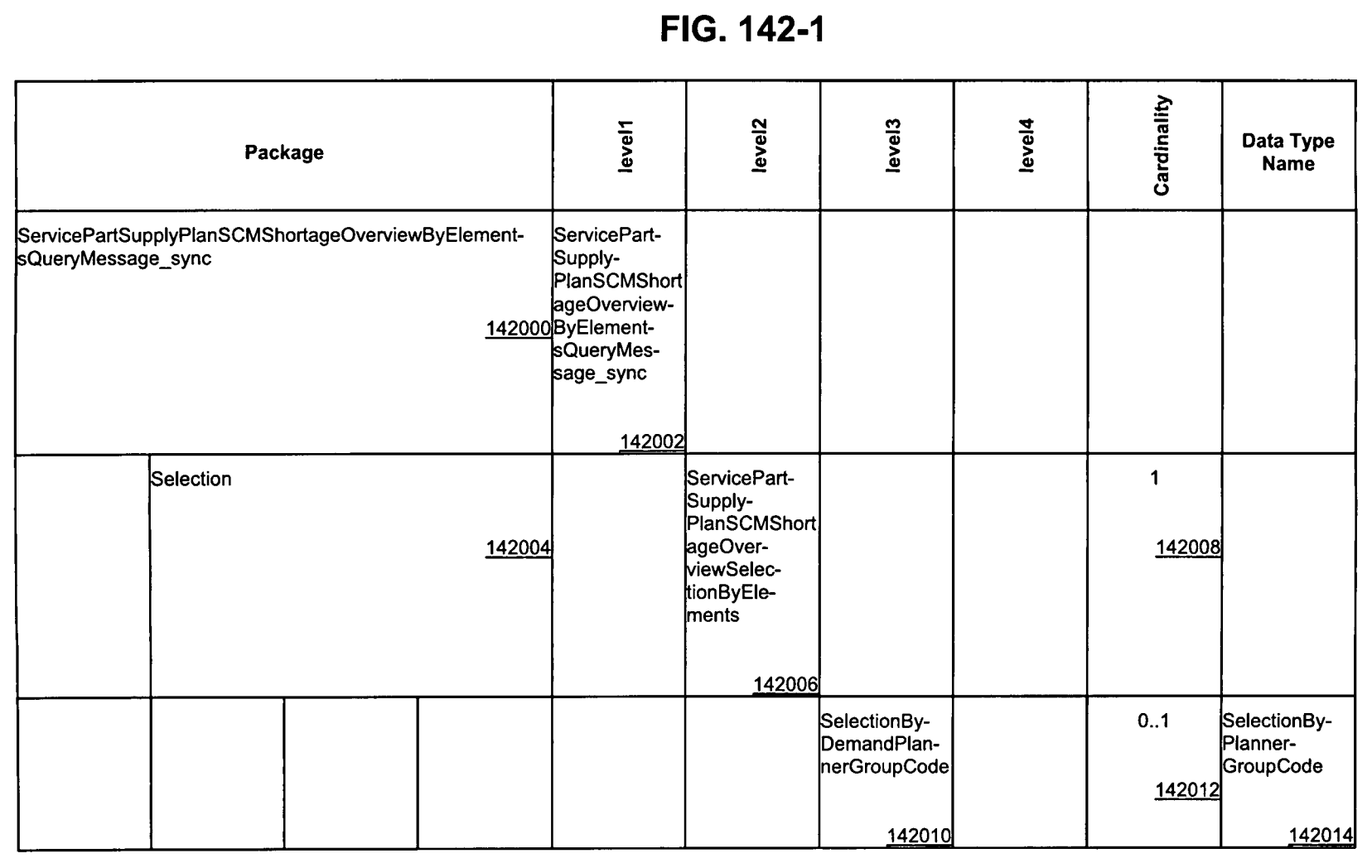

| Package | | | | level1 | level2 | level3 | level4 | Cardinality | Data Type Name |
|---|---|---|---|---|---|---|---|---|---|
| ServicePartSupplyPlanSCMShortageOverviewByElement-sQueryMessage_sync 142000 | | | | ServicePart-Supply-PlanSCMShortageOverview-ByElement-sQueryMes-sage_sync 142002 | | | | | |
| | Selection 142004 | | | | ServicePart-Supply-PlanSCMShortageOver-viewSelec-tionByEle-ments 142006 | | | 1 142008 | |
| | | | | | | SelectionBy-DemandPlan-nerGroupCode 142010 | | 0..1 142012 | SelectionBy-Planner-GroupCode 142014 |

FIG. 142-2

| Package | | | | level1 | level2 | level3 | level4 | Cardinality | Data Type Name |
|---|---|---|---|---|---|---|---|---|---|
| | | | | | | | InclusionExclusionCode 142016 | 1 142018 | InclusionExclusionCode 142020 |
| | | | | | | | IntervalBoundaryTypeCode 142022 | 1 142024 | IntervalBoundaryTypeCode 142026 |
| | | | | | | | LowerBoundaryDemandPlannerGroupCode 142028 | 1 142030 | DemandPlannerGroupCode 142032 |
| | | | | | | | UpperBoundaryDemandPlannerGroupCode 142034 | 0..1 142036 | DemandPlannerGroupCode 142038 |

FIG. 142-3

| Package | | | | level1 | level2 | level3 | level4 | Cardinality | Data Type Name |
|---|---|---|---|---|---|---|---|---|---|
| | | | | | | Selection-ByService-PartPlanning-Pro-ductGroupCode 142040 | | 0..1 142042 | Selection-ByPro-ductGroupID 142044 |
| | | | | | | | InclusionEx-clusionCode 142046 | 1 142048 | InclusionEx-clusionCode 142050 |
| | | | | | | | IntervalBound-aryTypeCode 142052 | 1 142054 | IntervalBound-aryTypeCode 142056 |
| | | | | | | | LowerBound-aryService-PartPlanning-Pro-ductGroupCode 142058 | 1 142060 | ServicePart-PlanningPro-ductGroup-Code 142062 |

FIG. 142-4

| Package | | | | level1 | level2 | level3 | level4 | Cardinality | Data Type Name |
|---|---|---|---|---|---|---|---|---|---|
| | | | | | | | UpperBoundaryServicePartPlanningProductGroupCode 142064 | 0..1 142066 | ServicePartPlanningProductGroupCode 142068 |
| | | | | | | SelectionByShipFromLocationInternalID 142070 | | 0..1 142072 | SelectionByShipFromLocation 142074 |
| | | | | | | | InclusionExclusionCode 142076 | 1 142078 | InclusionExclusionCode 142080 |
| | | | | | | | IntervalBoundaryTypeCode 142082 | 1 142084 | IntervalBoundaryTypeCode 142086 |

FIG. 142-5

| Package | | | | level1 | level2 | level3 | level4 | Cardinality | Data Type Name |
|---|---|---|---|---|---|---|---|---|---|
| | | | | | | | LowerBoundaryShipFromLocationInternalID 142088 | 1 142090 | LocationInternalID 142092 |
| | | | | | | | UpperBoundaryShipFromLocationInternalID 142094 | 0..1 142096 | LocationInternalID 142098 |
| | | | | | | SelectionByShipToLocationInternalID 142100 | | 0..1 142102 | SelectionByShipToLocation 142104 |
| | | | | | | | InclusionExclusionCode 142106 | 1 142108 | InclusionExclusionCode 142110 |

FIG. 142-6

| Package | | | | level1 | level2 | level3 | level4 | Cardinality | Data Type Name |
|---|---|---|---|---|---|---|---|---|---|
| | | | | | | | IntervalBoundaryTypeCode 142112 | 1 142114 | IntervalBoundaryTypeCode 142116 |
| | | | | | | | LowerBoundaryShipToLocationInternalID 142118 | 1 142120 | LocationInternalID 142122 |
| | | | | | | | UpperBoundaryShipToLocationInternalID 142124 | 0..1 142126 | LocationInternalID 142128 |
| | | | | | | SelectionByActualResultIndicator 142130 | | 1 142132 | Indicator(Qulifier:result) 142134 |

FIG. 143-1

| Package | level1 | level2 | level3 | level4 | Cardinality | Data Type Name |
|---|---|---|---|---|---|---|
| ServicePartSupplyPlanSCMShortageOverviewByElementsResponseMessage_sync 143000 | ServicePartSupply-PlanSCMShortageOverview-ByElements-Response-Message_sync 143002 | | | | | |
| ServicePartSupplyPlan 143004 | | ServicePart-SupplyPlan 143006 | | | 0..n 143008 | |
| | | | DemandPlannerGroupCode 143010 | | 1 143012 | DemandPlannerGroupCode 143014 |
| | | | ServicePart-PlanningPro-ductGroup-Code 143016 | | 1 143018 | ServicePart-PlanningPro-ductGroup-Code 143020 |

FIG. 143-2

| Package | | | | level1 | level2 | level3 | level4 | Cardinality | Data Type Name |
|---|---|---|---|---|---|---|---|---|---|
| | | | | | | ShipFrom-LocationInter-nalID 143022 | | 1 143024 | LocationInter-nalID 143026 |
| | | | | | | ShipToLoca-tionInternalID 143028 | | 1 143030 | LocationInter-nalID 143032 |
| | | | | | | ActualRe-sultIndicator 143034 | | 1 143036 | Indica-tor(Qualifier:re sult) 143038 |
| | | KeyFigureValue 143040 | | | | KeyFigure-Value 143042 | | 1 143044 | |
| | | | | | | | CriticalPro-ductNumber-Value 143046 | 1 143048 | NumberValue 143050 |

FIG. 143-3

| Package | | | | level1 | level2 | level3 | level4 | Cardinality | Data Type Name |
|---|---|---|---|---|---|---|---|---|---|
| | | | | | | | PotentiallyCriticalProductNumberValue 143052 | 1 143054 | NumberValue 143056 |
| | | | | | | | BackOrderItemNumberValue 143058 | 1 143060 | NumberValue 143062 |
| | | | | | | | BackOrderProductNumberValue 143064 | 1 143066 | NumberValue 143068 |
| | Log 143070 | | | | Log 143072 | | | 1 143074 | Log 143076 |

FIG. 144-1

| Package | level1 | level2 | level3 | level4 | Cardinality | Data Type Name |
|---|---|---|---|---|---|---|
| ServicePartSupplyPlanSCMShortageByElementsQueryMessage_sync 144000 | ServicePart-SupplyPlanSCMShortageByElementsQuery-Message_sync 144002 | | | | | |
| Selection 144004 | | ServicePart-SupplyPlanSCMShortageSelection-ByElements 144006 | | | 1 144008 | |
| | | | SelectionBy-DemandPlannerGroupCode 144010 | | 0..1 144012 | SelectionBy-DemandPlannerGroupCode 144014 |
| | | | | InclusionEx-clusionCode 144016 | 1 144018 | InclusionEx-clusionCode 144020 |

FIG. 144-2

| Package | | | | level1 | level2 | level3 | level4 | Cardinality | Data Type Name |
|---|---|---|---|---|---|---|---|---|---|
| | | | | | | | IntervalBoundaryTypeCode 144022 | 1 144024 | IntervalBoundaryTypeCode 144026 |
| | | | | | | | LowerBoundaryDemandPlannerGroupCode 144028 | 1 144030 | DemandPlannerGroupCode 144032 |
| | | | | | | | UpperBoundaryDemandPlannerGroupCode 144034 | 0..1 144036 | DemandPlannerGroupCode 144038 |
| | | | | | | SelectionByMaterialInternalID 144040 | | 0..1 144042 | SelectionByMaterialInternalID 144044 |

FIG. 144-3

| Package | | | | level1 | level2 | level3 | level4 | Cardinality | Data Type Name |
|---|---|---|---|---|---|---|---|---|---|
| | | | | | | | InclusionExclusionCode 144046 | 1 144048 | InclusionExclusionCode 144050 |
| | | | | | | | IntervalBoundaryTypeCode 144052 | 1 144054 | IntervalBoundaryTypeCode 144056 |
| | | | | | | | LowerBoundaryMaterialInternalID 144058 | 1 144060 | ProductInternalID 144062 |
| | | | | | | | UpperBoundaryMaterialInternalID 144064 | 0..1 144066 | ProductInternalID 144068 |
| | | | | | | SelectionByShipFromLocationInternalID 144070 | | 0..1 144072 | SelectionByShipFromLocationInternalID 144074 |

FIG. 144-4

| Package | | | | level1 | level2 | level3 | level4 | Cardinality | Data Type Name |
|---|---|---|---|---|---|---|---|---|---|
| | | | | | | | InclusionExclusionCode 144076 | 1 144078 | InclusionExclusionCode 144080 |
| | | | | | | | IntervalBoundaryTypeCode 144082 | 1 144084 | IntervalBoundaryTypeCode 144086 |
| | | | | | | | LowerBoundaryShipFromLocationInternalID 144088 | 1 144090 | LocationInternalID 144092 |
| | | | | | | | UpperBoundaryShipFromLocationInternalID 144094 | 0..1 144096 | LocationInternalID 144098 |

FIG. 144-5

| Package | | | | level1 | level2 | level3 | level4 | Cardinality | Data Type Name |
|---|---|---|---|---|---|---|---|---|---|
| | | | | | | SelectionByShipToLocationInternalID 144100 | | 0..1 144102 | SelectionByShipToLocationInternalID 144104 |
| | | | | | | | InclusionExclusionCode 144106 | 1 144108 | InclusionExclusionCode 144110 |
| | | | | | | | IntervalBoundaryTypeCode 144112 | 1 144114 | IntervalBoundaryTypeCode 144116 |
| | | | | | | | LowerBoundaryShipToLocationInternalID 144118 | 1 144120 | LocationInternalID 144122 |
| | | | | | | | UpperBoundaryShipToLocationInternalID 144124 | 0..1 144126 | LocationInternalID 144128 |

FIG. 144-6

| Package | | | | level1 | level2 | level3 | level4 | Cardinality | Data Type Name |
|---|---|---|---|---|---|---|---|---|---|
| | | | | | | SelectionBy-CriticalityCode 144130 | | 0..1 144132 | SelectionBy-ShortageS-tatus 144134 |
| | | | | | | | InclusionEx-clusionCode 144136 | 1 144138 | InclusionEx-clusionCode 144140 |
| | | | | | | | IntervalBound-aryTypeCode 144142 | 1 144144 | IntervalBound-aryTypeCode 144146 |
| | | | | | | | LowerBound-aryCriticality-Code 144148 | 1 144150 | CriticalityCode 144152 |
| | | | | | | | UpperBound-aryCriticality-Code 144154 | 0..1 144156 | CriticalityCode 144158 |

FIG. 144-7

| Package | | | | level1 | level2 | level3 | level4 | Cardinality | Data Type Name |
|---|---|---|---|---|---|---|---|---|---|
| | | | | | | SelectionBySupplyPlanningShortageResolutionCode 144160 | | 0..1 144162 | SelectionBySupplyPlanningShortageResolutionCode 144164 |
| | | | | | | | InclusionExclusionCode 144166 | 1 144168 | InclusionExclusionCode 144170 |
| | | | | | | | IntervalBoundaryTypeCode 144172 | 1 144174 | IntervalBoundaryTypeCode 144176 |
| | | | | | | | LowerBoundarySupplyPlanningShortageResolutionCode 144178 | 1 144180 | SupplyPlanningShortageResolutionCode 144182 |

FIG. 144-8

| Package | | | | level1 | level2 | level3 | level4 | Cardinality | Data Type Name |
|---|---|---|---|---|---|---|---|---|---|
| | | | | | | | UpperBoundarySupply-Planning-ShortageResolutionCode 144184 | 0..1 144186 | SupplyPlanningShortageResolutionCode 144188 |
| | | | | | | SelectionByBackOrderItemQuantity 144190 | | 0..1 144192 | SelectionByBackOrderItemQuantity 144194 |
| | | | | | | | InclusionExclusionCode 144196 | 1 144198 | InclusionExclusionCode 144200 |
| | | | | | | | IntervalBoundaryTypeCode 144202 | 1 144204 | IntervalBoundaryTypeCode 144206 |

FIG. 144-9

| Package | | | | level1 | level2 | level3 | level4 | Cardinality | Data Type Name |
|---|---|---|---|---|---|---|---|---|---|
| | | | | | | | LowerBoundaryBackOrderItemQuantity 144208 | 1 144210 | Quantity 144212 |
| | | | | | | | UpperBoundaryBackOrderItemQuantity 144214 | 0..1 144216 | Quantity 144218 |
| | | | | | | SelectionByActualResultIndicator 144220 | | 1 144222 | Indicator(Qualifier:result) 144224 |

FIG. 145-1

| Package | | | | level1 | level2 | level3 | level4 | Cardinality | Data Type Name |
|---|---|---|---|---|---|---|---|---|---|
| ServicePartSupplyPlanSCMShortageByElementsResponse-Message_sync 145000 | | | | ServicePart-Supply-PlanSCMShortageByEle-mentsRespon-seMes-sage_sync 145002 | | | | | |
| | ServicePartSupplyPlan 145004 | | | | ServicePart-SupplyPlan 145006 | | | 0..n 145008 | |
| | | | | | | DemandPlan-nerGroupCode 145010 | | 1 145012 | DemandPlan-nerGroupCode 145014 |
| | | | | | | MaterialInter-nalID 145016 | | 1 145018 | ProductInter-nalID 145020 |

FIG. 145-2

| Package | | | | level1 | level2 | level3 | level4 | Cardinality | Data Type Name |
|---|---|---|---|---|---|---|---|---|---|
| | | | | | | ShipFrom-LocationInter-nalID 145022 | | 1 145024 | LocationInter-nalID 145026 |
| | | | | | | ShipToLoca-tionInternalID 145028 | | 1 145030 | LocationInter-nalID 145032 |
| | | | | | | CriticalityCode 145034 | | 1 145036 | CriticalityCode 145038 |
| | | | | | | SupplyPlan-ningShort-ageResolu-tionCode 145040 | | 1 145042 | SupplyPlan-ningShort-ageResolu-tionCode 145044 |
| | | | | | | ActualRe-sultIndicator 145046 | | 1 145048 | Indica-tor(Qualifier:re sult) 145050 |

FIG. 145-3

| Package | | | | level1 | level2 | level3 | level4 | Cardinality | Data Type Name |
|---|---|---|---|---|---|---|---|---|---|
| | | | | | | ScheduledAgreementOldestDeliveryDateTime 145052 | | 0..1 145054 | GLOBAL_DateTime(Qualifier: delivery) 145056 |
| | | | | | | SupplierMultipleIndicator 145058 | | 1 145060 | Indicator(Qualifier:Multiple) 145062 |
| | | | | | | FirstServicePartPlanningProductGroupCode 145064 | | 0..1 145066 | ServicePartPlanningProductGroupCode 145068 |
| | | | | | | SecondServicePartPlanningProductGroupCode 145070 | | 0..1 145072 | ServicePartPlanningProductGroupCode 145074 |

FIG. 145-4

| Package | | | | level1 | level2 | level3 | level4 | Cardinality | Data Type Name |
|---|---|---|---|---|---|---|---|---|---|
| | | | | | | ThirdService-PartPlanning-Pro-ductGroupCode 145076 | | 0..1 145078 | ServicePart-PlanningPro-ductGroup-Code 145080 |
| | | | | | | FourthSer-vicePartPlan-ningPro-ductGroup-Code 145082 | | 0..1 145084 | ServicePart-PlanningPro-ductGroup-Code 145086 |
| | | | | | | FifthService-PartPlanning-Pro-ductGroupCode 145088 | | 0..1 145090 | ServicePart-PlanningPro-ductGroup-Code 145092 |
| | | | | | | MeasureUnit-Code 145094 | | 1 145096 | MeasureUnit-Code 145098 |

FIG. 145-5

| Package | | | | level1 | level2 | level3 | level4 | Cardinality | Data Type Name |
|---|---|---|---|---|---|---|---|---|---|
| | | KeyFigureValue 145100 | | | | KeyFigure-Value 145102 | | 0..1 145104 | |
| | | | | | | | StockOnHand 145106 | 0..1 145108 | Quantity 145110 |
| | | | | | | | OpenQuantity 145112 | 0..1 145114 | Quantity 145116 |
| | | | | | | | DaysSupply-Duration 145118 | 0..1 145120 | Dura-tion(Qualifier:DaysSupply) 145122 |
| | | | | | | | SalesOrde-rItemNumber-Value 145124 | 0..1 145126 | NumberValue 145128 |

FIG. 145-6

| Package | | | | level1 | level2 | level3 | level4 | Cardinality | Data Type Name |
|---|---|---|---|---|---|---|---|---|---|
| | | | | | | | SalesOrde-rItemQuantity 145130 | 0..1 145132 | Quantity 145134 |
| | | | | | | | RushOrde-rItemNumber-Value 145136 | 0..1 145138 | NumberValue 145140 |
| | | | | | | | RushOrde-rItemQuantity 145142 | 0..1 145144 | Quantity 145146 |
| | | | | | | | BackOrde-rItemNumber-Value 145148 | 0..1 145150 | NumberValue 145152 |
| | | | | | | | BackOrde-rItemQuantity 145154 | 0..1 145156 | Quantity 145158 |

FIG. 145-7

| Package | | | | level1 | level2 | level3 | level4 | Cardinality | Data Type Name |
|---|---|---|---|---|---|---|---|---|---|
| | Log 145160 | | | | Log 145162 | | | 1 145164 | Log 145166 |

MANAGING CONSISTENT INTERFACES FOR SERVICE PART BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, software creates, updates or retrieves service parts demand forecasts using service part master and transactional data. The software comprises computer readable instructions embodied on tangible media. The software executes in a landscape of computer systems providing message-based services. The software invokes a service part demand forecast business object. The business object is a logically centralized, semantically disjointed object for a forecast of the demand for service parts. The business object comprises data logically organized as a service part demand forecast root node, a key figure subordinate node and a time series period subordinate node. The key figure node contains a key figure value subordinate node. The software initiates transmission of a message to a heterogeneous second application, executing in the environment of computer systems providing message-based services, based on the data in the service part demand forecast business object. The message comprises a service part demand forecast template message entity, a message header package, a service part demand forecast package, and a log package.

In a second aspect, software creates, updates or retrieves service parts demand forecasts using service part master and transactional data. The software comprises computer readable instructions embodied on tangible media. The software executes in a landscape of computer systems providing message-based services. The software initiates transmission of a message to a heterogeneous second application, executing in the environment of computer systems providing message-based services, based on data in a service part demand forecast business object invoked by the second application. The business object is a logically centralized, semantically disjointed object for a forecast of the demand for service parts. The business object comprises data logically organized as a service part demand forecast root node, a key figure subordinate node and a time series period subordinate node. The key figure node contains a key figure value subordinate node. The message comprises a service part demand forecast template message entity, a message header package, a service part demand forecast package, and a log package. The software receives a second message from the second application. The second message is associated with the invoked service part demand forecast business object and is in response to the first message.

In a third aspect, a distributed system operates in a landscape of computer systems providing message-based services. The system processes business objects involving creating, updating or retrieving service parts demand forecasts using service part master and transactional data. The system comprises memory and a graphical user interface remote from the memory. The memory stores a business object repository storing a plurality of business objects. Each business object is a logically centralized, semantically disjointed object of a particular business object type. At least one of the business objects is for a forecast of the demand for service parts. The business object comprises data logically organized as a service part demand forecast root node, a key figure subordinate node and a time series period subordinate node. The key figure node contains a key figure value subordinate node. The graphical user interface presents data associated with an invoked instance of the service part demand forecast business object. The interface comprises computer readable instructions embodied on tangible media.

In a fourth aspect, software creates, updates or retrieves histories for service parts demand. The software comprises computer readable instructions embodied on tangible media. The software executes in a landscape of computer systems providing message-based services. The software invokes a service part demand history business object. The business object is a logically centralized, semantically disjointed object for defining the history of the demand for a service part. The business object comprises data logically organized as a service part demand history root node, a key figure subordinate node and a period bucket assignment subordinate node. The key figure node contains a key figure value subordinate node. The software initiates transmission of a message to a heterogeneous second application, executing in the environment of computer systems providing message-based services, based on the data in the service part demand history business object. The message comprises a service part demand histories change request message entity, a message header package, and a service part demand history change request message package.

In a fifth aspect, software creates, updates or retrieves histories for service parts demand. The software comprises computer readable instructions embodied on tangible media. The software executes in a landscape of computer systems providing message-based services. The software initiates transmission of a message to a heterogeneous second application, executing in the environment of computer systems providing message-based services, based on data in a service part demand history business object invoked by the second application. The business object is a logically centralized, semantically disjointed object for defining the history of the demand for a service part. The business object comprises data logically organized as a service part demand history root node, a key figure subordinate node and a period bucket assignment subordinate node. The key figure node contains a key figure value subordinate node. The message comprises a service part demand histories change request message entity, a message header package, and a service part demand history change request message package. The software receives a second message from the second application. The second message is associated with the invoked service part demand history business object and is in response to the first message.

In a sixth aspect, a distributed system operates in a landscape of computer systems providing message-based services. The system processes business objects involving creating, updating or retrieving histories for service parts demand. The system comprises memory and a graphical user interface remote from the memory. The memory stores a business object repository storing a plurality of business objects. Each business object is a logically centralized, semantically disjointed object of a particular business object type. At least one of the business objects is for defining the history of the demand for a service part. The business object comprises data logically organized as a service part demand history root node, a key figure subordinate node and a period bucket assignment subordinate node. The key figure node contains a key figure value subordinate node. The graphical user interface presents data associated with an invoked instance of the service part demand history business object. The interface comprises computer readable instructions embodied on tangible media.

In a seventh aspect, software creates, updates or retrieves replenishment rules for service part inventories. The software comprises computer readable instructions embodied on tangible media. The software executes in a landscape of computer systems providing message-based services. The software invokes a service part inventory replenishment rule business object. The business object is a logically centralized, semantically disjointed object for defining the replenishment rules for service part inventories. The business object comprises data logically organized as a service part inventory replenishment rule root node, a key figure subordinate node and a period bucket assignment subordinate node. The key figure node contains a key figure value subordinate node. The software initiates transmission of a message to a heterogeneous second application, executing in the environment of computer systems providing message-based services, based on the data in the service part inventory replenishment rule business object. The message comprises a service part inventory replenishment rule template message entity, a message header package, a service part inventory replenishment rule package and a log package.

In an eighth aspect, software creates, updates or retrieves replenishment rules for service part inventories. The software comprises computer readable instructions embodied on tangible media. The software executes in a landscape of computer systems providing message-based services. The software initiates transmission of a message to a heterogeneous second application, executing in the environment of computer systems providing message-based services, based on data in a service part inventory replenishment rule business object invoked by the second application. The business object is a logically centralized, semantically disjointed object for defining the replenishment rules for service part inventories. The business object comprises data logically organized as a service part inventory replenishment rule root node, a key figure subordinate node and a period bucket assignment subordinate node. The key figure node contains a key figure value subordinate node. The message comprises a service part inventory replenishment rule template message entity, a message header package, a service part inventory replenishment rule package and a log package. The software receives a second message from the second application. The second message is associated with the invoked service part inventory replenishment rule business object and is in response to the first message.

In a ninth aspect, a distributed system operates in a landscape of computer systems providing message-based services. The system processes business objects involving creating, updating or retrieving replenishment rules for service part inventories. The system comprises memory and a graphical user interface remote from the memory. The memory stores a business object repository storing a plurality of business objects. Each business object is a logically centralized, semantically disjointed object of a particular business object type. At least one of the business objects is for defining the replenishment rules for service part inventories. The business object comprises data logically organized as a service part inventory replenishment rule root node, a key figure subordinate node and a period bucket assignment subordinate node. The key figure node contains a key figure value subordinate node. The graphical user interface presents data associated with an invoked instance of the service part inventory replenishment rule business object. The interface comprises computer readable instructions embodied on tangible media.

In a tenth aspect, software creates, updates or retrieves historical data that can be derived from a business document item. The software comprises computer readable instructions embodied on tangible media. The software executes in a landscape of computer systems providing message-based services. The software invokes a service part order history business object. The business object is a logically centralized, semantically disjointed object for defining historical data that can be derived from a business document item. The business object comprises data logically organized as a service part order history root node and a business transaction document reference subordinate node. The business transaction document reference node contains a business transaction document reference actual values subordinate node. The software initiates transmission of a message to a heterogeneous second application, executing in the environment of computer systems providing message-based services, based on the data in the service part order history business object. The message comprises a service part order history supply chain management by elements response message entity, a message header package, a service part order history package, a processing conditions package and a log package.

In an eleventh aspect, software creates, updates or retrieves historical data that can be derived from a business document item. The software comprises computer readable instructions embodied on tangible media. The software executes in a landscape of computer systems providing message-based services. The software initiates transmission of a message to a heterogeneous second application, executing in the environment of computer systems providing message-based services, based on data in a service part order history business object invoked by the second application. The business object is a logically centralized, semantically disjointed object for defining historical data that can be derived from a business document item. The business object comprises data logically organized as a service part order history root node and a business transaction document reference subordinate node. The business transaction document reference node contains a business transaction document reference actual values subordinate node. The message comprises a service part order history supply chain management by elements response message entity, a message header package, a service part order history package, a processing conditions package and a log package. The software receives a second message from the second application. The second message is associated with the invoked service part order history business object and is in response to the first message.

In a twelfth aspect, a distributed system operates in a landscape of computer systems providing message-based services. The system processes business objects involving creating, updating or retrieving historical data that can be derived from a business document item. The system comprises memory and a graphical user interface remote from the memory. The memory stores storing a business object repository storing a plurality of business objects. Each business object is a logically centralized, semantically disjointed object of a particular business object type. At least one of the business objects is for defining historical data that can be derived from a business document item. The business object comprises data logically organized as a service part order history root node and a business transaction document reference subordinate node. The business transaction document reference node contains a business transaction document reference actual values subordinate node. The graphical user interface presents data associated with an invoked instance of the service part order history business object. The interface comprises computer readable instructions embodied on tangible media.

In a thirteenth aspect, software creates, updates or retrieves information about service part supply plans. The software comprises computer readable instructions embodied on tangible media. The software executes in a landscape of computer systems providing message-based services. The software invokes a service part supply plan business object. The business object is a logically centralized, semantically disjointed object for defining the supply plan for service parts. The business object comprises data logically organized as a service part supply plan root node and a key figure subordinate node. The software initiates transmission of a message to a heterogeneous second application, executing in the environment of computer systems providing message-based services, based on the data in the service part supply plan business object. The message comprises a service part supply plan supply chain management by elements response message entity, a service part supply plan package and a log package.

In a fourteenth aspect, software creates, updates or retrieves information about service part supply plans. The software comprises computer readable instructions embodied on tangible media. The software executes in a landscape of computer systems providing message-based services. The software initiates transmission of a message to a heterogeneous second application, executing in the environment of computer systems providing message-based services, based on data in a service part supply plan business object invoked by the second application. The business object is a logically centralized, semantically disjointed object for defining the supply plan for service parts. The business object comprises data logically organized as a service part supply plan root node and a key figure subordinate node. The message comprises a service part supply plan supply chain management by elements response message entity, a service part supply plan package and a log package. The software receives a second message from the second application. The second message is associated with the invoked service part supply plan business object and is in response to the first message.

In a fifteenth aspect, a distributed system operates in a landscape of computer systems providing message-based services. The system processes business objects involving creating, updating or retrieving information about service part supply plans. The system comprises memory and a graphical user interface remote from the memory. The memory stores a business object repository storing a plurality of business objects. Each business object is a logically centralized, semantically disjointed object of a particular business object type. At least one of the business objects is for defining the supply plan for service parts. The business object comprises data logically organized as a service part supply plan root node and a key figure subordinate node. The graphical user interface presents data associated with an invoked instance of the service part supply plan business object. The interface comprises computer readable instructions embodied on tangible media.

BRIEF DESCRIPTION OF THE DRAWINGS

FIGS. 27A-E depict a hierarchization process in accordance with methods and systems consistent with the subject matter described herein.

FIGS. 34-1 through 34-2 show an exemplary ServicePartDemandForecastsTemplateMessages_sync Message Data Type.

FIGS. 37-1 through 37-4 show an exemplary ServicePartDemandForecastSCMForApprovalByElementsQueryMessage_sync Element Structure.

FIGS. 38-1 through 38-2 show an exemplary ServicePartDemandForecastSCMForApprovalByElementsResponseMessage_sync Element Structure.

FIGS. 64-1 through 64-3 show an exemplary ServicePartDemandHistoriesCancelConfirmationMessage Element Structure.

FIGS. 65-1 through 65-3 show an exemplary ServicePartDemandHistoriesCancelRequestMessage Element Structure.

FIGS. 66-1 through 66-3 show an exemplary ServicePartDemandHistoriesChangeConfirmationMessage Element Structure.

FIGS. 67-1 through 67-5 show an exemplary ServicePartDemandHistoriesChangeRequestMessage Element Structure.

FIGS. 68-1 through 68-3 show an exemplary ServicePartDemandHistoriesCreateConfirmationMessage Element Structure.

FIGS. 69-1 through 69-5 show an exemplary ServicePartDemandHistoriesCreateRequestMessage Element Structure.

FIGS. 70-1 through 70-3 show an exemplary ServicePartDemandHistoriesKeyFigureCancelConfirmationMessage Element Structure.

FIGS. 71-1 through 71-3 show an exemplary ServicePartDemandHistoriesKeyFigureCancelRequestMessage Element Structure.

FIGS. 72-1 through 72-3 show an exemplary ServicePartDemandHistoriesKeyFigureCreateConfirmationMessage Element Structure.

FIGS. 73-1 through 73-4 show an exemplary ServicePartDemandHistoriesKeyFigureCreateRequestMessage Element Structure.

FIGS. 74-1 through 74-5 show an exemplary ServicePartDemandHistoryByElementsQueryMessage Element Structure.

FIGS. 75-1 through 75-5 show an exemplary ServicePartDemandHistoryByElementsResponseMessage Element Structure.

FIGS. 76-1 through 76-2 show an exemplary ServicePartDemandHistoryCancelConfirmationMessage Element Structure.

FIGS. 77-1 through 77-2 show an exemplary ServicePartDemandHistoryCancelRequestMessage Element Structure.

FIGS. 78-1 through 78-2 show an exemplary ServicePartDemandHistoryChangeConfirmationMessage Element Structure.

FIGS. 79-1 through 79-4 show an exemplary ServicePartDemandHistoryChangeRequestMessage Element Structure.

FIGS. 80-1 through 80-2 show an exemplary ServicePartDemandHistoryCreateConfirmationMessage Element Structure.

FIGS. 81-1 through 81-4 show an exemplary ServicePartDemandHistoryCreateRequestMessage Element Structure.

FIGS. 82-1 through 82-2 show an exemplary ServicePartDemandHistoryKeyFigureCancelConfirmationMessage Element Structure.

FIGS. 83-1 through 83-3 show an exemplary ServicePartDemandHistoryKeyFigureCancelRequestMessage Element Structure.

FIGS. 84-1 through 84-2 show an exemplary ServicePartDemandHistoryKeyFigureCreateConfirmationMessage Element Structure.

FIGS. 85-1 through 85-4 show an exemplary ServicePartDemandHistoryKeyFigureCreateRequestMessage Element Structure.

FIGS. 111-1 through 111-2 show an exemplary ServicePartInventoryReplenishmentRuleCancelConfirmation Message Element Structure.

FIGS. 112-1 through 112-2 show an exemplary ServicePartInventoryReplenishmentRuleCancelRequestMessage Element Structure.

FIGS. 113-1 through 113-2 show an exemplary ServicePartInventoryReplenishmentRuleChangeConfirmation Message Element Structure.

FIGS. 114-1 through 114-5 show an exemplary ServicePartInventoryReplenishmentRuleChangeRequestMessage Element Structure.

FIGS. 115-1 through 115-2 show an exemplary ServicePartInventoryReplenishmentRuleCreateConfirmation Message Element Structure.

FIGS. 116-1 through 116-4 show an exemplary ServicePartInventoryReplenishmentRuleCreateRequestMessage Element Structure.

FIGS. 117-1 through 117-2 show an exemplary ServicePartInventoryReplenishmentRuleKeyFigureCancel ConfirmationMessage Element Structure.

FIGS. 118-1 through 118-3 show an exemplary ServicePartInventoryReplenishmentRuleKeyFigureCancelRequestMessage Element Structure.

FIGS. 119-1 through 119-2 show an exemplary ServicePartInventoryReplenishmentRuleKeyFigureCreate Confirmation Message Element Structure.

FIGS. 120-1 through 120-4 show an exemplary ServicePartInventoryReplenishmentRuleKeyFigureCreate RequestMessage Element Structure.

FIGS. 121-1 through 121-3 show an exemplary ServicePartInventoryReplenishmentRulesCancelConfirmation Message Element Structure.

FIGS. 122-1 through 122-3 show an exemplary ServicePartInventoryReplenishmentRulesCancelRequestMessage Element Structure.

FIGS. 123-1 through 123-3 show an exemplary ServicePartInventoryReplenishmentRulesChangeConfirmation Message Element Structure.

FIGS. 124-1 through 124-5 show an exemplary ServicePartInventoryReplenishmentRulesChangeRequestMessage Element Structure.

FIGS. 125-1 through 125-3 show an exemplary ServicePartInventoryReplenishmentRulesCreateConfirmation Message Element Structure.

FIGS. 126-1 through 126-5 show an exemplary ServicePartInventoryReplenishmentRulesCreateRequestMessage Element Structure.

FIGS. 127-1 through 127-3 show an exemplary ServicePartInventoryReplenishmentRulesKeyFigureCancel ConfirmationMessage Element Structure.

FIGS. 128-1 through 128-3 show an exemplary ServicePartInventoryReplenishmentRulesKeyFigureCancelRequestMessage Element Structure.

FIGS. 129-1 through 129-3 show an exemplary ServicePartInventoryReplenishmentRulesKeyFigureCreate ConfirmationMessage Element Structure.

Figure 1:
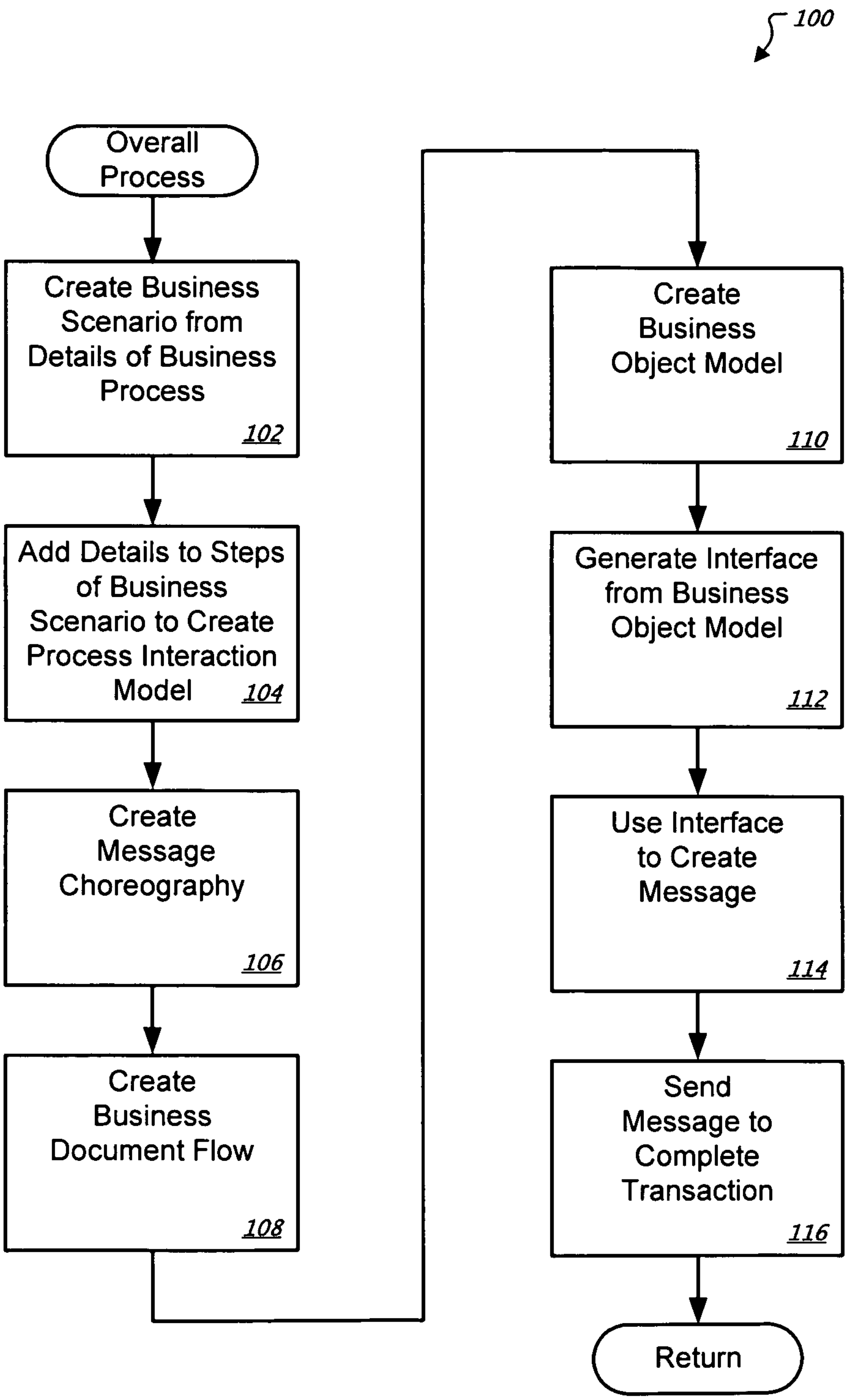
FIG. 1 depicts a flow diagram of the overall steps performed by methods and systems consistent with the subject matter described herein.

FIGS. 130-1 through 130-5 show an exemplary ServicePartInventoryReplenishmentRulesKeyFigureCreate RequestMessage Element Structure.

FIGS. 131-1 through 131-5 show an exemplary ServicePartInventoryReplenishmentRuletByElementsResponse Message Element Structure.

Figure 132:
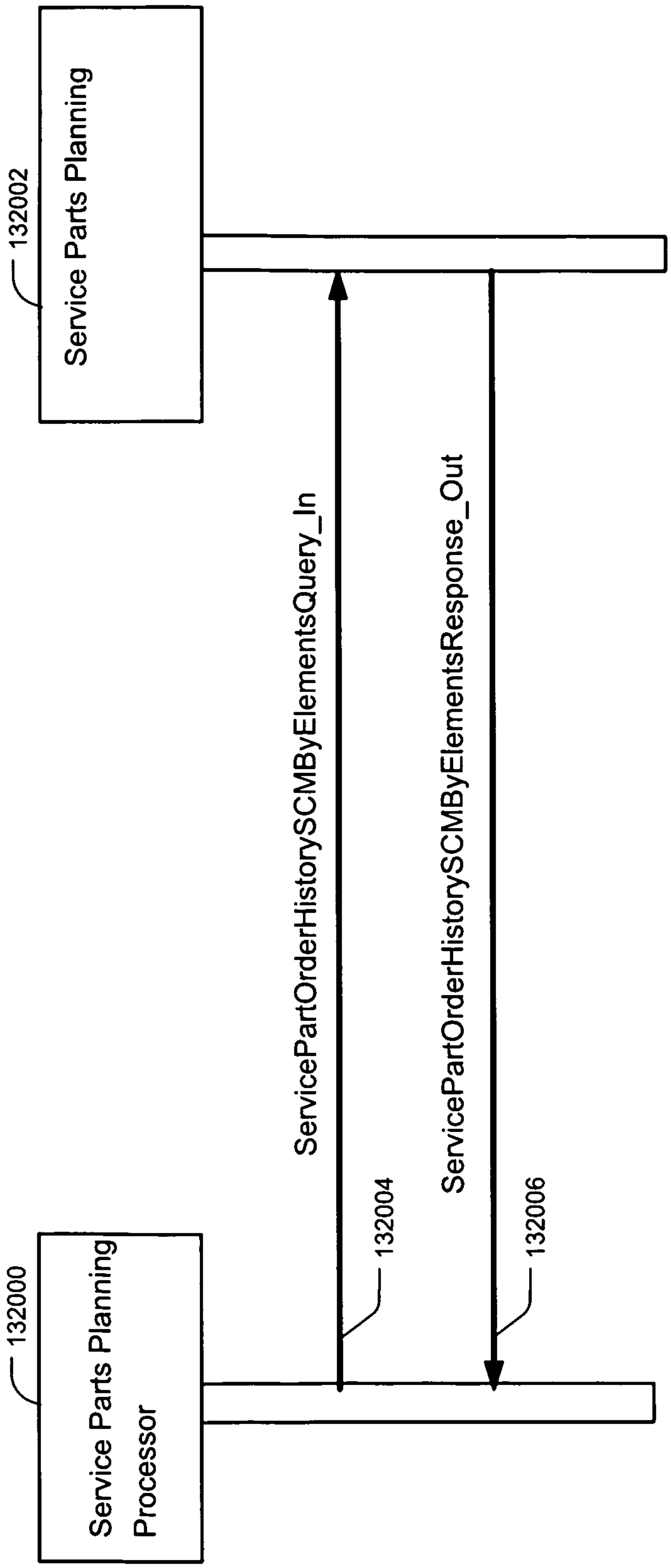

FIG. 132 shows an exemplary ServicePartOrderHistory Message Choreography.

Figure 133:
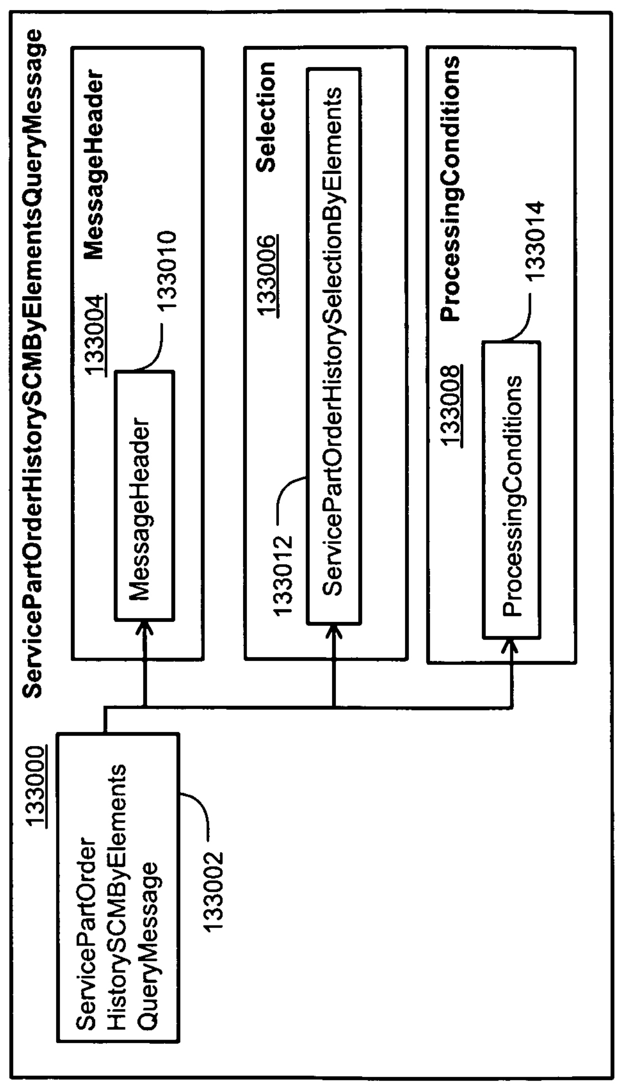

FIG. 133 shows an exemplary ServicePartOrderHistorySCMByElementsQueryMessage Message Data Type.

Figure 134:
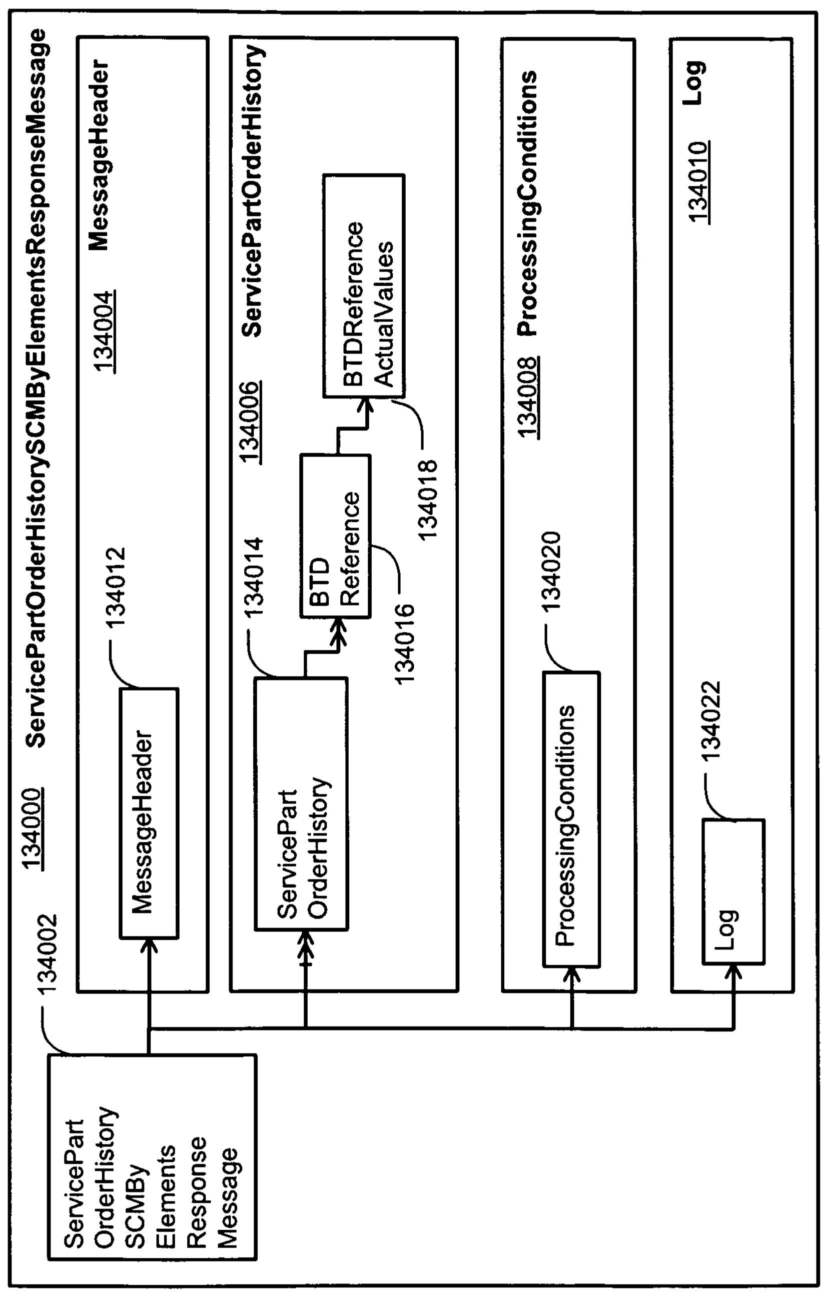

FIG. 134 shows an exemplary ServicePartOrderHistorySCMByElementsResponseMessage Message Data Type.

Figure 8:
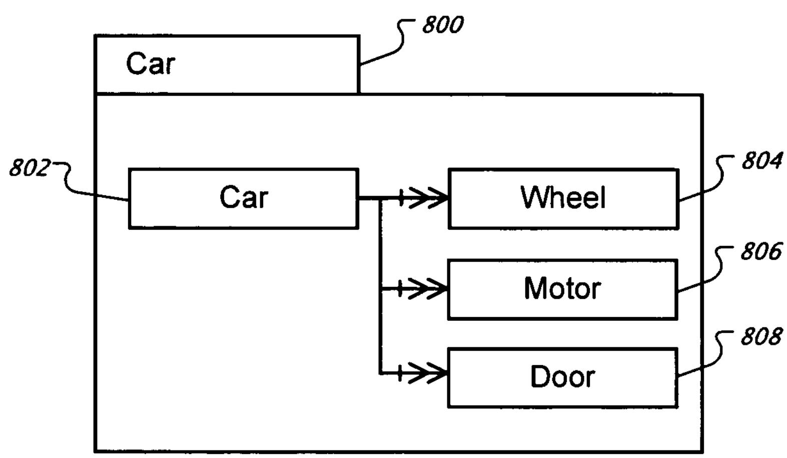
FIG. 8 depicts another example of a package in accordance with methods and systems consistent with the subject matter described herein.

FIGS. 135-1 through 135-8 show an exemplary ServicePartOrderHistorySCMByElementsQueryMessage Element Structure.

FIGS. 136-1 through 136-8 show an exemplary ServicePartOrderHistorySCMByElementsResponseMessage Element Structure.

Figure 137:
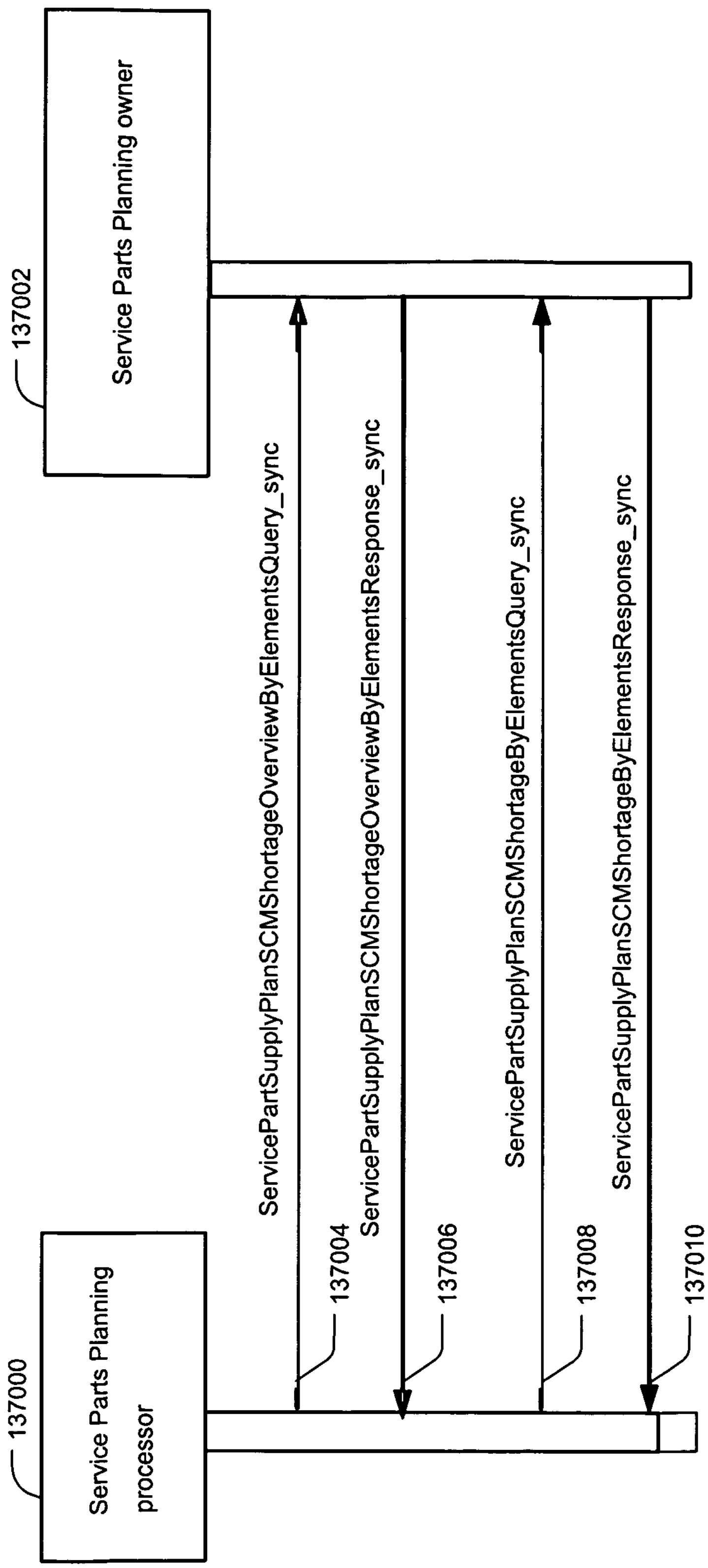

FIG. 137 shows an exemplary ServicePartSupplyPlan Message Choreography.

Figure 138:
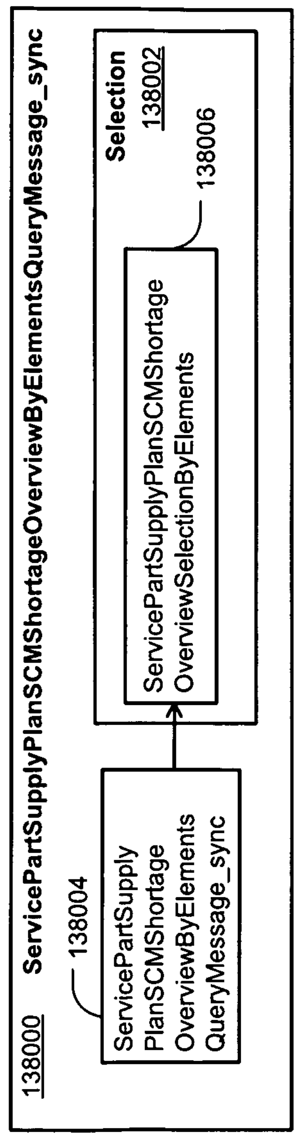

FIG. 138 shows an exemplary ServicePartSupplyPlanSCMShortageOverviewByElementsQueryMessage_sync Message Data Type.

Figure 139:
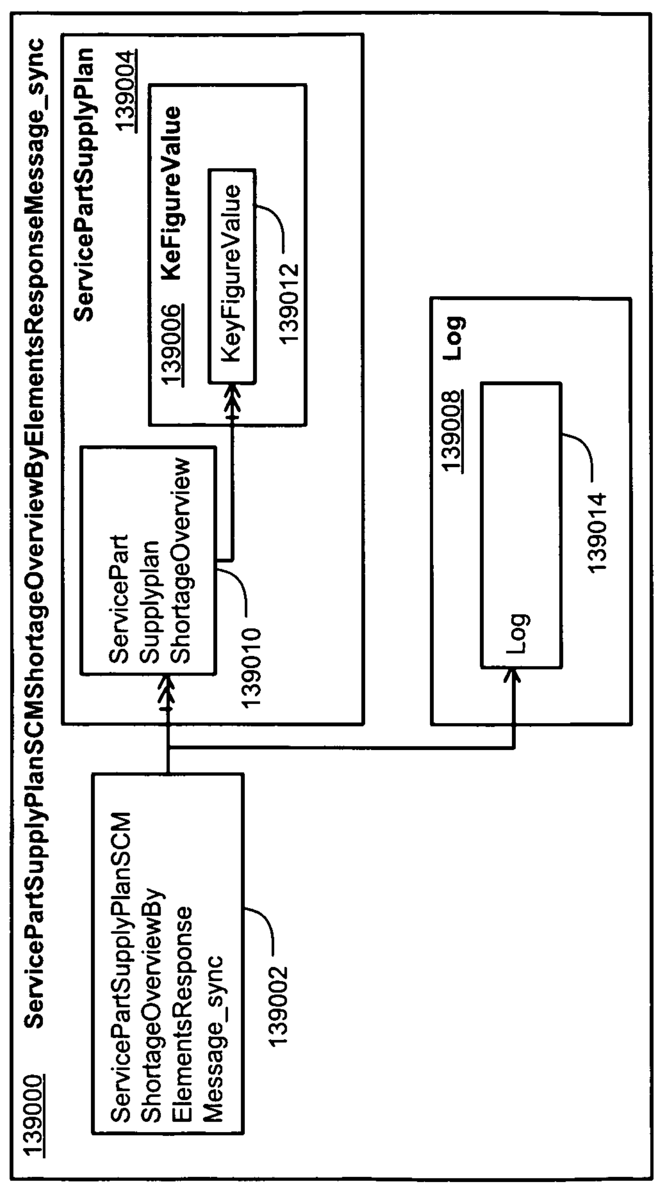

FIG. 139 shows an exemplary ServicePartSupplyPlanSCMShortageOverviewByElementsResponseMessage_sync Message Data Type.

Figure 140:
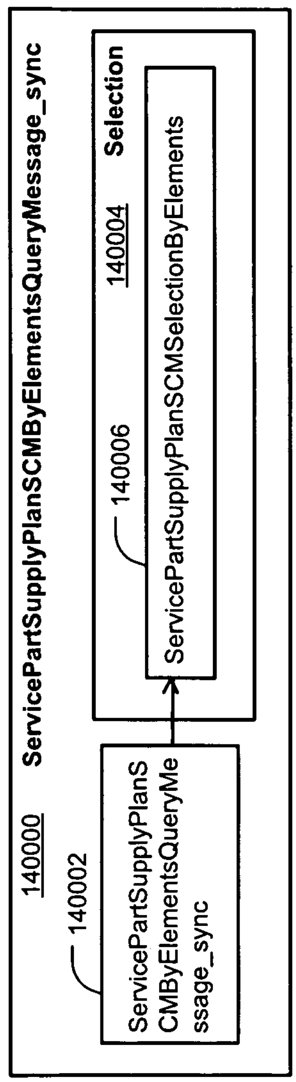

FIG. 140 shows an exemplary ServicePartSupplyPlanSCMByElementsQueryMessage_sync Message Data Type.

Figure 141:
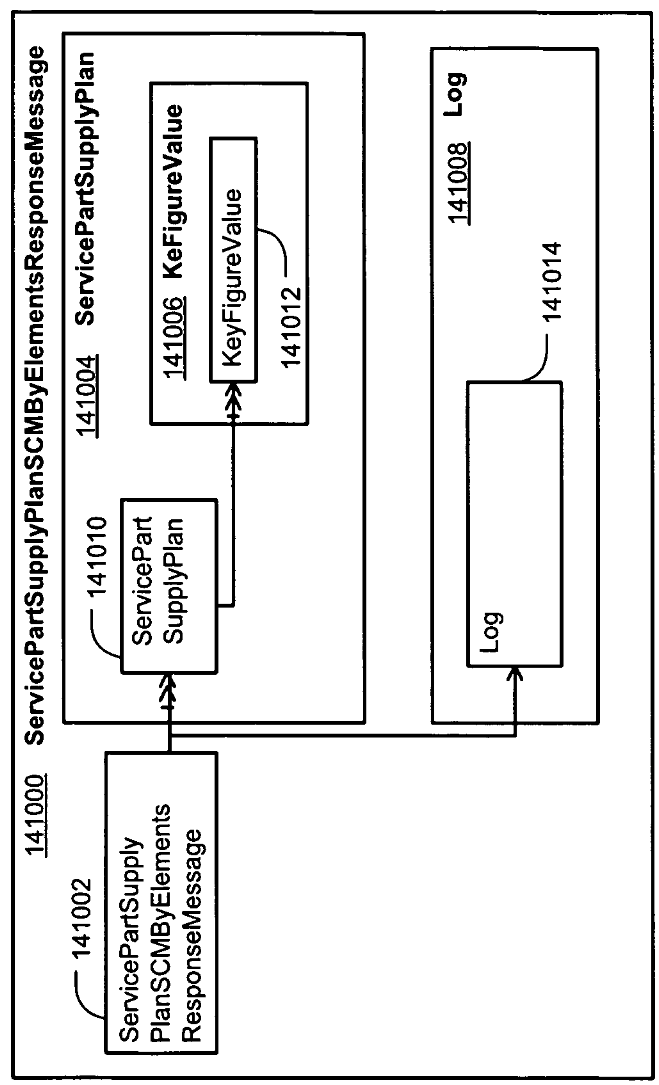

FIG. 141 shows an exemplary ServicePartSupplyPlanSCMByElementsResponseMessage_sync Message Data Type.

Figure 6:
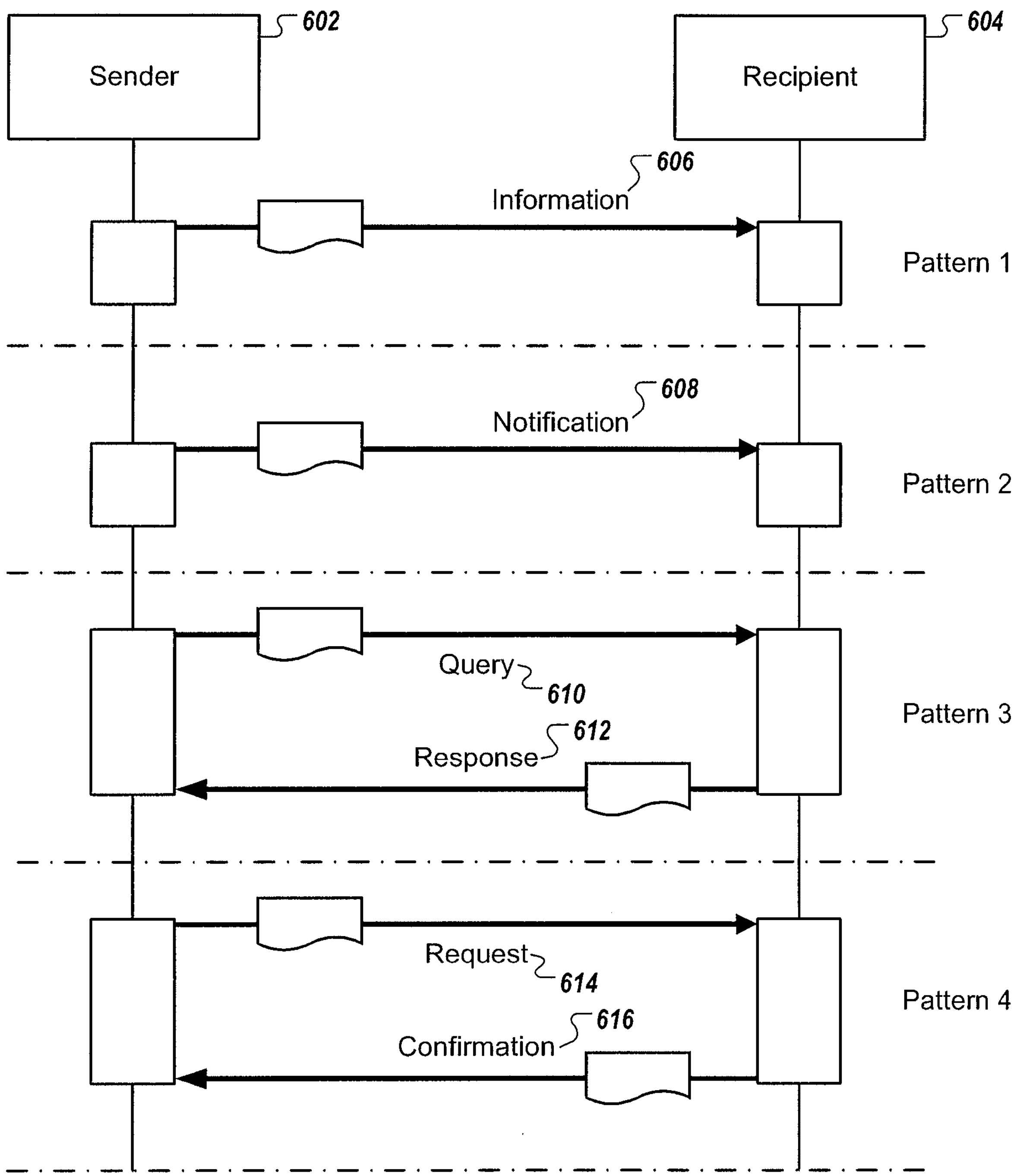
FIG. 6 depicts message categories in accordance with methods and systems consistent with the subject matter described herein.

FIGS. 142-1 through 142-6 show an exemplary ServicePartSupplyPlanSCMShortageOverviewByElements QueryMessage_sync Element Structure.

FIGS. 143-1 through 143-3 show an exemplary ServicePartSupplyPlanSCMShortageOverviewByElements Response Message_sync Element Structure.

Figure 9:
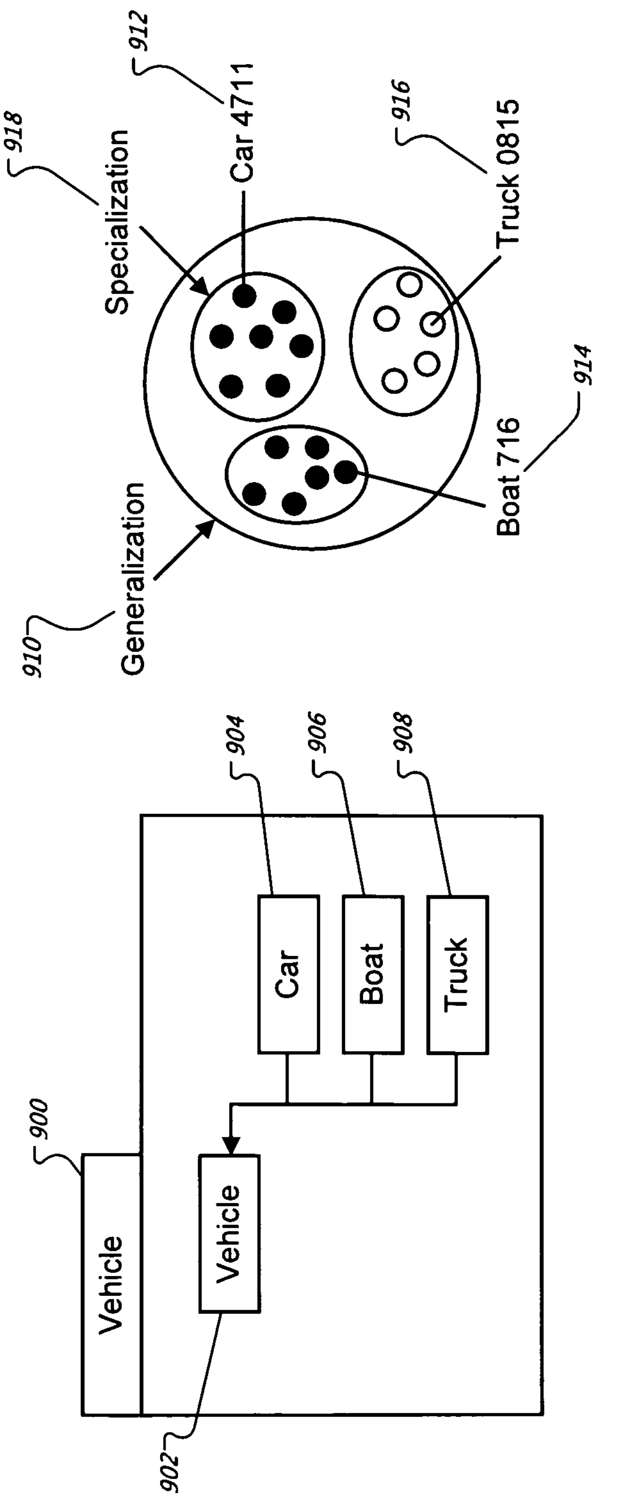
FIG. 9 depicts a third example of a package in accordance with methods and systems consistent with the subject matter described herein.

FIGS. 144-1 through 144-9 show an exemplary ServicePartSupplyPlanSCMByElementsQueryMessage_sync Element Structure.

Figure 7:
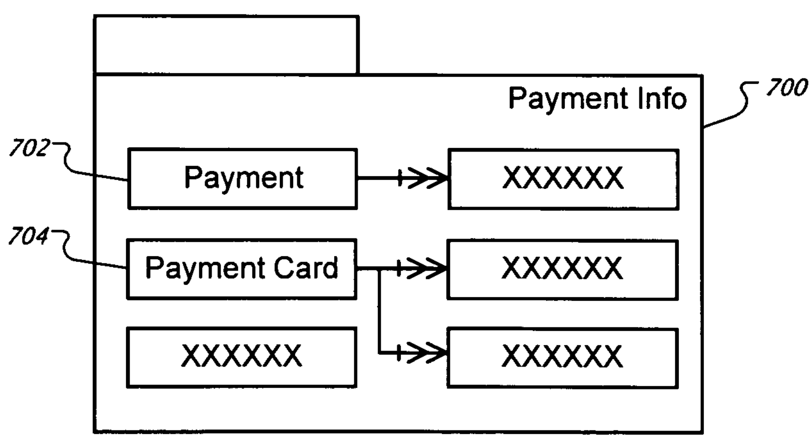
FIG. 7 depicts an example of a package in accordance with methods and systems consistent with the subject matter described herein.

FIGS. 145-1 through 145-7 show an exemplary ServicePartSupplyPlanSCMByElementsResponseMessage_sync Element Structure.

DETAILED DESCRIPTION

A. Overview

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
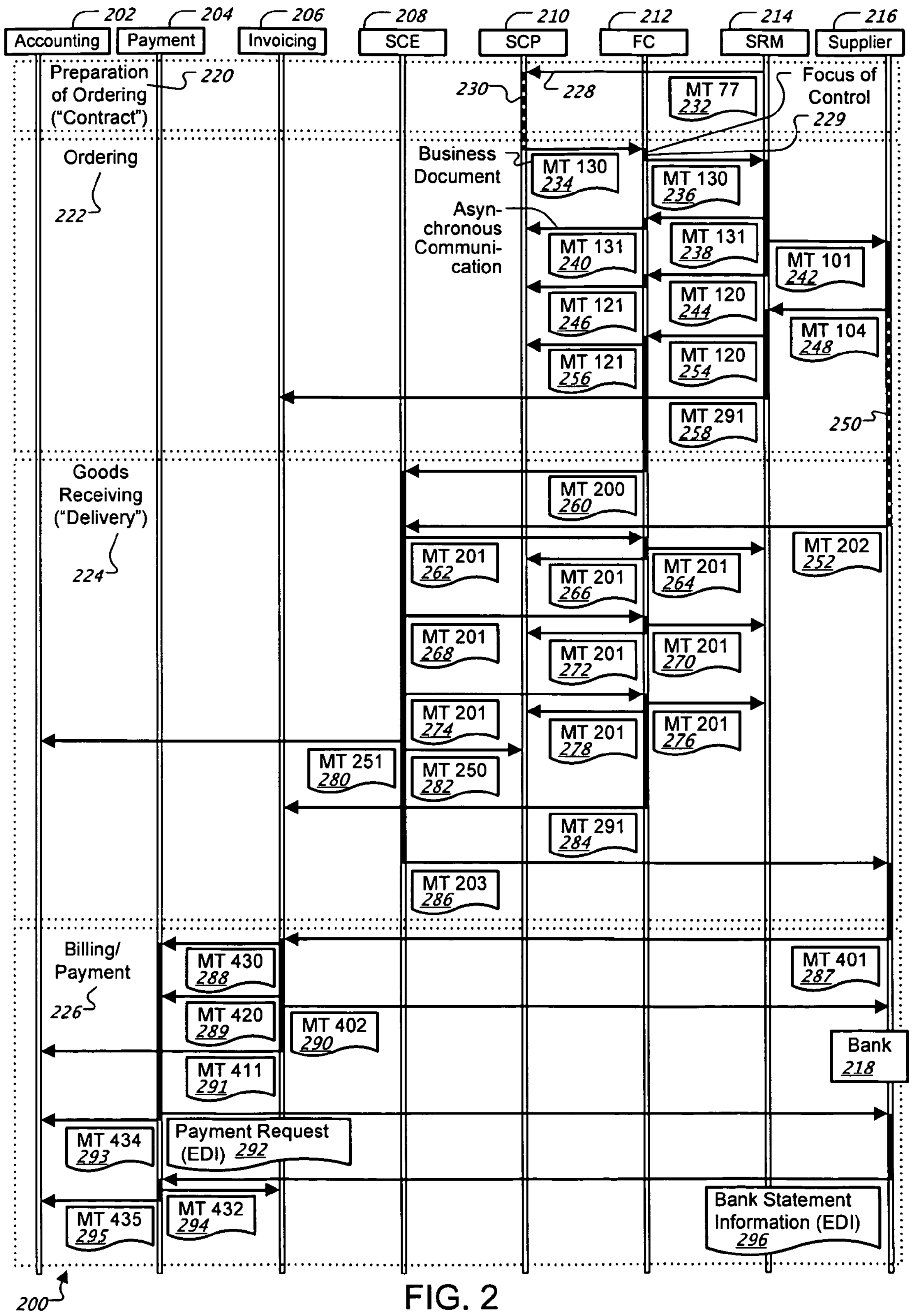
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
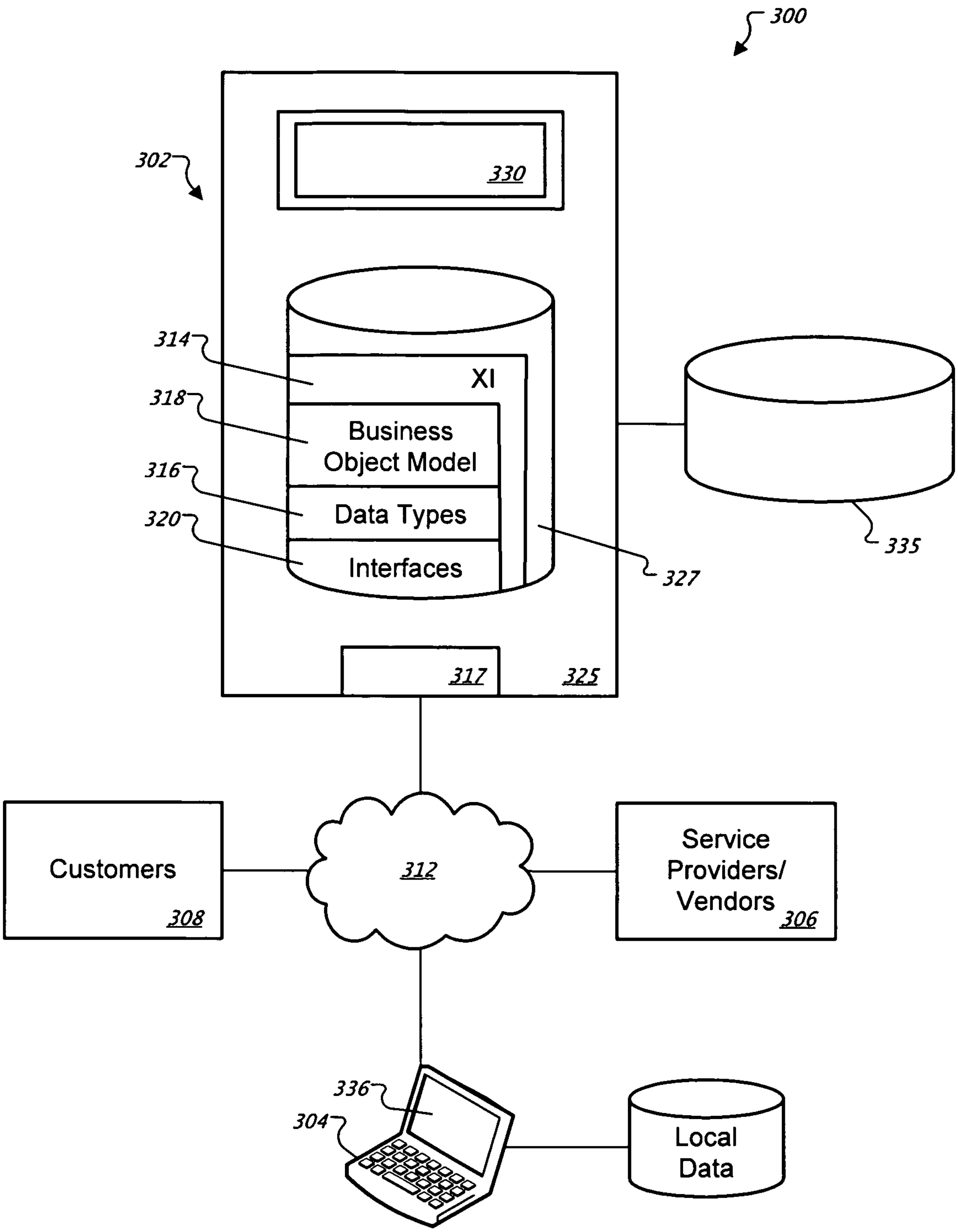
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or offshore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
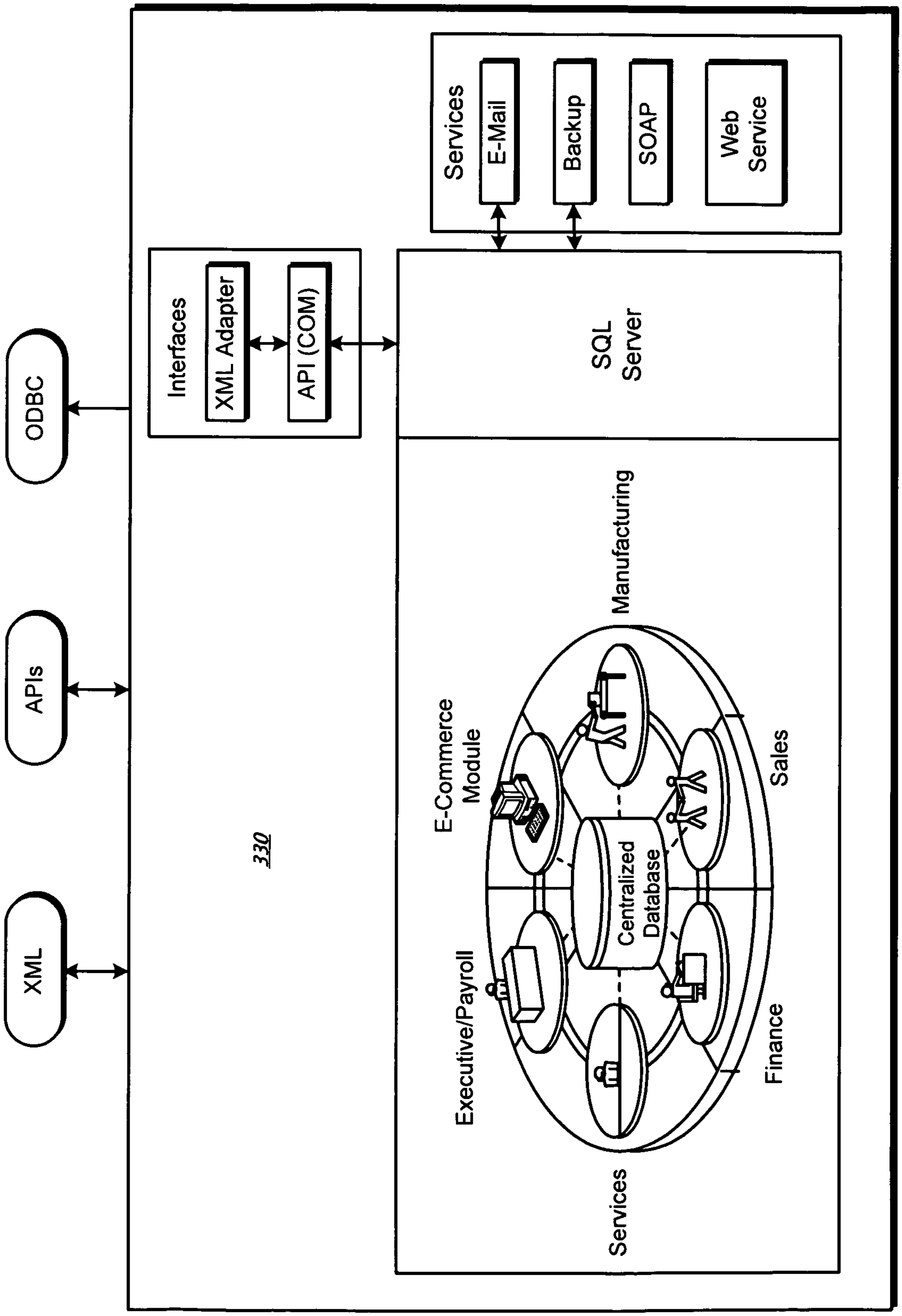
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
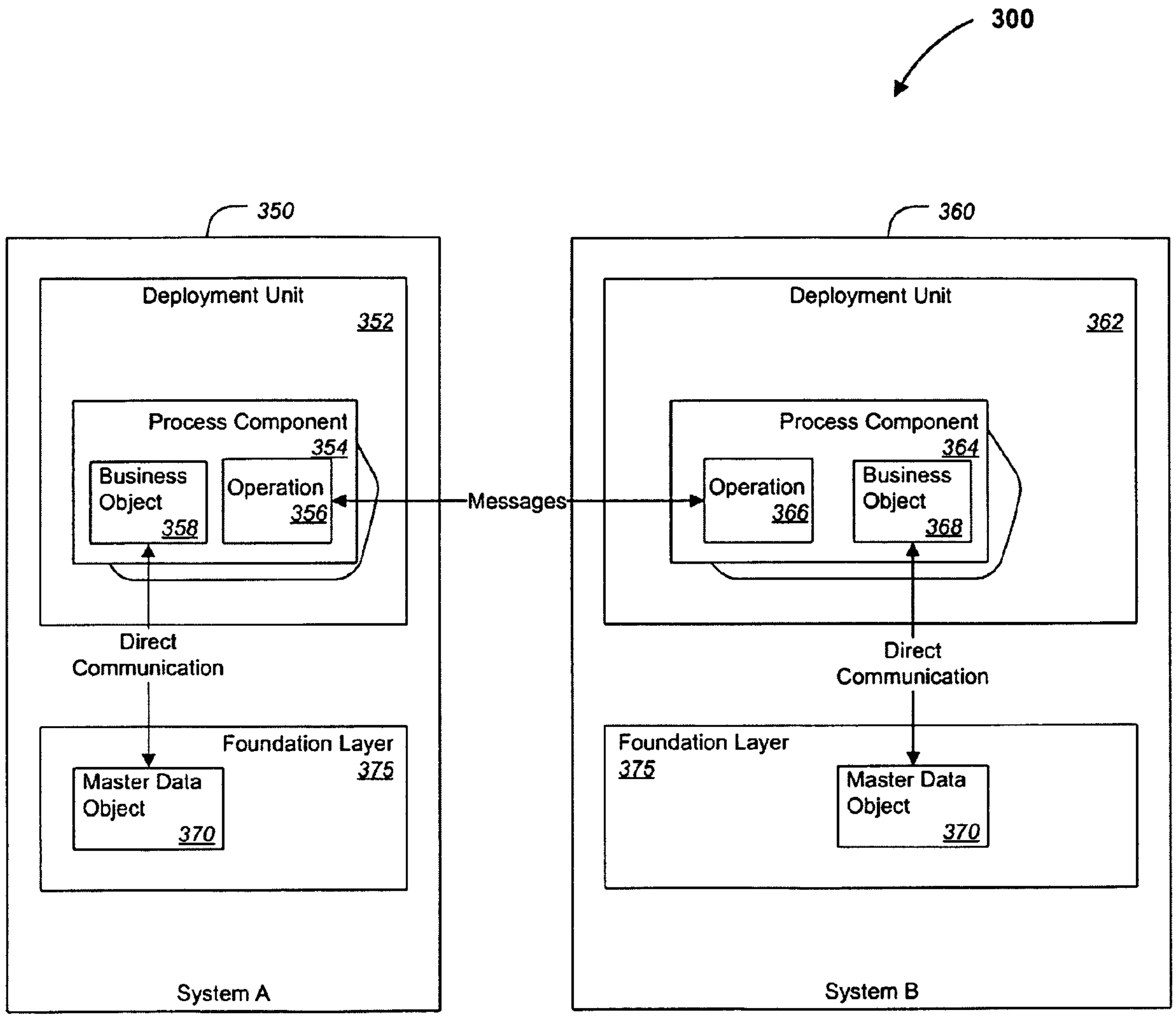

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
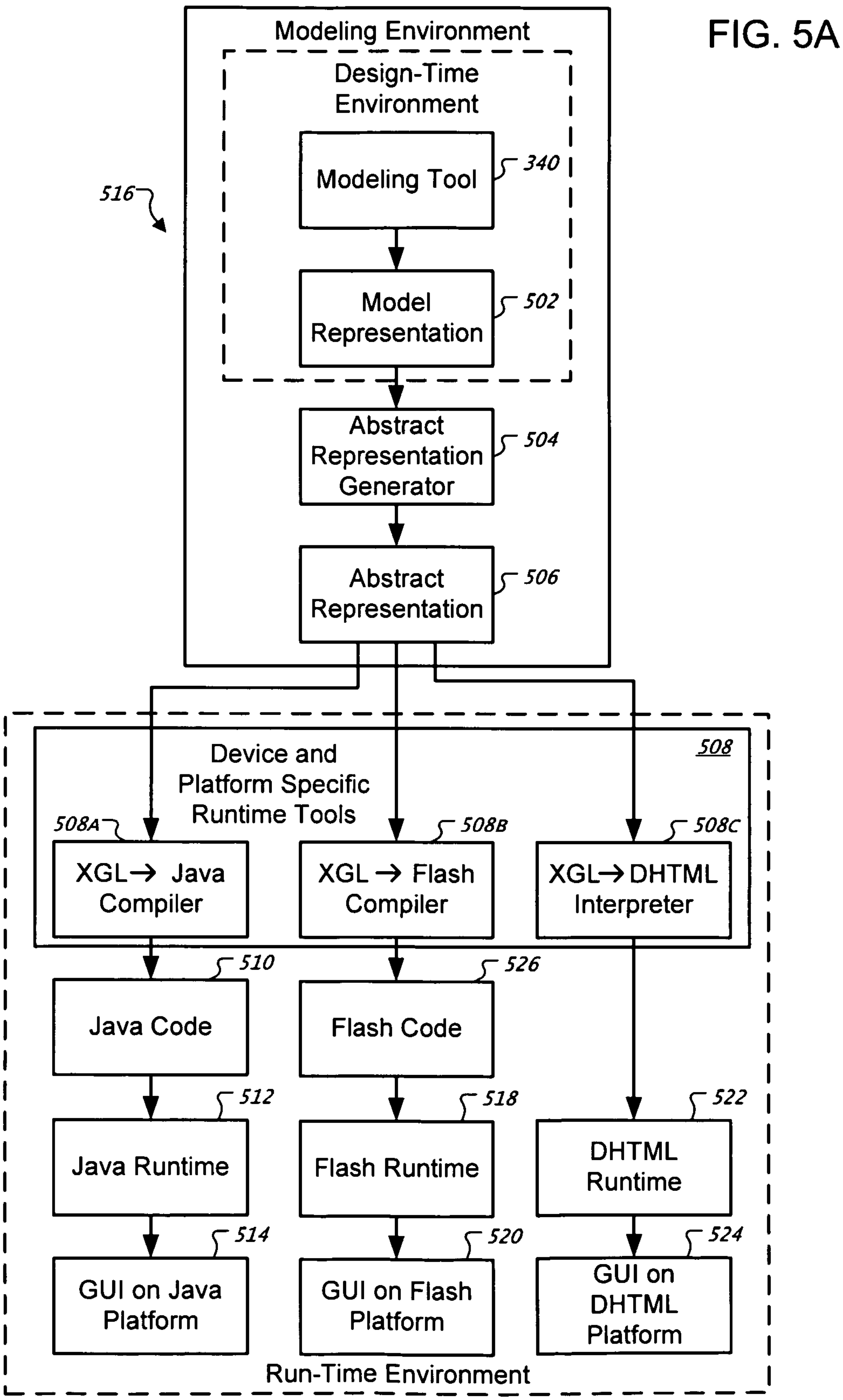
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
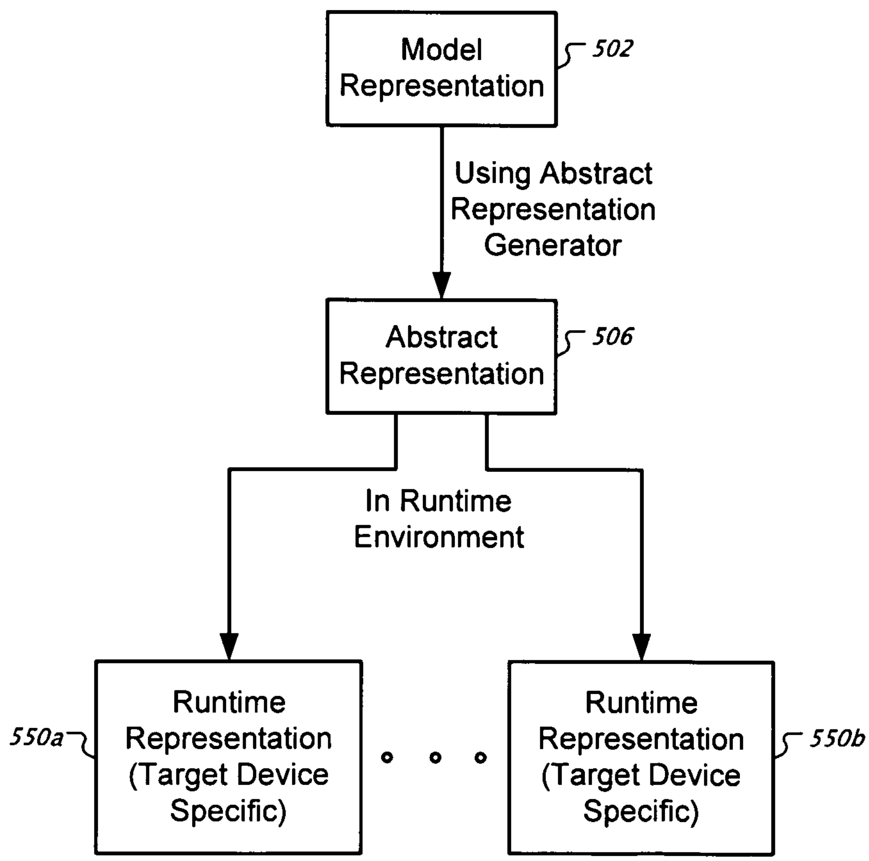
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
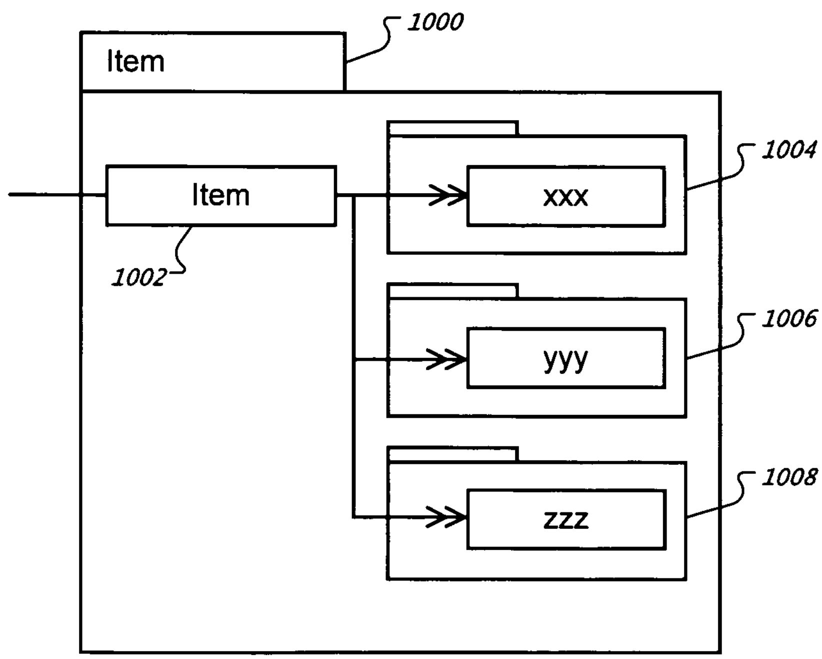
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
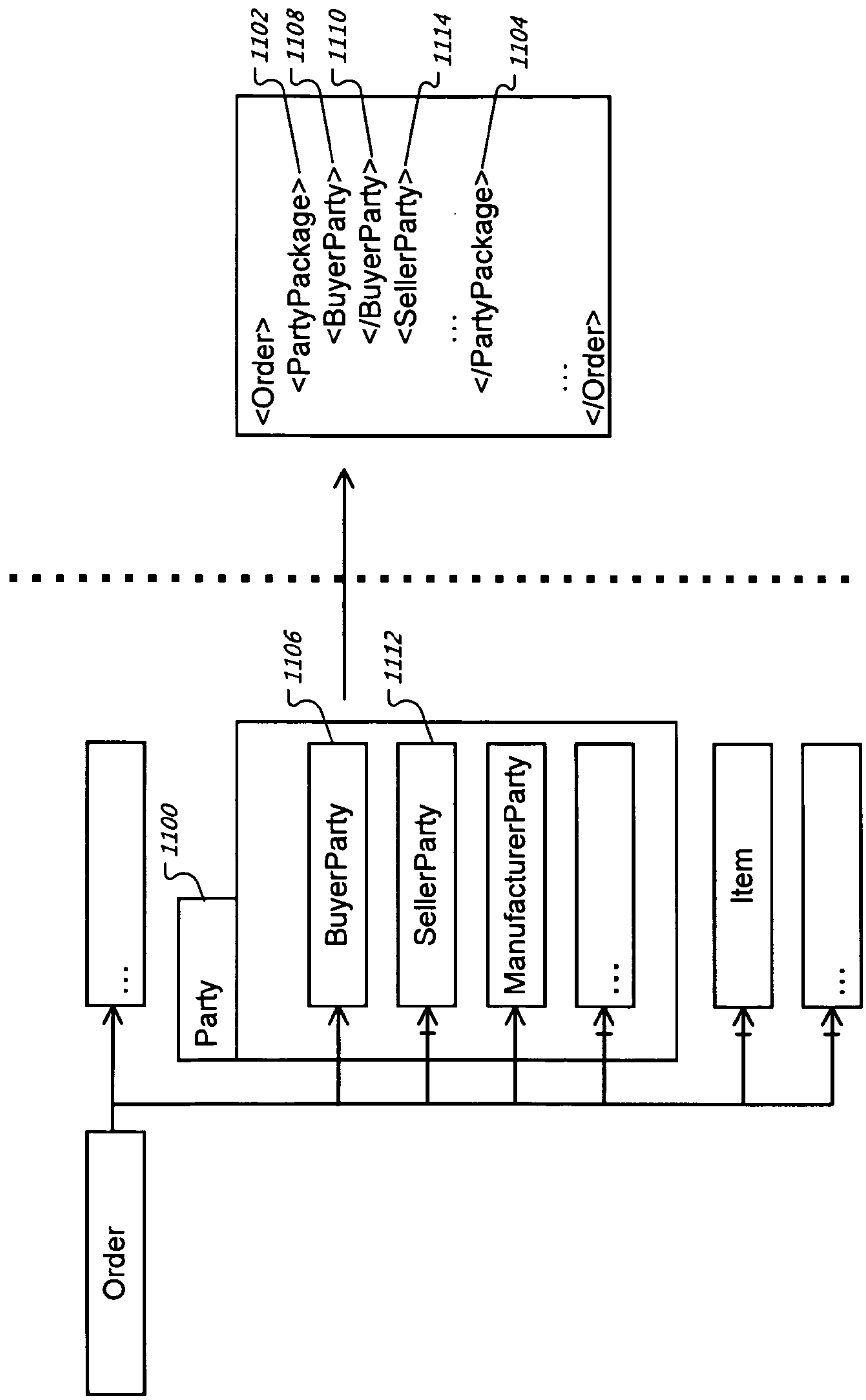
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
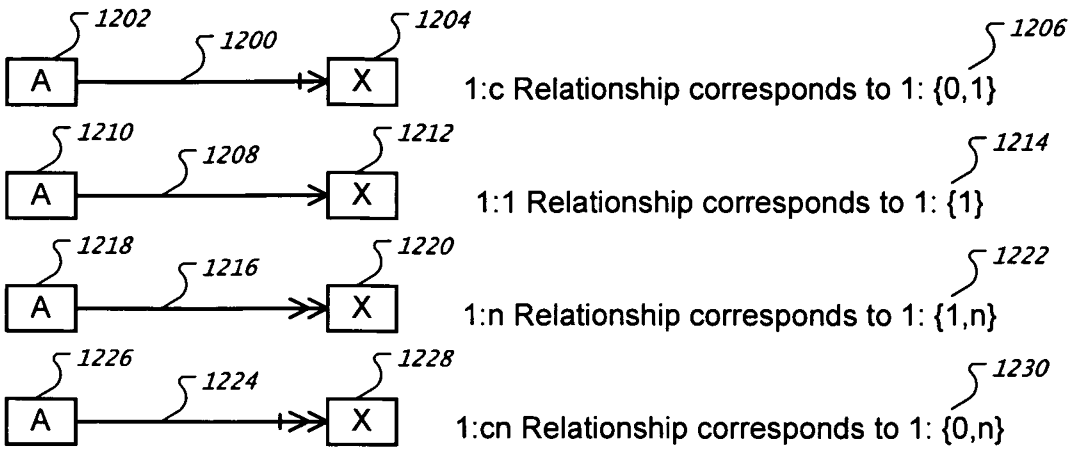
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
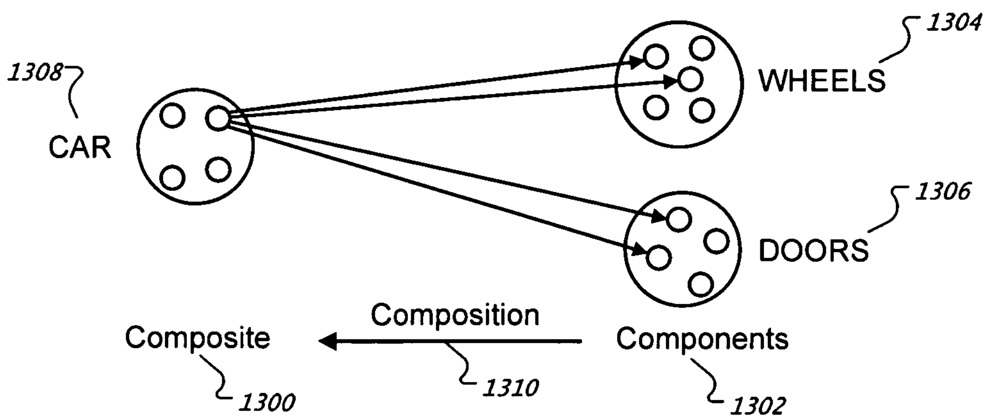
FIG. 13 depicts an example of a composition in accordance with methods and systems consistent with the subject matter described herein.
Figure 14:
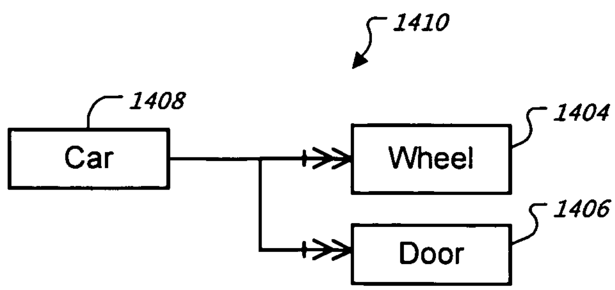
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
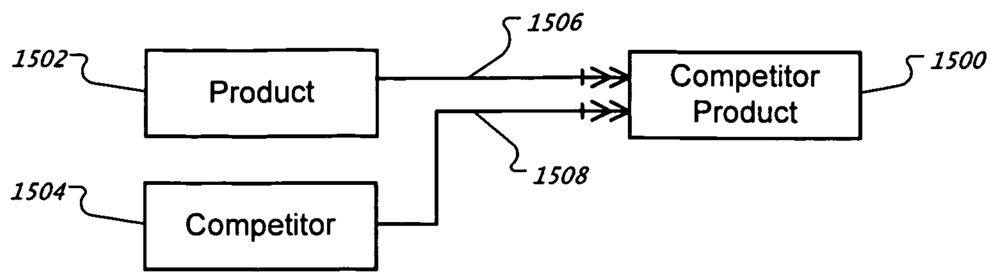
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
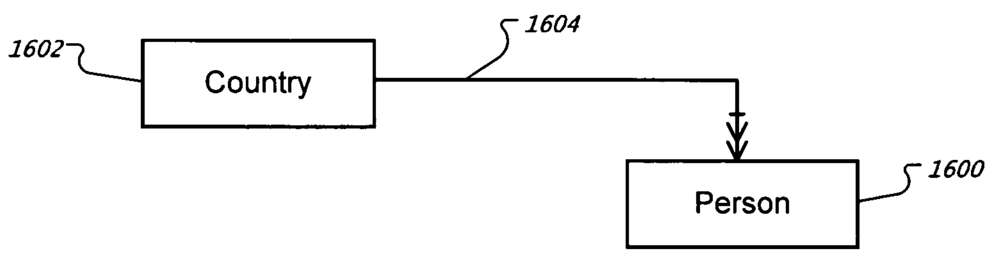
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
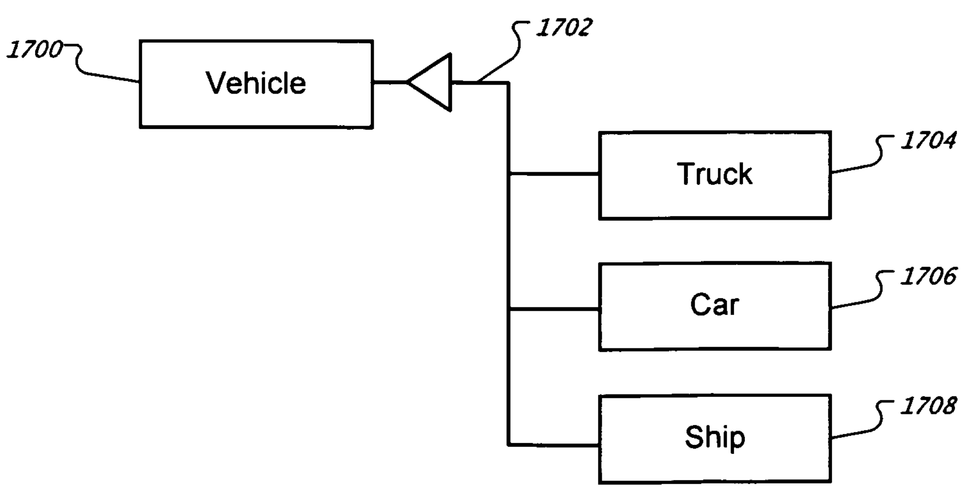
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
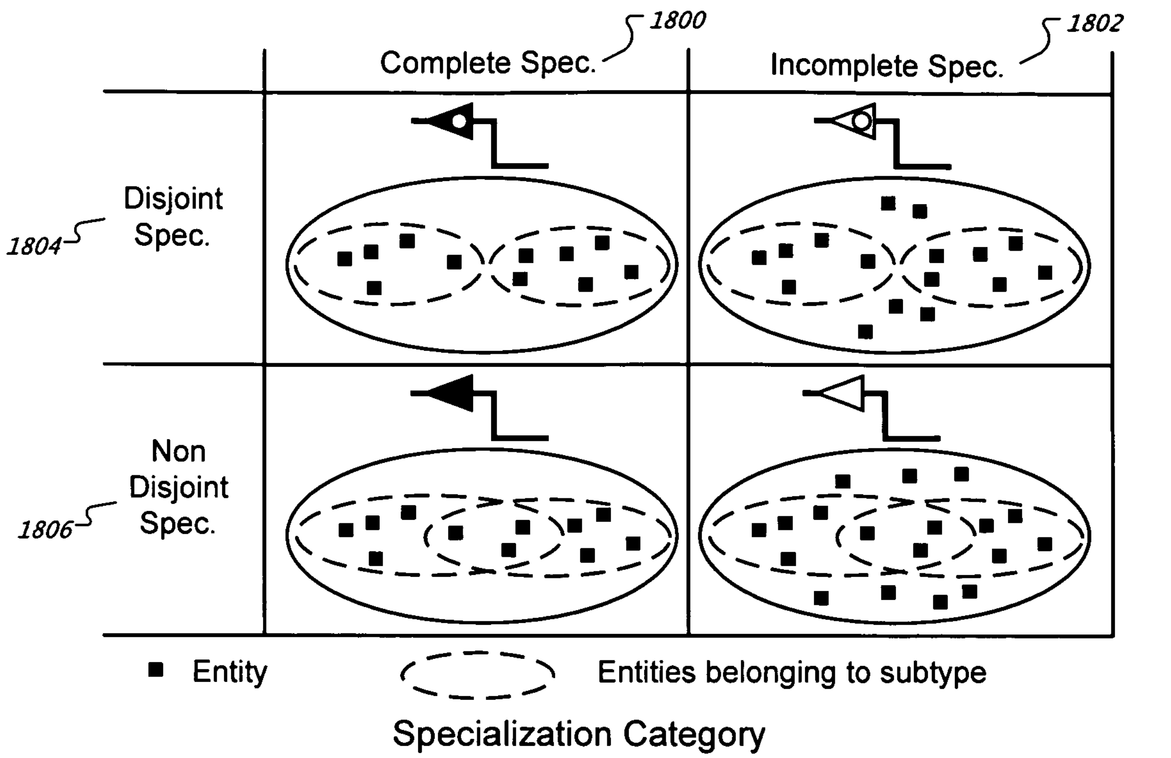
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
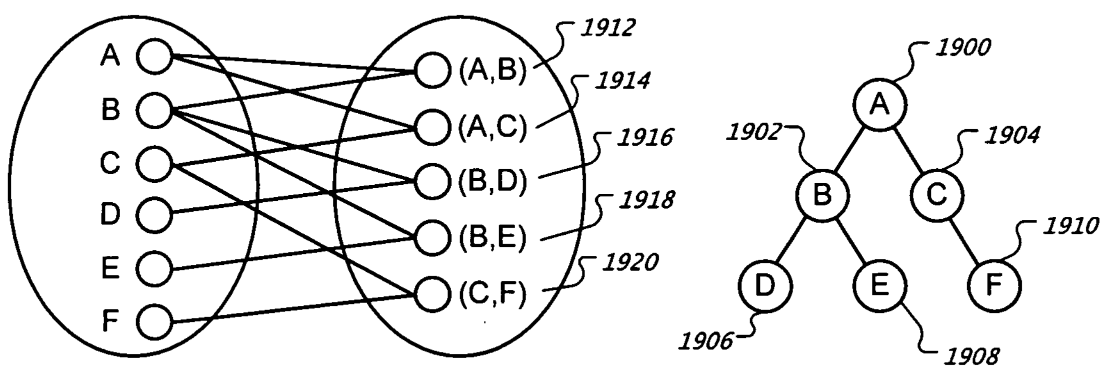
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
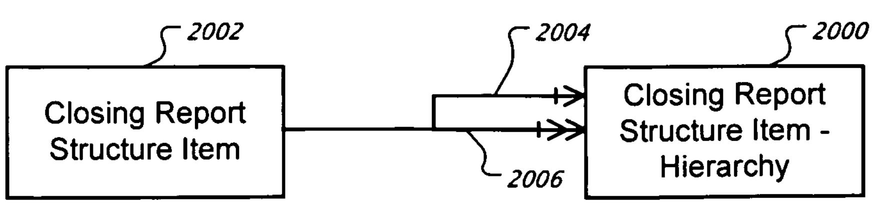
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
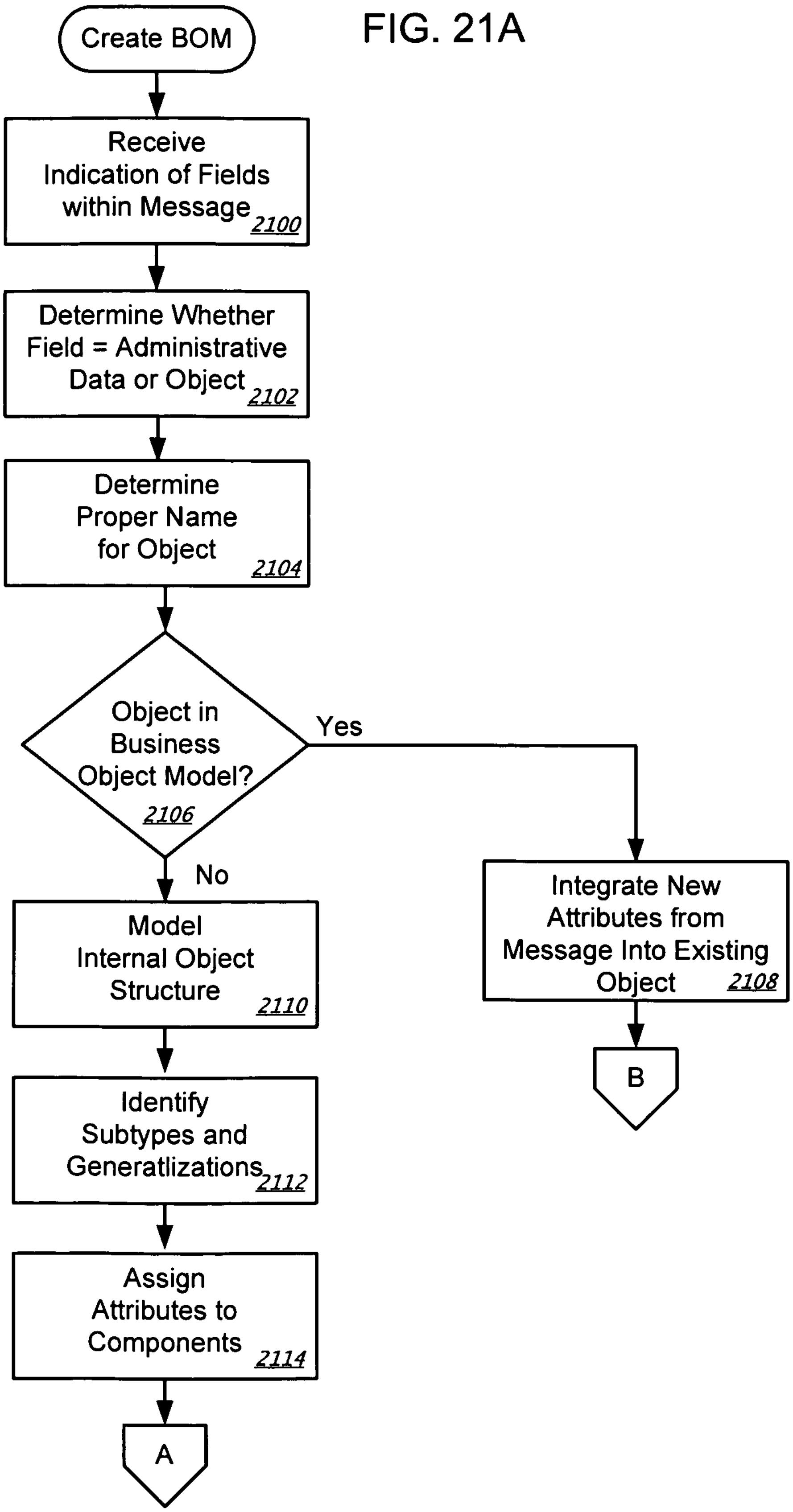
FIGS. 21A-B depict a flow diagram of the steps performed to create a business object model in accordance with methods and systems consistent with the subject matter described herein.
Figure 21B:
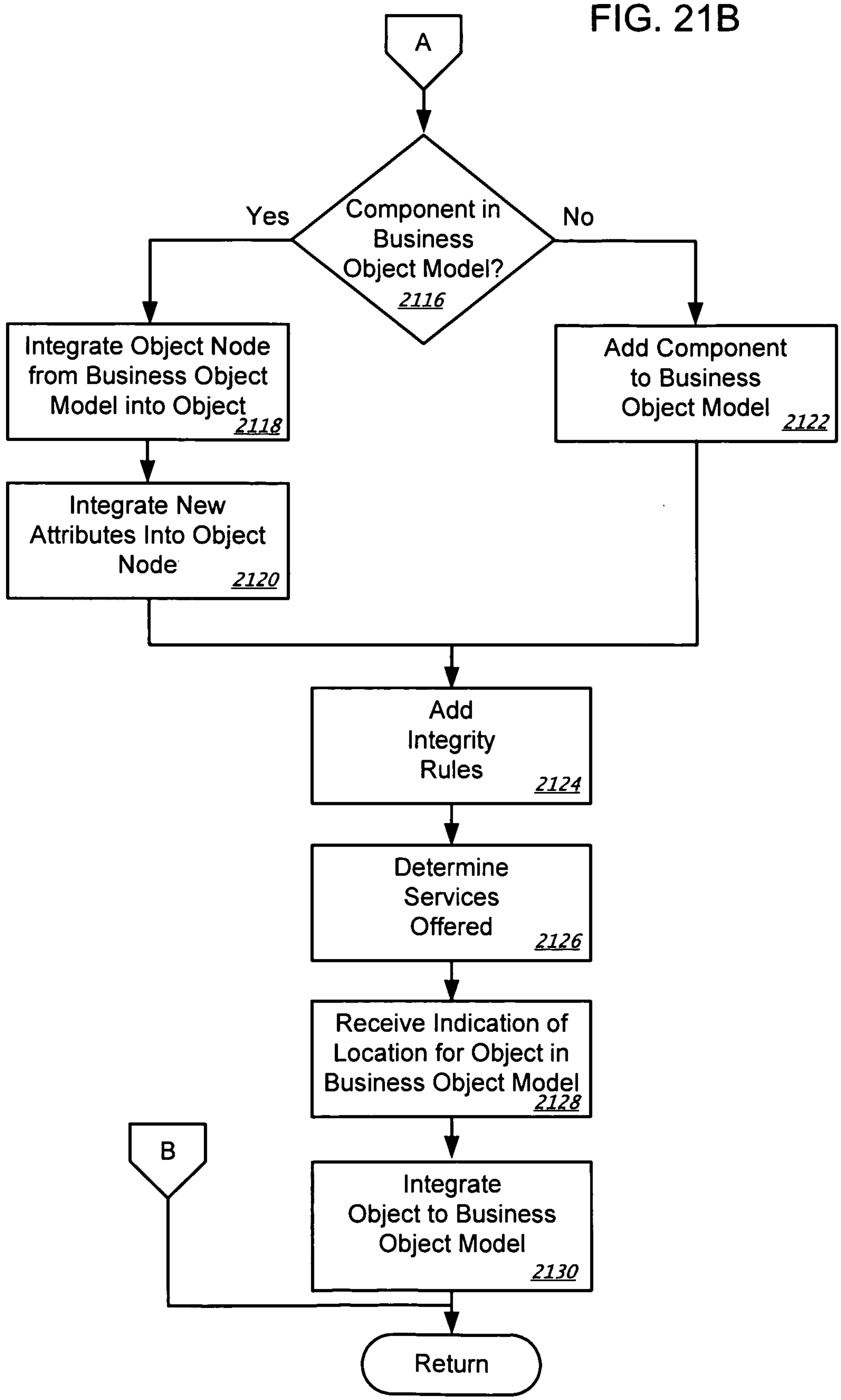

FIGS. 21A-B depict the steps performed using methods and systems consistent with the subject matter described herein to create a business object model. Although some steps are described as being performed by a computer, these steps may alternatively be performed manually, or computer-assisted, or any combination thereof Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |

-continued

| |
|---|
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | | |
|---|---|---|---|
| ID | Purchase | | |
| AdditionalID | Order | | |
| PostingDate | | | |
| LastChangeDate | | | |
| AcceptanceStatus | | | |
| Note | | | |
| CompleteTransmission | | | |
| Indicator | | | |
| Buyer | | Buyer | |
| BuyerOrganisationName | | | |
| Person Name | | | |
| FunctionalTitle | | | |
| DepartmentName | | | |
| CountryCode | | | |
| StreetPostalCode | | | |
| POBox Postal Code | | | |
| Company Postal Code | | | |
| City Name | | | |
| DistrictName | | | |
| PO Box ID | | | |
| PO Box Indicator | | | |
| PO Box Country Code | | | |
| PO Box Region Code | | | |
| PO Box City Name | | | |
| Street Name | | | |
| House ID | | | |
| Building ID | | | |
| Floor ID | | | |
| Room ID | | | |
| Care Of Name | | | |
| AddressDescription | | | |
| Telefonnumber | | | |
| MobileNumber | | | |
| Facsimile | | | |
| Email | | | |
| Seller | | Seller | |
| SellerAddress | | | |
| Location | | Location | |
| LocationType | | | |
| DeliveryItemGroupID | | DeliveryTerms | |
| DeliveryPriority | | | |
| DeliveryCondition | | | |
| TransferLocation | | | |
| NumberofPartialDelivery | | | |
| QuantityTolerance | | | |
| MaximumLeadTime | | | |
| TransportServiceLevel | | | |
| TranportCondition | | | |
| TransportDescription | | | |
| CashDiscountTerms | | | |
| PaymentForm | | Payment | |
| PaymentCardID | | | |
| PaymentCardReferenceID | | | |
| SequenceID | | | |
| Holder | | | |
| ExpirationDate | | | |
| AttachmentID | | | |
| AttachmentFilename | | | |
| DescriptionofMessage | | | |
| ConfirmationDescriptionof | | | |
| Message | | | |
| FollowUpActivity | | | |
| ItemID | | Purchase Order | |
| ParentItemID | | Item | |
| HierarchyType | | | |
| ProductID | | | Product |
| ProductType | | | |
| ProductNote | | | |
| ProductCategoryID | | | Product- |

-continued

| | Category |
|---|---|
| Amount | |
| BaseQuantity | |
| ConfirmedAmount | |
| ConfirmedBaseQuantity | |
| ItemBuyer | Buyer |
| ItemBuyerOrganisation | |
| Name | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |

-continued

| | |
|---|---|
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation Description | | | 0 . . . 1 |
| | | ScheduleLine | | | 0 . . . n |
| | | | Delivery Period | | 1 |
| | | ConfirmedScheduleLine | | | 0 . . . n |

After identifying the subtypes and generalizations, the developers assign the attributes to these components (step 2114). The attributes for a portion of the components are shown below.

| | | |
|---|---|---|
| Purchase Order | | 1 |
| | ID | 1 |
| | SellerID | 0 . . . 1 |
| | BuyerPosting DateTime | 0 . . . 1 |

-continued

| | | | |
|---|---|---|---|
| BuyerLast ChangeDate Time | | | 0 . . . 1 |
| SellerPosting DateTime | | | 0 . . . 1 |
| SellerLast ChangeDate Time | | | 0 . . . 1 |
| Acceptance StatusCode | | | 0 . . . 1 |
| Note | | | 0 . . . 1 |
| ItemList Complete Transmission Indicator | | | 0 . . . 1 |
| BuyerParty | | | 0 . . . 1 |
| | StandardID | | 0 . . . n |
| | BuyerID | | 0 . . . 1 |
| | SellerID | | 0 . . . 1 |
| | Address | | 0 . . . 1 |
| | ContactPerson | | 0 . . . 1 |
| | | BuyerID | 0 . . . 1 |
| | | SellerID | 0 . . . 1 |
| | | Address | 0 . . . 1 |
| SellerParty | | | 0 . . . 1 |
| Product RecipientParty | | | 0 . . . 1 |
| VendorParty | | | 0 . . . 1 |
| Manufacturer Party | | | 0 . . . 1 |
| BillToParty | | | 0 . . . 1 |
| PayerParty | | | 0 . . . 1 |
| CarrierParty | | | 0 . . . 1 |
| ShipTo Location | | | 0 . . . 1 |
| | StandardID | | 0 . . . n |
| | BuyerID | | 0 . . . 1 |
| | SellerID | | 0 . . . 1 |
| | Address | | 0 . . . 1 |
| ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
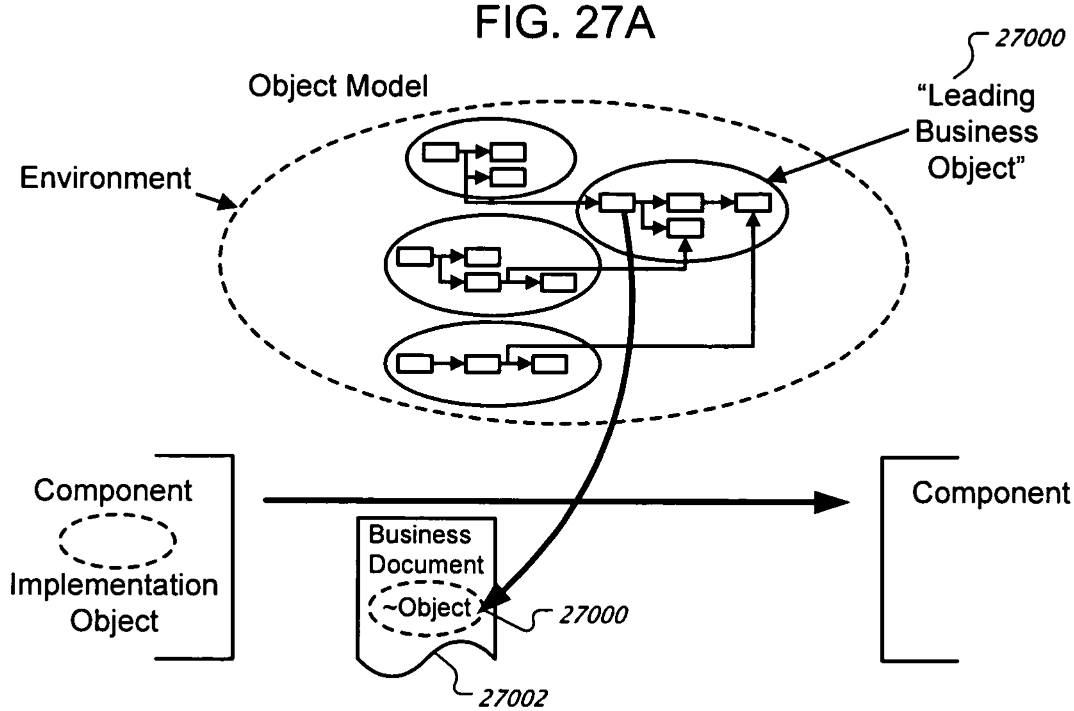

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
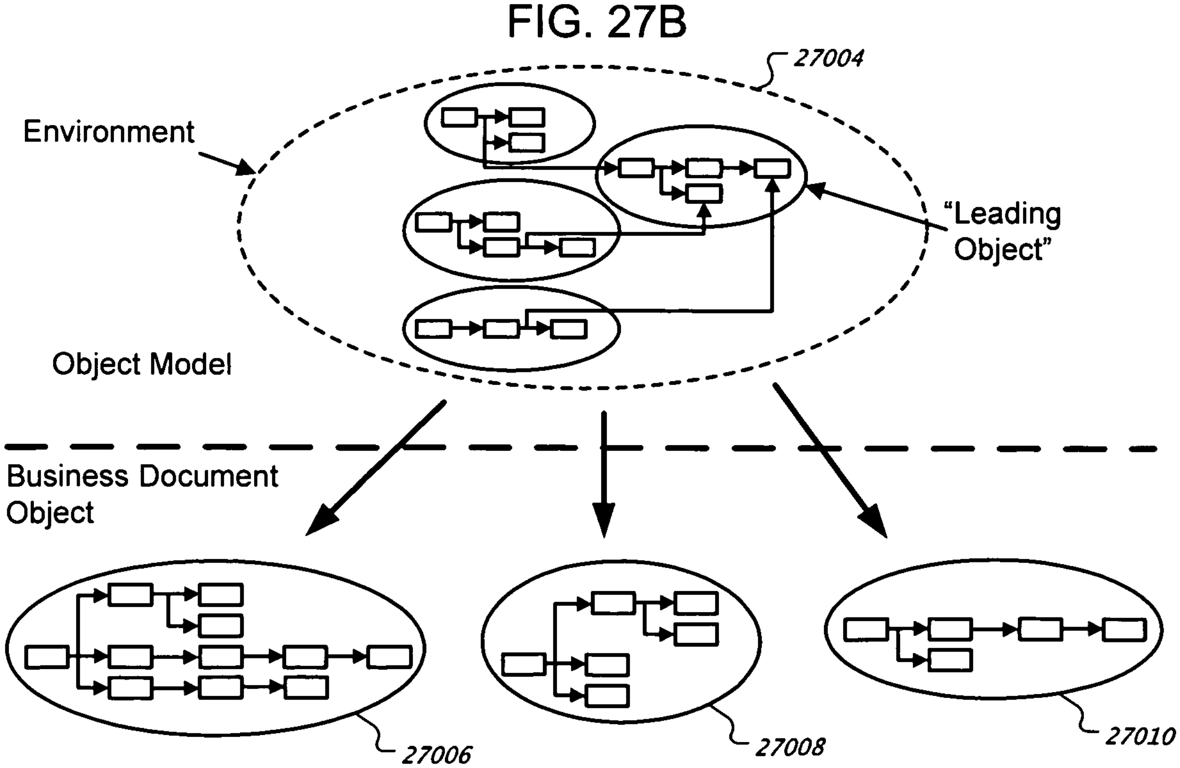

As illustrated in FIG. 27B, several business document objects 27006, 27008, and 27010 as overlapping views may be derived for a given leading object 27004. Each business document object results from the object model by hierarchization.

Figure 27C:
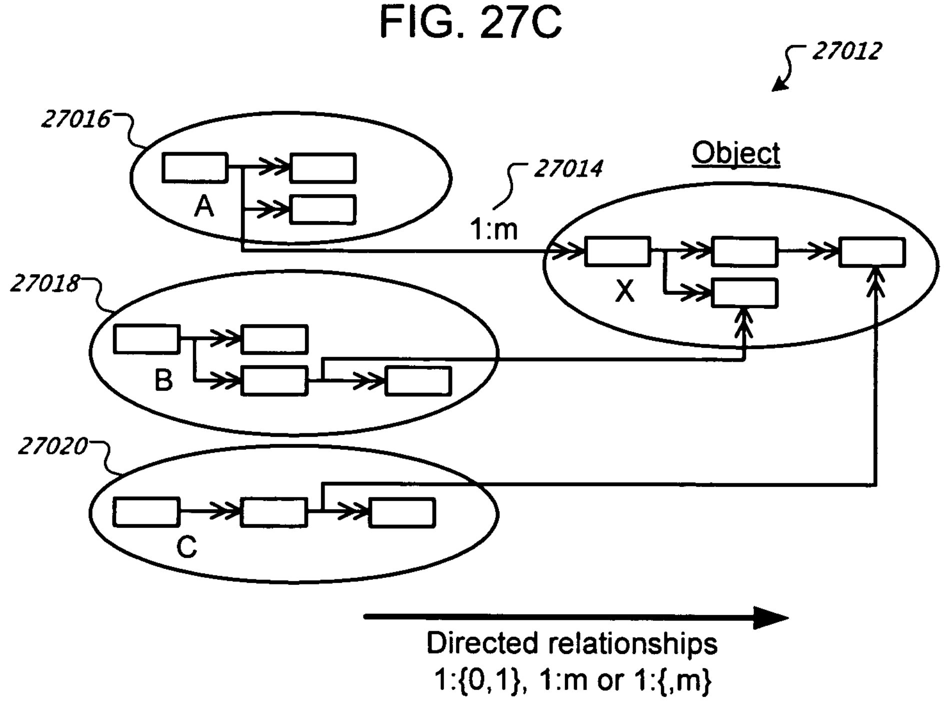

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
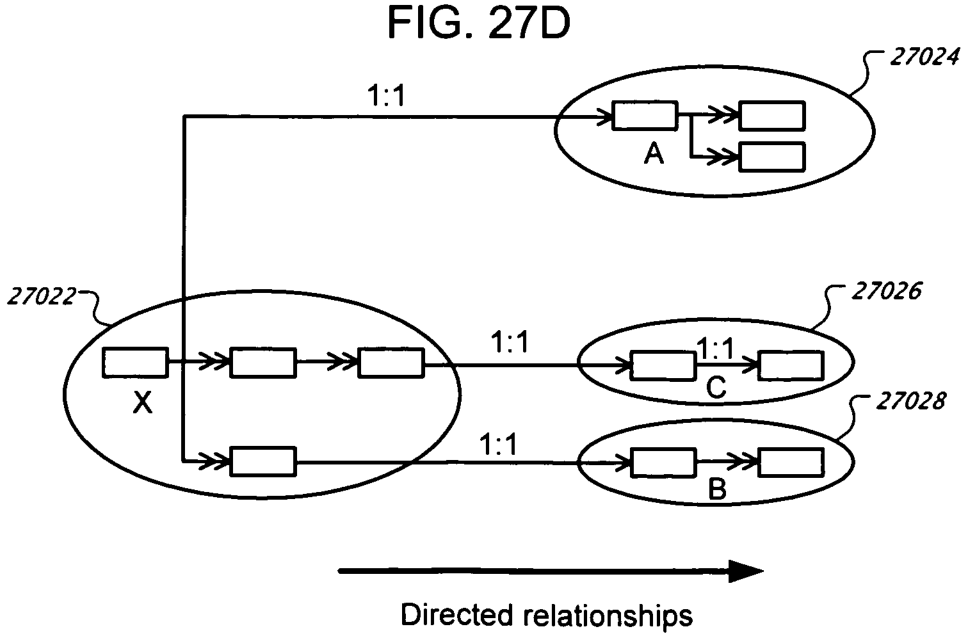

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role> Party, for example, BuyerParty, ItemBuyerParty.
  - BTDReference nodes are modeled as separate entities for each reference type in the business document object. These nodes are given the name <Qualifier><BO><Node> Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
  - Elements are typed by GDTs according to their business objects.
  - Aggregated levels are typed with message type specific data types (Intermediate Data Types), with their names being built according to the corresponding paths in the message type structure.
  - The whole message type structured is typed by a message data type with its name being built according to the root entity with the suffix "Message".
- For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
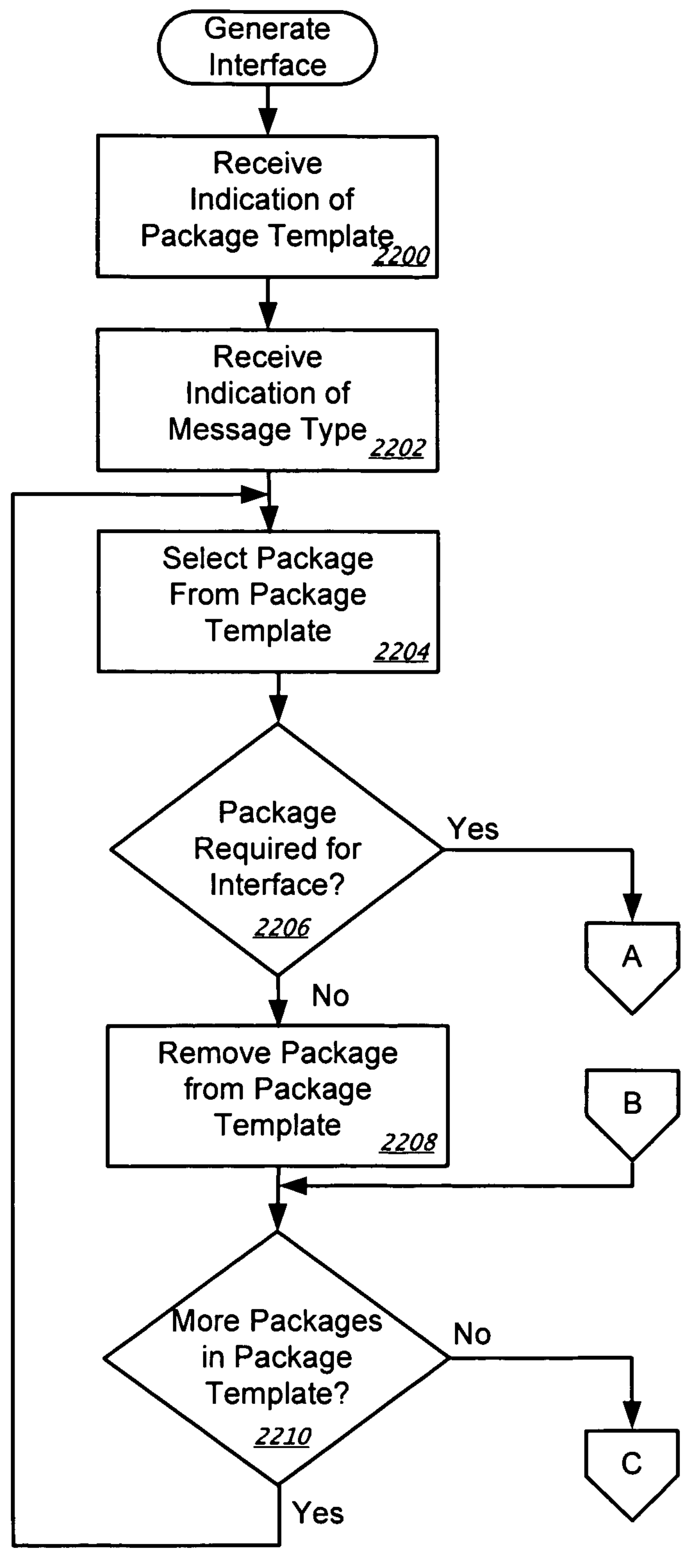
FIGS. 22A-F depict a flow diagram of the steps performed to generate an interface from the business object model in accordance with methods and systems consistent with the subject matter described herein.
Figure 22B:
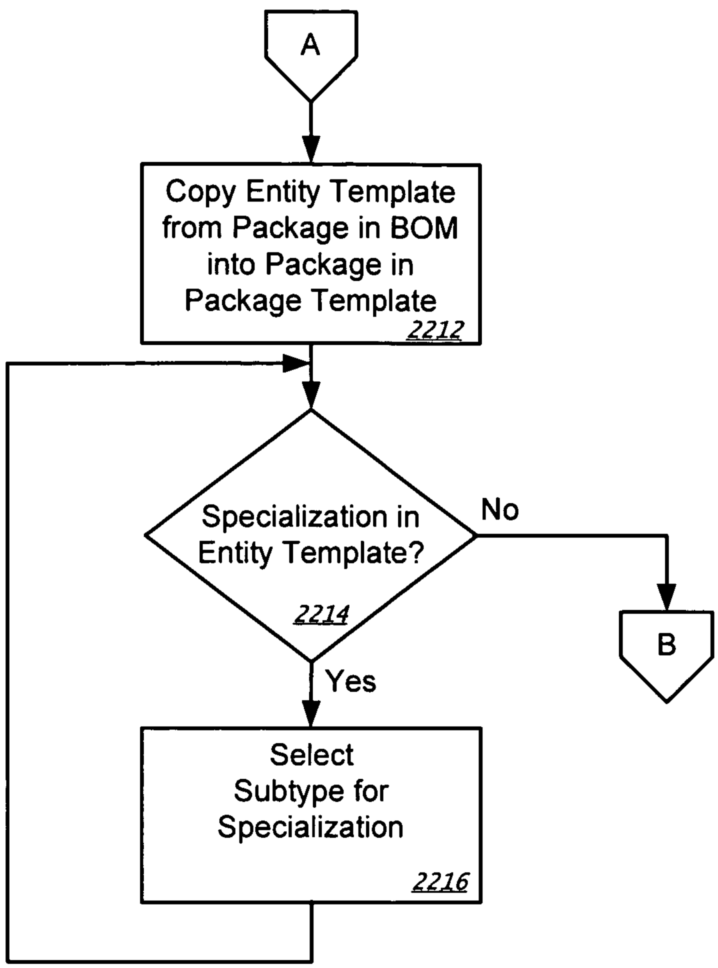
Figure 22C:
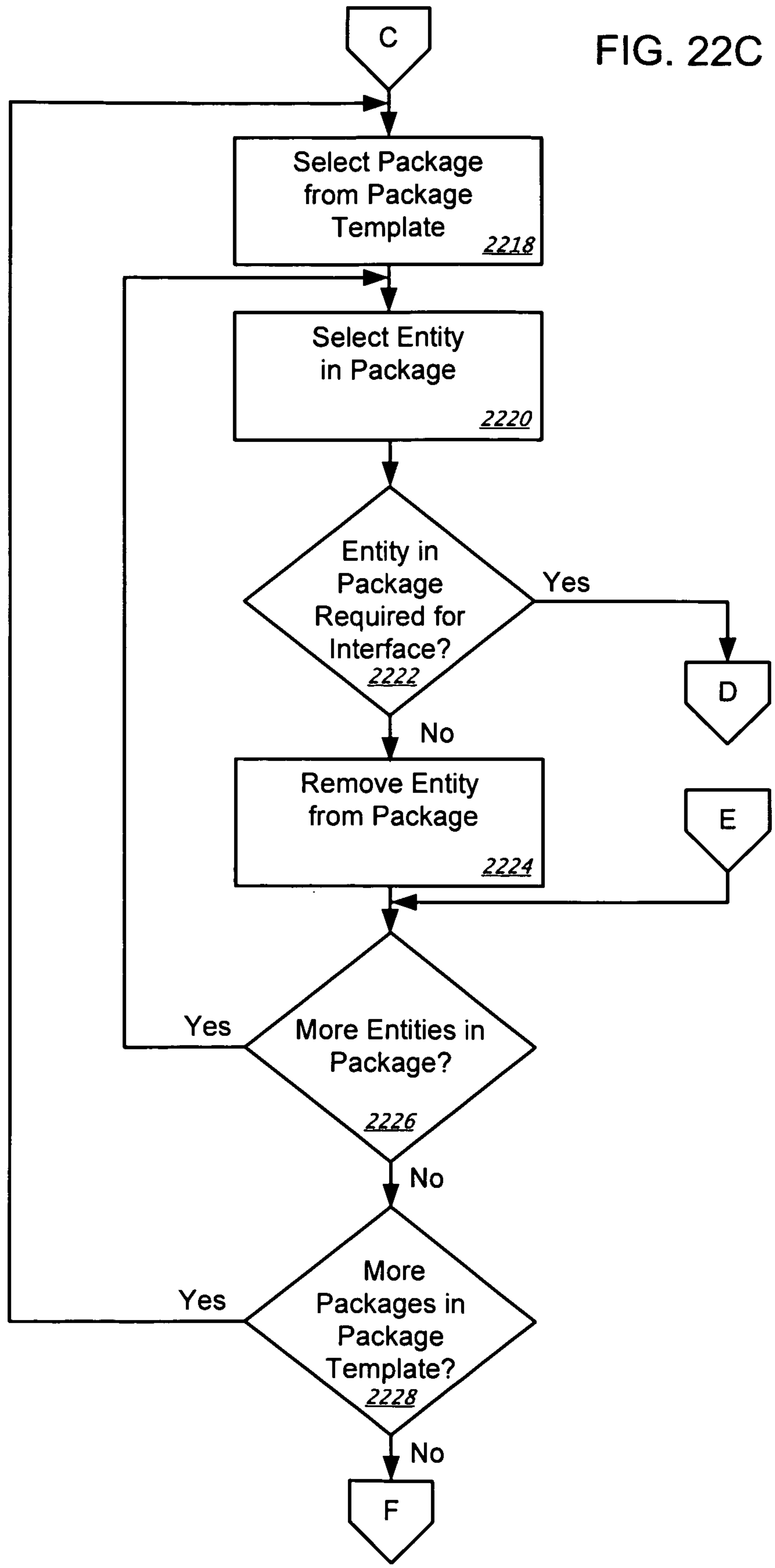

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
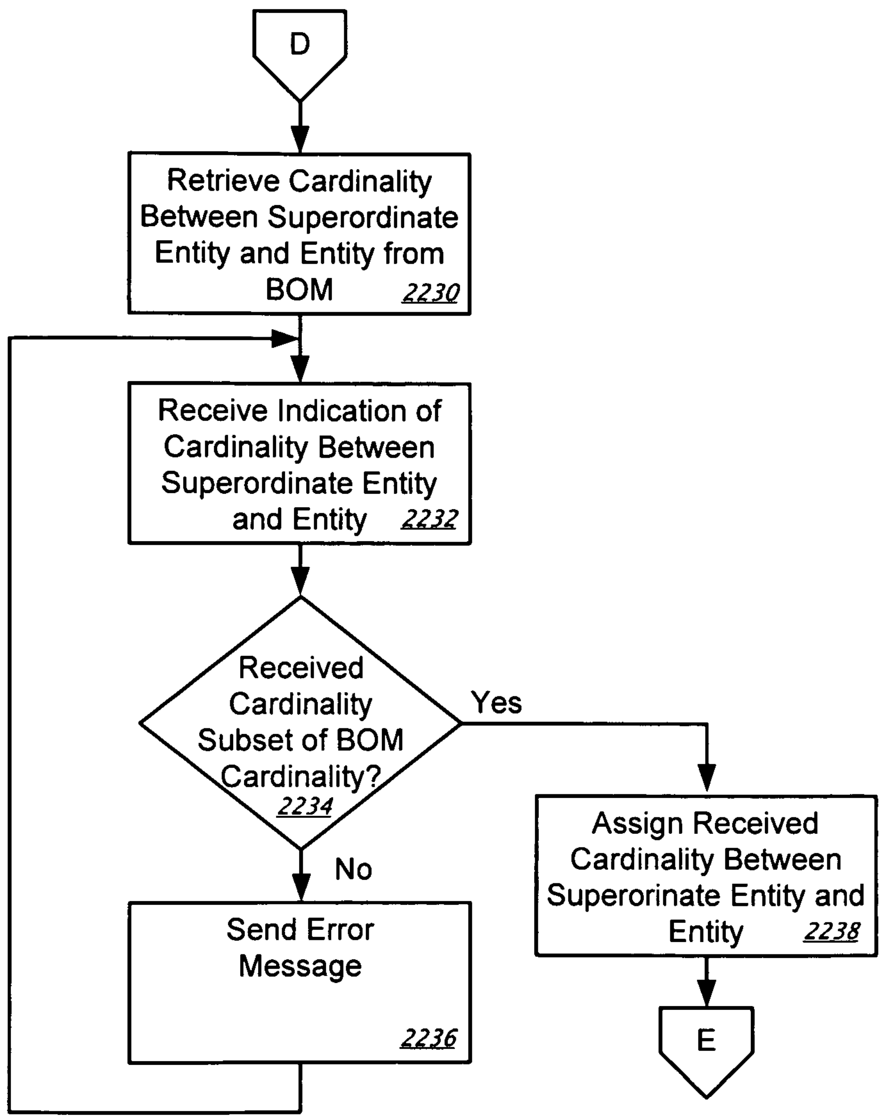

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
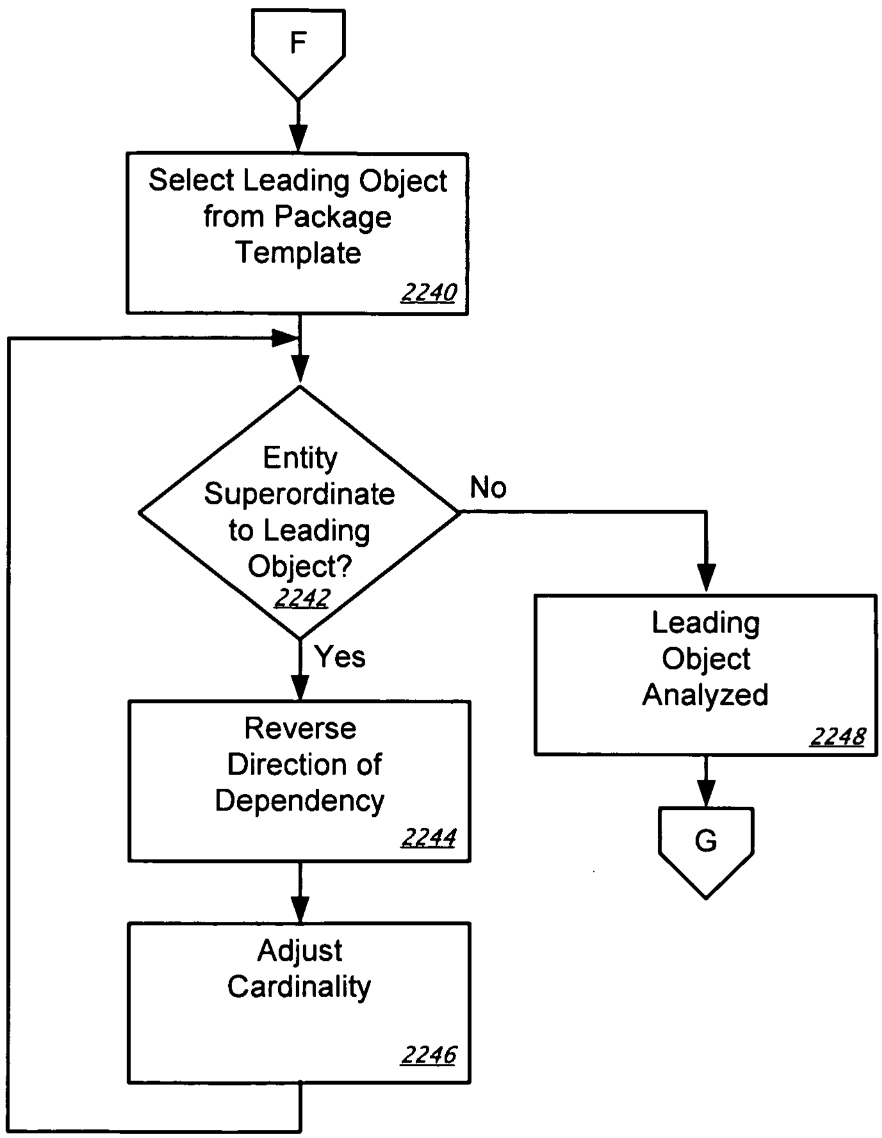

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
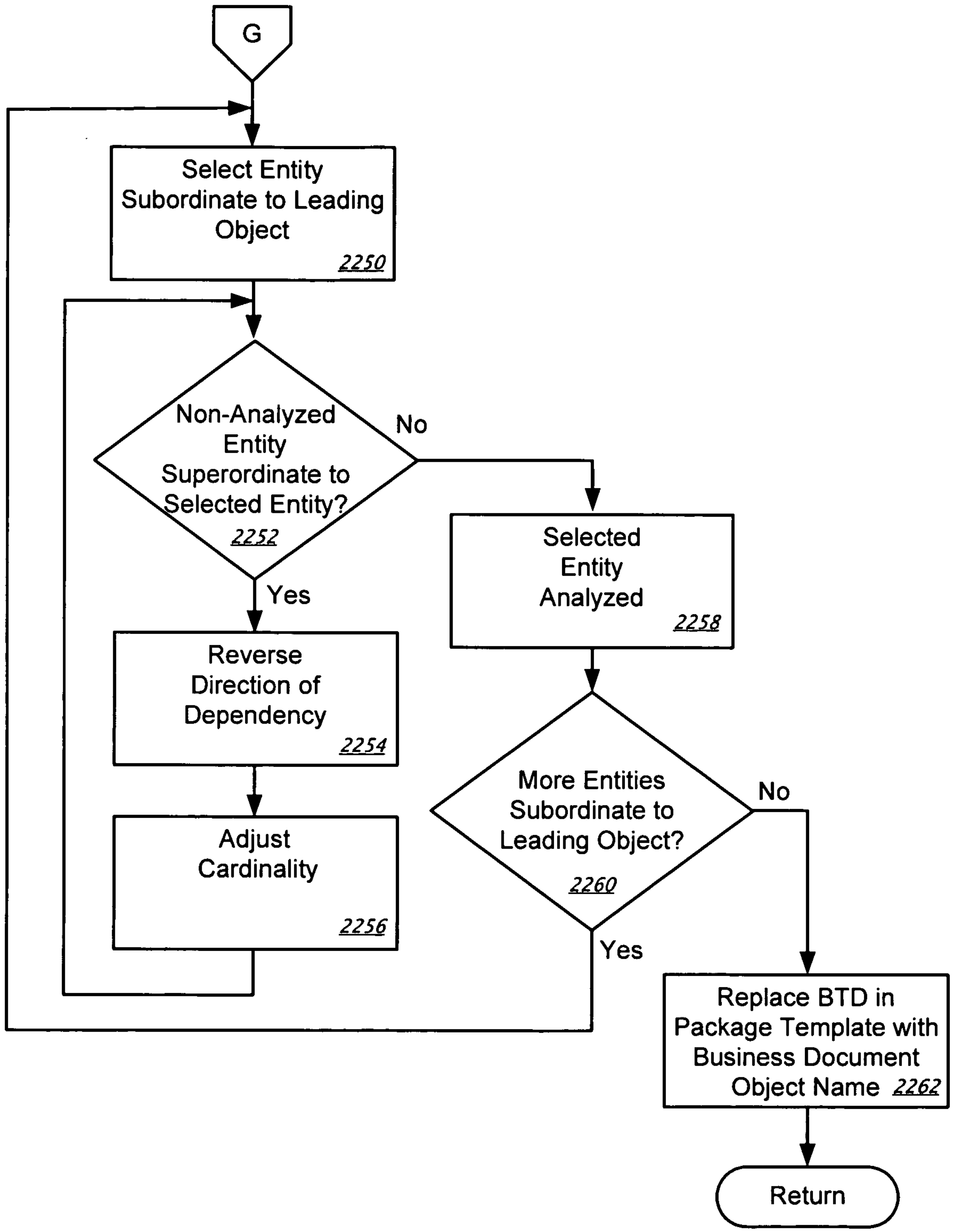

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
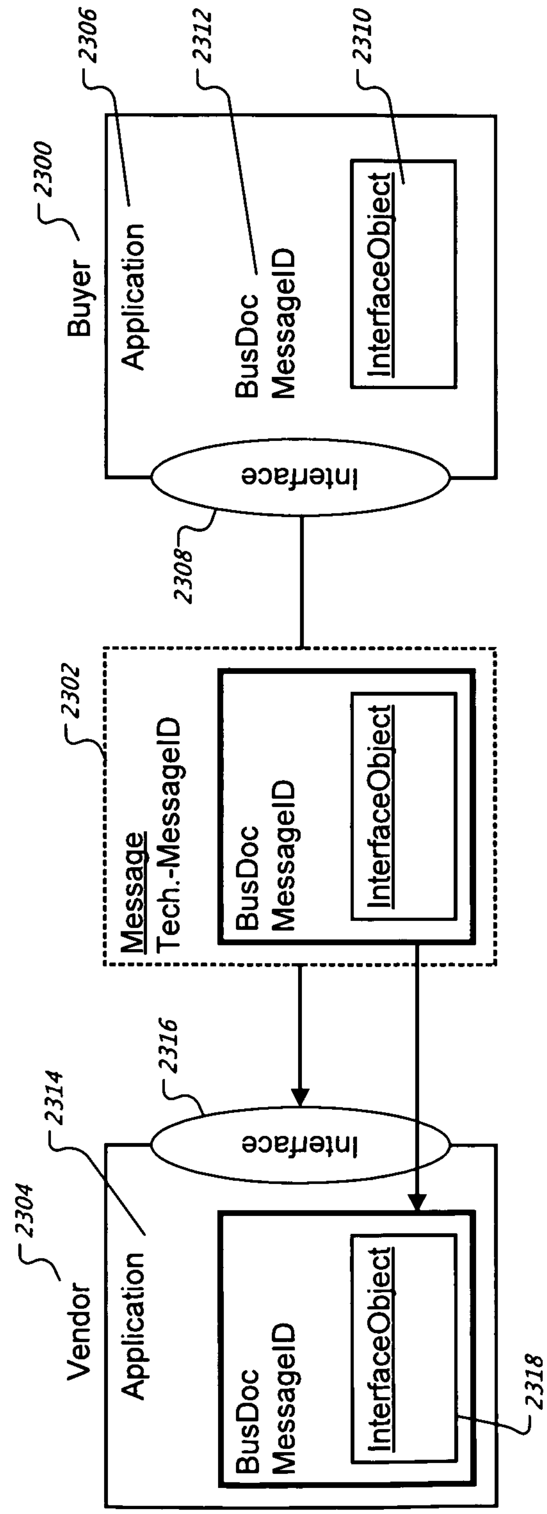
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
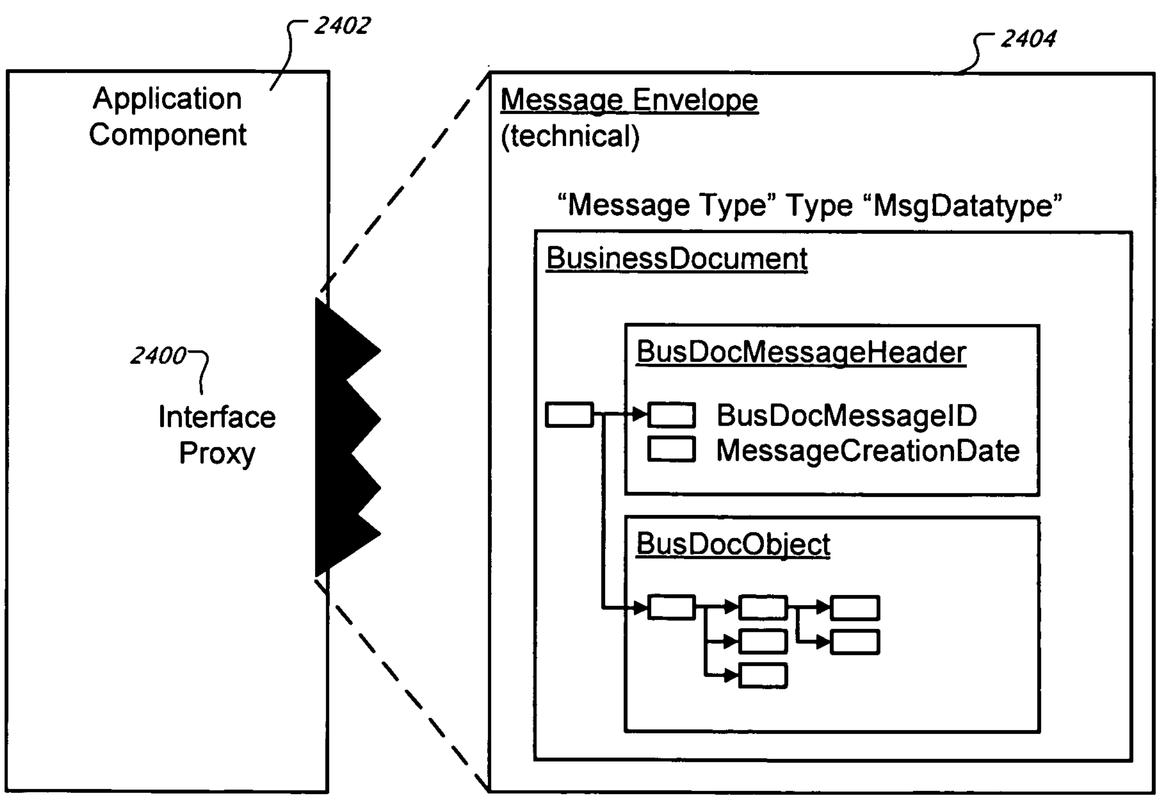
FIG. 24 depicts an interface proxy in accordance with methods and systems consistent with the subject matter described herein.
Figure 25:
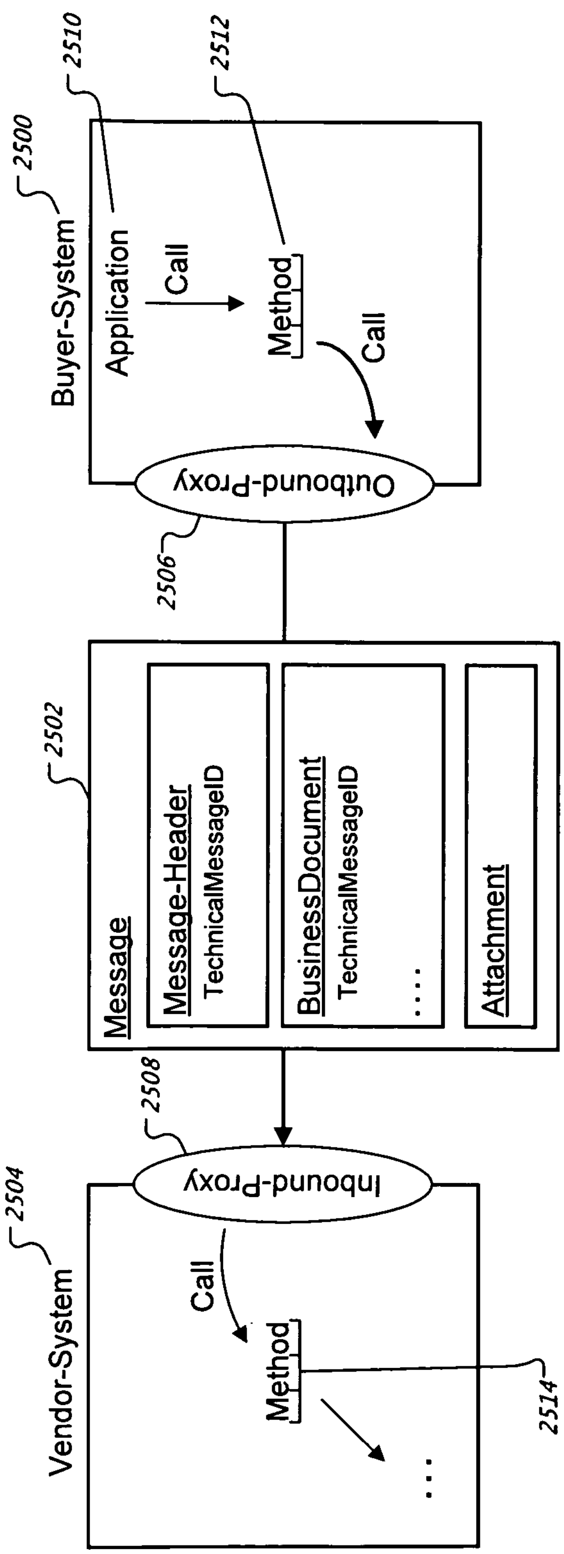
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
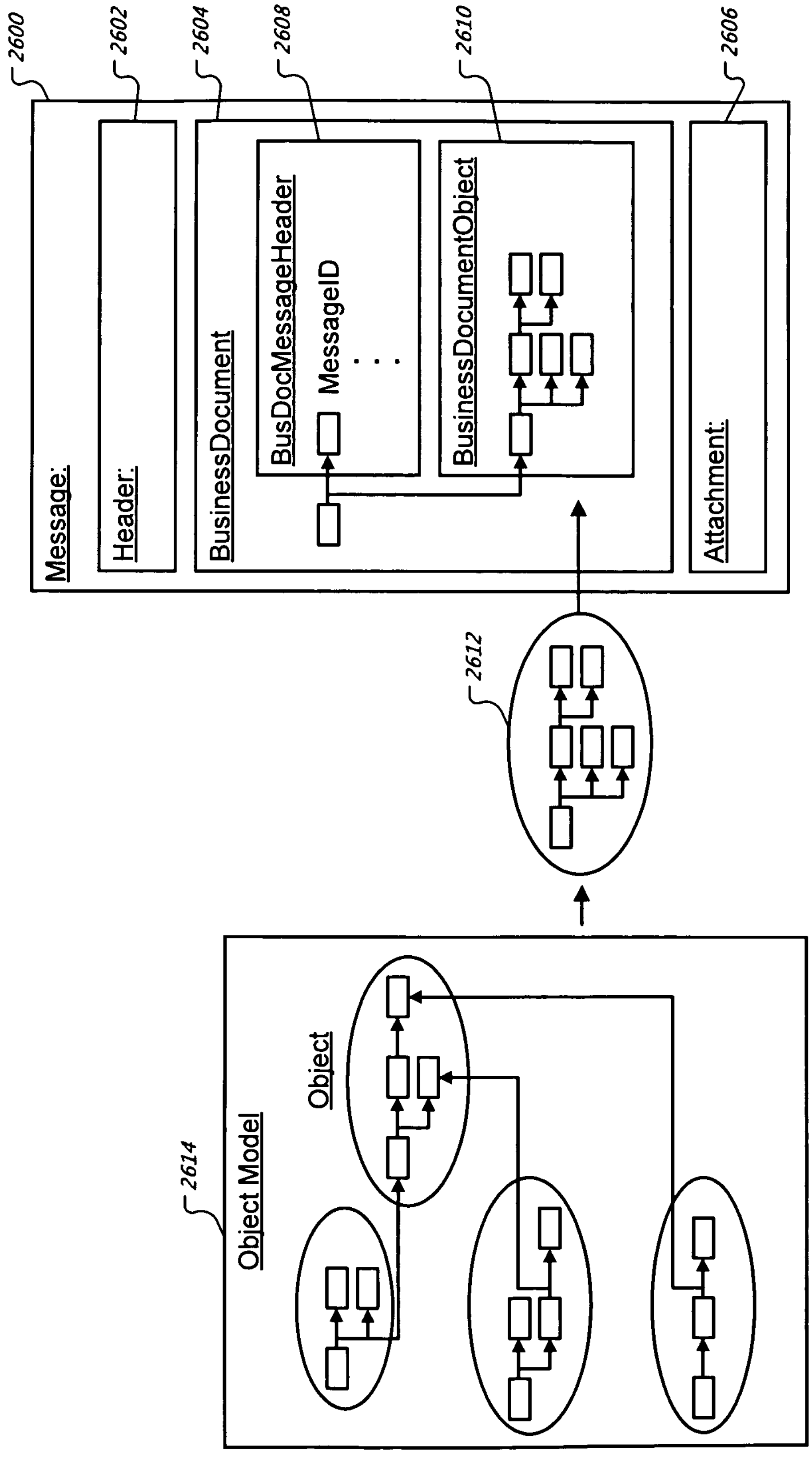
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
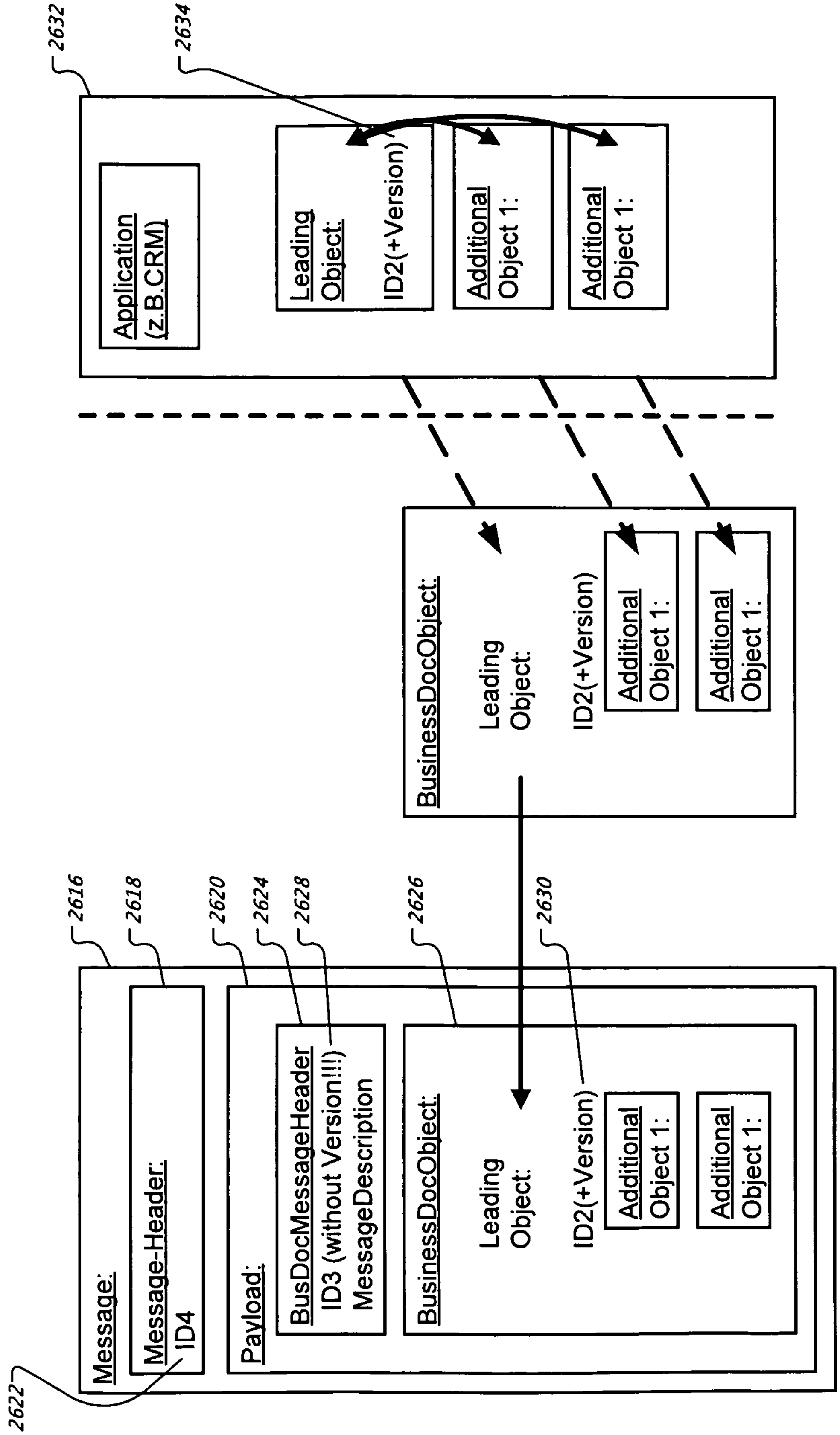
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
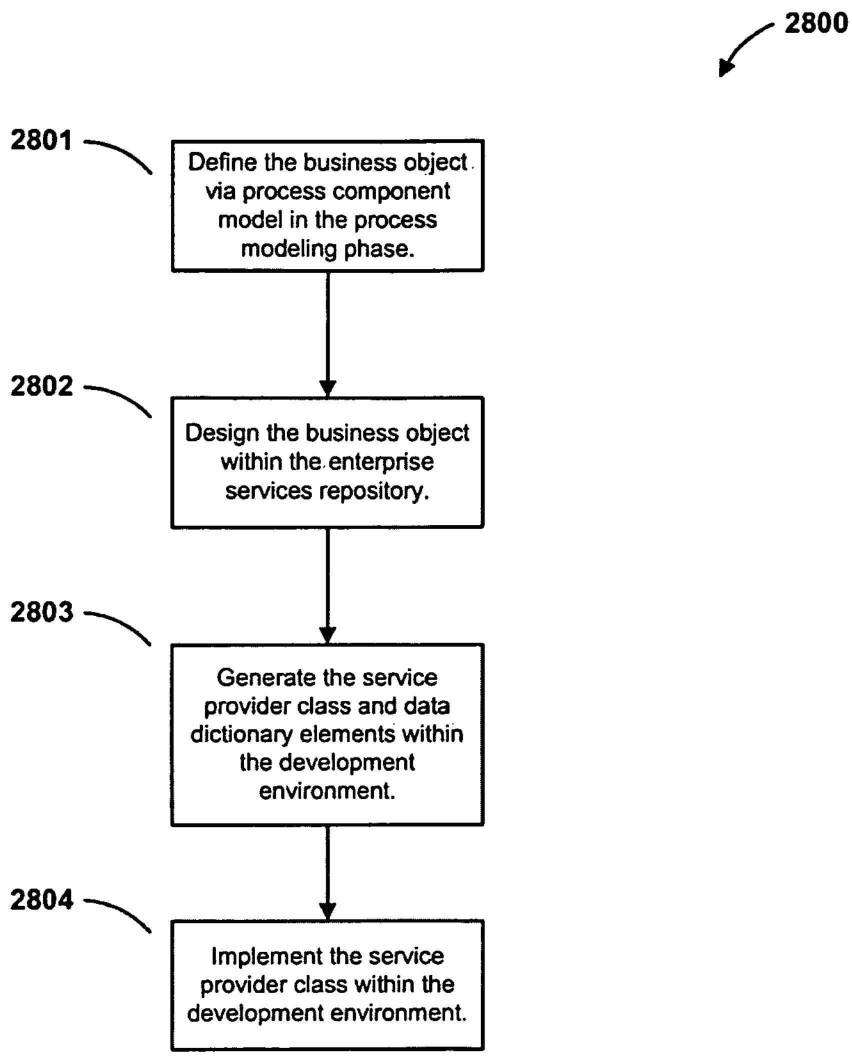
FIG. 28 illustrates an example method for service enabling in accordance with one embodiment of the present disclosure.
Figure 29:
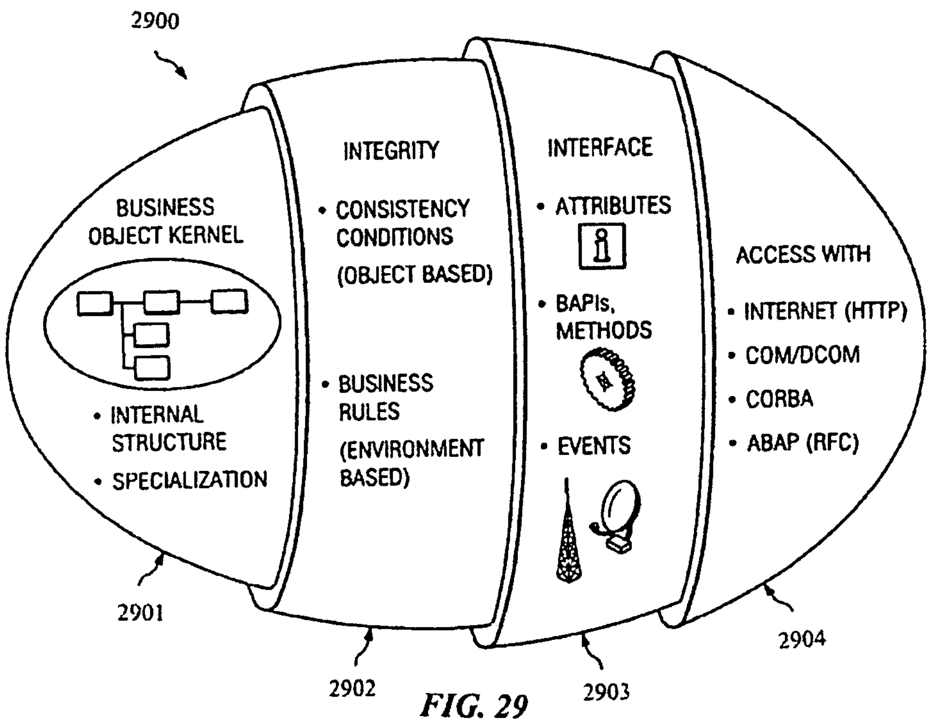
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
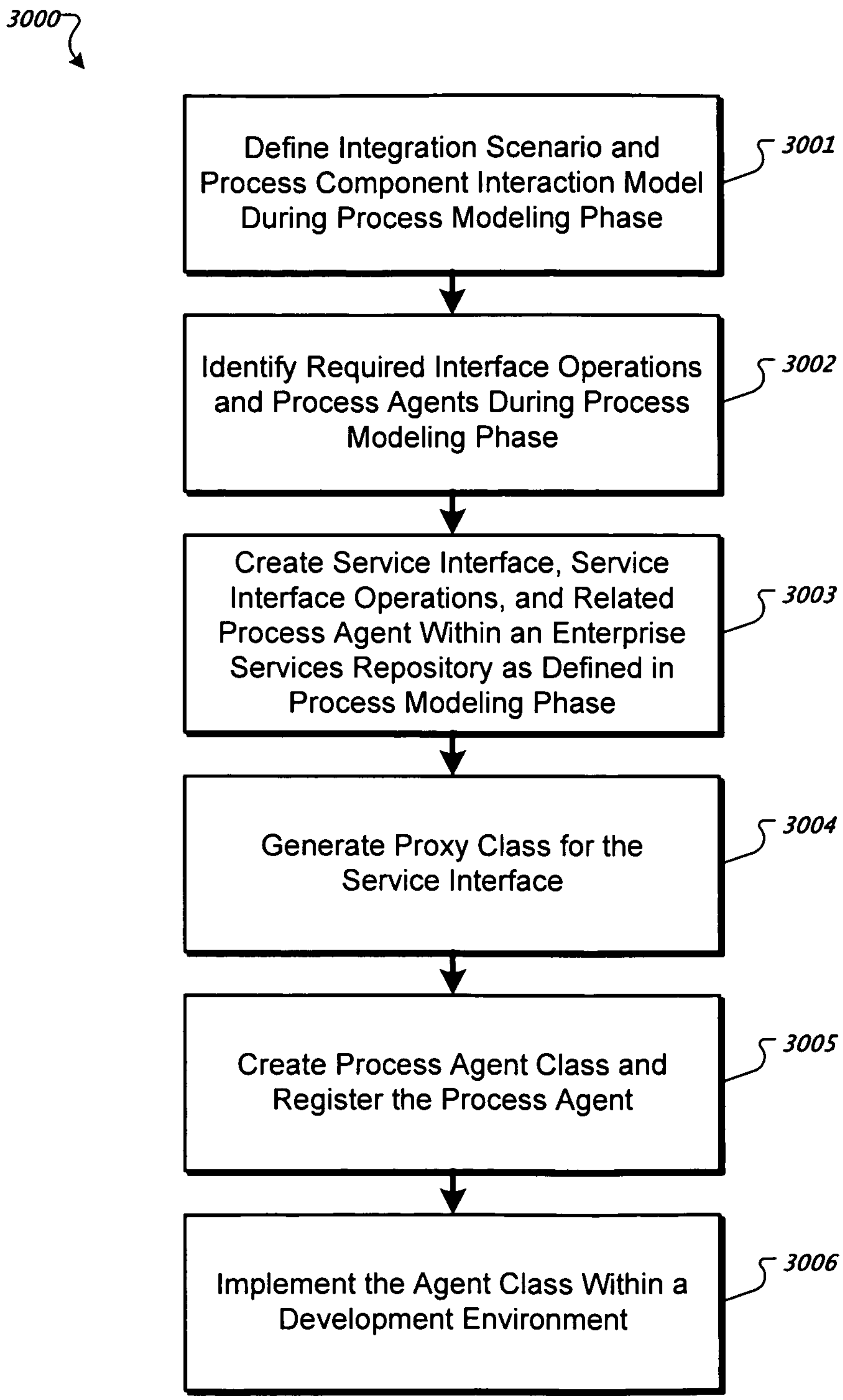
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
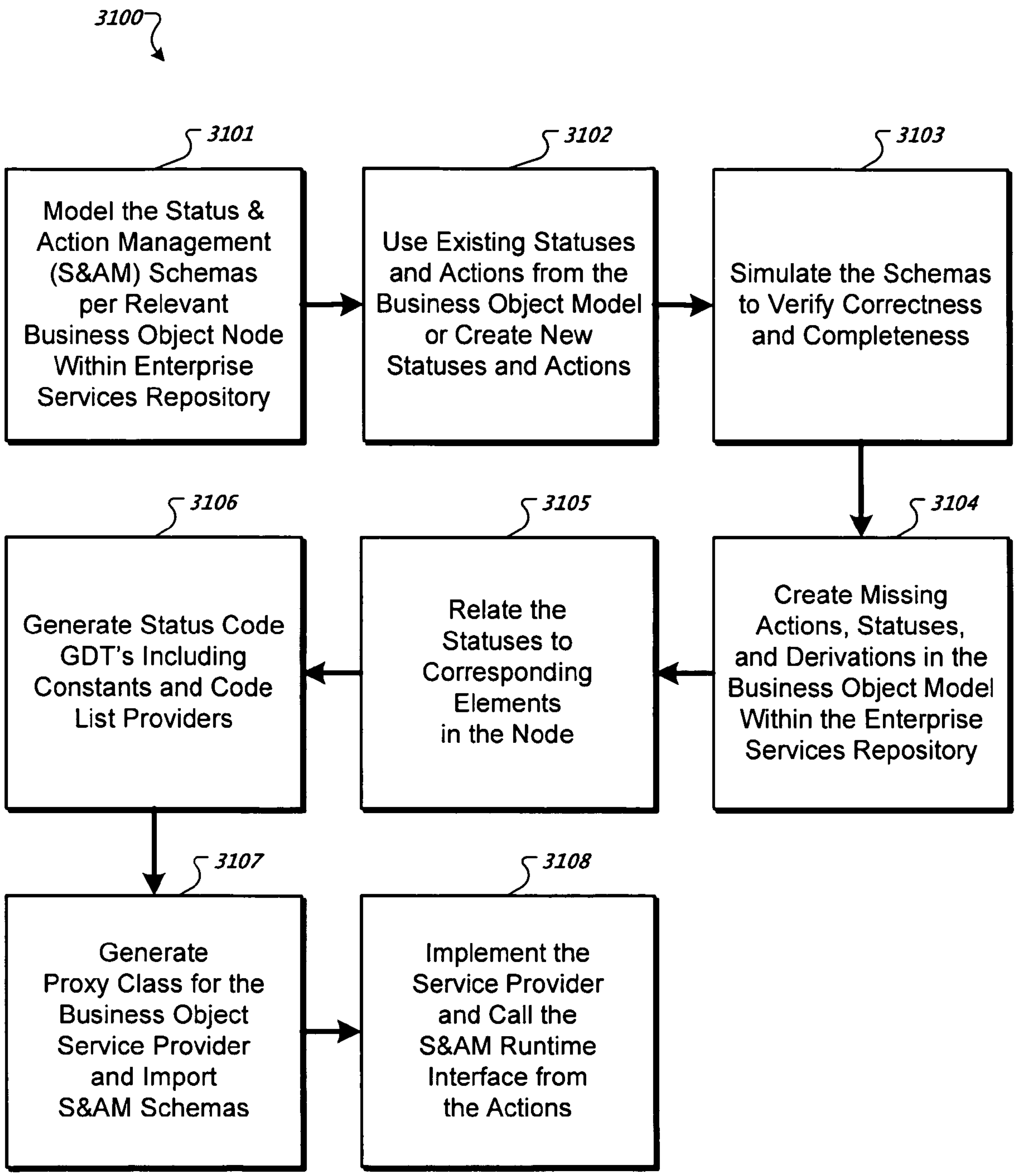
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Service Part Demand Forecast Interfaces

Two or more Service Parts Planning environments can be linked. One represents the Service Parts Planning process component that administers and coordinates all master and transactional data. The other, subsequently called the Service Parts Planner, provides Service Parts Planning algorithms, for example, forecast algorithms for service parts used in the automotive area. The Service Parts Planner and the Service Parts Planning process components can be coupled in such a way that the forecast is calculated in Service Parts Planning and is then sent to and processed by Service Parts Planner for subsequent planning processes.

Figure 32:
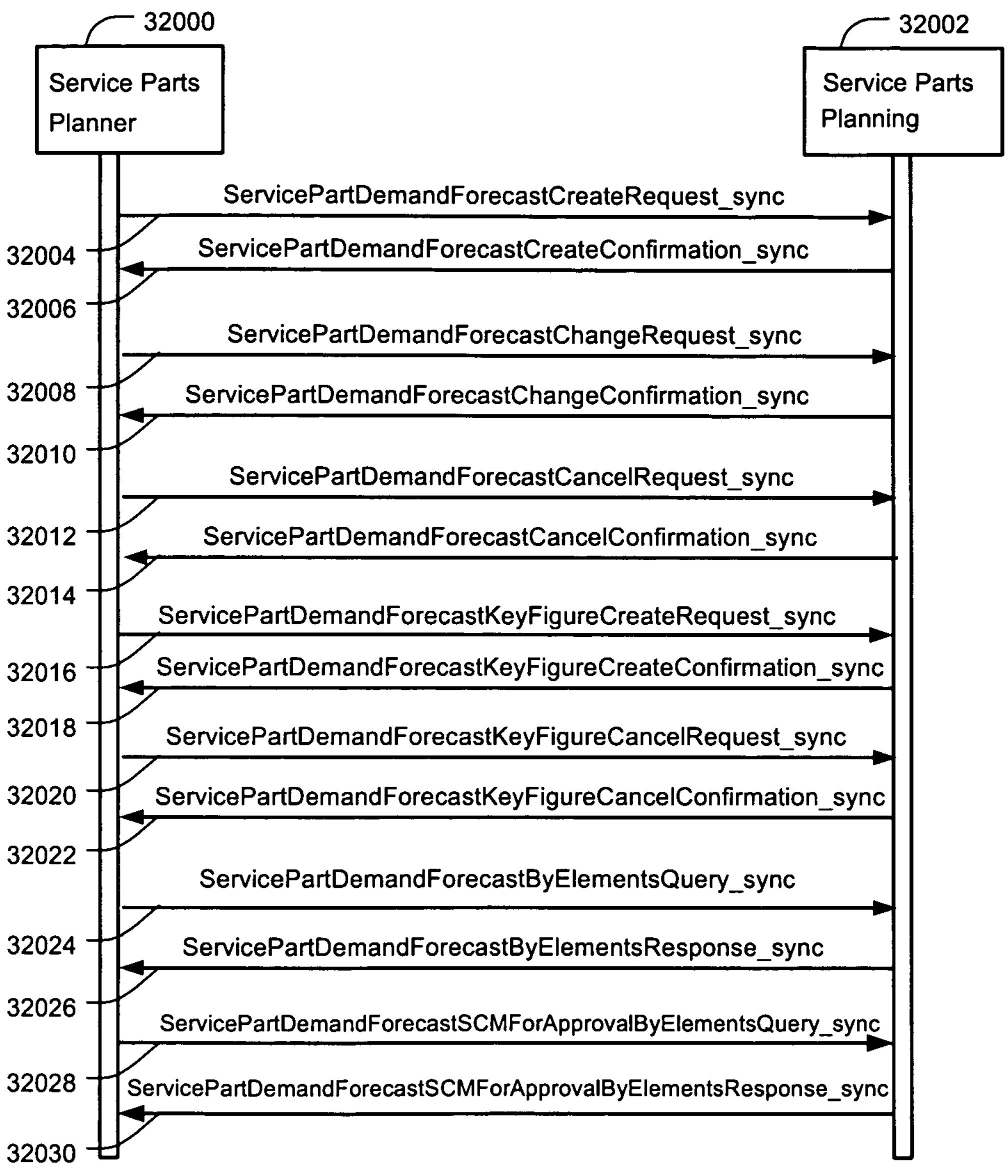
FIG. 32 shows an exemplary ServicePartDemandForecast Message Choreography.

The message choreography of FIG. 32 describes a possible logical sequence of messages that can be used to realize a Service Part Demand Forecast business scenario. A “Service Parts Planner” system 32000 can request the creation of a Service Part Demand Forecast using a ServicePartDemandForecastCreateRequest_sync message 32004 as shown, for example, in FIG. 32. A “Service Parts Planning” system 32002 can confirm the request using a ServicePartDemandForecastCreateConfirmation_sync message 32006 as shown, for example, in FIG. 32.

The “Service Parts Planner” system 32000 can request the change of a Service Part Demand Forecast using a ServicePartDemandForecastChangeRequest_sync message 32008 as shown, for example, in FIG. 32. The “Service Parts Planning” system 32002 can confirm the request using a ServicePartDemandForecastChangeConfirmation_sync message 32010 as shown, for example, in FIG. 32.

The “Service Parts Planner” system 32000 can request the cancellation of a Service Part Demand Forecast using a ServicePartDemandForecastCancelRequest_sync message 32012 as shown, for example, in FIG. 32. The “Service Parts Planning” system 32002 can confirm the request using a ServicePartDemandForecastCancelConfirmation_sync message 32014 as shown, for example, in FIG. 32.

The “Service Parts Planner” system 32000 can request the creation of a Service Part Demand Forecast Key Figure using a ServicePartDemandForecastKeyFigureCreateRequest_sync message 32016 as shown, for example, in FIG. 32. The “Service Parts Planning” system 32002 can confirm the request using a ServicePartDemandForecastKeyFigureCreateConfirmation_sync message 32018 as shown, for example, in FIG. 32.

The “Service Parts Planner” system 32000 can request the cancellation of a Service Part Demand Forecast Key Figure using a ServicePartDemandForecastKeyFigureCancel Request_sync message 32020 as shown, for example, in FIG. 32. The “Service Parts Planning” system 32002 can confirm the request using a ServicePartDemandForecastKeyFigureCancelConfirmation_sync message 32022 as shown, for example, in FIG. 32.

The “Service Parts Planner” system 32000 can query Service Part Demand Forecasts using a ServicePartDemandForecastByElementsQuery_sync message 32024 as shown, for example, in FIG. 32. The “Service Parts Planning” system 32002 can respond to the query using a ServicePartDemandForecastByElementsResponse_sync message 32026 as shown, for example, in FIG. 32.

The “Service Parts Planner” system 32000 can query Service Part Demand Forecast Supply Chain Management (SCM) for approval using a ServicePartDemandForecastSCMForApprovalByElementsQuery_sync message 32028 as shown, for example, in FIG. 32. The “Service Parts Planning” system 32002 can respond to the query using a ServicePartDemandForecastSCMForApprovalByElementsResponse_sync message 32030 as shown, for example, in FIG. 32.

A message ServicePartDemandForecastCreateRequest_sync is sent from the Service Parts Planner to create a Service Part Demand Forecast in Service Parts Planning. The structure of the message type ServicePartDemandForecastCreateRequest_sync is specified by the message data type ServicePartDemandForecastCreateRequest Message_sync, which is derived from the message data type ServicePartDemandForecastTemplateMessage_sync. All key figures can have the same time series periods.

A message ServicePartDemandForecastCreateConfirmation_sync is sent from Service Parts Planning to the Service Parts Planner to confirm a ServicePartDemandForecastCreateRequest_sync. The structure of the message type ServicePartDemandForecastCreateConfirmation_sync is specified by the message data type ServicePartDemandForecastCreateConfirmation Message_sync, which is derived from the message data type ServicePartDemandForecastTemplateMessage_sync.

A message ServicePartDemandForecastChangeRequest_sync is sent from the Service Parts Planner to change a Service Part Demand Forecast in Service Parts Planning. The structure of the message type ServicePartDemandForecastChangeRequest_sync is specified by the message data type ServicePartDemandForecastChange RequestMessage_sync, which is derived from the message data type ServicePartDemandForecastTemplateMessage_sync. In some implementations, key figure values and values at the root node can be changed. In that case, it is not possible to create new key figures by using this message. All key figures can have the same time series periods.

A message ServicePartDemandForecastChange Confirmation_sync is sent from Service Parts Planning to the Service Parts Planner to confirm a ServicePartDemandForecastChangeRequest_sync. The structure of the message type ServicePartDemandForecast ChangeConfirmation_sync is specified by the message data type ServicePartDemandForecastChangeConfirmation Message_sync, which is derived from the message data type ServicePartDemandForecastTemplateMessage_sync.

A message ServicePartDemandForecastCancel Request_sync is sent from the Service Parts Planner to cancel a Service Part Demand Forecast in Service Parts Planning. The structure of the message type ServicePartDemandForecastCancelRequest_sync is specified by the message data type ServicePartDemandForecastCancelRequestMessage_sync, which is derived from the message data type ServicePartDemandForecastTemplateMessage_sync.

A message ServicePartDemandForecastCancel Confirmation_sync is sent from Service Parts Planning to the Service Parts Planner to confirm a ServicePartDemandForecastCancelRequest_sync. The structure of the message type ServicePartDemandForecastCancelConfirmation_sync is specified by the message data type ServicePartDemandForecastCancelConfirmationMessage_sync, which is derived from the message data type ServicePartDemandForecastTemplateMessage_sync.

A message ServicePartDemandForecastKeyFigure Create Request_sync is sent from the Service Parts Planner to create a Service Part Demand Forecast Key Figure for a Service Part Demand Forecast in Service Parts Planning. The structure of the message type ServicePartDemandForecastKeyFigureCreateRequest_sync is specified by the message data type ServicePartDemandForecastKeyFigureCreate RequestMessage_sync, which is derived from the message data type ServicePartDemandForecastTemplateMessage_sync. All key figures can have the same time series periods.

A message ServicePartDemandForecastKeyFigure CreateConfirmation_sync is sent from Service Parts Planning to the Service Parts Planner to confirm a ServicePartDemandForecastKeyFigureCreateRequest_sync. The structure of the message type ServicePartDemandForecastKeyFigureCreateConfirmation_sync is specified by the message data type ServicePartDemandForecastKeyFigure CreateConfirmationMessage_sync, which is derived from the message data type ServicePartDemandForecastTemplateMessage_sync.

A message ServicePartDemandForecastKeyFigure CancelRequest_sync is sent from the Service Parts Planner to delete a Service Part Demand Forecast Key Figure for a Service Part Demand Forecast in Service Parts Planning. The structure of the message type ServicePartDemandForecastKeyFigureCancelRequest_sync is specified by the message data type ServicePartDemandForecastKeyFigureCancelRequestMessage_sync, which is derived from the message data type ServicePartDemandForecastTemplateMessage_sync.

A message ServicePartDemandForecastKeyFigure CancelConfirmation_sync is sent from the Service Parts Planning to the Service Parts Planner to confirm a ServicePartDemandForecastKeyFigureCancelRequest_sync. The structure of the message type ServicePartDemandForecastKeyFigureCancelConfirmation_sync is specified by the message data type ServicePartDemandForecastKeyFigure CancelConfirmationMessage_sync, which is derived from the message data type ServicePartDemandForecastTemplateMessage_sync.

A message ServicePartDemandForecastsCreate Request_sync is sent from the Service Parts Planner to create one or multiple Service Part Demand Forecasts in Service Parts Planning. The structure of the message type ServicePartDemandForecastsCreateRequest_sync is specified by the message data type ServicePartDemandForecastsCreateRequestMessages_sync, which is derived from the message data type ServicePartDemandForecasts TemplateMessages_sync.

A message ServicePartDemandForecastsCreate Confirmation_sync is sent from Service Parts Planning to the Service Parts Planner to confirm a ServicePartDemandForecastsCreateRequest_sync. The structure of the message type ServicePartDemandForecastsCreateConfirmation_sync is specified by the message data type ServicePartDemandForecastsCreateConfirmationMessages_sync, which is derived from the message data type ServicePartDemandForecastsTemplateMessages_sync.

A message ServicePartDemandForecastsChangeRequest_sync is sent from the Service Parts Planner to change one or multiple Service Part Demand Forecasts in Service Parts Planning. The structure of the message type ServicePartDemandForecastsChangeRequest_sync is specified by the message data type ServicePartDemandForecastsChangeRequestMessages_sync, which is derived from the message data type ServicePartDemandForecastsTemplateMessages_sync.

A message ServicePartDemandForecastsChangeConfirmation_sync is sent from Service Parts Planning to the Service Parts Planner to confirm a ServicePartDemandForecastsChangeRequest_sync. The structure of the message type ServicePartDemandForecastsChangeConfirmation_sync is specified by the message data type ServicePartDemandForecastsChangeConfirmationMessages_sync, which is derived from the message data type ServicePartDemandForecasts TemplateMessages_sync.

A message ServicePartDemandForecastsCancelRequest_sync is sent from the Service Parts Planner to delete one or multiple Service Part Demand Forecasts in Service Parts Planning. The structure of the message type ServicePartDemandForecastsCancelRequest_sync is specified by the message data type ServicePartDemandForecastsCancelRequestMessages_sync, which is derived from the message data type ServicePartDemandForecasts TemplateMessages_sync.

A message ServicePartDemandForecastsCancelConfirmation_sync is sent from Service Parts Planning to the Service Parts Planner to confirm a ServicePartDemandForecastsCancelRequest_sync. The structure of the message type ServicePartDemandForecastsCancelConfirmation_sync is specified by the message data type ServicePartDemandForecastsCancelConfirmationMessages_sync, which is derived from the message data type ServicePartDemandForecasts TemplateMessages_sync.

A message ServicePartDemandForecastsKeyFigureCreateRequest_sync is sent from the Service Parts Planner to create a Service Part Demand Forecast Key Figure for one or multiple Service Part Demand Forecasts in Service Parts Planning. The structure of the message type ServicePartDemandForecastsKeyFigureCreateRequest_sync is specified by the message data type ServicePartDemandForecastsKeyFigureCreateRequestMessages_sync, which is derived from the message data type ServicePartDemandForecastsTemplateMessages_sync.

A message ServicePartDemandForecastsKeyFigureCreateConfirmation_sync is sent from the Service Parts Planning to the Service Parts Planner to confirm a ServicePartDemandForecastsKeyFigureCreateRequest_sync. The structure of the message type ServicePartDemandForecastsKeyFigureCreateConfirmation_sync is specified by the message data type ServicePartDemandForecastsKeyFigureCreateConfirmationMessages_sync, which is derived from the message data type ServicePartDemandForecastsTemplateMessages_sync.

A message ServicePartDemandForecastsKeyFigureCancelRequest_sync is sent from the Service Parts Planner to delete a Service Part Demand Forecast Key Figure for one or multiple Service Part Demand Forecasts in Service Parts Planning. The structure of the message type ServicePartDemandForecastsKeyFigureCancelRequest_sync is specified by the message data type ServicePartDemandForecastsKeyFigureCancelRequestMessages_sync, which is derived from the message data type ServicePartDemandForecastsTemplateMessages_sync.

A message ServicePartDemandForecastsKeyFigureCancelConfirmation_sync is sent from Service Parts Planning to the Service Parts Planner to confirm a ServicePartDemandForecastsKeyFigureCancelRequest_sync. The structure of the message type ServicePartDemandForecastsKeyFigureCancelConfirmation_sync is specified by the message data type ServicePartDemandForecastsKeyFigureCancelConfirmationMessages_sync, which is derived from the message data type ServicePartDemandForecastsTemplateMessages_sync.

A ServicePartDemandForecastByElementsQuery_sync is a query for ServicePartDemandForecast that satisfies the selection criteria specified by the query elements. The structure of the message type ServicePartDemandForecastByElementsQuery_sync is specified by the message data type ServicePartDemandForecastByElementsQueryMessage_sync.

A message ServicePartDemandForecastByElementsResponse_sync is sent from Service Parts Planning to the Service Parts Planner based on the query message ServicePartDemandForecastByElementsQuery_sync. The structure of the message type ServicePartDemandForecastByElementsResponse_sync is specified by the message data type ServicePartDemandForecastByElementsResponseMessage_sync, which is derived from the message data type ServicePartDemandForecastTemplateMessage_sync.

A ServicePartDemandForecastSCMForApprovalByElementsQuery_sync is a query for ServicePartDemandForecast that satisfies the selection criteria specified by the query elements. The structure of the message type ServicePartDemandForecastSCMForApprovalByElementsQuery_sync is specified by the message data type ServicePartDemandForecastSCMForApprovalByElementsQueryMessage_sync.

A message ServicePartDemandForecastSCMForApprovalByElementsResponse_sync is a response to ServicePartDemandForecastSCMForApprovalByElementsQuery_sync. The structure of the message type ServicePartDemandForecastSCMForApprovalByElementsResponse_sync is specified by the message data type ServicePartDemandForecastSCMForApprovalByElementsResponseMessage_sync, which is derived from the message data type ServicePartDemandForecastTemplateMessage_sync.

Interfaces can include ServicePartDemandForecastCreateRequestConfirmation_In, ServicePartDemandForecastChangeRequestConfirmation_In, ServicePartDemandForecastCancelRequestConfirmation_In, ServicePart Demand ForecastCreateKeyFigureRequestConfirmation_In, ServicePartDemandForecastCancelKeyFigure RequestConfirmation_In, ServicePartDemandForecastsCreate RequestConfirmation_In, ServicePartDemandForecastsChange RequestConfirmation_In, ServicePartDemandForecasts CancelRequestConfirmation_In, ServicePartDemandForecastsCreateKeyFigureRequestConfirmation_In, ServicePartDemandForecastsCancelKeyFigureRequest Confirmation_In, ServicePartDemandForecastByElements Query Response_In, and ServicePartDemandForecastSCMFor ApprovalByElementsQueryResponse_In.

Figure 33:
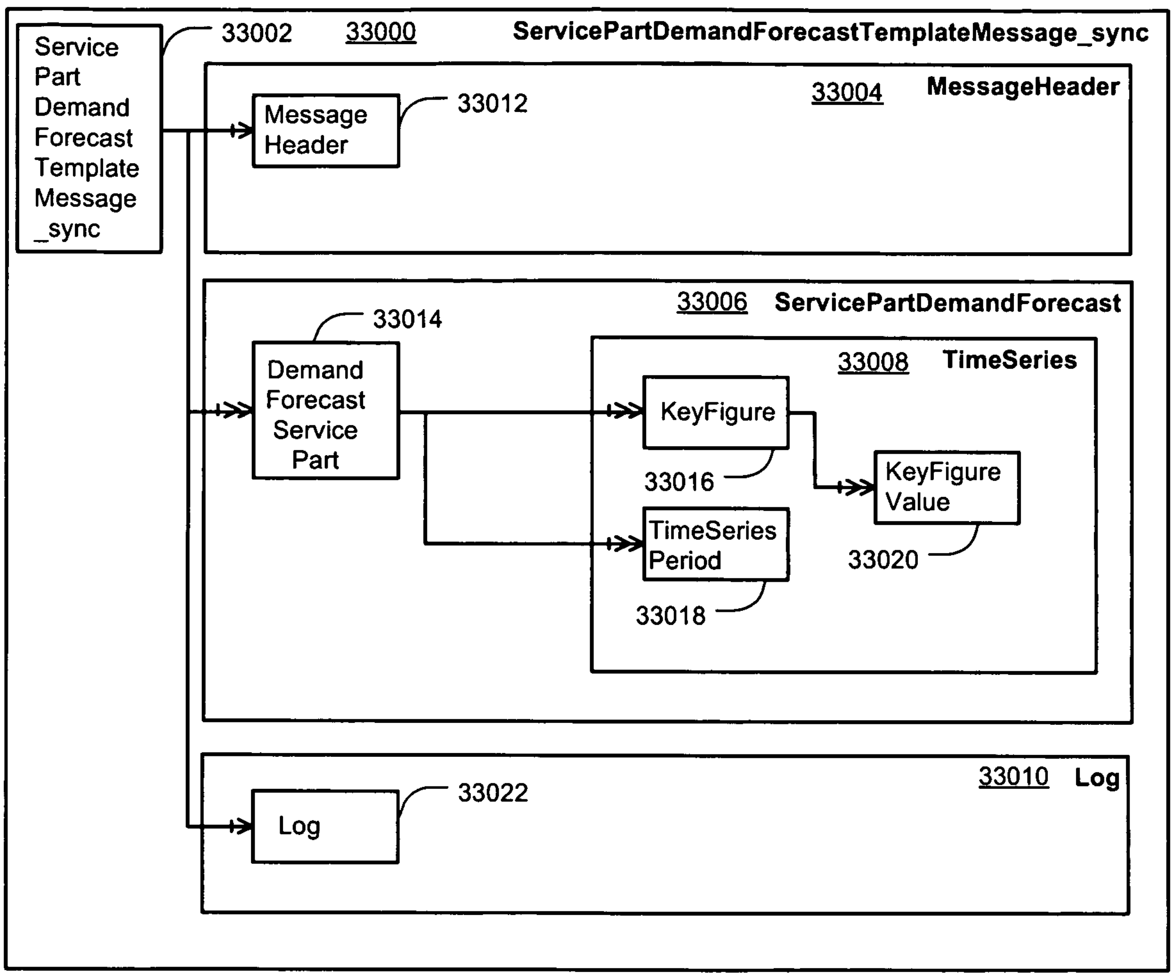
FIG. 33 shows an exemplary ServicePartDemandForecastTemplateMessage_sync Message Data Type.

FIG. 33 illustrates one example logical configuration of ServicePartDemandForecastTemplateMessage_sync message 33000. Specifically, this figure depicts the arrangement and hierarchy of various components such as one or more levels of packages, entities, and datatypes, shown here as 33000 through 33022. As described above, packages may be used to represent hierarchy levels. Entities are discrete business elements that are used during a business transaction. Data types are used to type object entities and interfaces with a structure. For example, ServicePartDemandForecastTemplateMessage_sync message 33000 includes, among other things, ServicePartDemandForecast 33006. Accordingly, heterogeneous applications may communicate using this consistent message configured as such.

Figures 1, 34:
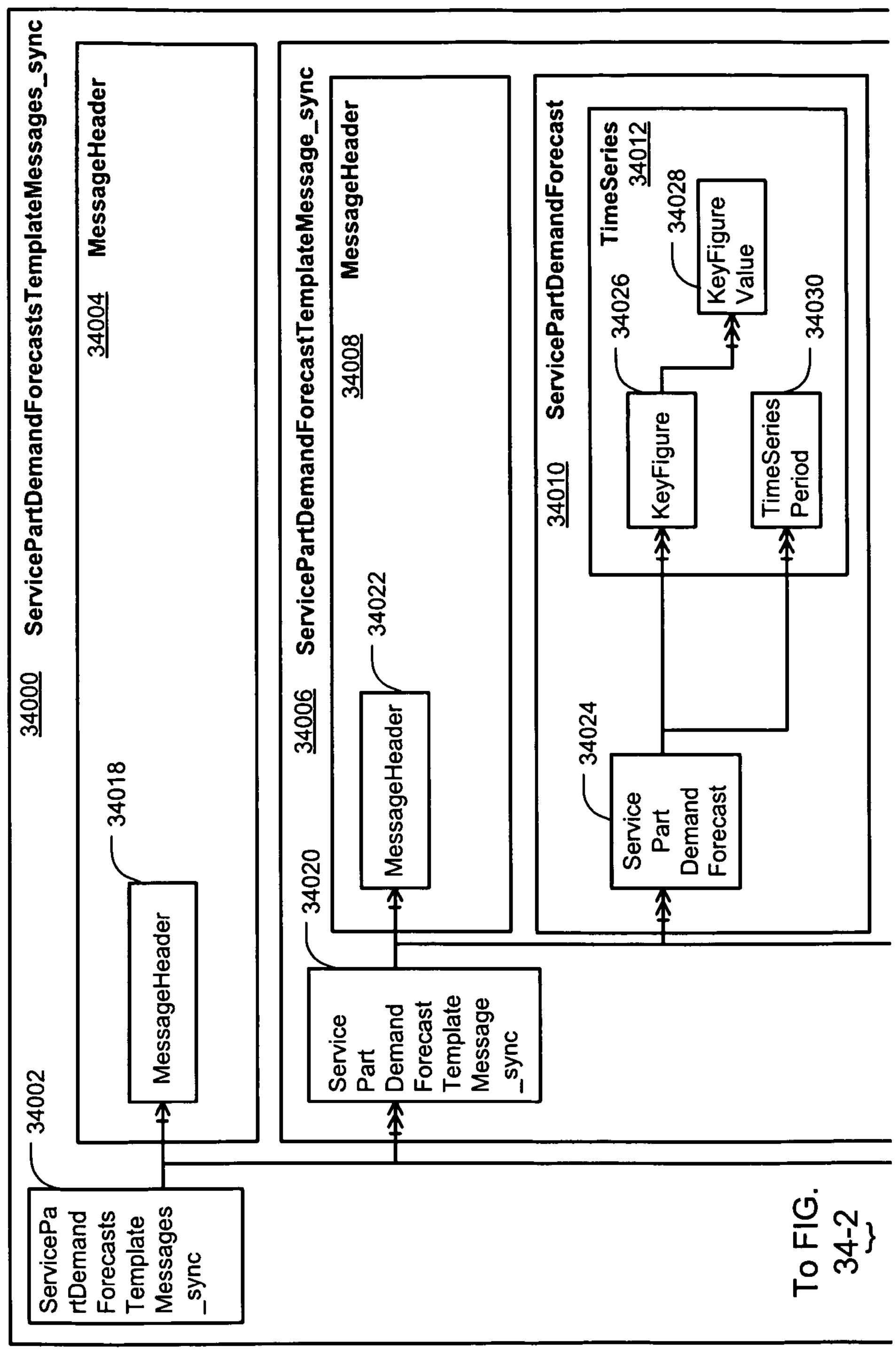
Figures 2, 34:
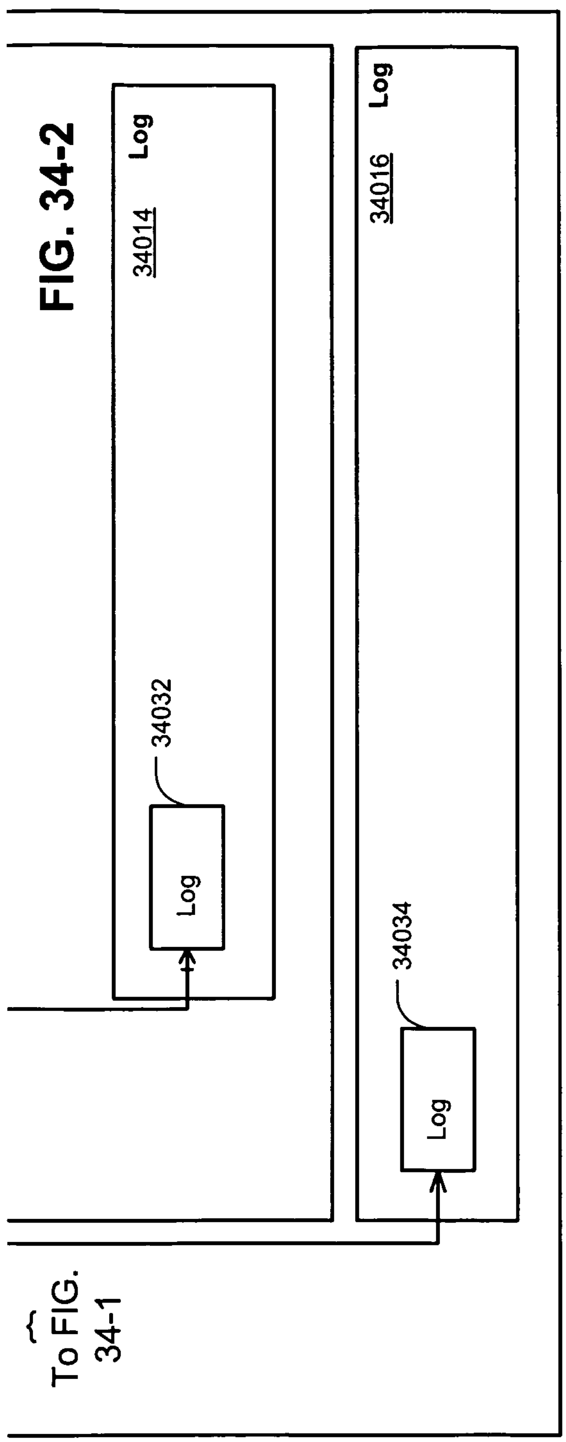

Additionally, FIGS. 34-1 to 34-2 illustrate one example logical configuration of ServicePartDemandForecastsTemplateMessages_sync message 34000. Specifically, these figures depict the arrangement and hierarchy of various components such as one or more levels of packages, entities, and datatypes, shown here as 34000 through 34034. As described above, packages may be used to represent hierarchy levels. Entities are discrete business elements that are used during a business transaction. Data types are used to type object entities and interfaces with a structure. For example, ServicePartDemandForecastsTemplateMessages_sync message 34000 includes, among other things, ServicePartDemandForecastTemplateMessage_sync 34006. Accordingly, heterogeneous applications may communicate using this consistent message configured as such.

Figure 35:
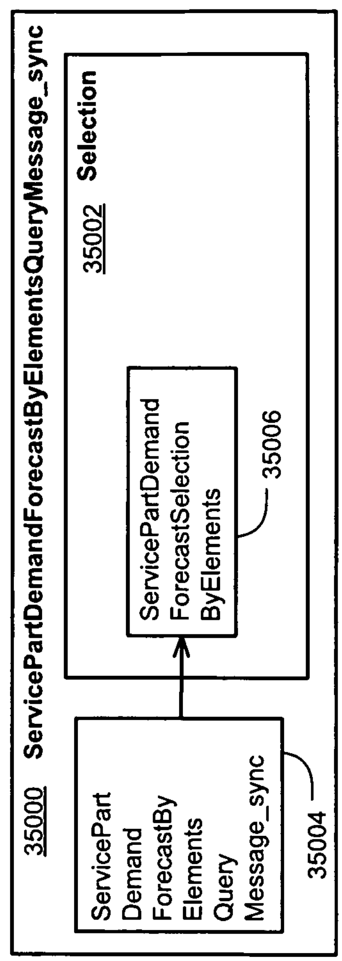
FIG. 35 shows an exemplary ServicePartDemandForecastByElementsQueryMessage_sync Message Data Type.

Additionally, FIG. 35 illustrates one example logical configuration of ServicePartDemandForecastByElementsQueryMessage_sync message 35000. Specifically, this figure depicts the arrangement and hierarchy of various components such as one or more levels of packages, entities, and datatypes, shown here as 35000 through 35006. As described above, packages may be used to represent hierarchy levels. Entities are discrete business elements that are used during a business transaction. Data types are used to type object entities and interfaces with a structure. For example, ServicePartDemandForecastByElementsQueryMessage_sync message 35000 includes, among other things, Selection 35002. Accordingly, heterogeneous applications may communicate using this consistent message configured as such.

Figure 36:
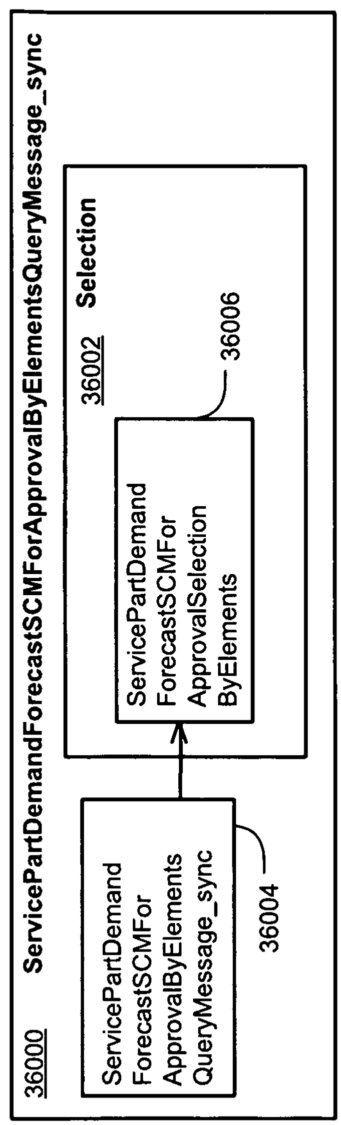
FIG. 36 shows an exemplary ServicePartDemandForecastSCMForApprovalByElementsQueryMessage_sync Message Data Type.

Additionally, FIG. 36 illustrates one example logical configuration of ServicePartDemandForecastSCMForApprovalByElementsQueryMessage_sync message 36000. Specifically, this figure depicts the arrangement and hierarchy of various components such as one or more levels of packages, entities, and datatypes, shown here as 36000 through 36006. As described above, packages may be used to represent hierarchy levels. Entities are discrete business elements that are used during a business transaction. Data types are used to type object entities and interfaces with a structure. For example, ServicePartDemandForecastSCMForApprovalByElementsQueryMessage_sync message 36000 includes, among other things, Selection 36002. Accordingly, heterogeneous applications may communicate using this consistent message configured as such.

FIGS. 37-1 through 37-4 illustrate one example logical configuration of a ServicePartDemandForecastSCMForApprovalByElementsQueryMessage_sync 37000 element structure. Specifically, these figures depict the arrangement and hierarchy of various components such as one or more levels of packages, entities, and datatypes, shown here as 37000 through 37106. As described above, packages may be used to represent hierarchy levels. Entities are discrete business elements that are used during a business transaction. Data types are used to type object entities and interfaces with a structure. For example, the ServicePartDemandForecastSCMForApprovalByElementsQueryMessage_sync 37000 includes, among other things, a ServicePartDemandForecastSCMForApprovalByElementsQueryMessage_sync 37002. Accordingly, heterogeneous applications may communicate using this consistent message configured as such.

ConfirmationMessage_sync, ServicePartDemandForecastKeyFigureCancelRequestMessage_sync, ServicePart DemandForecastKeyFigureCancelConfirmation Message_sync, ServicePartDemandForecastByElementsResponse Message_sync, and ServicePartDemandForecastSCMForApprovalByElementsResponseMessage_sync.

The following table shows the packages and entities of the abstract message data type ServicePartDemandForecastTemplateMessage_sync that are used in the above mentioned concrete message data types:

| | Package/Entity | | | | | |
|---|---|---|---|---|---|---|
| Message data type | Message header | ServicePart-Demand-Forecast | Key-Figure | KeyFigure-Value | Time-Series-Period | Log |
| ServicePartDemandForecastCreateRequestMessage__sync | 1:1 | 1:1 | 1:n | 1:n | 1:n | |
| ServicePartDemandForecastCreateConfirmationMessage__sync | 1:1 | 1:c | | | | 1:1 |
| ServicePartDemandForecastChangeRequestMessage__sync | 1:1 | 1:1 | 1:n | 1:cn | 1:n | |
| ServicePartDemandForecastChangeConfirmationMessage__sync | 1:1 | 1:c | | | | 1:1 |
| ServicePartDemandForecastCancelRequestMessage__sync | 1:1 | 1:1 | | | | |
| ServicePartDemandForecastCancelConfirmationMessage__sync | 1:1 | 1:c | | | | 1:1 |
| ServicePartDemandForecastKeyFigureCreateRequestMessage__sync | 1:1 | 1:1 | 1:n | 1:n | 1:n | |
| ServicePartDemandForecastKeyFigureCreateConfirmationMessage__sync | 1:1 | 1:c | 1:cn | | | 1:1 |
| ServicePartDemandForecastKeyFigureCancelRequestMessage__sync | 1:1 | 1:1 | 1:n | | | |
| ServicePartDemandForecastKeyFigureCancelConfirmationMessage__sync | 1:1 | 1:c | 1:cn | | | 1:1 |
| ServicePartDemandForecastByElementsResponseMessage__sync | | 1:cn | 1:n | 1:cn | 1:n | 1:1 |
| ServicePartDemandForecastSCMForApprovalByElementsResponseMessage__sync | | 1:cn | | | | 1:1 |

FIGS. 38-1 through 38-2 illustrate one example logical configuration of a ServicePartDemandForecastSCMForApprovalByElementsResponseMessage_sync 38000 element structure. Specifically, these figures depict the arrangement and hierarchy of various components such as one or more levels of packages, entities, and datatypes, shown here as 38000 through 38054. As described above, packages may be used to represent hierarchy levels. Entities are discrete business elements that are used during a business transaction. Data types are used to type object entities and interfaces with a structure. For example, the ServicePartDemandForecastSCMForApprovalByElementsResponseMessage_sync 38000 includes, among other things, a ServicePartDemandForecastSCMForApprovalByElementsResponse Message_sync 38002. Accordingly, heterogeneous applications may communicate using this consistent message configured as such.

Message Data Type ServicePartDemandForecastTemplateMessage_sync

The message data type ServicePartDemandForecastTemplateMessage_sync includes the ServicePartDemandForecast included in the business document and the business information that is relevant for sending a business document in a message. It includes the packages: MessageHeader package, ServicePartDemandForecast package, and Log. The message data type ServicePartDemandForecastTemplateMessage_sync is used as an abstract message data type that unifies all packages and entities for the following concrete message data types: ServicePartDemandForecastCreateRequestMessage_sync, ServicePartDemandForecastCreateConfirmationMessage_sync, ServicePartDemand Forecast ChangeRequestMessage_sync, ServicePartDemandForecastChangeConfirmationMessage_sync, ServicePartDemandForecastCancelRequestMessage_sync, ServicePartDemandForecastCancelConfirmationMessage_sync, ServicePartDemandForecastKeyFigureCreate RequestMessage_sync, ServicePartDemandForecastKeyFigure Create- A MessageHeader package groups the business information that is relevant for sending a business document in a message. It includes the entity: MessageHeader. A MessageHeader includes the identification data of an instance of a business document message. For all Request message data types, the MessageHeader can be of type GDT:ID_BasicBusinessDocumentMessageHeader, which includes the element:ID. For all Confirmation message data types, the MessageHeader can be of type GDT: REFERENCEID_BasicBusinessDocumentMessageHeader, which includes the element: ReferenceID.

The ServicePartDemandForecast package groups the Service Part Demand Forecast with the package TimeSeries. A ServicePartDemandForecast entity identifies a time series of future demands in a Service Parts Planning environment. The elements at the ServicePartDemandForecast entity are ID, PlanningVersionID, ProductInternalID, LocationInternalID, VirtualChildIndicator, ThirdPartyOrderProcessingIndicator, DemandForecastStategyCode, DemandForecastStategyCode, DemandForecastStrategyChangeDateTime, and DemandForecastDeviationFactorValue. ID identifies the ServicePartDemandForecast and is of type GDT:ServicePartDemandForecastID. PlanningVersionID is a planning version referenced by the demand forecast key field and is of type GDT:PlanningVersionID. ProductInternalID is a product referenced by the demand forecast key field, and is of type GDT:ProductInternalID. LocationInternalID is a location referenced by the demand forecast key field and is of type GDT:LocationInternalID. VirtualChildIndicator indicates whether the location ID represents a virtual child location or not, may be based on GDT:Indicator, and can have a Qualifier:BODVirtualChildIndicator. ThirdPartyOrderProcessingIndicator indicates whether the product-location combination is used in the context of a third-party deal or not key field and is of type GDT:Indicator and can have a Qualifier:BusinessTransactionDocumentItemThirdParty. DemandForecastStategyCode is a forecast strategy which defines the forecast model, for example constant, trend, seasonal model. It characterizes the basic pattern of a demand forecast time series, and is of type GDT:DemandForecastStrategyCode. DemandForecastStrategyChangeDateTime is a date and time when the forecast strategy was changed and is of type GDT: GLOBAL_DateTime. DemandForecastDeviationFactorValue is a number which represents the deviation factor between the new calculated forecast and the previous forecast and is of type GDT:DemandForecastDeviationFactorValue.

A ServicePartDemandForecast can be defined either by the key fields (elements) PlanningVersionID, ProductInternalID, LocationInternalID, VirtualChildIndicator, and ThirdPartyOrderProcessingIndicator or the ID. The TimeSeries package groups the information used to define a grid of time-dependent demand types. It includes the entities: KeyFigure, KeyFigureValue and TimeSeriesPeriod.

A KeyFigure entity represents a forecast demand type, such as demand in pieces or order items. The elements at the entity KeyFigure are TimeSeriesKeyFigureCode and MeasureUnitCode. TimeSeriesKeyFigureCode is a coded name of the key figure and is of type GDT:TimeSeriesKeyFigureCode. MeasureUnitCode is a unit of measure of all key figure values in the time series for this specific key figure and is of type GDT:MeasureUnitCode.

Because the TimeSeriesKeyFigureCode value is used to identify a KeyFigure, the TimeSeriesKeyFigureCode value can be unique within a business object. The key figures used Message Data Type ServicePartDemandForecasts TemplateMessages_sync A message data type ServicePartDemandForecasts TemplateMessages_sync includes the packages: MessageHeader, ServicePartDemandForecastTemplate Message_ sync, and Log. The message data type ServicePartDemandForecasts TemplateMessages_sync is used as an abstract message data type, which unifies all packages and entities for the following concrete message data types: ServicePartDemandForecastsCreateRequest Messages_sync, ServicePartDemandForecastsCreateConfirmation Messages_sync, ServicePartDemandForecastsChange RequestMessages_sync, ServicePartDemandForecasts ChangeConfirmationMessages_sync, ServicePartDemandForecastsCancel RequestMessages_sync, ServicePartDemandForecastsCancel ConfirmationMessages_sync, ServicePartDemand Forecasts KeyFigureCreate Request Messages_sync, ServicePartDemandForecastsKeyFigure CreateConfirmationMessages_sync, ServicePartDemandForecastsKeyFigureCancel RequestMessages_sync, and ServicePartDemandForecastsKeyFigureCancel ConfirmationMessages_sync.

The following table shows the packages and entities of the abstract message data type ServicePartDemandForecastTemplateMessages_sync that are used in the above mentioned concrete message data types:

| Message data type | Elements used in entity "KeyFigure" | |
|---|---|---|
| | TimeSeriesKeyFigureCode | MeasureUnitCode |
| ServicePartDemandForecastCreateRequestMessage__sync | X | (X) |
| ServicePartDemandForecastCreateConfirmationMessage__sync | | |
| ServicePartDemandForecastChangeRequestMessage__sync | X | (X) |
| ServicePartDemandForecastChangeConfirmationMessage__sync | | |
| ServicePartDemandForecastCancelRequestMessage__sync | | |
| ServicePartDemandForecastCancelConfirmationMessage__sync | | |
| ServicePartDemandForecastKeyFigureCreateRequestMessage__sync | X | (X) |
| ServicePartDemandForecastKeyFigureCreateConfirmationMessage__sync | | |
| ServicePartDemandForecastKeyFigureCancelRequestMessage__sync | X | |
| ServicePartDemandForecastKeyFigureCancelConfirmationMessage__sync | | |
| ServicePartDemandForecastByElementsResponseMessage__sync | X | X |
| ServicePartDemandForecastSCMForApprovalByElementsResponseMessage__sync | | |

can come from the pool of key figures for demand forecast in Service Parts Planning. A KeyFigureValue entity is the value of a forecast demand type in a time series period. The elements at the entity KeyFigureValue are TimeSeriesPeriodID and KeyFigureFloatValue. TimeSeriesPeriodID identifies the TimeSeriesPeriod and is of type GDT:TimeSeriesPeriodID. KeyFigureFloatValue is a value of a key figure in the time series period and is of type GDT:FloatValue. TimeSeriesPeriodID can be related to an existing TimeSeriesPeriod.

A TimeSeriesPeriod entity represents the period of a time series. The elements of the entity TimeSeriesPeriod are ID and Period. ID is a time series period ID which identifies the time series period. It is usually a positive number and is of type GDT:TimeSeriesPeriodID. Period defines the start date and time and the end date and time of the time series period in time zone UTC (Coordinated Universal Time) and is of type GDT:UPPEROPEN_GLOBAL_DateTimePeriod. A log is a sequence of messages that result when an application executes a task. The entity Log is of type GDT:Log.

The listed concrete message data types represent mass services that allow creating, changing and canceling one or many instances of a ServicePartDemandForecast business object. Each message type includes the corresponding single operation message data type.

A MessageHeader package groups the business information that is relevant for sending a business document in a message. It includes the entity: MessageHeader. A MessageHeader includes the identification data of an instance of a business document message. For all Request message data types, the MessageHeader can be of type GDT:ID_BasicBusinessDocumentMessageHeader, which can includes the element:ID. For all Confirmation message data types, the MessageHeader is of type GDT:REFERENCEID_BasicBusinessDocumentMessageHeader, which includes the element: ReferenceID. A log is a sequence of messages that result when an application executes a task. The entity Log is of type GDT:Log.

Message Data Type ServicePartDemandForecastByElementsQueryMessage_sync

A message data type ServicePartDemandForecastByElementsQueryMessage_sync includes: the Selection included in the business document. It includes the package: Selection. A Selection package collects all the selection criteria for the ServicePartDemandForecast. It includes the entity ServicePartDemandForecastSelectionByElements. A ServicePartDemandForecastSelectionByElements includes the query elements for a demand forecast search by common data. The elements at the ServicePartDemandForecastSelectionByElements entity are ServicePartDemandForecastID, PlanningVersionID, SelectionByProductInternalID, SelectionByLocationInternalID, VirtualChildIndicator, ThirdPartyOrderProcessingIndicator, and SelectionByPeriod. ServicePartDemandForecastID is optional, identifies the ServicePartDemandForecast and is of type GDT:ServicePartDemandForecastID.

PlanningVersionID is optional, is a planning version referenced by the demand forecast (key field) and is of type GDT: PlanningVersionID. SelectionByProductInternalID is optional, is a range of ProductInternalIDs referenced by the demand forecast (key field), and is of type IDT:SelectionByProductInternalID. InclusionExclusionCode is optional, is a coded representation of the inclusion of a set into a result set or the exclusion of it and is of type GDT:InclusionExclusionCode. IntervalBoundaryTypeCode is a coded representation of an interval boundary type GDT:IntervalBoundaryTypeCode. LowerBoundaryProductInternalID is optional and is a proprietary identifier for a ProductInternalID. The LowerBoundaryProductInternalID is the lower boundary of the ProductInternalID identifier interval and is of type GDT:ProductInternalID. UpperBoundaryProductInternalID is optional, and is a proprietary identifier for a ProductInternalID. The UpperBoundaryProductInternalID is the upper boundary of the ProductInternalID identifier interval and is of type GDT:ProductInternalID.

SelectionByLocationInternalID is optional, is a range of LocationInternalIDs referenced by the demand forecast (key field) and is of type IDT:SelectionByLocationInternalID. InclusionExclusionCode is optional, is a coded representation of the inclusion of a set into a result set or the exclusion of it and is of type GDT:InclusionExclusionCode. IntervalBoundaryTypeCode is a coded representation of an interval boundary type and is of type GDT:IntervalBoundaryTypeCode. LowerBoundaryLocationInternalID is optional, and is a proprietary identifier for a LocationInternalID. The LowerBoundaryLocationInternalID is the lower boundary of the LocationInternalID identifier interval and is of type GDT: LocationInternalID. UpperBoundaryLocatoinInternalID is optional, and is a proprietary identifier for a LocationInternalID. The UpperBoundaryLocationInternalID is the upper boundary of the LocationInternalID identifier interval and is of type GDT:LocationInternalID.

VirtualChildIndicator is optional, indicates whether the location ID represents a virtual child location or not (key field), and is of type GDT:Indicator with a Qualifier:BODVirtualChildIndicator. ThirdPartyOrderProcessingIndicator is optional, indicates whether the product-location combination is used in the context of a third-party deal or not (key field) and is of type GDT:Indicator with a Qualifier:BusinessTransactionDocumentItemThirdParty.

SelectionByPeriod is optional, is a range of TimeSeriesPeriods and is of type IDT:SelectionByPeriod. LowerBoundaryDateTime is optional and GLOBAL_DateTime is the accurate-to-the-second time-point of a calendar day in timezone UTC. It defines the lower boundary of the selection period and is of type GDT:GLOBAL_DateTime. UpperBoundaryDateTime is optional, and GLOBAL_DateTime is the accurate-to-the-second time-point of a calendar day in timezone UTC. It defines the upper boundary of the selection period and is of type GDT:GLOBAL_DateTime.

Message Data Type ServicePartDemandForecastSCMForApprovalByElementsQueryMessage_sync The message data type ServicePartDemandForecastSCMForApprovalByElementsQueryMessage_sync includes: the Selection included in the business document. It includes the package: Selection. The Selection package collects all the selection criteria for the ServicePartDemandForecastSCMForApproval. It includes the entity ServicePartDemandForecastSCMForApprovalSelectionByElements.

A ServicePartDemandForecastSCMForApprovalSelectionByElements includes the query elements for a demand forecast search by common data. The elements at the ServicePartDemandForecastSCMForApprovalSelectionByElements entity are PlanningVersionID, SelectionByMaterialInternalID, SelectionBySupplyPlanningAreaID, VirtualChildIndicator, ThirdPartyOrderProcessingIndicator, and SelectionByDemandForecastDeviationFactorValue. PlanningVersionID is a planning version referenced by the demand forecast and is of type GDT:PlanningVersionID.

SelectionByMaterialInternalID is a range of MaterialInternalIDs referenced by the demand forecast and is of type IDT:SelectionByMaterialInternalID. InclusionExclusionCode is a coded representation of the inclusion of a set into a result set or the exclusion of it and is of type GDT:InclusionExclusionCode. IntervalBoundaryTypeCode is a coded representation of an interval boundary type and is of type GDT: IntervalBoundaryTypeCode. LowerBoundaryMaterialInternalID is a proprietary identifier for a ProductInternalID. The LowerBoundaryProductInternalID is the lower boundary of the MaterialInternalID identifier interval and is of type GDT:ProductInternalID. UpperBoundaryMaterialInternalID is optional and is a proprietary identifier for a ProductInternalID. The UpperBoundaryProductInternalID is the upper boundary of the MaterialInternalID identifier interval and is of type GDT:ProductInternalID.

SelectionBySupplyPlanningAreaID is optional, is a range of SupplyPlanningAreaIDs referenced by the demand forecast key field, and is of type IDT:SelectionBySupplyPlanningAreaID. InclusionExclusionCode is a coded representation of the inclusion of a set into a result set or the exclusion of it and is of type GDT:InclusionExclusionCode. IntervalBoundaryTypeCode is a coded representation of an interval boundary type and is of type GDT:IntervalBoundaryTypeCode. LowerBoundarySupplyPlanningAreaID is a proprietary identifier for a SupplyPlanningAreaID. The LowerBoundaryLocationInternalID is the lower boundary of the SupplyPlanningAreaID identifier interval and is of type GDT:SupplyPlanningAreaID.

UpperBoundarySupplyPlanningAreaID is optional and is a proprietary identifier for a SupplyPlanningAreaID. The UpperBoundaryLocationInternalID is the upper boundary of the SupplyPlanningAreaID identifier interval and is of type GDT:SupplyPlanningAreaID.

VirtualChildIndicator is optional, indicates whether the location ID represents a virtual child location or not key field, and is of type GDT:Indicator with a Qualifier:BODVirtualChildIndicator. ThirdPartyOrderProcessingIndicator is optional, indicates whether the product-location combination is used in the context of a third-party deal or not (key field)

and is of type GDT:Indicator with a Qualifier: BusinessTransactionDocumentItemThirdParty. SelectionByDemandForecastDeviationFactorValue is optional, is an interval of DemandForecastDeviationFactorValue, and is of type IDT: SelectionByDemandForecastDeviationFactorValue.

LowerBoundaryDemandForecastDeviationFactorValue is a number which represents the deviation factor between the new calculated forecast and the previous forecast, defines the lower boundary of the DemandForecastDeviationFactorValue, and is of type GDT:DemandForecastDeviationFactorValue. UpperBoundaryDemandForecastDeviationFactorValue is optional, and is a number which represents the deviation factor between the new calculated forecast and the previous forecast. It can define the upper boundary of the DemandForecastDeviationFactorValue and is of type GDT:DemandForecastDeviationFactorValue.

Service Part Demand History Interfaces

Two or more Service Parts Planning environments can be linked. One represents the Service Parts Planning owner that administers and coordinates all master and transactional data. The other, subsequently called the Service Parts Planning processor, provides Service Parts Planning algorithms, for example, an algorithm describing how to capture and manage demand for service parts used in the automotive area.

Figure 39:
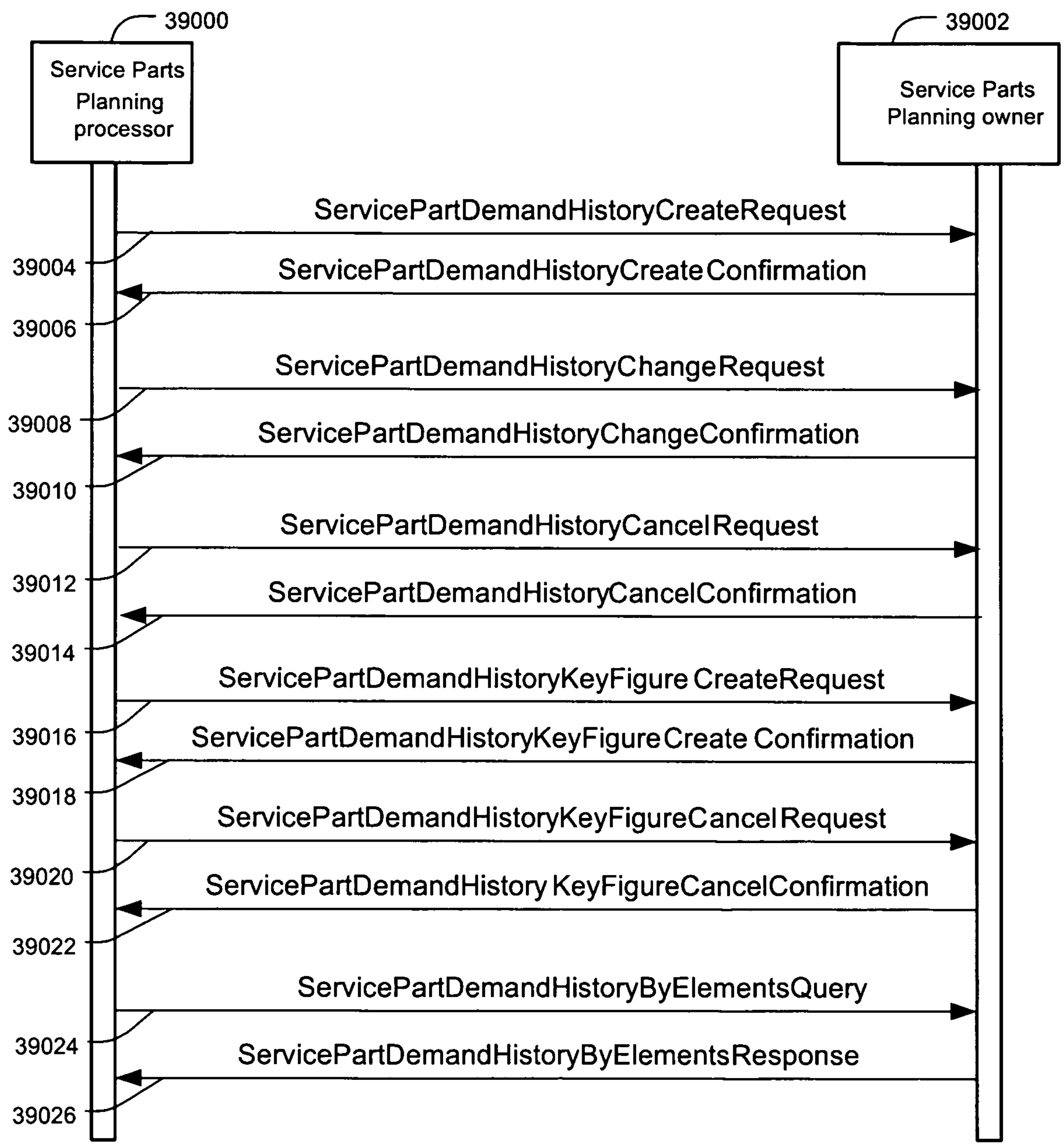
FIG. 39 shows an exemplary ServicePartDemandHistory Message Choreography.

The message choreography of FIG. 39 describes a possible logical sequence of messages that can be used to realize a Service Part Demand History business scenario. A "Service Parts Planning Processor" system 39000 can request the creation of a Service Part Demand History using a ServicePartDemandHistoryCreateRequest message 39004 as shown, for example, in FIG. 39. A "Service Parts Planning Owner" system 39002 can respond to the request using a ServicePartDemandHistoryCreateConfirmation message 39006 as shown, for example, in FIG. 39.

The "Service Parts Planning Processor" system 39000 can request the change of a Service Part Demand History using a ServicePartDemandHistoryChangeRequest message 39008 as shown, for example, in FIG. 39. The "Service Parts Planning Owner" system 39002 can respond to the request using a ServicePartDemandHistoryChangeConfirmation message 39010 as shown, for example, in FIG. 39.

The "Service Parts Planning Processor" system 39000 can request the cancellation of a Service Part Demand History using a ServicePartDemandHistoryCancelRequest message 39012 as shown, for example, in FIG. 39. The "Service Parts Planning Owner" system 39002 can respond to the request using a ServicePartDemandHistoryCancelConfirmation message 39014 as shown, for example, in FIG. 39.

The "Service Parts Planning Processor" system 39000 can request the cancellation of a Service Part Demand History Key Figure using a ServicePartDemandHistoryKeyFigureCreateRequest message 39016 as shown, for example, in FIG. 39. The "Service Parts Planning Owner" system 39002 can respond to the request using a ServicePartDemandHistoryKeyFigureCreateConfirmation message 39018 as shown, for example, in FIG. 39.

The "Service Parts Planning Processor" system 39000 can request the creation of a Service Part Demand History Key Figure using a ServicePartDemandHistoryKeyFigureCancelRequest message 39020 as shown, for example, in FIG. 39. The "Service Parts Planning Owner" system 39002 can respond to the request using a ServicePartDemandHistoryKeyFigureCancelConfirmation message 39022 as shown, for example, in FIG. 39.

The "Service Parts Planning Processor" system 39000 can query a Service Part Demand History using a ServicePartDemandHistoryByElementsQuery message 39024 as shown, for example, in FIG. 39. The "Service Parts Planning Owner" system 39002 can respond to the request using a ServicePartDemandHistoryByElementsResponse message 39026 as shown, for example, in FIG. 39.

Figure 40:
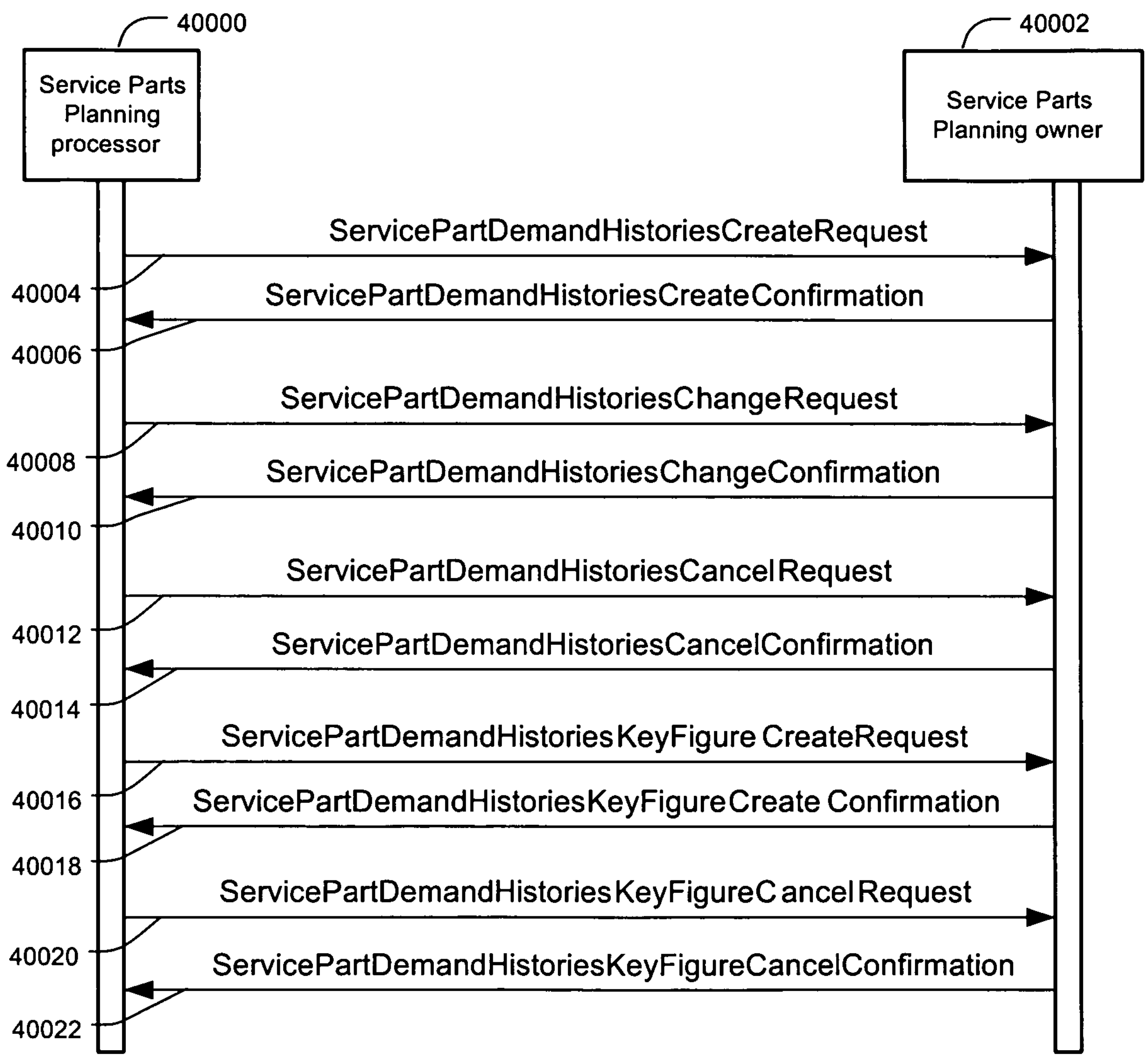
FIG. 40 shows an exemplary ServicePartDemandHistories Message Choreography.

The message choreography of FIG. 40 describes another possible logical sequence of messages that can be used to realize a Service Part Demand History business scenario. A "Service Parts Planning Processor" system 40000 can request the creation of Service Part Demand Histories using a ServicePartDemandHistoriesCreateRequest message 40004 as shown, for example, in FIG. 40. A "Service Parts Planning Owner" system 40002 can respond to the request using a ServicePartDemandHistoriesCreateConfirmation message 40006 as shown, for example, in FIG. 40.

The "Service Parts Planning Processor" system 40000 can request the change of Service Part Demand Histories using a ServicePartDemand HistoriesChangeRequest message 40008 as shown, for example, in FIG. 40. The "Service Parts Planning Owner" system 40002 can respond to the request using a ServicePartDemandHistoriesChangeConfirmation message 40010 as shown, for example, in FIG. 40.

The "Service Parts Planning Processor" system 40000 can request the cancellation of Service Part Demand Histories using a ServicePartDemandHistoriesCancelRequest message 40012 as shown, for example, in FIG. 40. The "Service Parts Planning Owner" system 40002 can respond to the request using a ServicePartDemandHistoriesCancelConfirmation message 40014 as shown, for example, in FIG. 40.

The "Service Parts Planning Processor" system 40000 can request the cancellation of Service Part Demand Histories Key Figure using a ServicePartDemandHistoriesKeyFigureCreateRequest message 40016 as shown, for example, in FIG. 40. The "Service Parts Planning Owner" system 40002 can respond to the request using a ServicePartDemandHistoriesKeyFigureCreateConfirmation message 40018 as shown, for example, in FIG. 40.

The "Service Parts Planning Processor" system 40000 can request the creation of Service Part Demand Histories Key Figure using a ServicePartDemandHistoriesKeyFigureCancelRequest message 40020 as shown, for example, in FIG. 40. The "Service Parts Planning Owner" system 40002 can respond to the request using a ServicePartDemandHistoriesKeyFigureCancelConfirmation message 40022 as shown, for example, in FIG. 40.

The message ServicePartDemandHistoryCreateRequest is sent from the Service Parts Planning processor to create a Service Part Demand History at the Service Parts Planning owner side. The structure of the message type ServicePartDemandHistoryCreateRequest is specified by the message data type ServicePartDemandHistoryCreateRequestMessage, which is derived from the message data type ServicePartDemandHistoryTemplateMessage. Key figures can have the same period bucket assignment.

The message ServicePartDemandHistoriesCreateRequest is sent from the Service Parts Planning processor to create one or multiple Service Part Demand Histories at the Service Parts Planning owner side. The structure of the message type ServicePartDemandHistoriesCreateRequest is specified by the message data type ServicePartDemandHistoriesCreateRequestMessage, which includes the message data type ServicePartDemandHistoryCreateRequestMessage.

The message ServicePartDemandHistoryCreateConfirmation is sent from Service Parts Planning owner to the Service Parts Planning processor to confirm a ServicePartDemandHistoryCreateRequest. The structure of the message type ServicePartDemandHistoryCreateConfirmation is specified by the message data type ServicePartDemandHistoryCreateConfirmation Message, which is derived from the message data type ServicePartDemandHistoryTemplateMessage.

The message ServicePartDemandHistoriesCreateConfirmation is sent from the Service Parts Planning owner to the Service Parts Planning processor to confirm a ServicePartDemandHistoriesCreateRequest. The structure of the message type ServicePartDemandHistoriesCreateConfirmation is specified by the message data type ServicePartDemandHistoriesCreateConfirmationMessage, which includes the message data type ServicePartDemandHistoryCreateConfirmationMessage.

The message ServicePartDemandHistoryChangeRequest is sent from the Service Parts Planning processor to change a Service Part Demand History at the Service Parts Planning owner side. The structure of the message type ServicePartDemandHistoryChangeRequest is specified by the message data type ServicePartDemandHistoryChangeRequestMessage, which is derived from the message data type ServicePartDemandHistoryTemplateMessage. Key figures can have the same period bucket assignment.

The message ServicePartDemandHistoriesChangeRequest is sent from the Service Parts Planning processor to change one or multiple Service Part Demand Histories at the Service Parts Planning owner side. The structure of the message type ServicePartDemandHistoriesChangeRequest is specified by the message data type ServicePartDemandHistoriesChangeRequestMessage, which includes the message data type ServicePartDemandHistoryChangeRequestMessage.

The message ServicePartDemandHistoryChangeConfirmation is sent from the Service Parts Planning owner to the Service Parts Planning processor to confirm a ServicePartDemandHistoryChangeRequest. The structure of the message type ServicePartDemandHistoryChangeConfirmation is specified by the message data type ServicePartDemandHistoryChangeConfirmation Message, which is derived from the message data type ServicePartDemandHistoryTemplateMessage.

The message ServicePartDemandHistoriesChangeConfirmation is sent from the Service Parts Planning owner to the Service Parts Planning processor to confirm a ServicePartDemandHistoriesChangeRequest. The structure of the message type ServicePartDemandHistoriesChangeConfirmation is specified by the message data type ServicePartDemandHistoriesChangeConfirmationMessage, which includes the message data type ServicePartDemandHistoryChangeConfirmationMessage.

The message ServicePartDemandHistoryCancelRequest is sent from the Service Parts Planning processor to delete a Service Part Demand History at the Service Parts Planning owner side. The structure of the message type ServicePartDemandHistoryCancelRequest is specified by the message data type ServicePartDemandHistoryCancelRequestMessage, which is derived from the message data type ServicePartDemandHistoryTemplateMessage.

The message ServicePartDemandHistoriesCancelRequest is sent from the Service Parts Planning processor to delete one or multiple Service Part Demand Histories at the Service Parts Planning owner side. The structure of the message type ServicePartDemandHistoriesCancelRequest is specified by the message data type ServicePartDemandHistoriesCancelRequestMessage, which includes the message data type ServicePartDemandHistoryCancelRequestMessage.

The message ServicePartDemandHistoryCancelConfirmation is sent from the Service Parts Planning owner to the Service Parts Planning processor to confirm a ServicePartDemandHistoryCancelRequest. The structure of the message type ServicePartDemandHistoryCancelConfirmation is specified by the message data type ServicePartDemandHistoryCancelConfirmationMessage, which is derived from the message data type ServicePartDemandHistoryTemplateMessage.

The message ServicePartDemandHistoriesCancelConfirmation is sent from the Service Parts Planning owner to the Service Parts Planning processor to confirm a ServicePartDemandHistoriesCancelRequest. The structure of the message type ServicePartDemandHistoriesCancelConfirmation is specified by the message data type ServicePartDemandHistoriesCancelConfirmationMessage, which includes the message data type ServicePartDemandHistoryCancelConfirmationMessage.

The message ServicePartDemandHistoryKeyFigureCreateRequest is sent from the Service Parts Planning processor to create a Service Part Demand History Key Figure for a Service Part Demand History at the Service Parts Planning owner side. The structure of the message type ServicePartDemandHistoryKeyFigureCreateRequest is specified by the message data type ServicePartDemandHistoryKeyFigureCreateRequestMessage, which is derived from the message data type ServicePartDemandHistoryTemplateMessage. Key figures can have the same period bucket assignment.

The message ServicePartDemandHistoriesKeyFigureCreateRequest is sent from the Service Parts Planning processor to create a Service Part Demand History Key Figure for one or multiple Service Part Demand Histories at the Service Parts Planning owner side. The structure of the message type ServicePartDemandHistoriesKeyFigureCreateRequest is specified by the message data type ServicePartDemandHistoriesKeyFigureCreateRequestMessage, which includes the message data type ServicePartDemandHistoryKeyFigureCreateRequest.

The message ServicePartDemandHistoryKeyFigureCreateConfirmation is sent from the Service Parts Planning owner to the Service Parts Planning processor to confirm a ServicePartDemandHistoryKeyFigureCreateRequest. The structure of the message type ServicePartDemandHistoryKeyFigureCreateConfirmation is specified by the message data type ServicePartDemandHistoryKeyFigureCreateConfirmationMessage, which is derived from the message data type ServicePartDemandHistoryTemplateMessage.

The message ServicePartDemandHistoriesKeyFigureCreateConfirmation is sent from the Service Parts Planning owner to the Service Parts Planning processor to confirm a ServicePartDemandHistoriesKeyFigureCreateRequest. The structure of the message type ServicePartDemandHistoriesKeyFigureCreateConfirmation is specified by the message data type ServicePartDemandHistoriesKeyFigureCreateConfirmationMessage, which includes the message data type ServicePartDemandHistoryKeyFigureCreateConfirmation.

The message ServicePartDemandHistoryKeyFigureCancelRequest is sent from the Service Parts Planning processor to delete a Service Part Demand History Key Figure for a Service Part Demand History at the Service Parts Planning owner side. The structure of the message type ServicePartDemandHistoryKeyFigureCancelRequest is specified by the message data type ServicePartDemandHistoryKeyFigureCancelRequestMessage, which is derived from the message data type ServicePartDemandHistoryTemplateMessage.

The message ServicePartDemandHistoriesKey FigureCancelRequest is sent from the Service Parts Planning processor to delete a Service Part Demand History Key Figure for one or multiple Service Part Demand Histories at the Service Parts Planning owner side. The structure of the message type ServicePartDemandHistoriesKeyFigureCancelRequest is specified by the message data type ServicePartDemandHistoriesKeyFigureCancelRequestMessage, which includes the message data type ServicePartDemandHistoryKeyFigureCancelRequest.

The message ServicePartDemandHistoryKeyFigureCancelConfirmation is sent from the Service Parts Planning owner to the Service Parts Planning processor to confirm a ServicePartDemandHistoryKeyFigureCancelRequest. The structure of the message type ServicePartDemandHistoryKeyFigureCancelConfirmation is specified by the message data type ServicePartDemandHistoryKeyFigureCancelConfirmationMessage, which is derived from the message data type ServicePartDemandHistoryTemplateMessage.

The message ServicePartDemandHistoriesKeyFigureCancelConfirmation is sent from the Service Parts Planning owner to the Service Parts Planning processor to confirm a ServicePartDemandHistoriesKeyFigureCancelRequest. The structure of the message type ServicePartDemandHistoriesKeyFigureCancelConfirmation is specified by the message data type ServicePartDemandHistoryKeyFigureCancelConfirmationMessage, which includes the message data type ServicePartDemandHistoryKeyFigureCancelConfirmation.

The ServicePartDemandHistoryByElementsQuery is a query for ServicePartDemandHistory that satisfies the selection criteria specified by the query elements. The structure of the message type ServicePartDemandHistoryByElementsQuery is specified by the message data type ServicePartDemandHistoryByElementsQueryMessage. The message ServicePartDemandHistoryByElementsResponse is sent from the Service Parts Planning owner to the Service Parts Planning processor based on the elements of the query message ServicePartDemandHistoryByElementsQuery. The structure of the message type ServicePartDemandHistoryByElementsResponse is specified by the message data type ServicePartDemandHistoryByElementsResponseMessage, which is derived from the message data type ServicePartDemandHistoryTemplateMessage.

The Service Parts Planning owner and the Service Parts Planning processor can be coupled in such a way that the demand history is captured at the Service Parts Planning processor side and is then sent to Service Parts Planning owner. A number of interfaces can be included, such as ServicePartDemandHistoryCreateRequestConfirmation_In, ServicePartDemandHistoryChangeRequestConfirmation_In, ServicePartDemandHistoryCancelRequestConfirmation_In, ServicePartDemandHistoryCreateKeyFigureRequestConfirmation_In, ServicePartDemandHistoryCancelKeyFigureRequestConfirmation_In, ServicePartDemandHistoriesCreateRequestConfirmation_In, ServicePartDemandHistoriesChangeRequestConfirmation_In, ServicePartDemandHistoriesCancelRequestConfirmation_In, ServicePartDemandHistoriesCreateKeyFigureRequestConfirmation_In, ServicePartDemandHistoriesCancelKeyFigureRequestConfirmation_In, and ServicePartDemandHistoryByElements QueryResponse_In.

Figure 41:
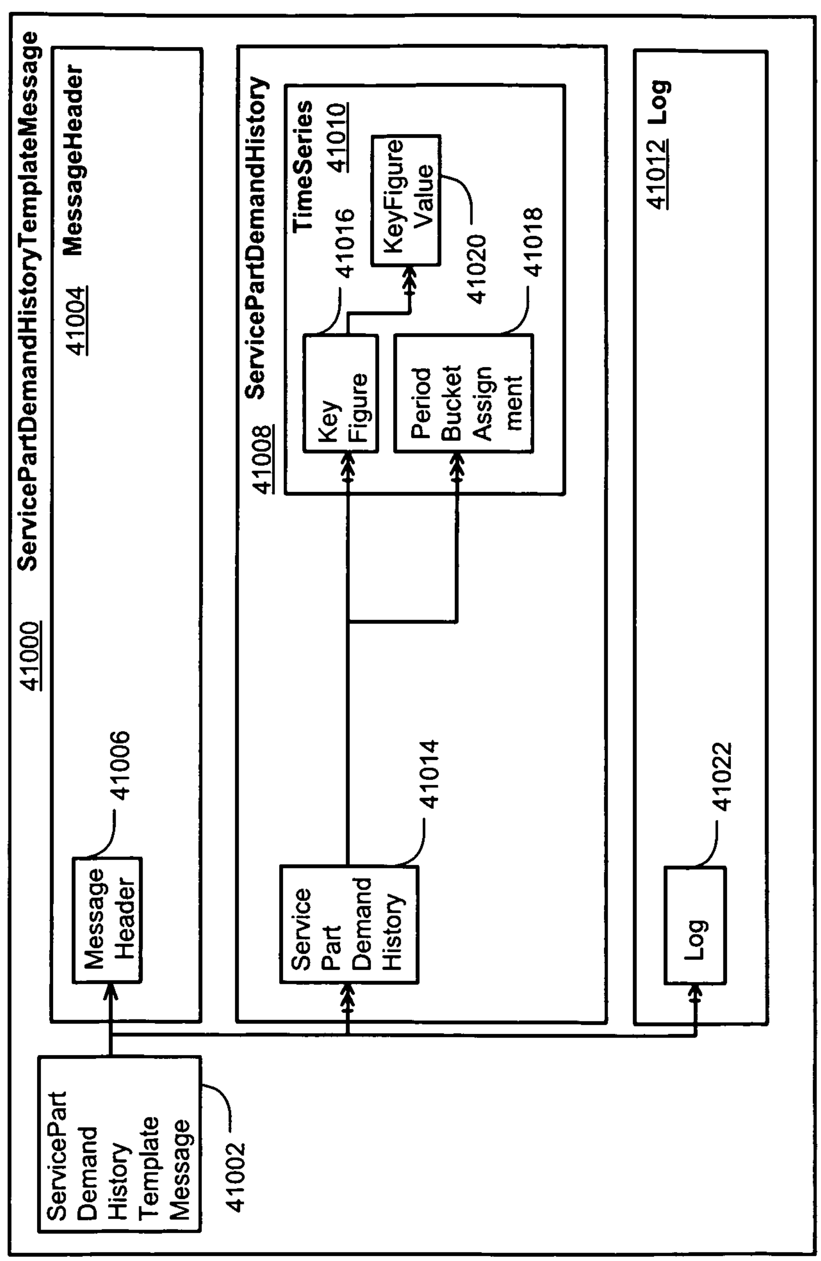
FIG. 41 shows an exemplary ServicePartDemandHistoryTemplateMessage Message Data Type.

FIG. 41 illustrates one example logical configuration of ServicePartDemandHistoryTemplateMessage message 41000. Specifically, this figure depicts the arrangement and hierarchy of various components such as one or more levels of packages, entities, and datatypes, shown here as 41000 through 41022. As described above, packages may be used to represent hierarchy levels. Entities are discrete business elements that are used during a business transaction. Data types are used to type object entities and interfaces with a structure. For example, ServicePartDemandHistoryTemplateMessage message 41000 includes, among other things, ServicePartDemandHistory 41008. Accordingly, heterogeneous applications may communicate using this consistent message configured as such.

Figure 42:
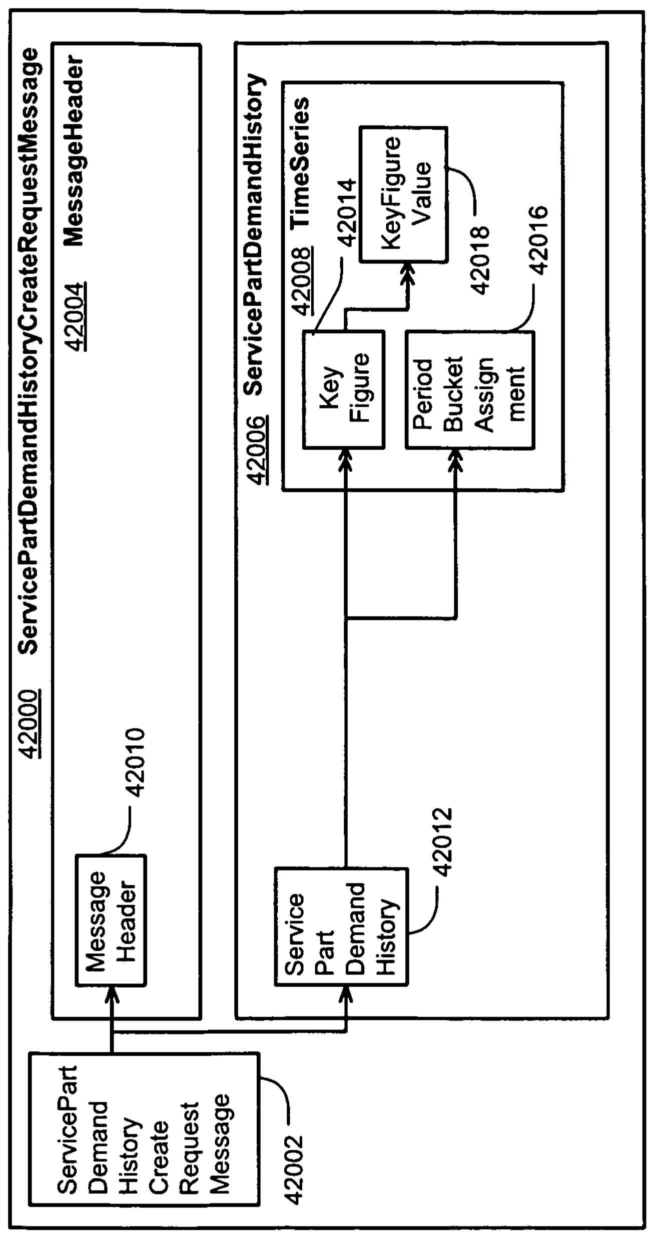
FIG. 42 shows an exemplary ServicePartDemandHistoryCreateRequestMessage Message Data Type.

Additionally, FIG. 42 illustrates one example logical configuration of ServicePartDemandHistoryCreateRequestMessage message 42000. Specifically, this figure depicts the arrangement and hierarchy of various components such as one or more levels of packages, entities, and datatypes, shown here as 42000 through 42018. As described above, packages may be used to represent hierarchy levels. Entities are discrete business elements that are used during a business transaction. Data types are used to type object entities and interfaces with a structure. For example, ServicePartDemandHistoryCreateRequestMessage message 42000 includes, among other things, ServicePartDemandHistory 42006. Accordingly, heterogeneous applications may communicate using this consistent message configured as such.

Figure 43:
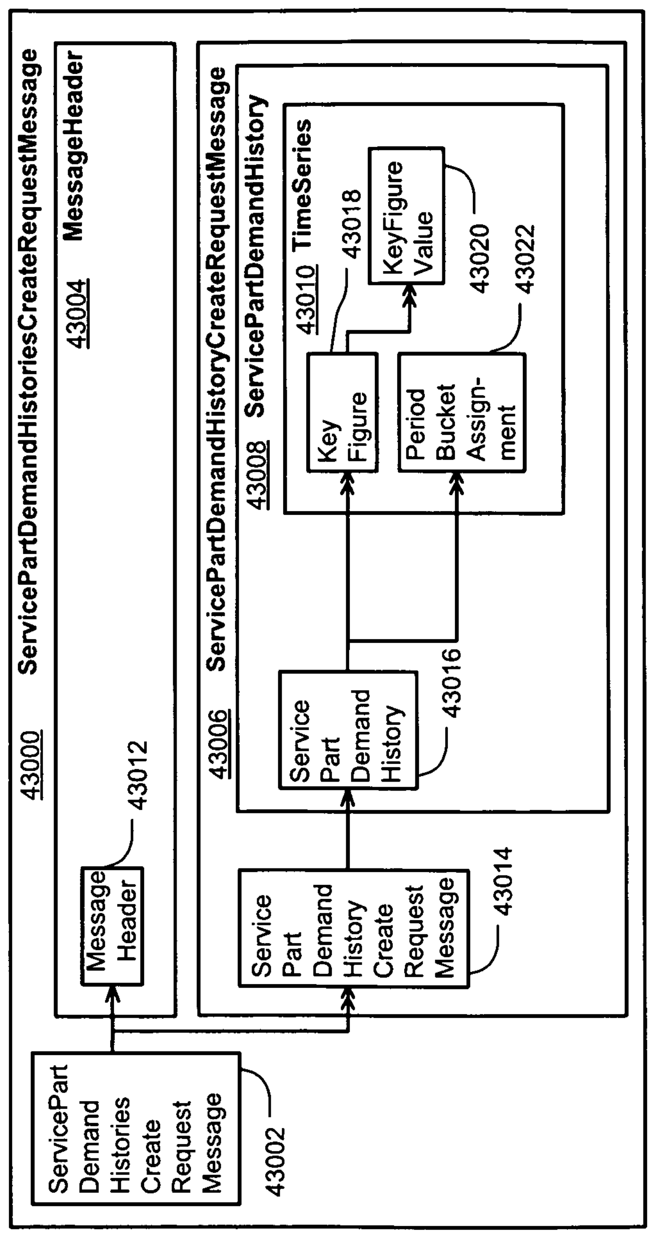
FIG. 43 shows an exemplary ServicePartDemandHistoriesCreateRequestMessage Message Data Type.

Additionally, FIG. 43 illustrates one example logical configuration of ServicePartDemandHistoriesCreateRequestMessage message 43000. Specifically, this figure depicts the arrangement and hierarchy of various components such as one or more levels of packages, entities, and datatypes, shown here as 43000 through 43022. As described above, packages may be used to represent hierarchy levels. Entities are discrete business elements that are used during a business transaction. Data types are used to type object entities and interfaces with a structure. For example, ServicePartDemandHistoriesCreateRequestMessage message 43000 includes, among other things, ServicePartDemandHistoryCreateRequestMessage 43006. Accordingly, heterogeneous applications may communicate using this consistent message configured as such.

Figure 44:
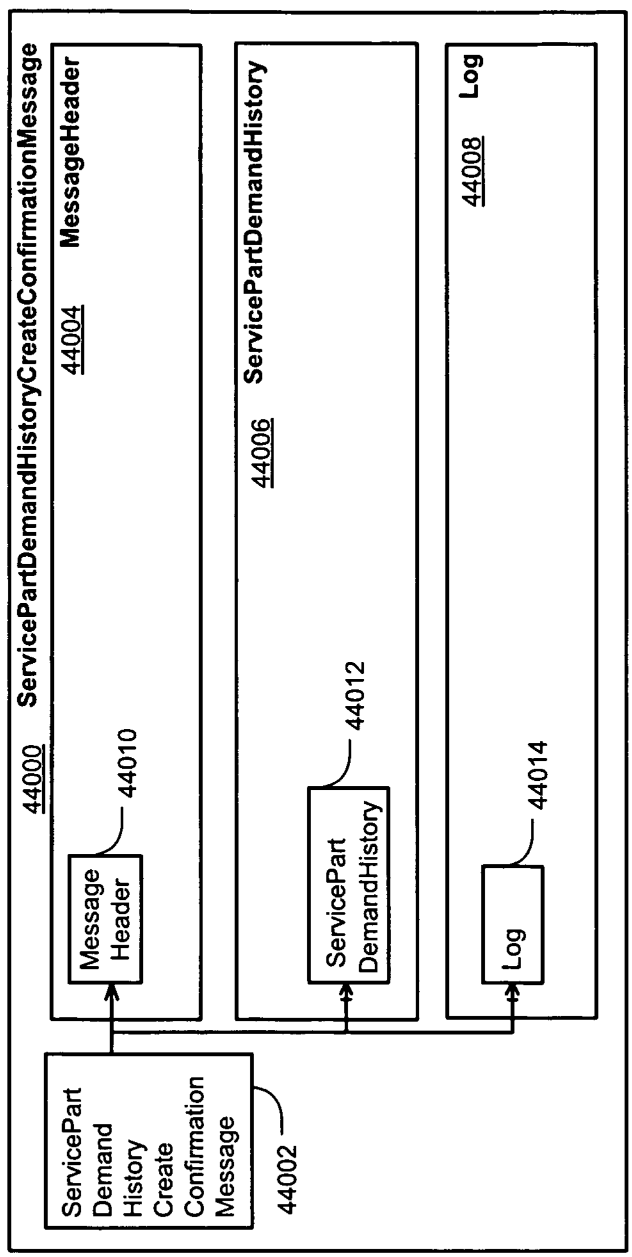
FIG. 44 shows an exemplary ServicePartDemandHistoryCreateConfirmationMessage Message Data Type.

Additionally, FIG. 44 illustrates one example logical configuration of ServicePartDemandHistoryCreateConfirmationMessage message 44000. Specifically, this figure depicts the arrangement and hierarchy of various components such as one or more levels of packages, entities, and datatypes, shown here as 44000 through 44014. As described above, packages may be used to represent hierarchy levels. Entities are discrete business elements that are used during a business transaction. Data types are used to type object entities and interfaces with a structure. For example, ServicePartDemandHistoryCreateConfirmationMessage message 44000 includes, among other things, ServicePartDemandHistory 44006. Accordingly, heterogeneous applications may communicate using this consistent message configured as such.

Figure 45:
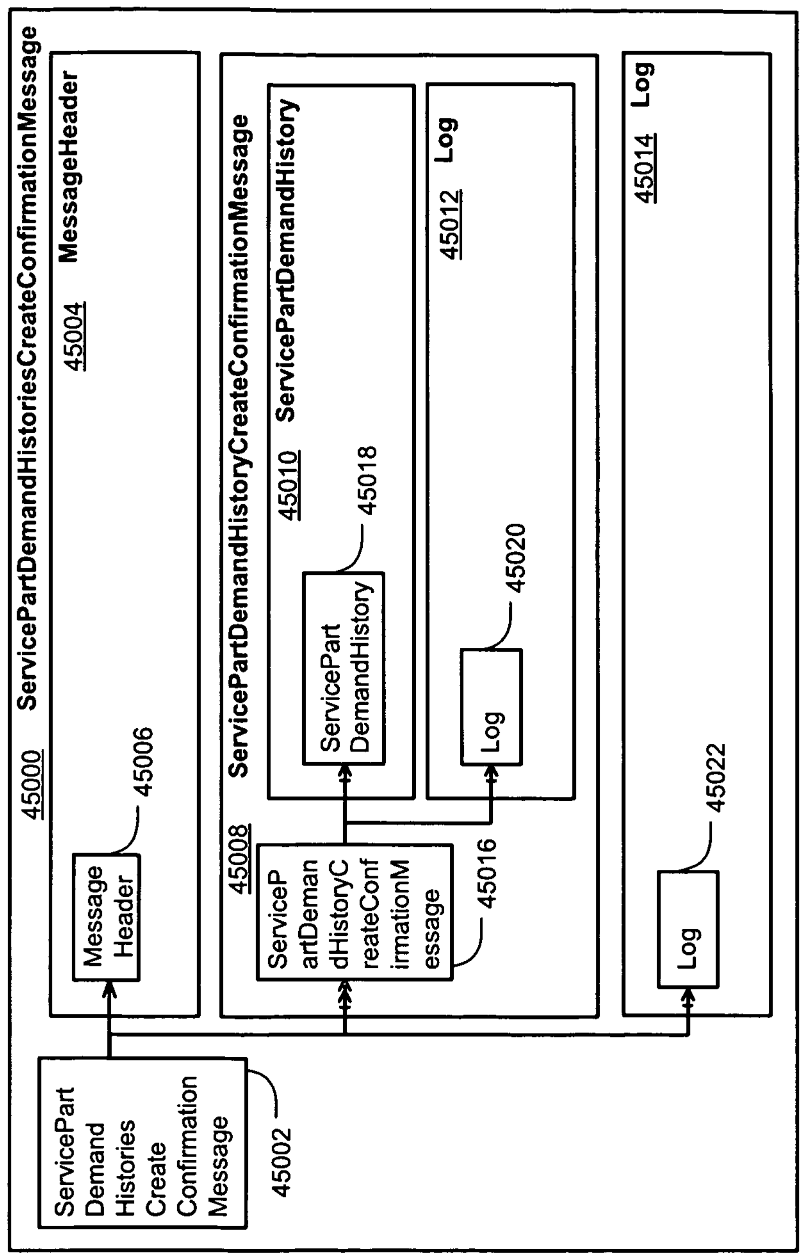
FIG. 45 shows an exemplary ServicePartDemandHistoriesCreateConfirmationMessage Message Data Type.

Additionally, FIG. 45 illustrates one example logical configuration of ServicePartDemandHistoriesCreateConfirmationMessage message 45000. Specifically, this figure depicts the arrangement and hierarchy of various components such as one or more levels of packages, entities, and datatypes, shown here as 45000 through 45022. As described above, packages may be used to represent hierarchy levels. Entities are discrete business elements that are used during a business transaction. Data types are used to type object entities and interfaces with a structure. For example, ServicePartDemandHistoriesCreateConfirmationMessage message 45000 includes, among other things, ServicePartDemandHistoryCreateConfirmationMessage 45008. Accordingly, heterogeneous applications may communicate using this consistent message configured as such.

Figure 46:
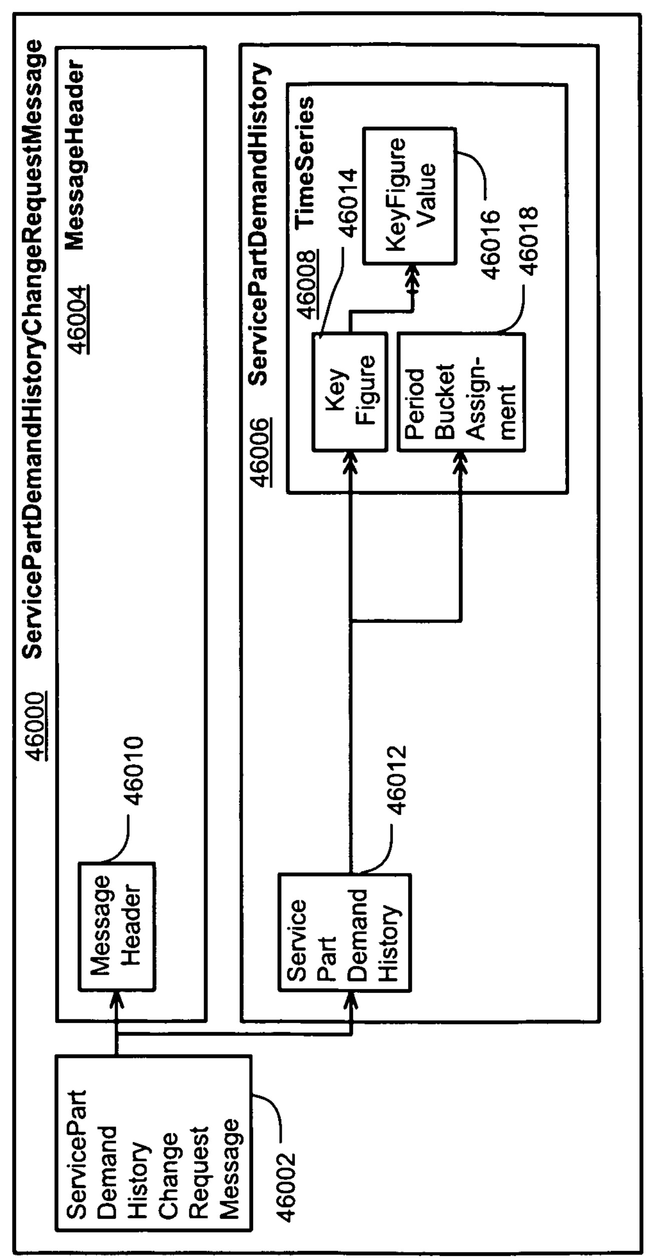
FIG. 46 shows an exemplary ServicePartDemandHistoryChangeRequestMessage Message Data Type.

Additionally, FIG. 46 illustrates one example logical configuration of ServicePartDemandHistoryChangeRequestMessage message 46000. Specifically, this figure depicts the arrangement and hierarchy of various components such as one or more levels of packages, entities, and datatypes, shown here as 46000 through 46018. As described above, packages may be used to represent hierarchy levels. Entities are discrete business elements that are used during a business transaction. Data types are used to type object entities and interfaces with a structure. For example, ServicePartDemandHistoryChangeRequestMessage message 46000 includes, among other things, ServicePartDemandHistory 46006. Accordingly, heterogeneous applications may communicate using this consistent message configured as such.

Figure 47:
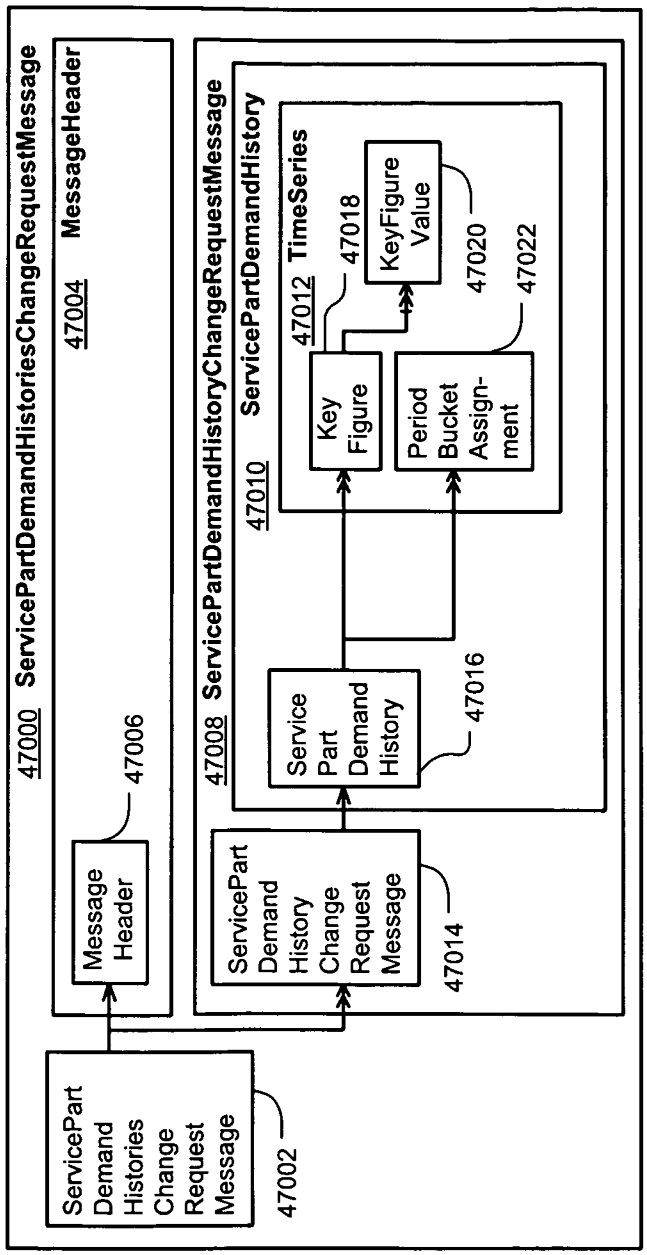
FIG. 47 shows an exemplary ServicePartDemandHistoriesChangeRequestMessage Message Data Type.

Additionally, FIG. 47 illustrates one example logical configuration of ServicePartDemandHistoriesChangeRequestMessage message 47000. Specifically, this figure depicts the arrangement and hierarchy of various components such as one or more levels of packages, entities, and datatypes, shown here as 47000 through 47022. As described above, packages may be used to represent hierarchy levels. Entities are discrete business elements that are used during a business transaction. Data types are used to type object entities and interfaces with a structure. For example, ServicePartDemandHistoriesChangeRequestMessage message 47000 includes, among other things, ServicePartDemandHistoryChangeRequestMessage 47008. Accordingly, heterogeneous applications may communicate using this consistent message configured as such.

Figure 48:
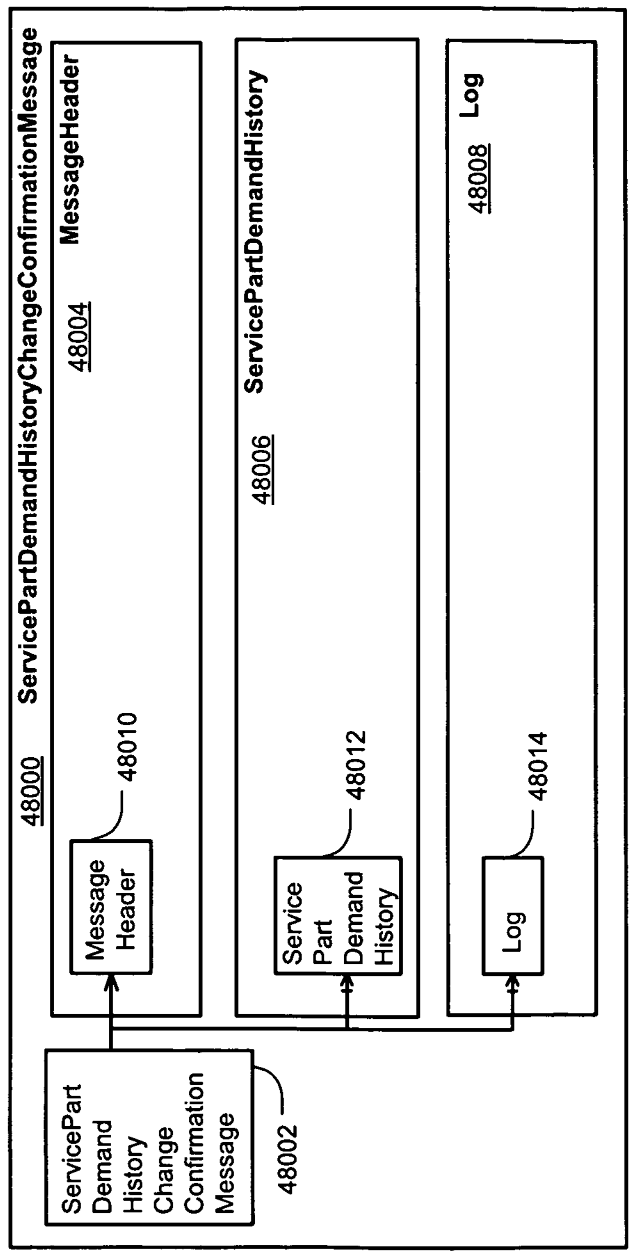
FIG. 48 shows an exemplary ServicePartDemandHistoryChangeConfirmationMessage Message Data Type.

Additionally, FIG. 48 illustrates one example logical configuration of ServicePartDemandHistoryChangeConfirmationMessage message 48000. Specifically, this figure depicts the arrangement and hierarchy of various components such as one or more levels of packages, entities, and datatypes, shown here as 48000 through 48014. As described above, packages may be used to represent hierarchy levels. Entities are discrete business elements that are used during a business transaction. Data types are used to type object entities and interfaces with a structure. For example, ServicePartDemandHistoryChangeConfirmationMessage message 48000 includes, among other things, ServicePartDemandHistory 48006. Accordingly, heterogeneous applications may communicate using this consistent message configured as such.

Figure 49:
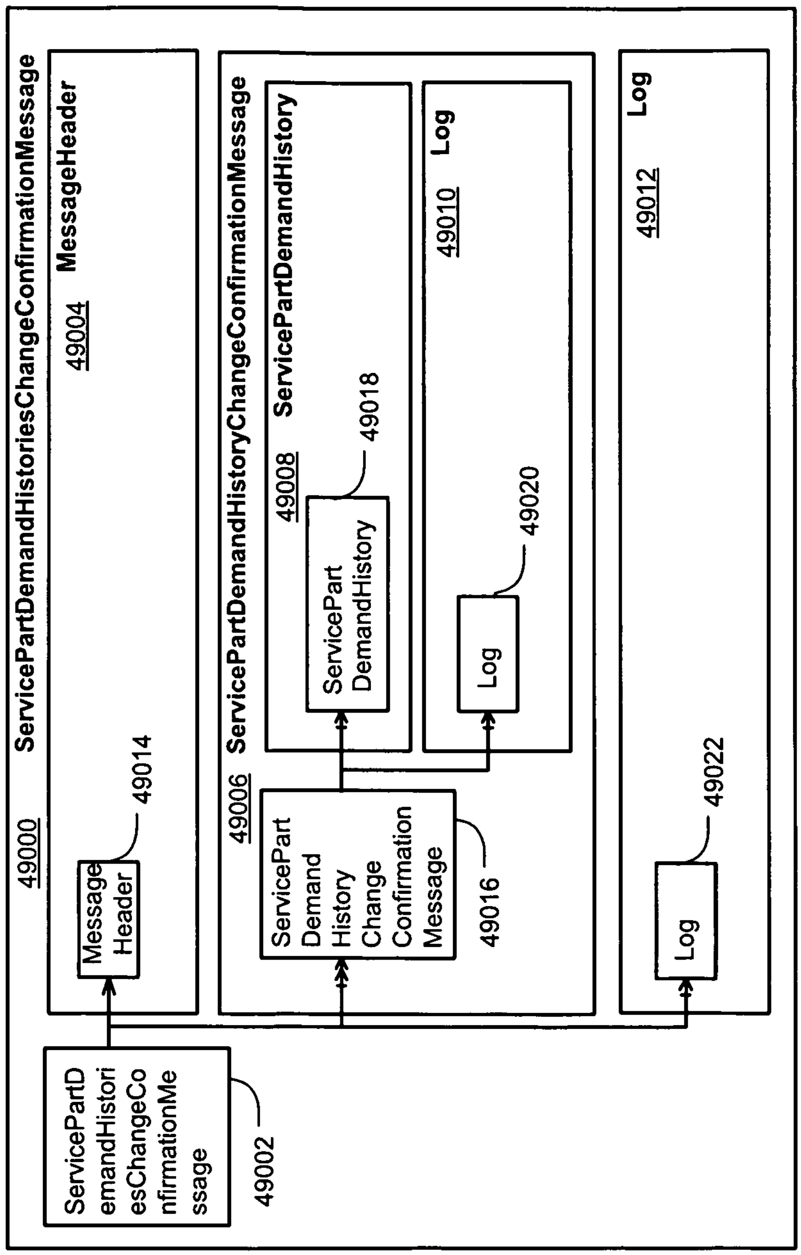
FIG. 49 shows an exemplary ServicePartDemandHistoriesChangeConfirmationMessage Message Data Type.

Additionally, FIG. 49 illustrates one example logical configuration of ServicePartDemandHistoriesChangeConfirmationMessage message 49000. Specifically, this figure depicts the arrangement and hierarchy of various components such as one or more levels of packages, entities, and datatypes, shown here as 49000 through 49022. As described above, packages may be used to represent hierarchy levels. Entities are discrete business elements that are used during a business transaction. Data types are used to type object entities and interfaces with a structure. For example, ServicePartDemandHistoriesChangeConfirmationMessage message 49000 includes, among other things, ServicePartDemandHistoryChangeConfirmationMessage 49006. Accordingly, heterogeneous applications may communicate using this consistent message configured as such.

Figure 50:
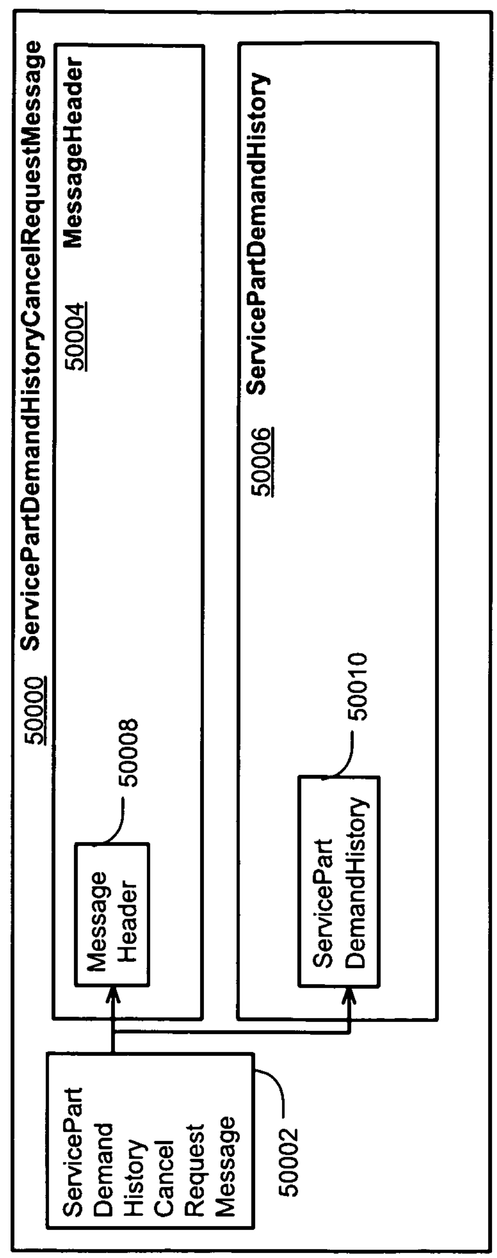
FIG. 50 shows an exemplary ServicePartDemandHistoryCancelRequestMessage Message Data Type.

Additionally, FIG. 50 illustrates one example logical configuration of ServicePartDemandHistoryCancelRequestMessage message 50000. Specifically, this figure depicts the arrangement and hierarchy of various components such as one or more levels of packages, entities, and datatypes, shown here as 50000 through 50010. As described above, packages may be used to represent hierarchy levels. Entities are discrete business elements that are used during a business transaction. Data types are used to type object entities and interfaces with a structure. For example, ServicePartDemandHistoryCancelRequestMessage message 50000 includes, among other things, ServicePartDemandHistory 50006. Accordingly, heterogeneous applications may communicate using this consistent message configured as such.

Figure 51:
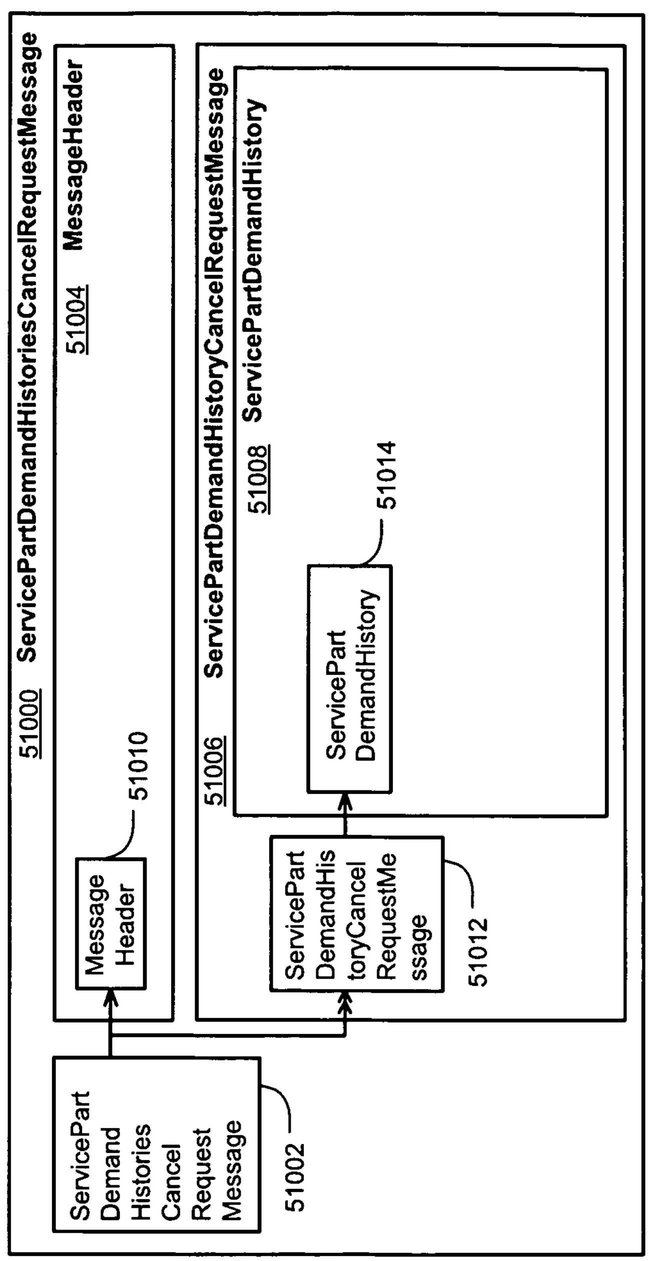
FIG. 51 shows an exemplary ServicePartDemandHistoriesCancelRequestMessage Message Data Type.

Additionally, FIG. 51 illustrates one example logical configuration of ServicePartDemandHistoriesCancelRequestMessage message 51000. Specifically, this figure depicts the arrangement and hierarchy of various components such as one or more levels of packages, entities, and datatypes, shown here as 51000 through 51014. As described above, packages may be used to represent hierarchy levels. Entities are discrete business elements that are used during a business transaction. Data types are used to type object entities and interfaces with a structure. For example, ServicePartDemandHistoriesCancelRequestMessage message 51000 includes, among other things, ServicePartDemandHistoryCancelRequestMessage 51006. Accordingly, heterogeneous applications may communicate using this consistent message configured as such.

Figure 52:
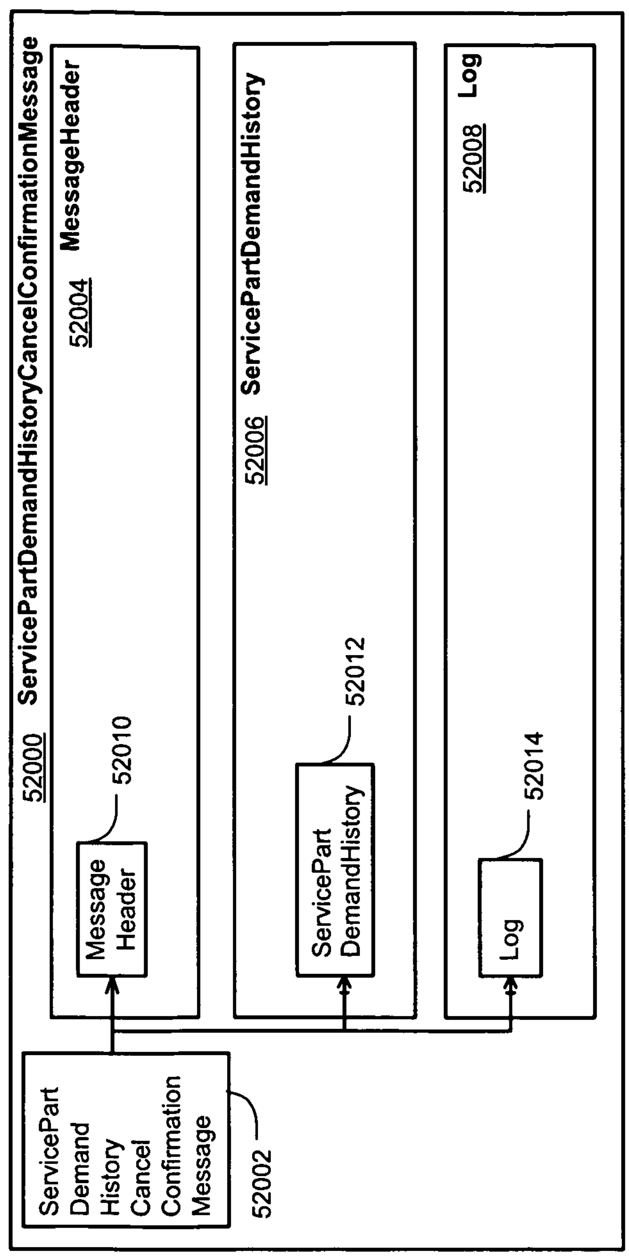
FIG. 52 shows an exemplary ServicePartDemandHistoryCancelConfirmationMessage Message Data Type.

Additionally, FIG. 52 illustrates one example logical configuration of ServicePartDemandHistoryCancelConfirmationMessage message 52000. Specifically, this figure depicts the arrangement and hierarchy of various components such as one or more levels of packages, entities, and datatypes, shown here as 52000 through 52014. As described above, packages may be used to represent hierarchy levels. Entities are discrete business elements that are used during a business transaction. Data types are used to type object entities and interfaces with a structure. For example, ServicePartDemandHistoryCancelConfirmationMessage message 52000 includes, among other things, ServicePartDemandHistory 52006. Accordingly, heterogeneous applications may communicate using this consistent message configured as such.

Figure 53:
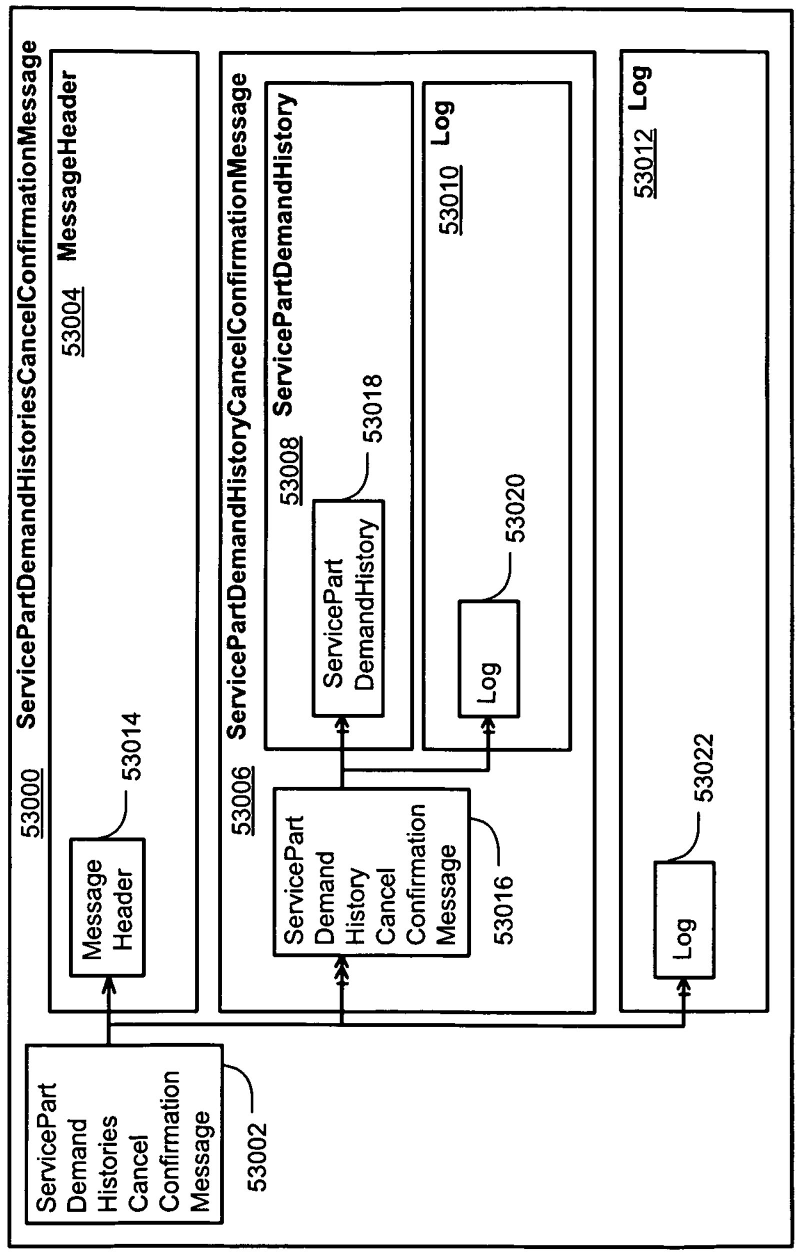
FIG. 53 shows an exemplary ServicePartDemandHistoriesCancelConfirmationMessage Message Data Type.

Additionally, FIG. 53 illustrates one example logical configuration of ServicePartDemandHistoriesCancelConfirmationMessage message 53000. Specifically, this figure depicts the arrangement and hierarchy of various components such as one or more levels of packages, entities, and datatypes, shown here as 53000 through 53022. As described above, packages may be used to represent hierarchy levels. Entities are discrete business elements that are used during a business transaction. Data types are used to type object entities and interfaces with a structure. For example, ServicePartDemandHistoriesCancelConfirmationMessage message 53000 includes, among other things, ServicePartDemandHistoryCancelConfirmationMessage 53006. Accordingly, heterogeneous applications may communicate using this consistent message configured as such.

Figure 54:
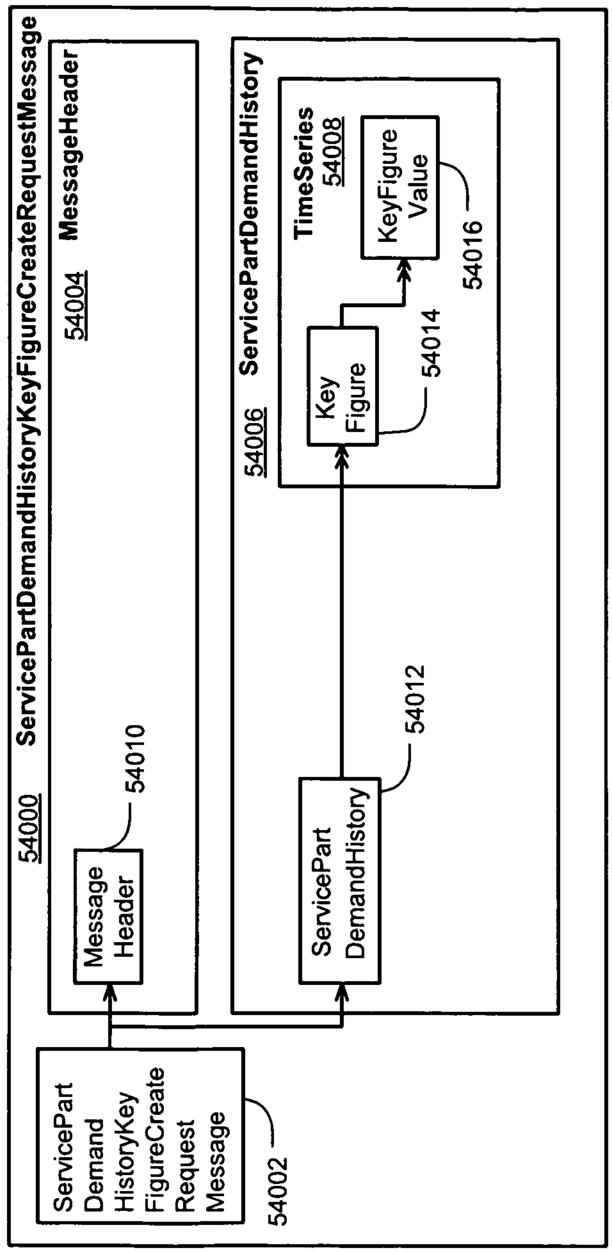
FIG. 54 shows an exemplary ServicePartDemandHistoryKeyFigureCreateRequestMessage Message Data Type.

Additionally, FIG. 54 illustrates one example logical configuration of ServicePartDemandHistoryKeyFigureCreateRequestMessage message 54000. Specifically, this figure depicts the arrangement and hierarchy of various components such as one or more levels of packages, entities, and datatypes, shown here as 54000 through 54016. As described above, packages may be used to represent hierarchy levels. Entities are discrete business elements that are used during a business transaction. Data types are used to type object entities and interfaces with a structure. For example, ServicePartDemandHistoryKeyFigureCreate RequestMessage message 54000 includes, among other things, ServicePartDemandHistory 54006. Accordingly, heterogeneous applications may communicate using this consistent message configured as such.

Figure 55:
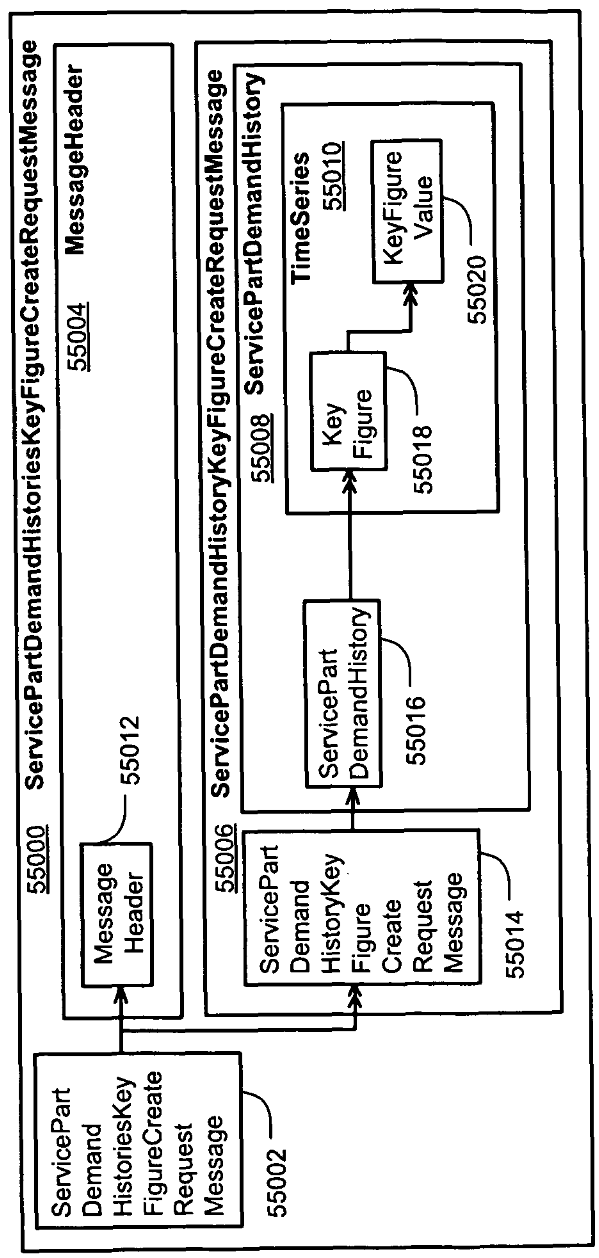
FIG. 55 shows an exemplary ServicePartDemandHistoriesKeyFigureCreateRequestMessage Message Data Type.

Additionally, FIG. 55 illustrates one example logical configuration of ServicePartDemandHistoriesKeyFigureCreateRequestMessage message 55000. Specifically, this figure depicts the arrangement and hierarchy of various components such as one or more levels of packages, entities, and datatypes, shown here as 55000 through 55020. As described above, packages may be used to represent hierarchy levels. Entities are discrete business elements that are used during a business transaction. Data types are used to type object entities and interfaces with a structure. For example, ServicePartDemandHistoriesKeyFigureCreateRequestMessage message 55000 includes, among other things, ServicePartDemandHistoryKeyFigureCreateRequestMessage 55006. Accordingly, heterogeneous applications may communicate using this consistent message configured as such.

Figure 56:
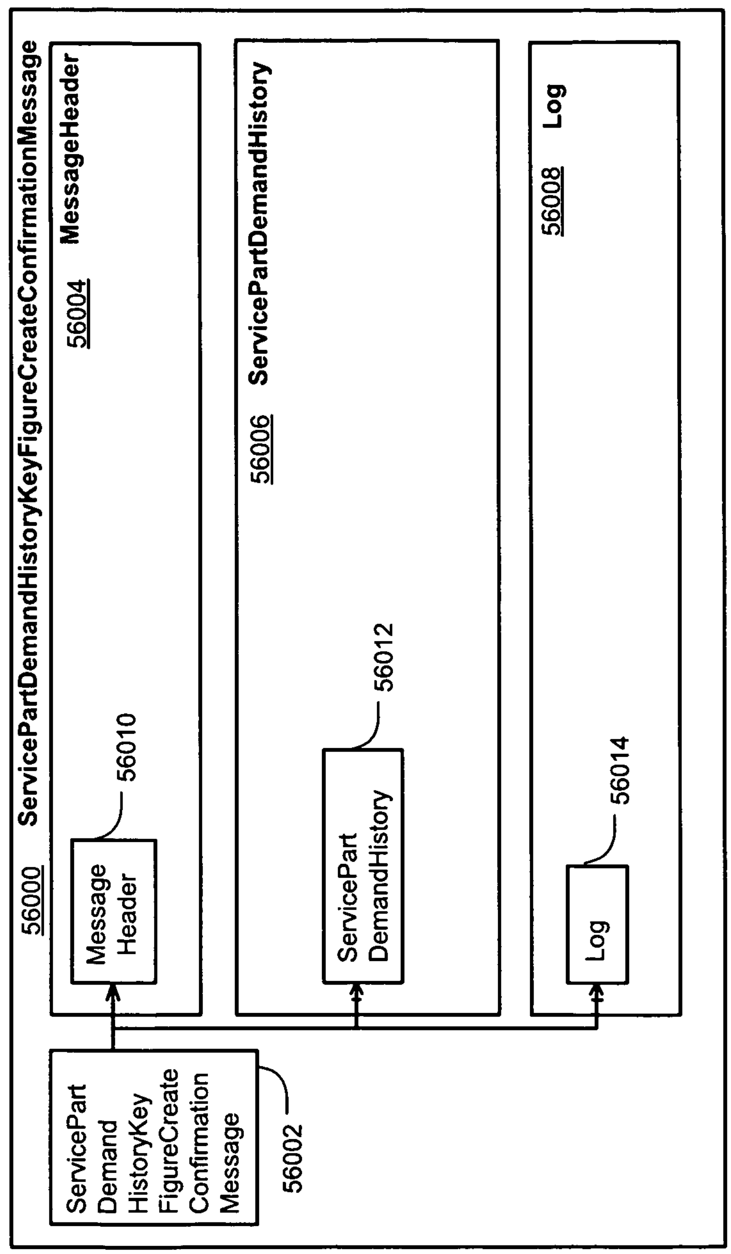
FIG. 56 shows an exemplary ServicePartDemandHistoryKeyFigureCreateConfirmationMessage Message Data Type.

Additionally, FIG. 56 illustrates one example logical configuration of ServicePartDemandHistoryKeyFigureCreateConfirmationMessage message 56000. Specifically, this figure depicts the arrangement and hierarchy of various components such as one or more levels of packages, entities, and datatypes, shown here as 56000 through 56014. As described above, packages may be used to represent hierarchy levels. Entities are discrete business elements that are used during a business transaction. Data types are used to type object entities and interfaces with a structure. For example, ServicePartDemandHistoryKeyFigureCreateConfirmationMessage message 56000 includes, among other things, ServicePartDemandHistory 56006. Accordingly, heterogeneous applications may communicate using this consistent message configured as such.

Figure 57:
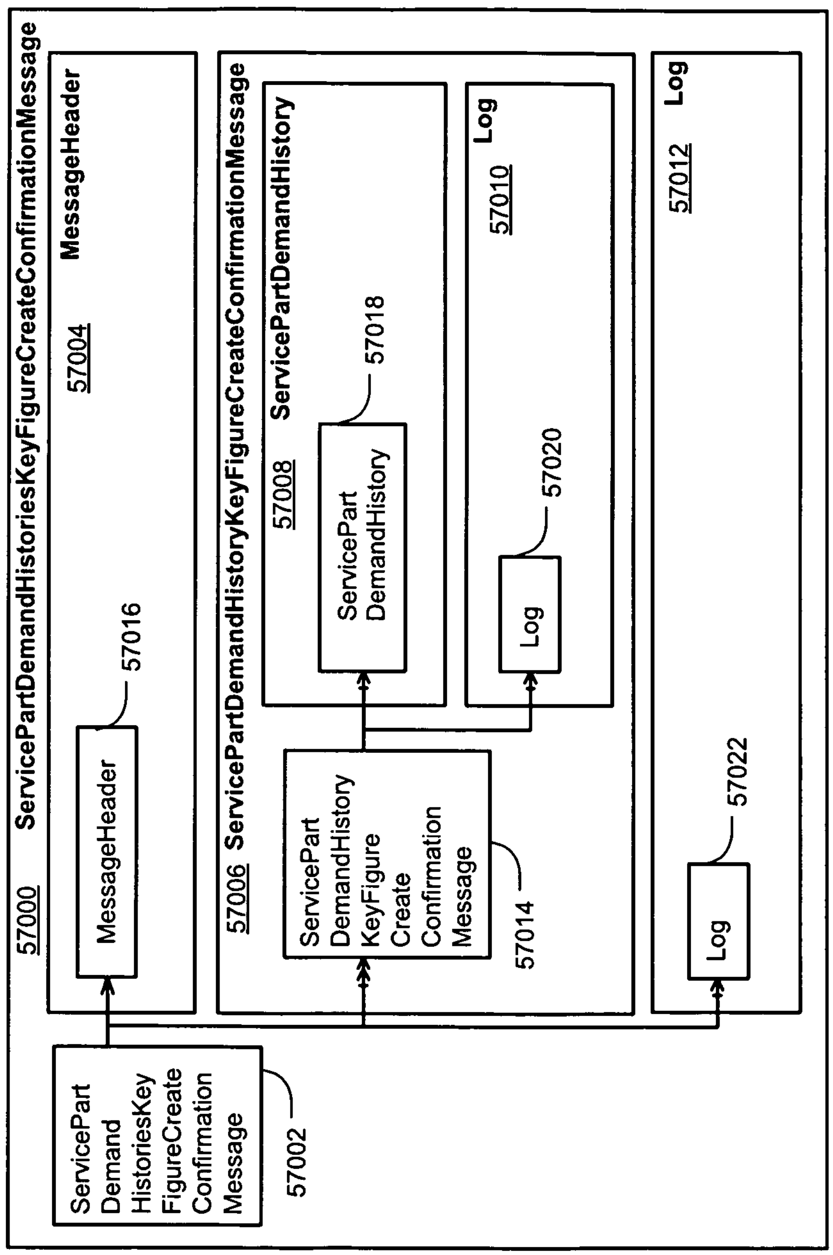
FIG. 57 shows an exemplary ServicePartDemandHistoriesKeyFiguresCreateConfirmationMessage Message Data Type.

Additionally, FIG. 57 illustrates one example logical configuration of ServicePartDemandHistoriesKeyFigureCreateConfirmationMessage message 57000. Specifically, this figure depicts the arrangement and hierarchy of various components such as one or more levels of packages, entities, and datatypes, shown here as 57000 through 57022. As described above, packages may be used to represent hierarchy levels. Entities are discrete business elements that are used during a business transaction. Data types are used to type object entities and interfaces with a structure. For example, ServicePartDemandHistoriesKeyFigureCreateConfirmationMessage message 57000 includes, among other things, ServicePartDemandHistoryKeyFigureCreateConfirmationMessage 57006. Accordingly, heterogeneous applications may communicate using this consistent message configured as such.

Figure 58:
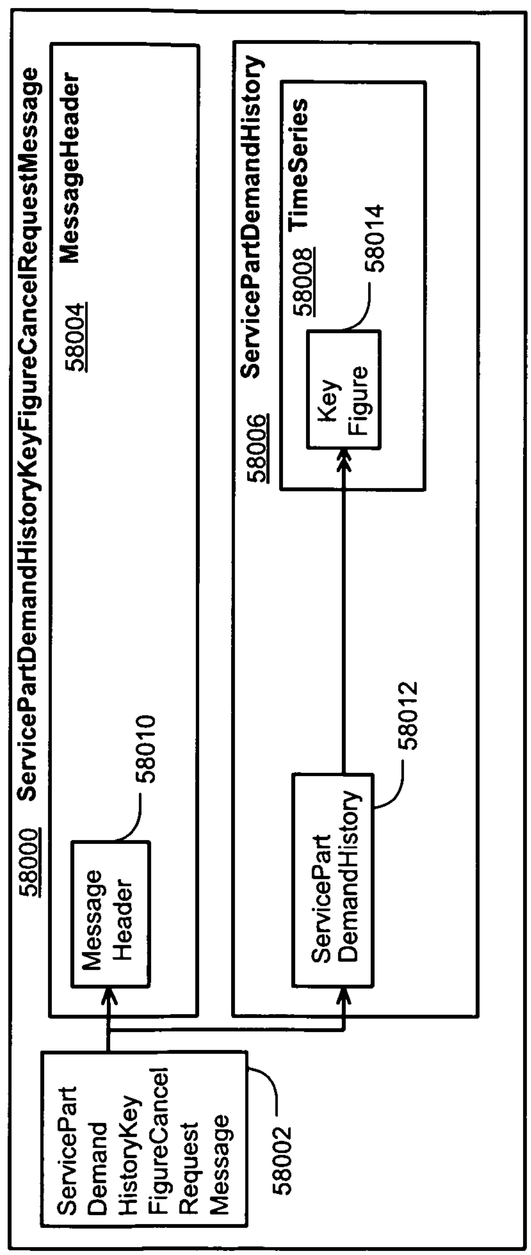
FIG. 58 shows an exemplary ServicePartDemandHistoryKeyFigureCancelRequestMessage Message Data Type.

Additionally, FIG. 58 illustrates one example logical configuration of ServicePartDemandHistoryKeyFigureCancelRequestMessage message 58000. Specifically, this figure depicts the arrangement and hierarchy of various components such as one or more levels of packages, entities, and datatypes, shown here as 58000 through 58014. As described above, packages may be used to represent hierarchy levels. Entities are discrete business elements that are used during a business transaction. Data types are used to type object entities and interfaces with a structure. For example, ServicePartDemandHistoryKeyFigureCancelRequestMessage message 58000 includes, among other things, ServicePartDemandHistory 58006. Accordingly, heterogeneous applications may communicate using this consistent message configured as such.

Figure 59:
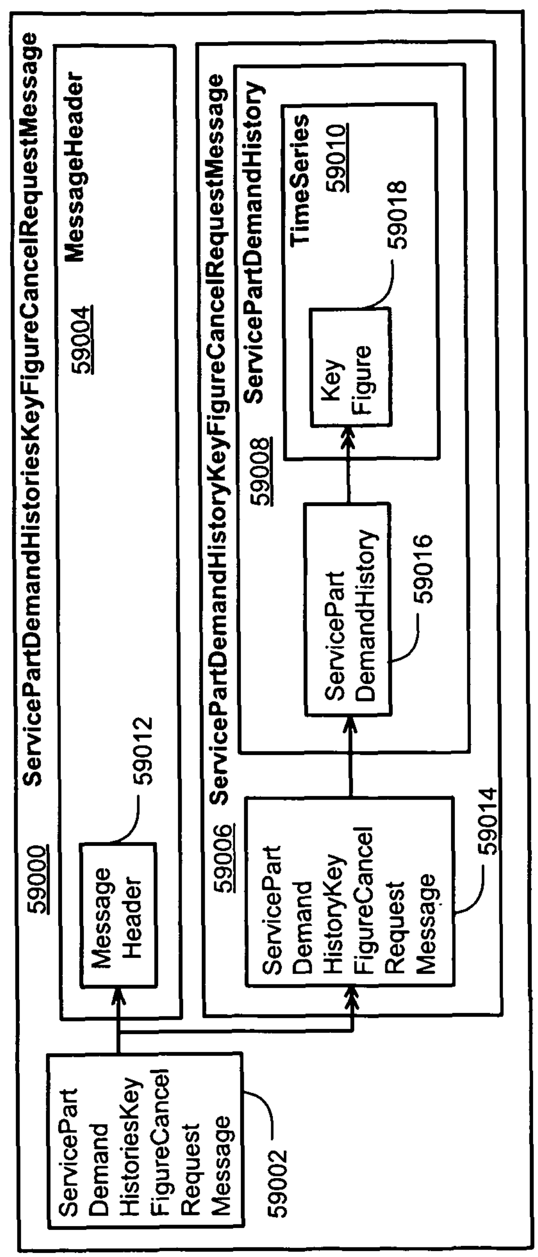
FIG. 59 shows an exemplary ServicePartDemandHistoriesKeyFigureCancelRequestMessage Message Data Type.

Additionally, FIG. 59 illustrates one example logical configuration of ServicePartDemandHistoriesKeyFigureCancelRequestMessage message 59000. Specifically, this figure depicts the arrangement and hierarchy of various components such as one or more levels of packages, entities, and datatypes, shown here as 59000 through 59018. As described above, packages may be used to represent hierarchy levels. Entities are discrete business elements that are used during a business transaction. Data types are used to type object entities and interfaces with a structure. For example, ServicePartDemandHistoriesKeyFigureCancelRequestMessage message 59000 includes, among other things, ServicePartDemandHistoryKeyFigureCancelRequestMessage 59006. Accordingly, heterogeneous applications may communicate using this consistent message configured as such.

Figure 60:
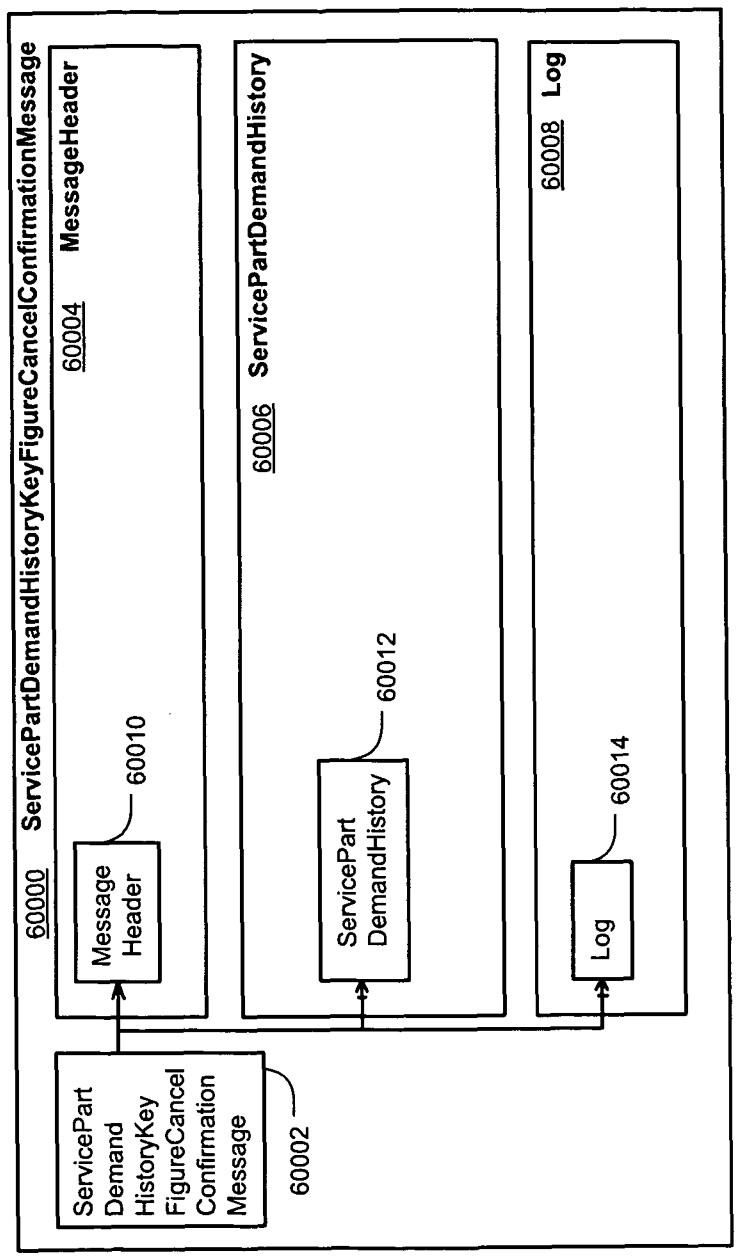
FIG. 60 shows an exemplary ServicePartDemandHistoryKeyFigureCancelConfirmationMessage Message Data Type.

Additionally, FIG. 60 illustrates one example logical configuration of ServicePartDemandHistoryKeyFigureCancelConfirmationMessage message 60000. Specifically, this figure depicts the arrangement and hierarchy of various components such as one or more levels of packages, entities, and datatypes, shown here as 60000 through 60014. As described above, packages may be used to represent hierarchy levels. Entities are discrete business elements that are used during a business transaction. Data types are used to type object entities and interfaces with a structure. For example, ServicePartDemandHistoryKeyFigureCancelConfirmationMessage message 60000 includes, among other things, ServicePartDemandHistory 60006. Accordingly, heterogeneous applications may communicate using this consistent message configured as such.

Figure 61:
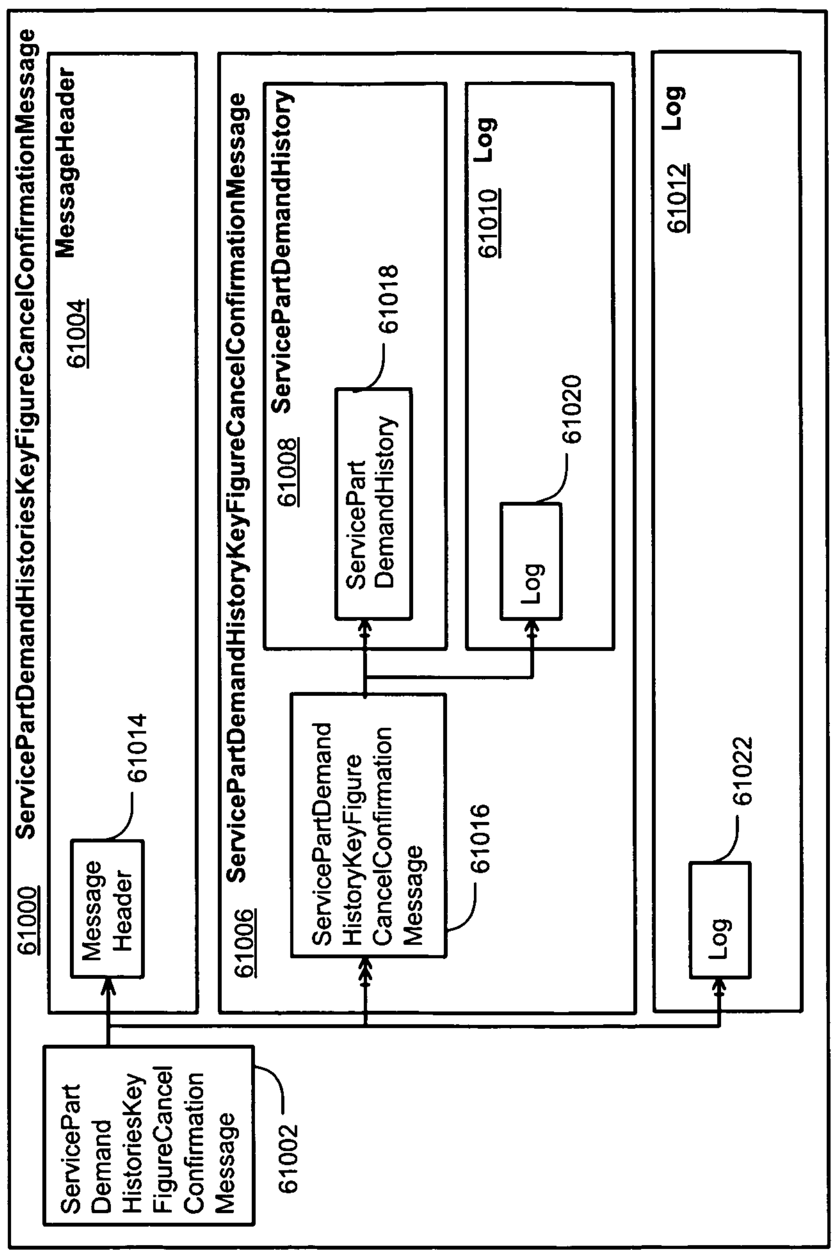
FIG. 61 shows an exemplary ServicePartDemandHistoriesKeyFiguresCancelConfirmationMessage Message Data Type.

Additionally, FIG. 61 illustrates one example logical configuration of ServicePartDemandHistoriesKeyFigureCancelConfirmationMessage message 61000. Specifically, this figure depicts the arrangement and hierarchy of various components such as one or more levels of packages, entities, and datatypes, shown here as 61000 through 61022. As described above, packages may be used to represent hierarchy levels. Entities are discrete business elements that are used during a business transaction. Data types are used to type object entities and interfaces with a structure. For example, ServicePartDemandHistoriesKeyFigureCancelConfirmationMessage message 61000 includes, among other things, ServicePartDemandHistoryKeyFigureCancelConfirmationMessage 61006. Accordingly, heterogeneous applications may communicate using this consistent message configured as such.

Figure 62:
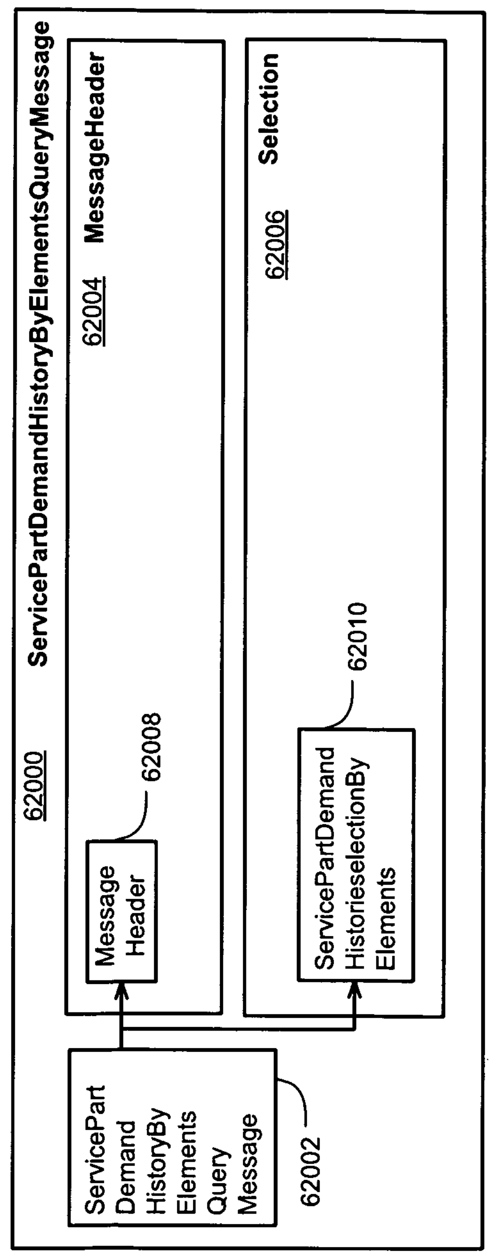
FIG. 62 shows an exemplary ServicePartDemandHistoryByElementsQueryMessage Message Data Type.

Additionally, FIG. 62 illustrates one example logical configuration of ServicePartDemandHistoryByElementsQueryMessage message 62000. Specifically, this figure depicts the arrangement and hierarchy of various components such as one or more levels of packages, entities, and datatypes, shown here as 62000 through 62010. As described above, packages may be used to represent hierarchy levels. Entities are discrete business elements that are used during a business transaction. Data types are used to type object entities and interfaces with a structure. For example, ServicePartDemandHistoryByElementsQueryMessage message 62000 includes, among other things, Selection 62006. Accordingly, heterogeneous applications may communicate using this consistent message configured as such.

Figure 63:
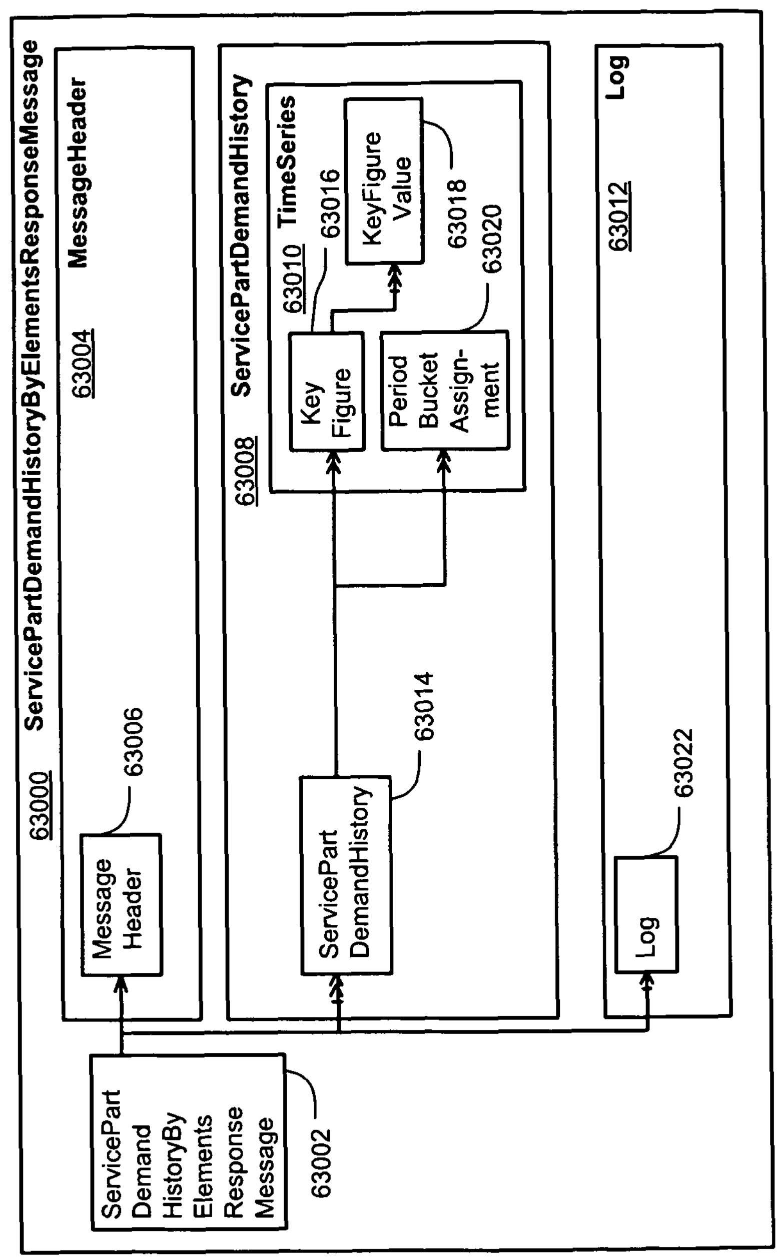
FIG. 63 shows an exemplary ServicePartDemandHistoryByElementsResponseMessage Message Data Type.

Additionally, FIG. 63 illustrates one example logical configuration of ServicePartDemandHistoryByElementsResponseMessage message 63000. Specifically, this figure depicts the arrangement and hierarchy of various components such as one or more levels of packages, entities, and datatypes, shown here as 63000 through 63022. As described above, packages may be used to represent hierarchy levels. Entities are discrete business elements that are used during a business transaction. Data types are used to type object entities and interfaces with a structure. For example, ServicePartDemandHistoryByElementsResponseMessage message 63000 includes, among other things, ServicePartDemandHistory 63008. Accordingly, heterogeneous applications may communicate using this consistent message configured as such.

FIGS. 64-1 through 64-3 illustrate one example logical configuration of a ServicePartDemandHistoriesCancelConfirmationMessage 64000 element structure. Specifically, these figures depict the arrangement and hierarchy of various components such as one or more levels of packages, entities, and datatypes, shown here as 64000 through 64078. As described above, packages may be used to represent hierarchy levels. Entities are discrete business elements that are used during a business transaction. Data types are used to type object entities and interfaces with a structure. For example, the ServicePartDemandHistoriesCancelConfirmationMessage 64000 includes, among other things, a ServicePartDemandHistoriesCancelConfirmationMessage 64002. Accordingly, heterogeneous applications may communicate using this consistent message configured as such.

FIGS. 65-1 through 65-3 illustrate one example logical configuration of a ServicePartDemandHistoriesCancelRequestMessage 65000 element structure. Specifically, these figures depict the arrangement and hierarchy of various components such as one or more levels of packages, entities, and datatypes, shown here as 65000 through 65062. As described above, packages may be used to represent hierarchy levels. Entities are discrete business elements that are used during a business transaction. Data types are used to type object entities and interfaces with a structure. For example, the ServicePartDemandHistoriesCancelRequestMessage 65000 includes, among other things, a ServicePartDemandHistoriesCancelRequestMessage 65002. Accordingly, heterogeneous applications may communicate using this consistent message configured as such.

FIGS. 66-1 through 66-3 illustrate one example logical configuration of a ServicePartDemandHistoriesChangeConfirmationMessage 66000 element structure. Specifically, these figures depict the arrangement and hierarchy of various components such as one or more levels of packages, entities, and datatypes, shown here as 66000 through 66078. As described above, packages may be used to represent hierarchy levels. Entities are discrete business elements that are used during a business transaction. Data types are used to type object entities and interfaces with a structure. For example, the ServicePartDemandHistoriesChangeConfirmationMessage 66000 includes, among other things, a ServicePartDemandHistoriesChangeConfirmationMessage 66002. Accordingly, heterogeneous applications may communicate using this consistent message configured as such.

FIGS. 67-1 through 67-5 illustrate one example logical configuration of a ServicePartDemandHistoriesChangeRequestMessage 67000 element structure. Specifically, these figures depict the arrangement and hierarchy of various components such as one or more levels of packages, entities, and datatypes, shown here as 67000 through 67124. As described above, packages may be used to represent hierarchy levels. Entities are discrete business elements that are used during a business transaction. Data types are used to type object entities and interfaces with a structure. For example, the ServicePartDemandHistoriesChangeRequestMessage 67000 includes, among other things, a ServicePartDemandHistoriesChangeRequestMessage 67002. Accordingly, heterogeneous applications may communicate using this consistent message configured as such.

FIGS. 68-1 through 68-3 illustrate one example logical configuration of a ServicePartDemandHistoriesCreateConfirmationMessage 68000 element structure. Specifically, these figures depict the arrangement and hierarchy of various components such as one or more levels of packages, entities, and datatypes, shown here as 68000 through 68078. As described above, packages may be used to represent hierarchy levels. Entities are discrete business elements that are used during a business transaction. Data types are used to type object entities and interfaces with a structure. For example, the ServicePartDemandHistoriesCreateConfirmationMessage 68000 includes, among other things, a ServicePartDemandHistoriesCreateConfirmationMessage 68002. Accordingly, heterogeneous applications may communicate using this consistent message configured as such.

FIGS. 69-1 through 69-5 illustrate one example logical configuration of a ServicePartDemandHistoriesCreateRequestMessage 69000 element structure. Specifically, these figures depict the arrangement and hierarchy of various components such as one or more levels of packages, entities, and datatypes, shown here as 69000 through 69118. As described above, packages may be used to represent hierarchy levels. Entities are discrete business elements that are used during a business transaction. Data types are used to type object entities and interfaces with a structure. For example, the ServicePartDemandHistoriesCreateRequestMessage 69000 includes, among other things, a ServicePartDemandHistoriesCreateRequestMessage 69002. Accordingly, heterogeneous applications may communicate using this consistent message configured as such.

FIGS. 70-1 through 70-3 illustrate one example logical configuration of a ServicePartDemandHistoriesKeyFigureCancelConfirmationMessage 70000 element structure. Specifically, these figures depict the arrangement and hierarchy of various components such as one or more levels of packages, entities, and datatypes, shown here as 70000 through 70078. As described above, packages may be used to represent hierarchy levels. Entities are discrete business elements that are used during a business transaction. Data types are used to type object entities and interfaces with a structure. For example, the ServicePartDemandHistoriesKeyFigureCancelConfirmationMessage 70000 includes, among other things, a ServicePartDemandHistoriesKeyFigureCancelConfirmationMessage 70002. Accordingly, heterogeneous applications may communicate using this consistent message configured as such.

FIGS. 71-1 through 71-3 illustrate one example logical configuration of a ServicePartDemandHistoriesKeyFigureCancelRequestMessage 71000 element structure. Specifically, these figures depict the arrangement and hierarchy of various components such as one or more levels of packages, entities, and datatypes, shown here as 71000 through 71076. As described above, packages may be used to represent hierarchy levels. Entities are discrete business elements that are used during a business transaction. Data types are used to type object entities and interfaces with a structure. For example, the ServicePartDemandHistoriesKeyFigureCancelRequestMessage 71000 includes, among other things, a ServicePartDemandHistoriesKeyFigureCancelRequestMessage 71002. Accordingly, heterogeneous applications may communicate using this consistent message configured as such.

FIGS. 72-1 through 72-3 illustrate one example logical configuration of a ServicePartDemandHistoriesKeyFigureCreateConfirmationMessage 72000 element structure. Specifically, these figures depict the arrangement and hierarchy of various components such as one or more levels of packages, entities, and datatypes, shown here as 72000 through 72078. As described above, packages may be used to represent hierarchy levels. Entities are discrete business elements that are used during a business transaction. Data types are used to type object entities and interfaces with a structure. For example, the ServicePartDemandHistoriesKeyFigureCreateConfirmationMessage 72000 includes, among other things, a ServicePartDemandHistoriesKeyFigureCreateConfirmationMessage 72002. Accordingly, heterogeneous applications may communicate using this consistent message configured as such.

FIGS. 73-1 through 73-4 illustrate one example logical configuration of a ServicePartDemandHistoriesKeyFigureCreateRequestMessage 73000 element structure. Specifically, these figures depict the arrangement and hierarchy of various components such as one or more levels of packages, entities, and datatypes, shown here as 73000 through 73100. As described above, packages may be used to represent hierarchy levels. Entities are discrete business elements that are used during a business transaction. Data types are used to type object entities and interfaces with a structure. For example, the ServicePartDemandHistoriesKeyFigureCreateRequestMessage 73000 includes, among other things, a ServicePartDemandHistoriesKeyFigureCreateRequestMessage 73002. Accordingly, heterogeneous applications may communicate using this consistent message configured as such.

FIGS. 74-1 through 74-5 illustrate one example logical configuration of a ServicePartDemandHistoryByElementsQueryMessage 74000 element structure. Specifically, these figures depict the arrangement and hierarchy of various components such as one or more levels of packages, entities, and datatypes, shown here as 74000 through 74126. As described above, packages may be used to represent hierarchy levels. Entities are discrete business elements that are used during a business transaction. Data types are used to type object entities and interfaces with a structure. For example, the ServicePartDemandHistoryByElementsQueryMessage 74000 includes, among other things, a ServicePartDemandHistoryByElementsQueryMessage 74002. Accordingly, heterogeneous applications may communicate using this consistent message configured as such.

FIGS. 75-1 through 75-5 illustrate one example logical configuration of a ServicePartDemandHistoryByElementsResponseMessage 75000 element structure. Specifically, these figures depict the arrangement and hierarchy of various components such as one or more levels of packages, entities, and datatypes, shown here as 75000 through 75124. As described above, packages may be used to represent hierarchy levels. Entities are discrete business elements that are used during a business transaction. Data types are used to type object entities and interfaces with a structure. For example, the ServicePartDemandHistoryByElementsResponseMessage 75000 includes, among other things, a ServicePartDemandHistoryByElementsResponseMessage 75002. Accordingly, heterogeneous applications may communicate using this consistent message configured as such.

FIGS. 76-1 through 76-2 illustrate one example logical configuration of a ServicePartDemandHistoryCancelConfirmationMessage 76000 element structure. Specifically, these figures depict the arrangement and hierarchy of various components such as one or more levels of packages, entities, and datatypes, shown here as 76000 through 76062. As described above, packages may be used to represent hierarchy levels. Entities are discrete business elements that are used during a business transaction. Data types are used to type object entities and interfaces with a structure. For example, the ServicePartDemandHistoryCancelConfirmationMessage 76000 includes, among other things, a ServicePartDemandHistoryCancelConfirmationMessage 76002. Accordingly, heterogeneous applications may communicate using this consistent message configured as such.

FIGS. 77-1 through 77-2 illustrate one example logical configuration of a ServicePartDemandHistoryCancelRequestMessage 77000 element structure. Specifically, these figures depict the arrangement and hierarchy of various components such as one or more levels of packages, entities, and datatypes, shown here as 77000 through 77054. As described above, packages may be used to represent hierarchy levels. Entities are discrete business elements that are used during a business transaction. Data types are used to type object entities and interfaces with a structure. For example, the ServicePartDemandHistoryCancelRequestMessage 77000 includes, among other things, a ServicePartDemandHistoryCancelRequestMessage 77002. Accordingly, heterogeneous applications may communicate using this consistent message configured as such.

FIGS. 78-1 through 78-2 illustrate one example logical configuration of a ServicePartDemandHistoryChangeConfirmationMessage 78000 element structure. Specifically, these figures depict the arrangement and hierarchy of various components such as one or more levels of packages, entities, and datatypes, shown here as 78000 through 78062. As described above, packages may be used to represent hierarchy levels. Entities are discrete business elements that are used during a business transaction. Data types are used to type object entities and interfaces with a structure. For example, the ServicePartDemandHistoryChangeConfirmationMessage 78000 includes, among other things, a ServicePartDemandHistoryChangeConfirmationMessage 78002. Accordingly, heterogeneous applications may communicate using this consistent message configured as such.

FIGS. 79-1 through 79-4 illustrate one example logical configuration of a ServicePartDemandHistoryChangeRequestMessage 79000 element structure. Specifically, these figures depict the arrangement and hierarchy of various components such as one or more levels of packages, entities, and datatypes, shown here as 79000 through 79116. As described above, packages may be used to represent hierarchy levels. Entities are discrete business elements that are used during a business transaction. Data types are used to type object entities and interfaces with a structure. For example, the ServicePartDemandHistoryChangeRequestMessage 79000 includes, among other things, a ServicePartDemandHistoryChangeRequestMessage 79002. Accordingly, heterogeneous applications may communicate using this consistent message configured as such.

FIGS. 80-1 through 80-2 illustrate one example logical configuration of a ServicePartDemandHistoryCreateConfirmationMessage 80000 element structure. Specifically, these figures depict the arrangement and hierarchy of various components such as one or more levels of packages, entities, and datatypes, shown here as 80000 through 80062. As described above, packages may be used to represent hierarchy levels. Entities are discrete business elements that are used during a business transaction. Data types are used to type object entities and interfaces with a structure. For example, the ServicePartDemandHistoryCreateConfirmationMessage 80000 includes, among other things, a ServicePartDemandHistoryCreateConfirmationMessage 80002. Accordingly, heterogeneous applications may communicate using this consistent message configured as such.

FIGS. 81-1 through 81-4 illustrate one example logical configuration of a ServicePartDemandHistoryCreateRequestMessage 81000 element structure. Specifically, these figures depict the arrangement and hierarchy of various components such as one or more levels of packages, entities, and datatypes, shown here as 81000 through 81110. As described above, packages may be used to represent hierarchy levels. Entities are discrete business elements that are used during a business transaction. Data types are used to type object entities and interfaces with a structure. For example, the ServicePartDemandHistoryCreateRequestMessage 81000 includes, among other things, a ServicePartDemandHistoryCreateRequestMessage 81002. Accordingly, heterogeneous applications may communicate using this consistent message configured as such.

FIGS. 82-1 through 82-2 illustrate one example logical configuration of a ServicePartDemandHistoryKeyFigureCancelConfirmationMessage 82000 element structure. Specifically, these figures depict the arrangement and hierarchy of various components such as one or more levels of packages, entities, and datatypes, shown here as 82000 through 82062. As described above, packages may be used to represent hierarchy levels. Entities are discrete business elements that are used during a business transaction. Data types are used to type object entities and interfaces with a structure. For example, the ServicePartDemandHistoryKeyFigureCancelConfirmationMessage 82000 includes, among other things, a ServicePartDemandHistoryKeyFigureCancelConfirmationMessage 82002. Accordingly, heterogeneous applications may communicate using this consistent message configured as such.

FIGS. 83-1 through 83-3 illustrate one example logical configuration of a ServicePartDemandHistoryKeyFigureCancelRequestMessage 83000 element structure. Specifically, these figures depict the arrangement and hierarchy of various components such as one or more levels of packages, entities, and datatypes, shown here as 83000 through 83068. As described above, packages may be used to represent hierarchy levels. Entities are discrete business elements that are used during a business transaction. Data types are used to type object entities and interfaces with a structure. For example, the ServicePartDemandHistoryKeyFigureCancelRequestMessage 83000 includes, among other things, a ServicePartDemandHistoryKeyFigureCancelRequestMessage 83002. Accordingly, heterogeneous applications may communicate using this consistent message configured as such.

FIGS. 84-1 through 84-2 illustrate one example logical configuration of a ServicePartDemandHistoryKeyFigureCreateConfirmationMessage 84000 element structure. Specifically, these figures depict the arrangement and hierarchy of various components such as one or more levels of packages, entities, and datatypes, shown here as 84000 through 84062. As described above, packages may be used to represent hierarchy levels. Entities are discrete business elements that are used during a business transaction. Data types are used to type object entities and interfaces with a structure. For example, the ServicePartDemandHistoryKeyFigureCreateConfirmationMessage 84000 includes, among other things, a ServicePartDemandHistoryKeyFigureCreateConfirmationMessage 84002. Accordingly, heterogeneous applications may communicate using this consistent message configured as such.

FIGS. 85-1 through 85-4 illustrate one example logical configuration of a ServicePartDemandHistoryKeyFigureCreateRequestMessage 85000 element structure. Specifically, these figures depict the arrangement and hierarchy of various components such as one or more levels of packages, entities, and datatypes, shown here as 85000 through 85092. As described above, packages may be used to represent hierarchy levels. Entities are discrete business elements that are used during a business transaction. Data types are used to type object entities and interfaces with a structure. For example, the ServicePartDemandHistoryKeyFigureCreateRequestMessage 85000 includes, among other things, a ServicePartDemandHistoryKeyFigureCreateRequestMessage 85002. Accordingly, heterogeneous applications may communicate using this consistent message configured as such.

Message Data Type ServicePartDemandHistoryTemplateMessage

The message data type ServicePartDemandHistoryTemplateMessage includes the ServicePartDemandHistory included in the business document and the business information that is relevant for sending a business document in a message. It includes the MessageHeader package, the ServicePartDemandHistory package, and the Log package. The message data type ServicePartDemandHistoryTemplateMessage is used as an abstract message data type, which unifies all packages and entities for the following concrete message data types: ServicePartDemandHistoryCreateRequestMessage, ServicePartDemandHistoryCreateConfirmationMessage, ServicePartDemandHistoryChangeRequestMessage, ServicePartDemandHistoryChangeConfirmationMessage, ServicePartDemandHistoryCancelRequestMessage, ServicePartDemandHistoryCancelConfirmationMessage, ServicePartDemandHistoryKeyFigureCreateRequestMessage, ServicePartDemandHistoryKeyFigureCreateConfirmationMessage, ServicePartDemandHistoryKeyFigureCancelRequestMessage, ServicePartDemandHistoryKeyFigureCancelConfirmationMessage, and ServicePartDemandHistoryByElementsResponseMessage.

The following table shows the packages and entities of the abstract message data type ServicePartDemandHistoryTemplateMessage that are used in the above mentioned concrete message data types:

| | Package/Entity | | | | | |
|---|---|---|---|---|---|---|
| Message data type | Message header | ServicePart-Demand-History | TimeSeries/KeyFigure | TimeSeries/KeyFigureValue | TimeSeries/Period-Bucket-Assignment | Log |
| ServicePartDemandHistoryCreateRequestMessage | 1:1 | 1:1 | 1:n | 1:n | 1:n | |
| ServicePartDemandHistoryCreateConfirmationMessage | 1:1 | 1:c | | | | 1:c |

-continued

| Message data type | Package/Entity | | | | | |
|---|---|---|---|---|---|---|
| | Message header | ServicePart-Demand-History | TimeSeries/KeyFigure | TimeSeries/KeyFigureValue | TimeSeries/Period-Bucket-Assignment | Log |
| ServicePartDemandHistoryChangeRequestMessage | 1:1 | 1:1 | 1:n | 1:cn | 1:n | |
| ServicePartDemandHistoryChangeConfirmationMessage | 1:1 | 1:c | | | | 1:c |
| ServicePartDemandHistoryCancelRequestMessage | 1:1 | 1:1 | | | | |
| ServicePartDemandHistoryCancelConfirmationMessage | 1:1 | 1:c | | | | 1:c |
| ServicePartDemandHistoryKeyFigureCreateRequestMessage | 1:1 | 1:1 | 1:n | 1:n | 1:n | |
| ServicePartDemandHistoryKeyFigureCreateConfirmationMessage | 1:1 | 1:c | 1:cn | | | 1:c |
| ServicePartDemandHistoryKeyFigureCancelRequestMessage | 1:1 | 1:1 | 1:n | | | |
| ServicePartDemandHistoryKeyFigureCancelConfirmationMessage | 1:1 | 1:c | 1:cn | | | 1:c |
| ServicePartDemandHistoryByElementsResponseMessage | 1:1 | 1:cn | 1:n | 1:cn | 1:n | 1:c |

A MessageHeader package groups the business information that is relevant for sending a business document in a message. The MessageHeader package includes the MessageHeader entity. A MessageHeader groups business information from the perspective of the sending application, such as information to identify the business document in a message, information about the sender, and (possibly) information about the recipient. The MessageHeader includes SenderParty and RecipientParty. MessageHeader is of type GDT:BusinessDocumentMessageHeader, whereby the following elements of the GDT are used: ID, ReferenceID, SenderParty, and RecipientParty. A SenderParty is the party responsible for sending a business document at a business application level. The SenderParty is of type GDT:BusinessDocumentMessageHeaderParty. A RecipientParty is the party responsible for receiving a business document at a business application level. The RecipientParty is of type GDT: BusinessDocumentMessageHeaderParty.

The ServicePartDemandHistory package groups the Service Part Demand History with the package TimeSeries. A ServicePartDemandHistory entity identifies a time series of demands in the past in a Service Parts Planning environment. The elements at the ServicePartDemandHistory entity can include: HistoryID, ProductID, LocationID, VirtualChildIndicator, and ThirdPartyOrderProcessingIndicator. HistoryID identifies the ServicePartDemandHistory and may be based on GDT:ServicePartDemandHistoryID. PlanningVersionID identifies a planning version referenced by the demand history (key field), and may be based on GDT:PlanningVersionID. ProductID identifies a product referenced by the demand history (key field), and may be based on GDT: ProductID. LocationID identifies a location referenced by the demand history (key field), and may be based on GDT:LocationID. VirtualChildIndicator indicates whether the location ID represents a virtual child location or not (key field), and may be based on GDT:Indicator with a qualifier of BODVirtualChildIndicator. ThirdPartyOrderProcessingIndicator indicates whether the product-location combination is used in the context of a third-party deal or not (key field), and may be based on GDT:Indicator and Qualifier:BusinessTransactionDocumentItemThirdParty. A ServicePartDemandHistory can be defined, for example, by the key fields (elements) PlanningVersionID, ProductID, LocationID, VirtualChildIndicator, and ThirdPartyOrderProcessingIndicator or the HistoryID.

The TimeSeries package groups the information used to define a grid of time-dependent historical demand types. TimeSeries includes the following entities: KeyFigure, KeyFigureValue, and PeriodBucketAssignment. A KeyFigure entity represents a historical demand type, such as demand in pieces or order items. The entity KeyFigure may be based on type GDT:TimeSeriesKeyFigure and can include the elements Code, UnitOfMeasureCode, and KeyFigureValue. Code is a coded name of the key figure and may be based on GDT:TimeSeriesKeyFigureCode. UnitOfMeasureCode is a unit of measure of all key figure values in the time series for this specific key figure, and may be based on GDT:MeasureUnitCode. KeyFigureValue includes the values of the key figure, and may be based on GDT:TimeSeriesKeyFigureTimeBucketValue.

A KeyFigureValue entity is the value of a historical demand type in a time bucket. The entity KeyFigureValue may be of type GDT:TimeSeriesKeyFigureTimeBucketValue and can include the TimeBucketNumberIntValue and KeyFigureFloatValue elements. TimeBucketNumberIntValue is a unique identifying number of a time series period. It is usually a positive number and may be based on GDT:IntegerValue. KeyFigureFloatValue is a value of a key figure in the time bucket and may be based on GDT: FloatValue. In some implementations, TimeBucketNumberIntValue is related to an existing period-bucket assignment.

A PeriodBucketAssignment entity defines the time range that is represented by a time bucket. The entity PeriodBucketAssignment may be of type GDT:TimeSeriesPeriodTimeBucketAssignment and can include the elements TimeBucketNumberIntValue, StartDateTime, and EndDateTime. TimeBucketNumberIntValue is a unique identifying number of a time series period. It is usually a positive number and may be based on GDT:IntegerValue. StartDateTime defines the start date and time of the time bucket in time zone UTC (Coordinated Universal Time), and may be based on GDT: GLOBAL_DateTime. EndDateTime defines the end date and time of the time bucket in time zone UTC, and may be based on GDT:GLOBAL_DateTime.

A log is a sequence of messages that result when an application executes a task. The entity Log is of type GDT:Log. In some implementations, the Log package is used in the message data types used for outbound messages from the perspective of the Service Parts Planning owner. The following message data types, and possibly other types, use the Log package: ServicePartDemandHistoryCreateConfirmationMessage, ServicePartDemandHistoriesCreateConfirmationMessage, ServicePartDemandHistoryChangeConfirmationMessage, ServicePartDemand HistoriesChangeConfirmationMessage, ServicePartDemandHistoryCancelConfirmationMessage, ServicePartDemandHistoriesCancelConfirmationMessage, ServicePartDemandHistoryKeyFigureCreate ConfirmationMessage, Service PartDemandHistoriesKeyFigureCreateConfirmation Message, ServicePartDemandHistoryKeyFigureCancel ConfirmationMessage, ServicePartDemandHistoriesKeyFigure CancelConfirmationMessage, and ServicePartDemandHistoryByElementsResponseMessage.

Message Data Type ServicePartDemandHistoryCreateRequestMessage

The message data type ServicePartDemandHistoryCreateRequestMessage includes the ServicePartDemandHistory included in the business document and the business information that is relevant for sending a business document in a message. It includes the MessageHeader package and ServicePartDemandHistory package. The ServicePartDemandHistory package groups the demand history with the package TimeSeries. A ServicePartDemandHistory entity identifies a time series of demands in the past in a Service Parts Planning environment. The elements at the ServicePartDemandHistory entity can include: PlanningVersionID, ProductID, LocationID, VirtualChildIndicator, and ThirdPartyOrderProcessingIndicator. PlanningVersionID identifies a planning version referenced by the demand history (key field), and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty.

A ServicePartDemandHistory can be defined either by the key fields (elements) PlanningVersionID, ProductID, LocationID, VirtualChildIndicator, and ThirdPartyOrderProcessingIndicator or the HistoryID. The TimeSeries package groups the information used to define a grid of time-dependent historical demand types. It includes the KeyFigure, KeyFigureValue, and PeriodBucketAssignment entities. A KeyFigure entity represents a historical demand type, such as demand in pieces or order items. The entity KeyFigure may be of type GDT:TimeSeriesKeyFigure and can include the elements Code, UnitOfMeasureCode, and KeyFigureValue. Code is a coded name of the key figure and may be based on GDT:TimeSeriesKeyFigureCode. UnitOfMeasureCode is a unit of measure of key figure values in the time series for this specific key figure, and may be based on GDT:MeasureUnitCode. KeyFigureValue includes the values of the key figure, and may be based on GDT:TimeSeriesKeyFigureTimeBucketValue. The key figures used can come from the pool of key figures for demand history at the Service Parts Planning owner side.

A KeyFigureValue entity is the value of a historical demand type in a time bucket. The entity KeyFigureValue may be of type GDT:TimeSeriesKeyFigureTimeBucketValue and can include the elements TimeBucketNumberIntValue and KeyFigureFloatValue. TimeBucketNumberIntValue is a unique identifying number of a time series period. It is usually a positive number and may be based on GDT:IntegerValue. KeyFigureFloatValue is a value of a key figure in the time bucket and may be based on GDT: FloatValue. In some implementations, TimeBucketNumberIntValue is related to an existing period-bucket assignment.

A PeriodBucketAssignment entity defines the time range that is represented by a time bucket. The entity PeriodBucketAssignment may be of type GDT:TimeSeriesPeriodTimeBucketAssignment and can include the elements TimeBucketNumberIntValue, StartDateTime, and EndDateTime. TimeBucketNumberIntValue is a unique identifying number of a time series period. It is usually a positive number and may be based on GDT:IntegerValue. StartDateTime defines the start date and time of the time bucket in time zone UTC, and may be based on GDT:GLOBAL_DateTime. EndDateTime defines the end date and time of the time bucket in time zone UTC, and may be based on GDT:GLOBAL_DateTime.

Message Data Type ServicePartDemandHistoriesCreateRequestMessage

The message data type ServicePartDemandHistoriesCreateRequestMessage includes the ServicePartDemandHistoryCreateRequestMessage and the business information that is relevant for sending a business document in the message. It includes the MessageHeader package and ServicePartDemandHistoryCreateRequestMessage.

Message Data Type ServicePartDemandHistoryCreateConfirmationMessage

The message data type ServicePartDemandHistoryCreateConfirmationMessage includes the ServicePartDemandHistory included in the business document and the business information that is relevant for sending a business document in a message. It includes the MessageHeader package, the ServicePartDemandHistory package, and the Log package. In some implementations, if an error occurs when creating the ServicePartDemandHistory, the creation of the whole ServicePartDemandHistory is aborted and no ServicePartDemandHistory entity is returned in the confirmation message.

The ServicePartDemandHistory package includes the demand history. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory, and may be based on GDT: ServicePartDemandHistoryID. PlanningVersionID identifies a planning version referenced by the demand history (key field), and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

Message Data Type ServicePartDemandHistoriesCreateConfirmationMessage

The message data type ServicePartDemandHistoriesCreateConfirmationMessage includes ServicePartDemandHistoryCreateConfirmationMessage and the business information that is relevant for sending a business document in the message. It includes the MessageHeader package and ServicePartDemandHistoryCreateConfirmationMessage.

Message Data Type ServicePartDemandHistoryChangeRequestMessage

The message data type ServicePartDemandHistoryChangeRequestMessage includes the ServicePartDemandHistory included in the business document and the business information that is relevant for sending a business document in a message. It includes the MessageHeader package and ServicePartDemandHistory package.

The ServicePartDemandHistory package groups the demand history with the package TimeSeries. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory and may be based on GDT: ServicePartDemandHistoryID. PlanningVersionID identifies a planning version referenced by the demand history (key field), and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

The TimeSeries package groups the information used to define a grid of time-dependent historical demand types. It includes the entities: KeyFigure, KeyFigureValue, and PeriodBucketAssignment. A KeyFigure entity represents a historical demand type, such as demand in pieces or order items. The entity KeyFigure may be of type GDT:TimeSeriesKeyFigure and can include the elements Code, UnitOfMeasureCode, and KeyFigureValue. Code is a coded name of the key figure and may be based on GDT:TimeSeriesKeyFigureCode. UnitOfMeasureCode is a unit of measure of all key figure values in the time series for this specific key figure, and may be based on GDT:MeasureUnitCode. KeyFigureValue includes the values of the key figure, and may be based on GDT:TimeSeriesKeyFigureTimeBucketValue. In some implementations, the key figures used come from the pool of key figures for demand history at the Service Parts Planning owner side. In some implementations, the provided key figures are changed, while other existing key figures remain unchanged.

A KeyFigureValue entity is the value of a historical demand type in a time bucket. The entity KeyFigureValue may be of type GDT:TimeSeriesKeyFigureTimeBucketValue and may include the elements TimeBucketNumberIntValue and KeyFigureFloatValue. TimeBucketNumberIntValue is a unique identifying number of a time series period. It is usually a positive number and may be based on GDT:IntegerValue. KeyFigureFloatValue is a value of a key figure in the time bucket, and may be based on GDT: FloatValue. In some implementations, TimeBucketNumberIntValue is related to an existing period-bucket assignment. In some implementations, the time buckets provided in the PeriodBucketAssignment are changed, while others remain unchanged. In some implementations, the content of a time bucket can be deleted, if the time bucket is provided in the PeriodBucketAssignment, but not in the KeyFigureValue entity.

A PeriodBucketAssignment entity defines the time range that is represented by a time bucket. The entity PeriodBucketAssignment may be of type GDT:TimeSeriesPeriodTimeBucketAssignment and may include the elements TimeBucketNumberIntValue, StartDateTime, and EndDateTime. TimeBucketNumberIntValue is a unique identifying number of a time series period. It is usually a positive number and may be based on GDT:IntegerValue. StartDateTime defines the start date and time of the time bucket in time zone UTC, and may be based on GDT:GLOBAL_DateTime. EndDateTime defines the end date and time of the time bucket in time zone UTC, and may be based on GDT:GLOBAL_DateTime. In some implementations, the time range definition of the time bucket is the same as the definition at the Service Parts Planning owner side. In some implementations, the provided time buckets are changed, while others remain unchanged.

Message Data Type ServicePartDemandHistoriesChangeRequestMessage

The message data type ServicePartDemandHistoriesChangeRequestMessage includes ServicePartDemandHistoryChangeRequestMessage and the business information that is relevant for sending a business document in the message. It includes the MessageHeader package and ServicePartDemandHistoryChangeRequestMessage.

Message Data Type ServicePartDemandHistoryChangeConfirmationMessage

The message data type ServicePartDemandHistoryChangeConfirmationMessage includes the ServicePartDemandHistory included in the business document and the business information that is relevant for sending a business document in a message. It includes the MessageHeader package, ServicePartDemandHistory package, and Log packages. In some implementations, if an error occurs when changing the ServicePartDemandHistory, the change of the whole ServicePartDemandHistory is aborted and no ServicePartDemandHistory entity is returned in the confirmation message.

The ServicePartDemandHistory package includes the demand history. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory and may be based on GDT: ServicePartDemandHistoryID. PlanningVersionID identifies a planning version referenced by the demand history (key field, and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

Message Data Type ServicePartDemandHistoriesChangeConfirmationMessage

The message data type ServicePartDemandHistoriesChangeConfirmationMessage includes ServicePartDemandHistoryChangeConfirmationMessage and the business information that is relevant for sending a business document in the message. It includes the MessageHeader package and ServicePartDemandHistoryChangeConfirmationMessage.

Message Data Type ServicePartDemandHistoryCancelRequestMessage

The message data type ServicePartDemandHistoryCancelRequestMessage includes the ServicePartDemandHistory included in the business document and the business information that is relevant for sending a business document in a message. It includes the MessageHeader package and the ServicePartDemandHistory package.

The ServicePartDemandHistory package includes the demand history. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory and may be based on GDT: ServicePartDemandHistoryID. PlanningVersionID identifies a planning version referenced by the demand history (key field), and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator.

ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

Message Data Type ServicePartDemandHistoriesCancelRequestMessage

The message data type ServicePartDemandHistoriesCancelRequestMessage includes ServicePartDemandHistoryCancelRequestMessage and the business information that is relevant for sending a business document in the message. It includes the MessageHeader package and ServicePartDemandHistoryCancelRequestMessage.

Message Data Type ServicePartDemandHistoryCancelConfirmationMessage

The message data type ServicePartDemandHistoryCancelConfirmationMessage includes the ServicePartDemandHistory included in the business document and the business information that is relevant for sending a business document in a message. It includes the MessageHeader package, ServicePartDemandHistory package, and Log package. In some implementations, if an error occurs when canceling the ServicePartDemandHistory, the cancellation of the whole ServicePartDemandHistory is aborted and no ServicePartDemandHistory entity is returned in the confirmation message.

The ServicePartDemandHistory package includes the demand history. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory and may be based on GDT: ServicePartDemandHistoryID. PlanningVersionID identifies a planning version referenced by the demand history (key field) and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

Message Data Type ServicePartDemandHistoriesCancelConfirmationMessage

The message data type ServicePartDemandHistoriesCancelConfirmationMessage includes ServicePartDemandHistoryCancelConfirmationMessage and the business information that is relevant for sending a business document in the message. It includes the MessageHeader package and ServicePartDemandHistoryCancelConfirmationMessage.

Message Data Type ServicePartDemandHistoryKeyFigureCreateRequestMessage

The message data type ServicePartDemandHistoryKeyFigureCreateRequestMessage includes the ServicePartDemandHistory included in the business document and the business information that is relevant for sending a business document in a message. It includes the MessageHeader package and ServicePartDemandHistory package. In some implementations, the operation fails if one of the KeyFigures or KeyFigureValues could not be created.

The ServicePartDemandHistory package groups the demand history with the package TimeSeries. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory, and may be based on GDT: ServicePartDemandHistoryID. PlanningVersionID identifies a planning version referenced by the demand history (key field), and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

The TimeSeries package groups the information used to define a grid of time-dependent historical demand types. It includes the KeyFigure and KeyFigureValue entities. A KeyFigure entity represents a historical demand type, such as demand in pieces or order items. The entity KeyFigure is of type GDT:TimeSeriesKeyFigure and can include the elements Code, UnitOfMeasureCode, and KeyFigureValue. Code is a coded name of the key figure, and may be based on GDT:TimeSeriesKeyFigureCode. UnitOfMeasureCode is a unit of measure of all key figure values in the time series for this specific key figure, and may be based on GDT:MeasureUnitCode. KeyFigureValue includes the values of the key figure, and may be based on GDT:TimeSeriesKeyFigureTimeBucketValue. In some implementations, the key figures used can come from the pool of key figures for demand history at the Service Parts Planning owner side.

A KeyFigureValue entity is the value of a historical demand type in a time bucket. The entity KeyFigureValue is of type GDT:TimeSeriesKeyFigureTimeBucketValue with the elements TimeBucketNumberIntValue and KeyFigureFloatValue. TimeBucketNumberIntValue is a unique identifying number of a time series period. It is usually a positive number and may be based on GDT:IntegerValue. KeyFigureFloatValue is a value of a key figure in the time bucket and may be based on GDT:FloatValue. In some implementations, TimeBucketNumberIntValue is related to an existing period-bucket assignment at the Service Part processing owner side.

Message Data Type ServicePartDemandHistoriesKeyFigureCreateRequestMessage

The message data type ServicePartDemandHistoriesKeyFigureCreateRequestMessage includes ServicePartDemandHistoryKeyFigureCreateRequestMessage and the business information that is relevant for sending a business document in the message. It includes the MessageHeader package and ServicePartDemandHistoryKeyFigureCreateRequestMessage.

Message Data Type ServicePartDemandHistoryKeyFigureCreateConfirmationMessage

The message data type ServicePartDemandHistoryKeyFigureCreateConfirmationMessage includes the ServicePartDemandHistory included in the business document and the business information that is relevant for sending a business document in a message. It includes the MessageHeader package, ServicePartDemandHistory package, and Log package. In some implementations, if an error occurs when creating the ServicePartDemandHistoryKeyFigure, the creation is aborted and no ServicePartDemandHistory entity is returned in the confirmation message.

The ServicePartDemandHistory package includes the demand history. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory, and may be based on GDT: ServicePartDemandHistoryID. PlanningVersionID identifies a planning version referenced by the demand history (key field), and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

Message Data Type ServicePartDemandHistoriesKeyFiguresCreateConfirmationMessage

The message data type ServicePartDemandHistoriesKeyFiguresCreateConfirmationMessage includes ServicePartDemandHistoriesKeyFigureCreateConfirmationMessage and the business information that is relevant for sending a business document in the message. It includes the MessageHeader package and ServicePartDemandHistoriesKeyFigureCreateConfirmationMessage.

Message Data Type ServicePartDemandHistoryKeyFigureCancelRequestMessage

The message data type ServicePartDemandHistoryKeyFigureCancelRequestMessage includes the ServicePartDemandHistory included in the business document and the business information that is relevant for sending a business document in a message. It includes the MessageHeader package and ServicePartDemandHistory package. In some implementations, the operation fails if one of the KeyFigures or KeyFigureValues could not be deleted.

The ServicePartDemandHistory package groups the demand history with the package TimeSeries. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory and may be based on GDT: ServicePartDemandHistoryID. PlanningVersionID identifies a planning version referenced by the demand history (key field), and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

The TimeSeries package groups the information used to define a grid of time-dependent historical demand types. It includes the KeyFigure entity. A KeyFigure entity represents a historical demand type, such as demand in pieces or order items. The entity KeyFigure may be of type GDT: TimeSeriesKeyFigure and may include the Code element. Code is a coded name of the key figure and may be based on GDT:TimeSeriesKeyFigureCode. In some implementations, the key figures used can come from the pool of key figures for demand history at the Service Parts Planning owner side.

Message Data Type ServicePartDemandHistoriesKeyFigureCancelRequestMessage

The message data type ServicePartDemandHistoriesKeyFigureCancelRequestMessage includes ServicePartDemandHistoryKeyFigureCancelRequestMessage and the business information that is relevant for sending a business document in the message. It includes the MessageHeader package and ServicePartDemandHistoryKeyFigureCancelRequestMessage.

Message Data Type ServicePartDemandHistoryKeyFigureCancelConfirmationMessage

The message data type ServicePartDemandHistoryKeyFigureCancelConfirmationMessage includes the ServicePartDemandHistory included in the business document and the business information that is relevant for sending a business document in a message. It includes the MessageHeader package, ServicePartDemandHistory package, and Log package. In some implementations, if an error occurs when canceling the ServicePartDemandHistoryKeyFigure, the cancellation is aborted and no ServicePartDemandHistory entity is returned in the confirmation message.

The ServicePartDemandHistory package includes the demand history. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory and may be based on GDT: ServicePartDemandHistoryID. PlanningVersionID identifies a planning version referenced by the demand history (key field), and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

Message Data Type ServicePartDemandHistoriesKeyFiguresCancelConfirmationMessage

The message data type ServicePartDemandHistoriesKeyFiguresCancelConfirmationMessage includes ServicePartDemandHistoriesKeyFigureCancelConfirmationMessage and the business information that is relevant for sending a business document in the message. It includes the MessageHeader package and ServicePartDemandHistoriesKeyFigureCancelConfirmationMessage.

Message Data Type ServicePartDemandHistoryByElementsQueryMessage

The message data type ServicePartDemandHistoryByElementsQueryMessage includes the Selection included in the business document and the business information that is relevant for sending a business document in a message. It includes the MessageHeader and Selection packages. A MessageHeader package groups the business information that is relevant for sending a business document in a message. It includes the MessageHeader entity. A MessageHeader groups business information from the perspective of the sending application, such as: information to identify the business document in a message, information about the sender, and (possibly) information about the recipient. The MessageHeader includes SenderParty and RecipientParty. MessageHeader is of type GDT:BusinessDocumentMessageHeader, whereby the following elements of the GDT are used: ID, ReferenceID, SenderParty, and RecipientParty. A SenderParty is the party responsible for sending a business document at a business application level. The SenderParty is of type GDT:BusinessDocumentMessageHeaderParty. A RecipientParty is the party responsible for receiving a business document at a business application level. The RecipientParty is of type GDT:BusinessDocumentMessageHeaderParty.

The Selection package collects all the selection criteria for the ServicePartDemandHistory. It includes the entity SelectionPartDemandHistorySelectionByElements. The SelectionPartDemandHistorySelectionByElements includes the query elements for a demand history search by common data. A ServicePartDemandHistory can be selected by HistoryID, PlanningVersionID, ProductID, LocationID, VirtualChildIndicator, ThirdPartyOrderProcessingIndicator, lower time range limit for time buckets, or upper time range limit for time buckets.

Message Data Type ServicePartDemandHistoryByElementsResponseMessage

The message data type ServicePartDemandHistoryByElementsResponseMessage includes the ServicePartDemandHistory included in the business document and the business information that is relevant for sending a business document in a message. It includes the MessageHeader, ServicePartDemandHistory package, and Log package.

The ServicePartDemandHistory package groups the demand history with the package TimeSeries. A ServicePartDemandHistory entity identifies a time series of demands in the past in a Service Parts Planning environment. The elements at the ServicePartDemandHistory entity can include HistoryID, PlanningVersionID, ProductID, LocationID, VirtualChildIndicator, and ThirdPartyOrderProcessingIndicator. HistoryID identifies the ServicePartDemandHistory and may be based on GDT: ServicePartDemandHistoryID. PlanningVersionID identifies a planning version referenced by the demand history (key field), and may be based on GDT:PlanningVersionID. ProductID identifies a product referenced by the demand history (key field), and may be based on GDT:ProductID. LocationID identifies a location referenced by the demand history (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartDemandHistory can be defined either by the key fields (elements) PlanningVersionID, ProductID, LocationID, VirtualChildIndicator, and ThirdPartyOrderProcessingIndicator or the HistoryID.

The TimeSeries package groups the information used to define a grid of time-dependent historical demand types. It includes the KeyFigure, KeyFigureValue, and PeriodBucketAssignment entities. A KeyFigure entity represents a historical demand type, such as demand in pieces or order items. The entity KeyFigure may be of type GDT:TimeSeriesKey- Figure and may the include the elements Code, UnitOfMeasureCode, and KeyFigureValue. Code is a coded name of the key figure, and may be based on GDT:TimeSeriesKeyFigureCode. UnitOfMeasureCode is a unit of measure of all key figure values in the time series for this specific key figure, and may be based on GDT:MeasureUnitCode. KeyFigureValue includes the values of the key figure, and may be based on GDT:TimeSeriesKeyFigureTimeBucketValue. In some implementations, the key figures used can come from the pool of key figures for demand history at the Service Parts Planning owner side.

A KeyFigureValue entity is the value of a historical demand type in a time bucket. The entity KeyFigureValue may be of type GDT:TimeSeriesKeyFigureTimeBucketValue and can include the elements TimeBucketNumberIntValue and KeyFigureFloatValue. TimeBucketNumberIntValue is a unique identifying number of a time series period. It is usually a positive number and may be based on GDT:IntegerValue. KeyFigureFloatValue is a value of a key figure in the time bucket, and may be based on GDT:FloatValue. In some implementations, TimeBucketNumberIntValue is related to an existing period-bucket assignment.

A PeriodBucketAssignment entity defines the time range that is represented by a time bucket. The entity PeriodBucketAssignment may be of type GDT:TimeSeriesPeriodTimeBucketAssignment and may include the elements TimeBucketNumberIntValue, StartDateTime, and EndDateTime. TimeBucketNumberIntValue is a unique identifying number of a time series period. It is usually a positive number and may be based on GDT:IntegerValue. StartDateTime defines the start date and time of the time bucket in time zone UTC, and may be based on GDT:GLOBAL_DateTime. EndDateTime defines the end date and time of the time bucket in time zone UTC, and may be based on GDT:GLOBAL_DateTime. In some implementations, the time range definition of time bucket can be the same as the definition at the Service Parts Planning data owner side.

Service Part Inventory Replenishment Rule Interfaces

Two or more service parts planning environment can be linked together. One represents the Service Parts Planning owner that administers and coordinates all master and transactional data. The other, subsequently called the Service Parts Planning processor, provides service parts planning algorithms, for example, inventory planning algorithms for service parts used in the automotive area.

Figure 86:
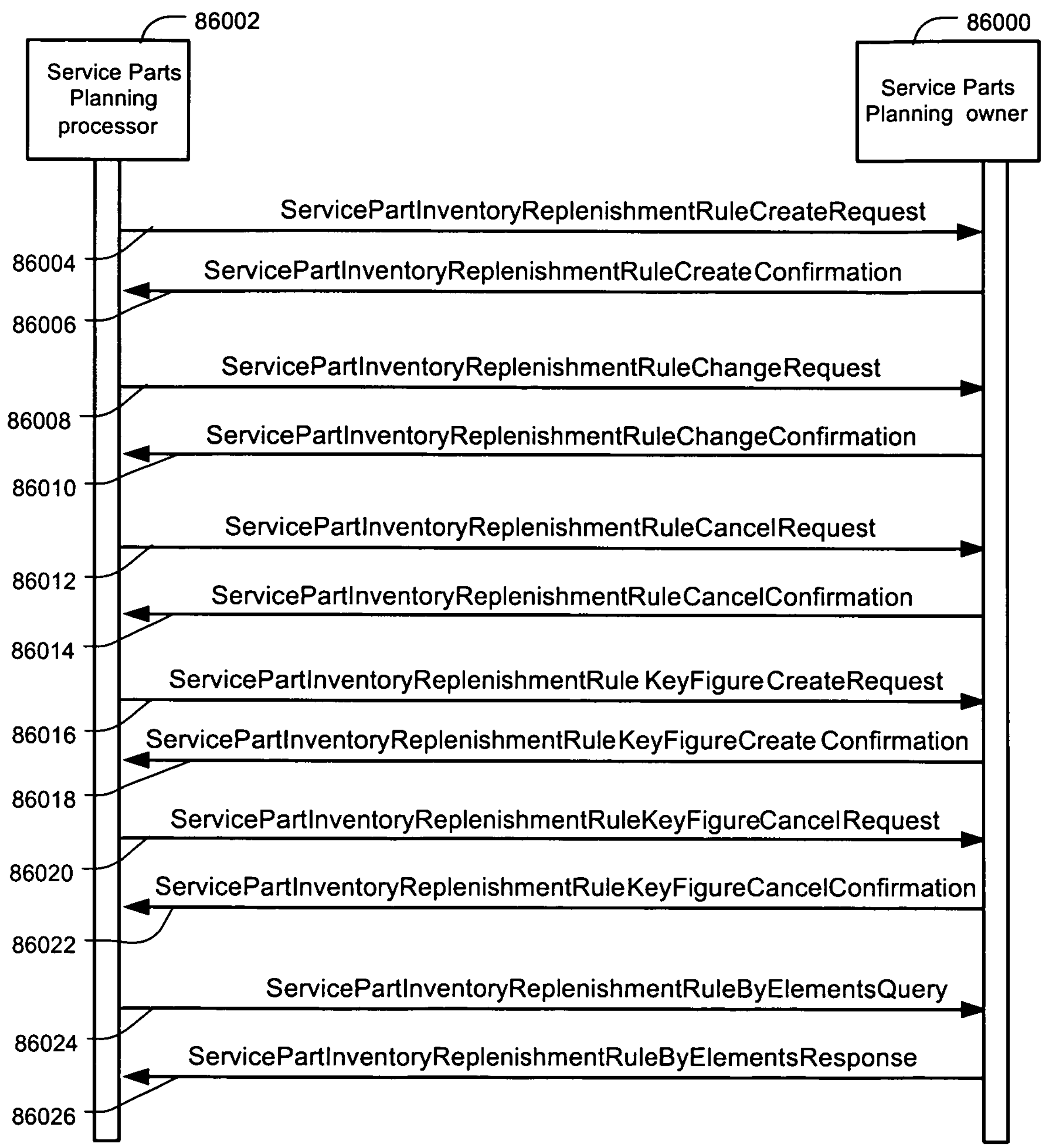
FIG. 86 shows an exemplary ServicePartInventoryReplenishmentRule Message Choreography.

The message choreography of FIG. 86 describes a possible logical sequence of messages that can be used to realize a Service Part Inventory Replenishment Rule business scenario.

A "Service Parts Planning Processor" system 86002 can request the creation of a Service Part Inventory Replenishment Rule using a ServicePartInventoryReplenishmentRuleCreateRequest message 86004 as shown, for example, in FIG. 86. A "Service Parts Planning Owner" system 86000 can respond to the request using a ServicePartInventoryReplenishmentRuleCreateConfirmation message 86006 as shown, for example, in FIG. 86.

The "Service Parts Planning Processor" system 86002 can request the change of a Service Part Inventory Replenishment Rule using a ServicePartInventoryReplenishmentRuleChangeRequest message 86008 as shown, for example, in FIG. 86. The "Service Parts Planning Owner" system 86000 can respond to the request using a ServicePartInventoryReplenishmentRuleChangeConfirmation message 86010 as shown, for example, in FIG. 86.

The "Service Parts Planning Processor" system 86002 can request the cancellation of a Service Part Inventory Replenishment Rule using a ServicePartInventoryReplenishmentRuleCancelRequest message 86012 as shown, for example, in FIG. 86. The "Service Parts Planning Owner" system 86000 can respond to the request using a ServicePartInventoryReplenishmentRuleCancelConfirmation message 86014 as shown, for example, in FIG. 86.

The "Service Parts Planning Processor" system 86002 can request the creation of a Service Part Inventory Replenishment Rule Key Figure using a ServicePartInventoryReplenishmentRuleKeyFigureCreateRequest message 86016 as shown, for example, in FIG. 86. The "Service Parts Planning Owner" system 86000 can respond to the request using a ServicePartInventoryReplenishmentRuleKeyFigureCreateConfirmation message 86018 as shown, for example, in FIG. 86.

The "Service Parts Planning Processor" system 86002 can request the cancellation of a Service Part Inventory Replenishment Rule Key Figure using a ServicePartInventoryReplenishmentRuleKeyFigureCancelRequest message 86020 as shown, for example, in FIG. 86. The "Service Parts Planning Owner" system 86000 can respond to the request using a ServicePartInventoryReplenishmentRuleKeyFigureCancelConfirmation message 86022 as shown, for example, in FIG. 86.

The "Service Parts Planning Processor" system 86002 can query Service Part Inventory Replenishment Rules using a ServicePartInventoryReplenishmentRuleByElementsQuery message 86024 as shown, for example, in FIG. 86. The "Service Parts Planning Owner" system 86000 can respond to the query using a ServicePartInventoryReplenishmentRuleByElementsResponse message 86026 as shown, for example, in FIG. 86.

Figure 87:
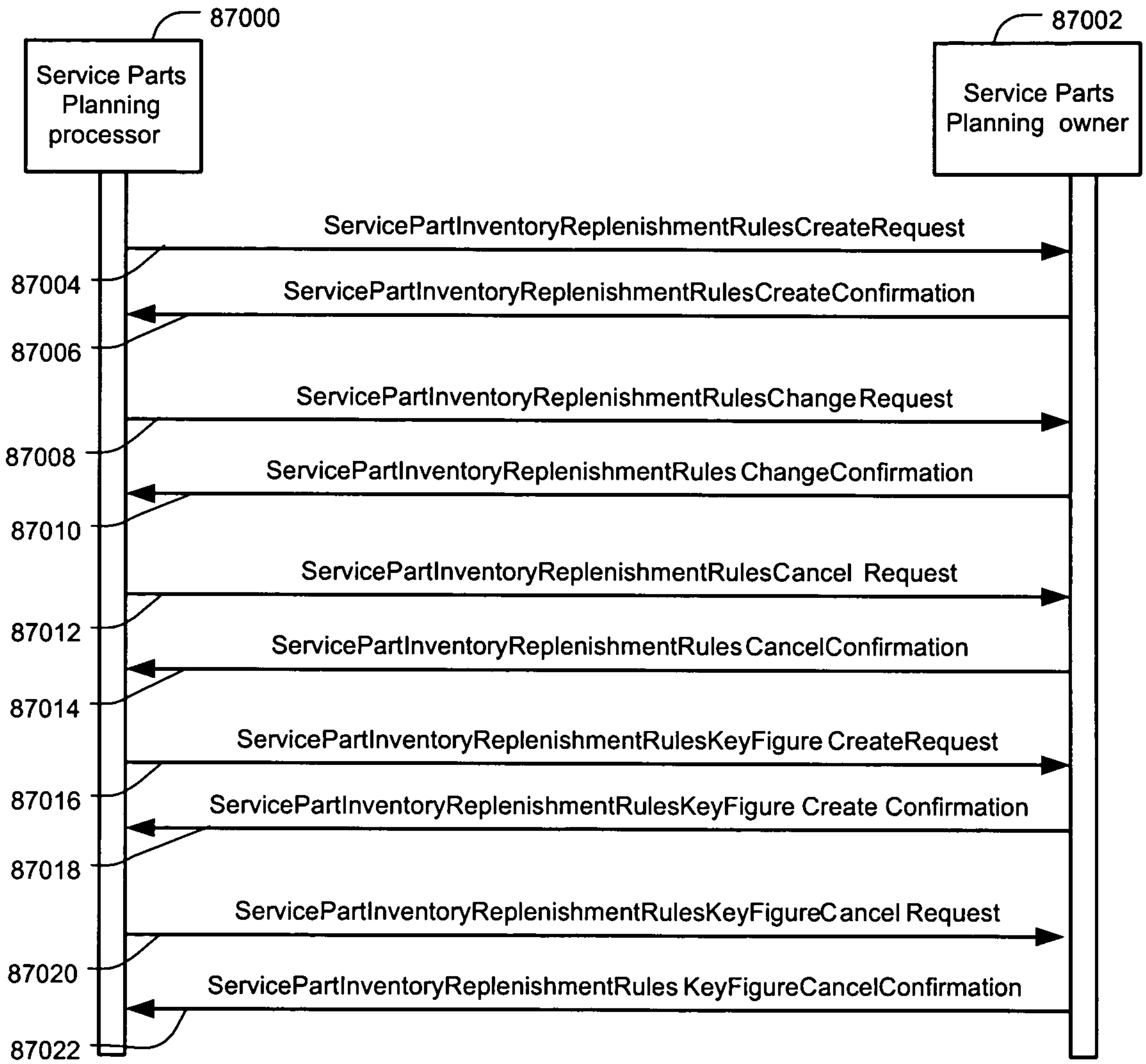
FIG. 87 shows an exemplary ServicePartInventoryReplenishmentRules Message Choreography.

The message choreography of FIG. 87 describes another possible logical sequence of messages that can be used to realize a Service Part Inventory Replenishment Rule business scenario. A "Service Parts Planning Processor" system 87000 can request the creation of Service Part Inventory Replenishment Rules using a ServicePartInventoryReplenishmentRulesCreateRequest message 87004 as shown, for example, in FIG. 87. A "Service Parts Planning Owner" system 87002 can respond to the request using a ServicePartInventoryReplenishmentRulesCreateConfirmation message 87006 as shown, for example, in FIG. 87.

The "Service Parts Planning Processor" system 87000 can request the change of Service Part Inventory Replenishment Rules using a ServicePartInventoryReplenishmentRulesChangeRequest message 87008 as shown, for example, in FIG. 87. The "Service Parts Planning Owner" system 87002 can respond to the request using a ServicePartInventoryReplenishmentRuleChangeConfirmation message 87010 as shown, for example, in FIG. 87.

The "Service Parts Planning Processor" system 87000 can request the cancellation of Service Part Inventory Replenishment Rules using a ServicePartInventoryReplenishmentRulesCancelRequest message 87012 as shown, for example, in FIG. 87. The "Service Parts Planning Owner" system 87002 can respond to the request using a ServicePartInventoryReplenishmentRulesCancelConfirmation message 87014 as shown, for example, in FIG. 87.

The "Service Parts Planning Processor" system 87000 can request the creation of a Service Part Inventory Replenishment Rules Key Figure using a ServicePartInventoryReplenishmentRulesKeyFigureCreateRequest message 87016 as shown, for example, in FIG. 87. The "Service Parts Planning Owner" system 87002 can respond to the request using a ServicePartInventoryReplenishmentRules KeyFigureCreateConfirmation message 87018 as shown, for example, in FIG. 87.

The "Service Parts Planning Processor" system 87000 can request the cancellation of a Service Part Inventory Replenishment Rules Key Figure using a ServicePartInventoryReplenishmentRulesKeyFigureCancelRequest message 87020 as shown, for example, in FIG. 87. The "Service Parts Planning Owner" system 87002 can respond to the request using a ServicePartInventoryReplenishmentRulesKeyFigureCancelConfirmation message 87022 as shown, for example, in FIG. 87.

The message ServicePartInventoryReplenishmentRuleCreateRequest is sent from the Service Parts Planning processor to create a Service Part Inventory Replenishment Rule at the Service Parts Planning owner side. The structure of the message type ServicePartInventoryReplenishmentRuleCreateRequest is specified by the message data type ServicePartInventoryReplenishmentRuleCreateRequestMessage, which is derived from the message data type ServicePartInventoryReplenishmentRuleTemplateMessage. In some implementations, all key figures can have the same period bucket assignment.

The message ServicePartInventoryReplenishmentRulesCreateRequest is sent from the Service Parts Planning processor to create one or multiple Service Part Inventory Replenishment Rules at the Service Parts Planning owner side. The structure of the message type ServicePartInventoryReplenishmentRulesCreateRequest is specified by the message data type ServicePartInventoryReplenishmentRulesCreateRequestMessage, which includes the message data type ServicePartInventoryReplenishmentRuleCreateRequestMessage.

The message ServicePartInventoryReplenishmentRuleCreateConfirmation is sent from the Service Parts Planning owner to the Service Parts Planning processor to confirm a ServicePartInventoryReplenishmentRuleCreateRequest. The structure of the message type ServicePartInventoryReplenishmentRuleCreateConfirmation is specified by the message data type ServicePartInventoryReplenishmentRuleCreateConfirmationMessage, which is derived from the message data type ServicePartInventoryReplenishmentRuleTemplateMessage.

The message ServicePartInventoryReplenishmentRulesCreateConfirmation is sent from the Service Parts Planning owner to the Service Parts Planning processor to confirm a ServicePartInventoryReplenishmentRulesCreateRequest. The structure of the message type ServicePartInventoryReplenishmentRulesCreateConfirmation is specified by the message data type ServicePartInventoryReplenishmentRulesCreateConfirmationMessage, which includes the message data type ServicePartInventoryReplenishmentRuleCreateConfirmationMessage.

The message ServicePartInventoryReplenishmentRuleChangeRequest is sent from the Service Parts Planning processor to change a Service Part Inventory Replenishment Rule at the Service Parts Planning owner side. The structure of the message type ServicePartInventoryReplenishmentRuleChangeRequest is specified by the message data type ServicePartInventoryReplenishmentRuleChangeRequestMessage, which is derived from the message data type ServicePartInventoryReplenishmentRuleTemplateMessage. In some implementations, all key figures have the same period bucket assignment.

The message ServicePartInventoryReplenishmentRulesChangeRequest is sent from the Service Parts Planning processor to change one or multiple Service Part Inventory Replenishment Rules at the Service Parts Planning owner side. The structure of the message type ServicePartInventoryReplenishmentRulesChangeRequest is specified by the message data type ServicePartInventoryReplenishmentRulesChangeRequestMessage, which includes the message data type ServicePartInventoryReplenishmentRuleChangeRequestMessage.

The message ServicePartInventoryReplenishmentRuleChangeConfirmation is sent from the Service Parts Planning owner to the Service Parts Planning processor to confirm a ServicePartInventoryReplenishmentRuleChangeRequest. The structure of the message type ServicePartInventoryReplenishmentRuleChangeConfirmation is specified by the message data type ServicePartInventoryReplenishmentRuleChangeConfirmationMessage, which is derived from the message data type ServicePartInventoryReplenishmentRuleTemplateMessage.

The message ServicePartInventoryReplenishmentRulesChangeConfirmation is sent from the Service Parts Planning owner to the Service Parts Planning processor to confirm a ServicePartInventoryReplenishmentRulesChangeRequest. The structure of the message type ServicePartInventoryReplenishmentRulesChangeConfirmation is specified by the message data type ServicePartInventoryReplenishmentRulesChangeConfirmationMessage, which includes the message data type ServicePartInventoryReplenishmentRuleChangeConfirmationMessage.

The message ServicePartInventoryReplenishmentRuleCancelRequest is sent from the Service Parts Planning processor to delete a Service Part Inventory Replenishment Rule at the Service Parts Planning owner side. The structure of the message type ServicePartInventoryReplenishmentRuleCancelRequest is specified by the message data type ServicePartInventoryReplenishmentRuleCancelRequestMessage, which is derived from the message data type ServicePartInventoryReplenishmentRuleTemplateMessage.

The message ServicePartInventoryReplenishmentRulesCancelRequest is sent from the Service Parts Planning processor to delete one or multiple Service Part Inventory Replenishment Rules at the Service Parts Planning owner side. The structure of the message type ServicePartInventoryReplenishmentRulesCancelRequest is specified by the message data type ServicePartInventoryReplenishmentRulesCancelRequestMessage, which includes the message data type ServicePartInventoryReplenishmentRuleCancelRequestMessage.

The message ServicePartInventoryReplenishmentRuleCancelConfirmation is sent from the Service Parts Planning owner to the Service Parts Planning processor to confirm a ServicePartInventoryReplenishmentRuleCancelRequest. The structure of the message type ServicePartInventoryReplenishmentRuleCancelConfirmation is specified by the message data type ServicePartInventoryReplenishmentRuleCancelConfirmationMessage, which is derived from the message data type ServicePartInventoryReplenishmentRuleTemplateMessage.

The message ServicePartInventoryReplenishmentRulesCancelConfirmation is sent from the Service Parts Planning owner to the Service Parts Planning processor to confirm a ServicePartInventoryReplenishmentRulesCancelRequest. The structure of the message type ServicePartInventoryReplenishmentRulesCancelConfirmation is specified by the message data type ServicePartInventoryReplenishmentRulesCancelConfirmationMessage, which includes the message data type ServicePartInventoryReplenishmentRuleCancelConfirmationMessage.

The message ServicePartInventoryReplenishmentRuleKeyFigureCreateRequest is sent from the Service Parts Planning processor to create a Service Part Inventory Replenishment Rule Key Figure for a Service Part Inventory Replenishment Rule at the Service Parts Planning owner side. The structure of the message type ServicePartInventoryReplenishmentRuleKeyFigureCreateRequest is specified by the message data type ServicePartInventoryReplenishmentRuleKeyFigureCreateRequestMessage, which is derived from the message data type ServicePartInventoryReplenishmentRuleTemplateMessage. In some implementations, all key figures have the same period bucket assignment.

The message ServicePartInventoryReplenishmentRulesKeyFigureCreateRequest is sent from the Service Parts Planning processor to create a Service Part Inventory Replenishment Rule Key Figure for one or multiple Service Part Inventory Replenishment Rules at the Service Parts Planning owner side. The structure of the message type ServicePartInventoryReplenishmentRulesKeyFigureCreateRequest is specified by the message data type ServicePartInventoryReplenishmentRulesKeyFigureCreateRequestMessage, which includes the message data type ServicePartInventoryReplenishmentRuleKeyFigureCreateRequest.

The message ServicePartInventoryReplenishmentRuleKeyFigureCreateConfirmation is sent from the Service Parts Planning owner to the Service Parts Planning processor to confirm a ServicePartInventoryReplenishmentRuleKeyFigureCreateRequest. The structure of the message type ServicePartInventoryReplenishmentRuleKeyFigureCreateConfirmation is specified by the message data type ServicePartInventoryReplenishmentRuleKeyFigureCreateConfirmationMessage, which is derived from the message data type ServicePartInventoryReplenishmentRuleTemplateMessage.

The message ServicePartInventoryReplenishmentRulesKeyFigureCreateConfirmation is sent from the Service Parts Planning owner to the Service Parts Planning processor to confirm a ServicePartInventoryReplenishmentRulesKeyFigureCreateRequest. The structure of the message type ServicePartInventoryReplenishmentRulesKeyFigureCreateConfirmation is specified by the message data type ServicePartInventoryReplenishmentRulesKeyFigureCreateConfirmationMessage, which includes the message data type ServicePartInventoryReplenishmentRuleKeyFigureCreateConfirmation.

The message ServicePartInventoryReplenishmentRuleKeyFigureCancelRequest is sent from the Service Parts Planning processor to delete a Service Part Inventory Replenishment Rule Key Figure for a Service Part Inventory Replenishment Rule at the Service Parts Planning owner side. The structure of the message type ServicePartInventoryReplenishmentRuleKeyFigureCancelRequest is specified by the message data type ServicePartInventoryReplenishmentRuleKeyFigureCancelRequestMessage, which is derived from the message data type ServicePartInventoryReplenishmentRuleTemplateMessage.

The message ServicePartInventoryReplenishmentRulesKeyFigureCancelRequest is sent from the Service Parts Planning processor to delete a Service Part Inventory Replenishment Rule Key Figure for one or multiple Service Part Inventory Replenishment Rules at the Service Parts Planning owner side. The structure of the message type ServicePartInventoryReplenishmentRulesKeyFigureCancelRequest is specified by the message data type ServicePartInventoryReplenishmentRulesKeyFigureCancelRequestMessage, which includes the message data type ServicePartInventoryReplenishmentRuleKeyFigureCancelRequest.

The message ServicePartInventoryReplenishmentRuleKeyFigureCancelConfirmation is sent from the Service Parts Planning owner to the Service Parts Planning processor to confirm a ServicePartInventoryReplenishmentRuleKeyFigureCancelRequest. The structure of the message type ServicePartInventoryReplenishmentRuleKeyFigureCancelConfirmation is specified by the message data type ServicePartInventoryReplenishmentRuleKeyFigureCancelConfirmationMessage, which is derived from the message data type ServicePartInventoryReplenishmentRuleTemplateMessage.

The message ServicePartInventoryReplenishmentRulesKeyFigureCancelConfirmation is sent from the Service Parts Planning owner to the Service Parts Planning processor to confirm a ServicePartInventoryReplenishmentRulesKeyFigureCancelRequest. The structure of the message type ServicePartInventoryReplenishmentRulesKeyFigureCancelConfirmation is specified by the message data type ServicePartInventoryReplenishmentRuleKeyFigureCancelConfirmationMessage, which includes the message data type ServicePartInventoryReplenishmentRuleKeyFigureCancelConfirmation.

The ServicePartInventoryReplenishmentRuleByElementsQuery is a query for ServicePartInventoryReplenishmentRule that satisfies the selection criteria specified by the query elements. The structure of the message type ServicePartInventoryReplenishmentRuleByElementsQuery is specified by the message data type ServicePartInventoryReplenishmentRuleByElementsQueryMessage.

The message ServicePartInventoryReplenishmentRuleByElementsResponse is sent from the Service Parts Planning owner to the Service Parts Planning processor based on the elements of the query message ServicePartInventoryReplenishmentRuleByElementsQuery. The structure of the message type ServicePartInventoryReplenishmentRuleByElementsResponse is specified by the message data type ServicePartInventoryReplenishmentRuleByElementsResponseMessage, which is derived from the message data type ServicePartInventoryReplenishmentRuleTemplateMessage.

The Service Parts Planning owner and the Service Parts Planning processor can be coupled in such a way that the Inventory Replenishment Rules are calculated at the Service Parts Planning processor side and then sent to Service Parts Planning owner. A number of interfaces can be included, such as: ServicePartInventoryReplenishmentRuleCreateRequestConfirmation_In, ServicePartInventoryReplenishmentRuleChangeRequest Confirmation_In, ServicePartInventoryReplenishmentRuleCancelRequest Confirmation_In, ServicePartInventoryReplenishmentRule CreateKeyFigureRequestConfirmation_In, ServicePartInventoryReplenishmentRuleCancelKeyFigureRequest Confirmation_In, ServicePartInventoryReplenishmentRules CreateRequestConfirmation_In, ServicePartInventoryReplenishmentRulesChangeRequestConfirmation_In, Service- PartInventoryReplenishmentRulesCancelRequest Confirmation_In, ServicePartInventoryReplenishmentRulesCreate KeyFigureRequestConfirmation_In, ServicePartInventoryReplenishmentRulesCancelKeyFigureRequest Confirmation_In, and ServicePartInventoryReplenishment RuleByElementsQueryResponse_In.

Figure 88:
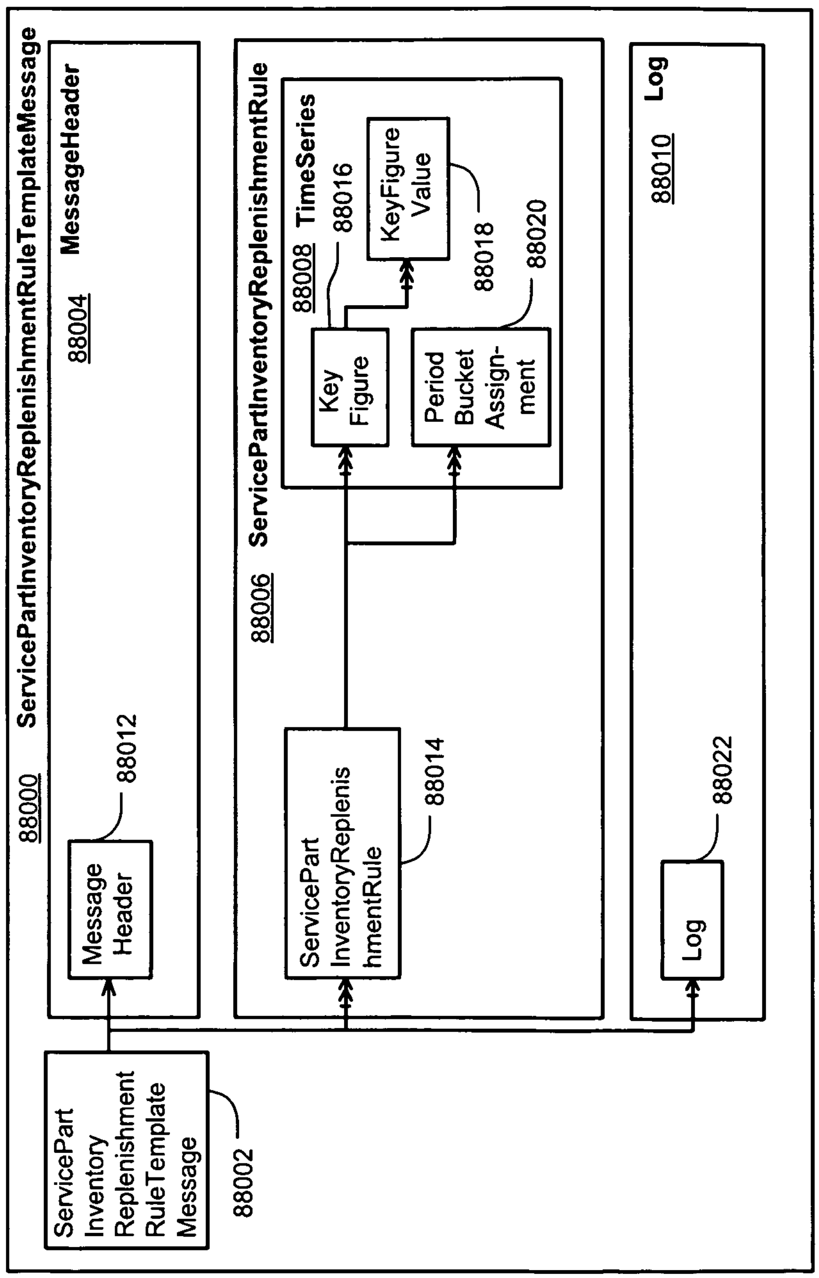
FIG. 88 shows an exemplary ServicePartInventoryReplenishmentRuleTemplateMessage Message Data Type.

FIG. 88 illustrates one example logical configuration of ServicePartInventoryReplenishmentRuleTemplateMessage message 88000. Specifically, this figure depicts the arrangement and hierarchy of various components such as one or more levels of packages, entities, and datatypes, shown here as 88000 through 88022. As described above, packages may be used to represent hierarchy levels. Entities are discrete business elements that are used during a business transaction. Data types are used to type object entities and interfaces with a structure. For example, ServicePartInventoryReplenishmentRuleTemplateMessage message 88000 includes, among other things, ServicePartInventoryReplenishmentRule 88006. Accordingly, heterogeneous applications may communicate using this consistent message configured as such.

Figure 89:
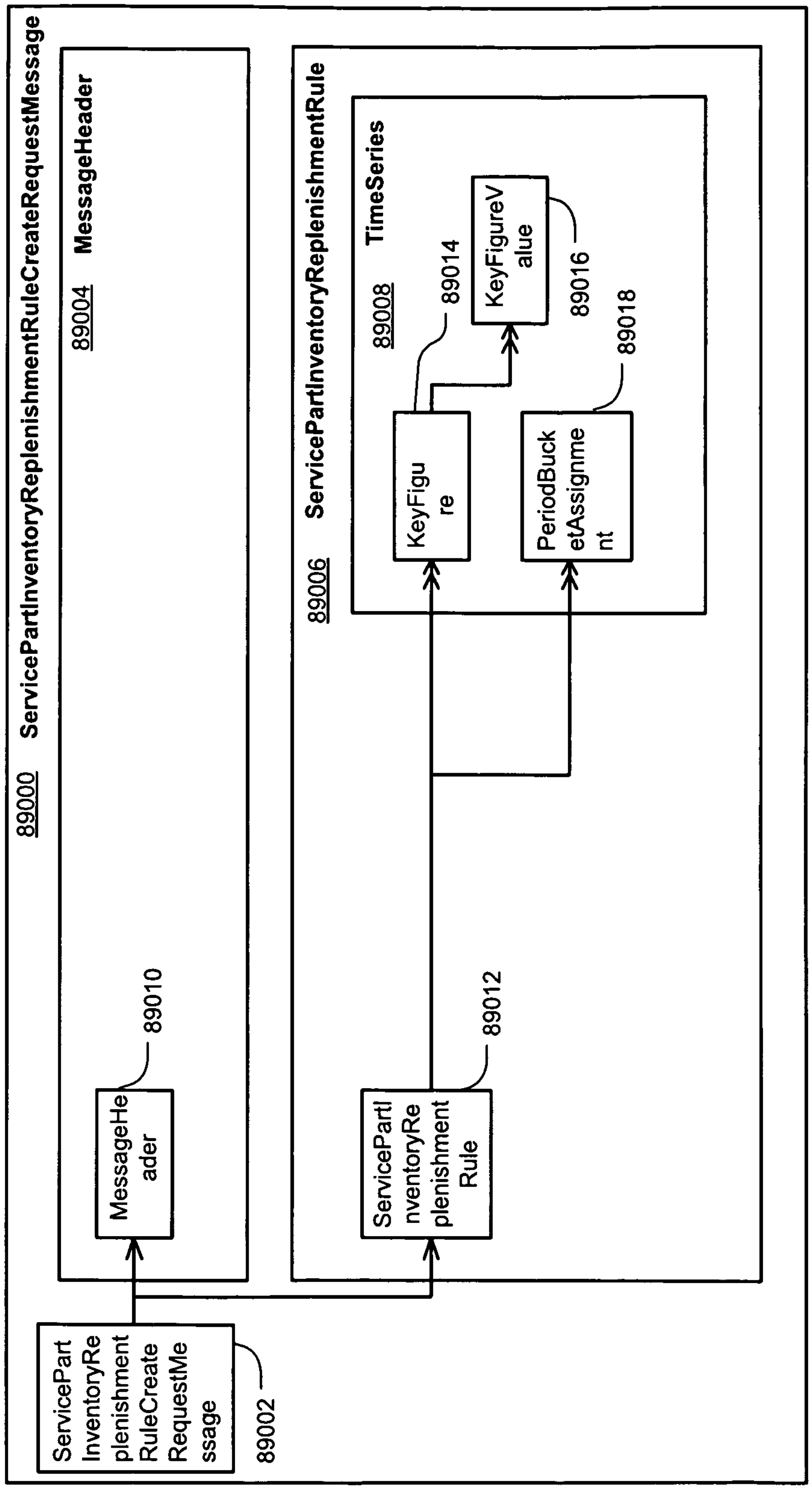
FIG. 89 shows an exemplary ServicePartInventoryReplenishmentRuleCreateRequestMessage Message Data Type.

Additionally, FIG. 89 illustrates one example logical configuration of ServicePartInventoryReplenishmentRuleCreateRequestMessage message 89000. Specifically, this figure depicts the arrangement and hierarchy of various components such as one or more levels of packages, entities, and datatypes, shown here as 89000 through ServicePartInventoryReplenishmentRule. As described above, packages may be used to represent hierarchy levels. Entities are discrete business elements that are used during a business transaction. Data types are used to type object entities and interfaces with a structure. For example, ServicePartInventoryReplenishmentRuleCreateRequestMessage message 89000 includes, among other things, 89006 89018. Accordingly, heterogeneous applications may communicate using this consistent message configured as such.

Figure 90:
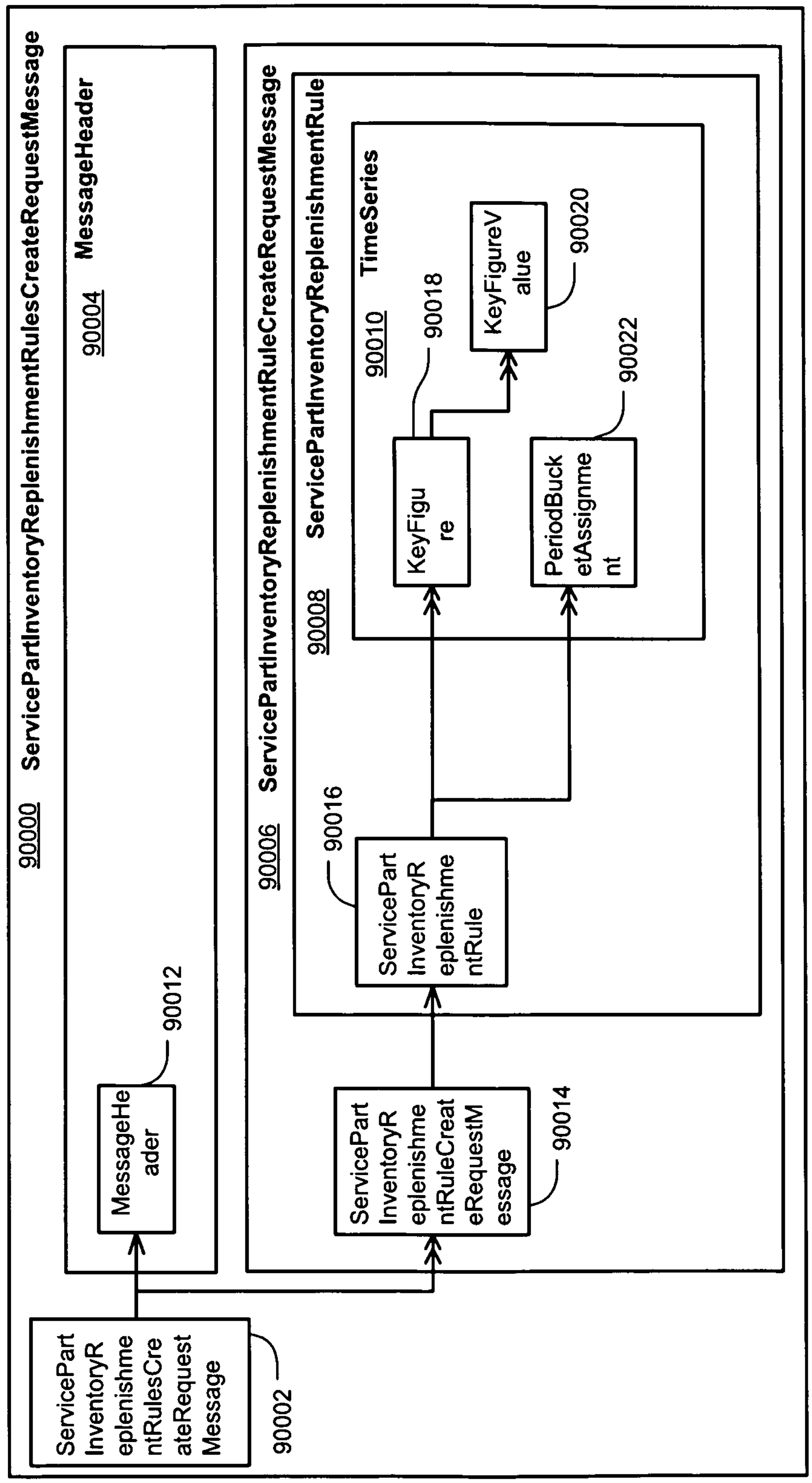
FIG. 90 shows an exemplary ServicePartInventoryReplenishmentRulesCreateRequestMessage Message Data Type.

Additionally, FIG. 90 illustrates one example logical configuration of ServicePartInventoryReplenishmentRulesCreateRequestMessage message 90000. Specifically, this figure depicts the arrangement and hierarchy of various components such as one or more levels of packages, entities, and datatypes, shown here as 90000 through 90022. As described above, packages may be used to represent hierarchy levels. Entities are discrete business elements that are used during a business transaction. Data types are used to type object entities and interfaces with a structure. For example, ServicePartInventoryReplenishmentRulesCreateRequestMessage message 90000 includes, among other things, ServicePartInventoryReplenishmentRuleCreateRequestMessage 90006. Accordingly, heterogeneous applications may communicate using this consistent message configured as such.

Figure 91:
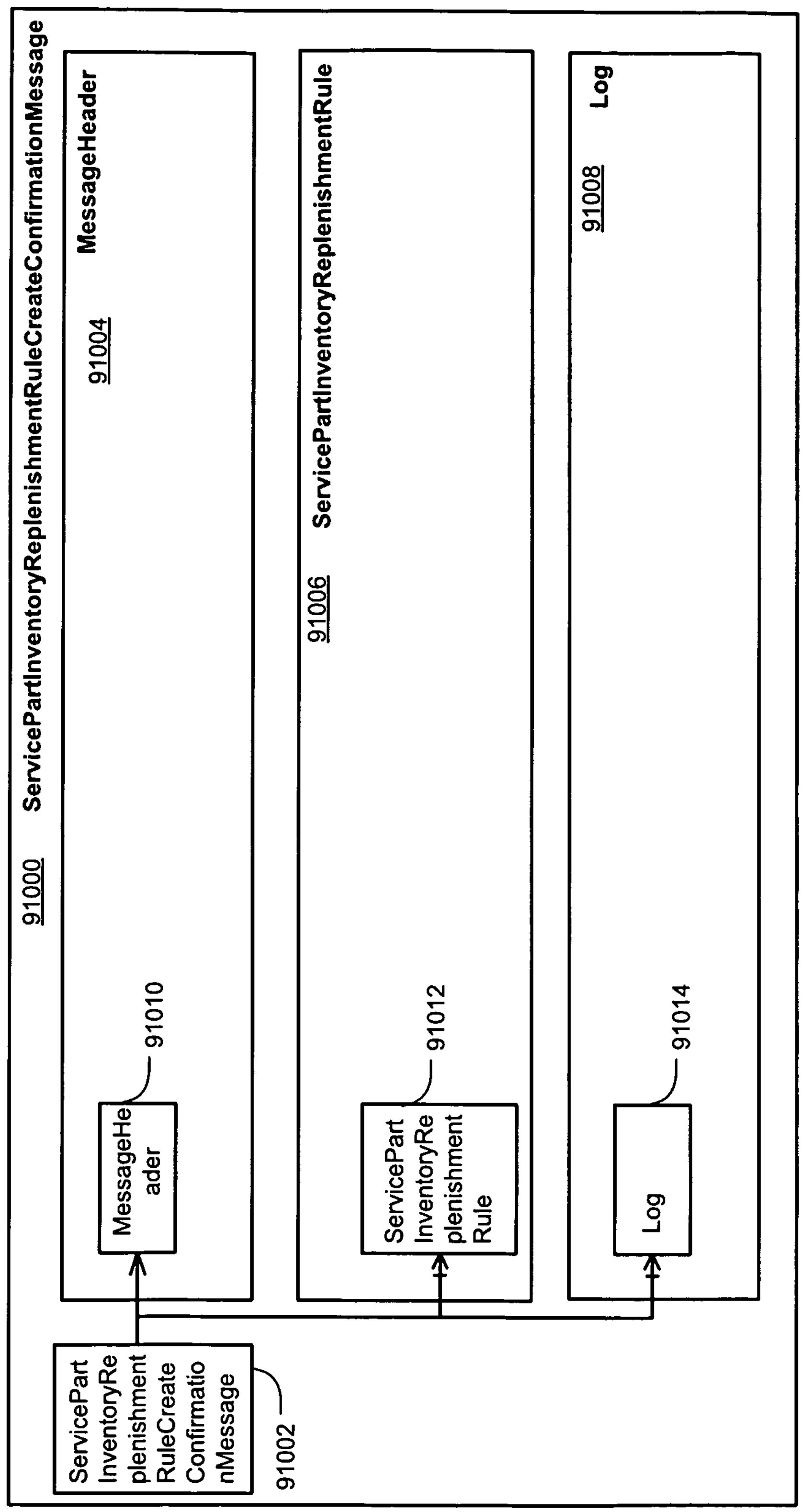
FIG. 91 shows an exemplary ServicePartInventoryReplenishmentRuleCreateConfirmationMessage Message Data Type.

Additionally, FIG. 91 illustrates one example logical configuration of ServicePartInventoryReplenishmentRuleCreateConfirmationMessage message 91000. Specifically, this figure depicts the arrangement and hierarchy of various components such as one or more levels of packages, entities, and datatypes, shown here as 91000 through 91014. As described above, packages may be used to represent hierarchy levels. Entities are discrete business elements that are used during a business transaction. Data types are used to type object entities and interfaces with a structure. For example, ServicePartInventoryReplenishmentRuleCreateConfirmationMessage message 91000 includes, among other things, ServicePartInventoryReplenishmentRule 91006. Accordingly, heterogeneous applications may communicate using this consistent message configured as such.

Figure 92:
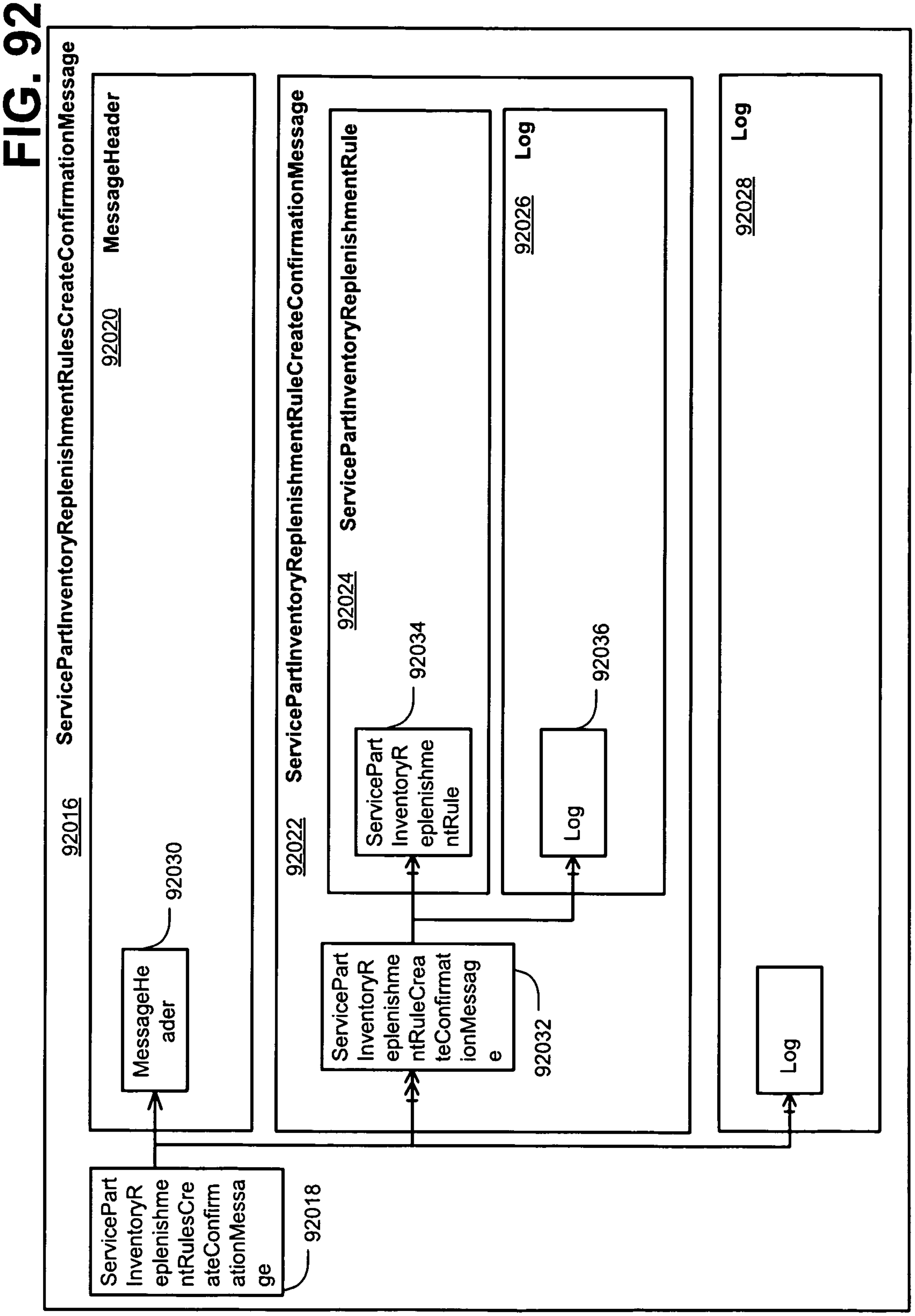
FIG. 92 shows an exemplary ServicePartInventoryReplenishmentRulesCreateConfirmationMessage Message Data Type.

Additionally, FIG. 92 illustrates one example logical configuration of ServicePartInventoryReplenishmentRulesCreateConfirmationMessage message 92000. Specifically, this figure depicts the arrangement and hierarchy of various components such as one or more levels of packages, entities, and datatypes, shown here as 92000 through 92022. As described above, packages may be used to represent hierarchy levels. Entities are discrete business elements that are used during a business transaction. Data types are used to type object entities and interfaces with a structure. For example, ServicePartInventoryReplenishmentRulesCreateConfirmationMessage message 92000 includes, among other things, ServicePartInventoryReplenishmentRuleCreateConfirmationMessage 92006. Accordingly, heterogeneous applications may communicate using this consistent message configured as such.

Figure 93:
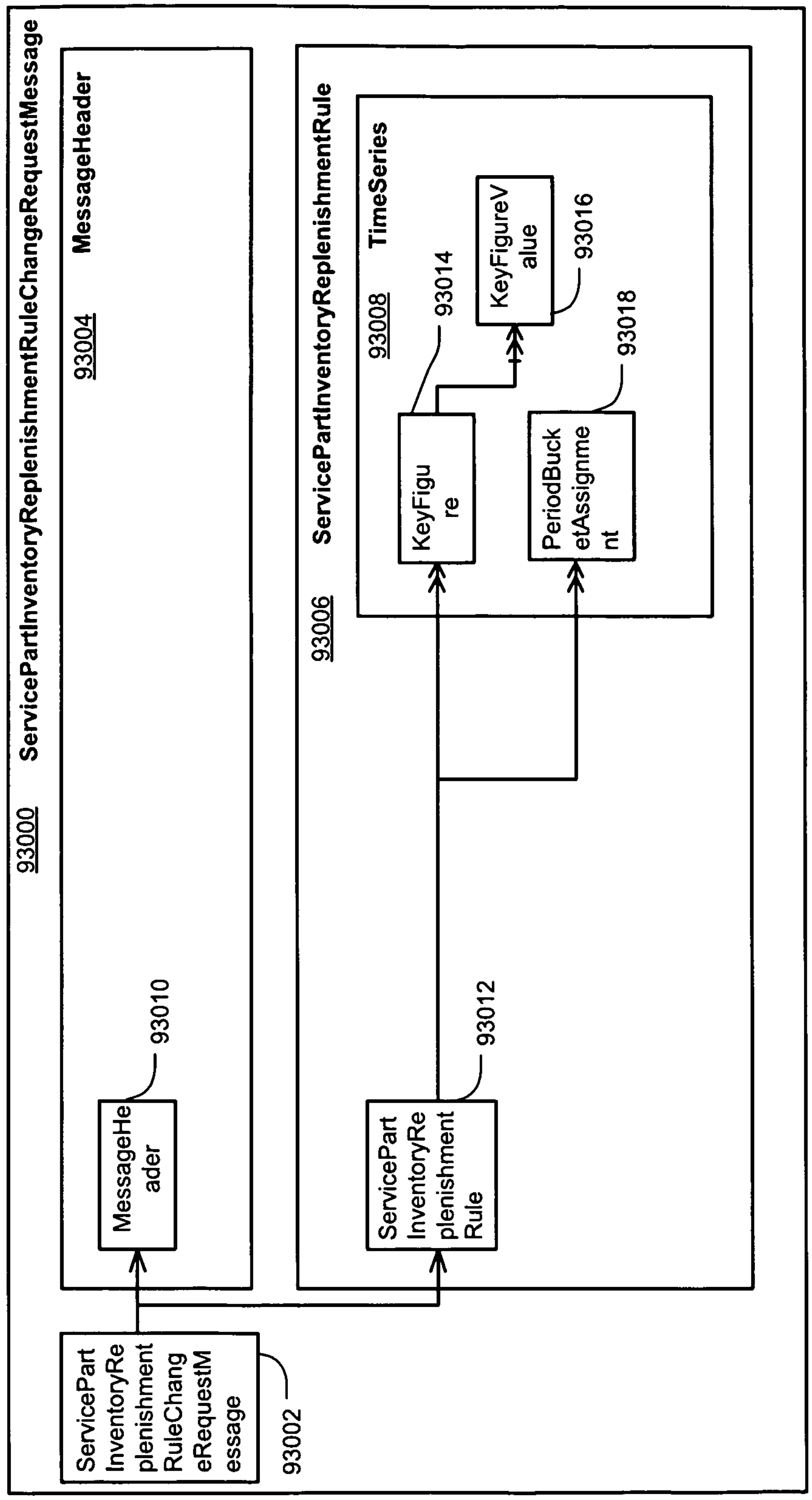
FIG. 93 shows an exemplary ServicePartInventoryReplenishmentRuleChangeRequestMessage Message Data Type.

Additionally, FIG. 93 illustrates one example logical configuration of ServicePartInventoryReplenishmentRuleChangeRequestMessage message 93000. Specifically, this figure depicts the arrangement and hierarchy of various components such as one or more levels of packages, entities, and datatypes, shown here as 93000 through 93018. As described above, packages may be used to represent hierarchy levels. Entities are discrete business elements that are used during a business transaction. Data types are used to type object entities and interfaces with a structure. For example, ServicePartInventoryReplenishmentRuleChangeRequestMessage message 93000 includes, among other things, ServicePartInventoryReplenishmentRule 93006. Accordingly, heterogeneous applications may communicate using this consistent message configured as such.

Figure 94:
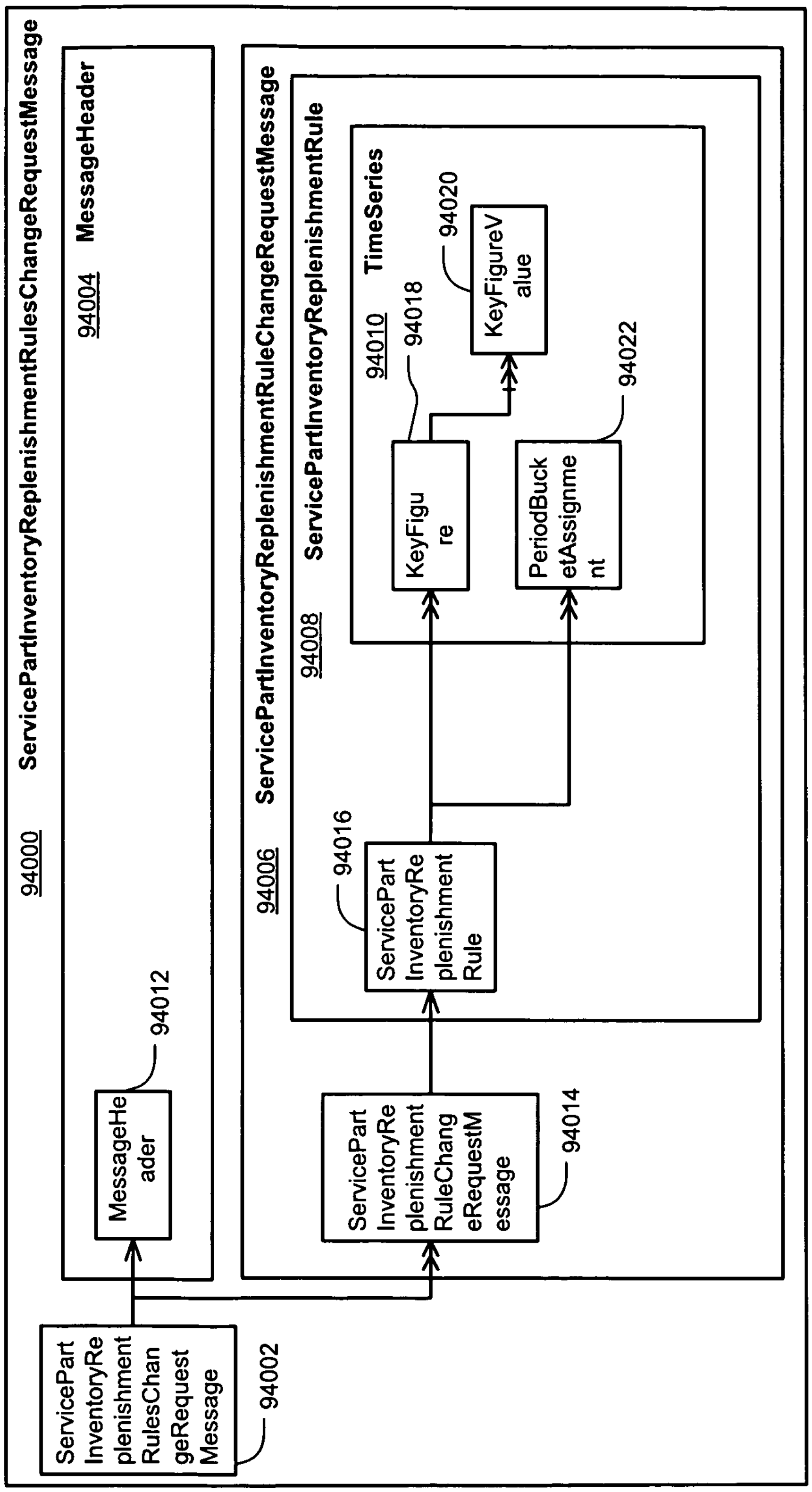
FIG. 94 shows an exemplary ServicePartInventoryReplenishmentRulesChangeRequestMessage Message Data Type.

Additionally, FIG. 94 illustrates one example logical configuration of ServicePartInventoryReplenishmentRulesChangeRequestMessage message 94000. Specifically, this figure depicts the arrangement and hierarchy of various components such as one or more levels of packages, entities, and datatypes, shown here as 94000 through 94022. As described above, packages may be used to represent hierarchy levels. Entities are discrete business elements that are used during a business transaction. Data types are used to type object entities and interfaces with a structure. For example, ServicePartInventoryReplenishmentRulesChangeRequestMessage message 94000 includes, among other things, ServicePartInventoryReplenishmentRuleChangeRequestMessage 94006. Accordingly, heterogeneous applications may communicate using this consistent message configured as such.

Figure 95:
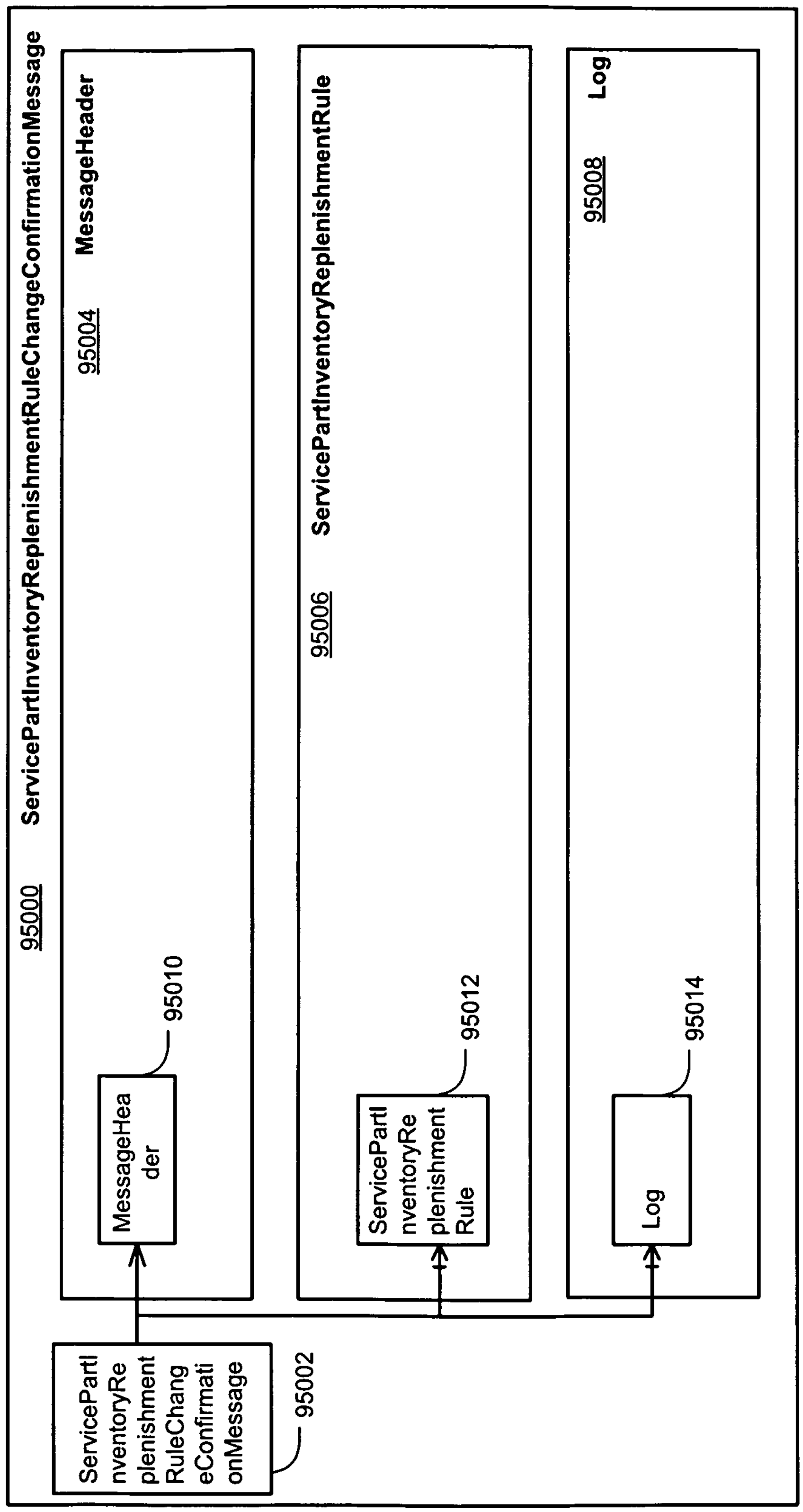
FIG. 95 shows an exemplary ServicePartInventoryReplenishmentRuleChangeConfirmationMessage Message Data Type.

Additionally, FIG. 95 illustrates one example logical configuration of ServicePartInventoryReplenishmentRuleChangeConfirmationMessage message 95000. Specifically, this figure depicts the arrangement and hierarchy of various components such as one or more levels of packages, entities, and datatypes, shown here as 95000 through 95014. As described above, packages may be used to represent hierarchy levels. Entities are discrete business elements that are used during a business transaction. Data types are used to type object entities and interfaces with a structure. For example, ServicePartInventoryReplenishmentRuleChangeConfirmationMessage message 95000 includes, among other things, ServicePartInventoryReplenishmentRule 95006. Accordingly, heterogeneous applications may communicate using this consistent message configured as such.

Figure 96:
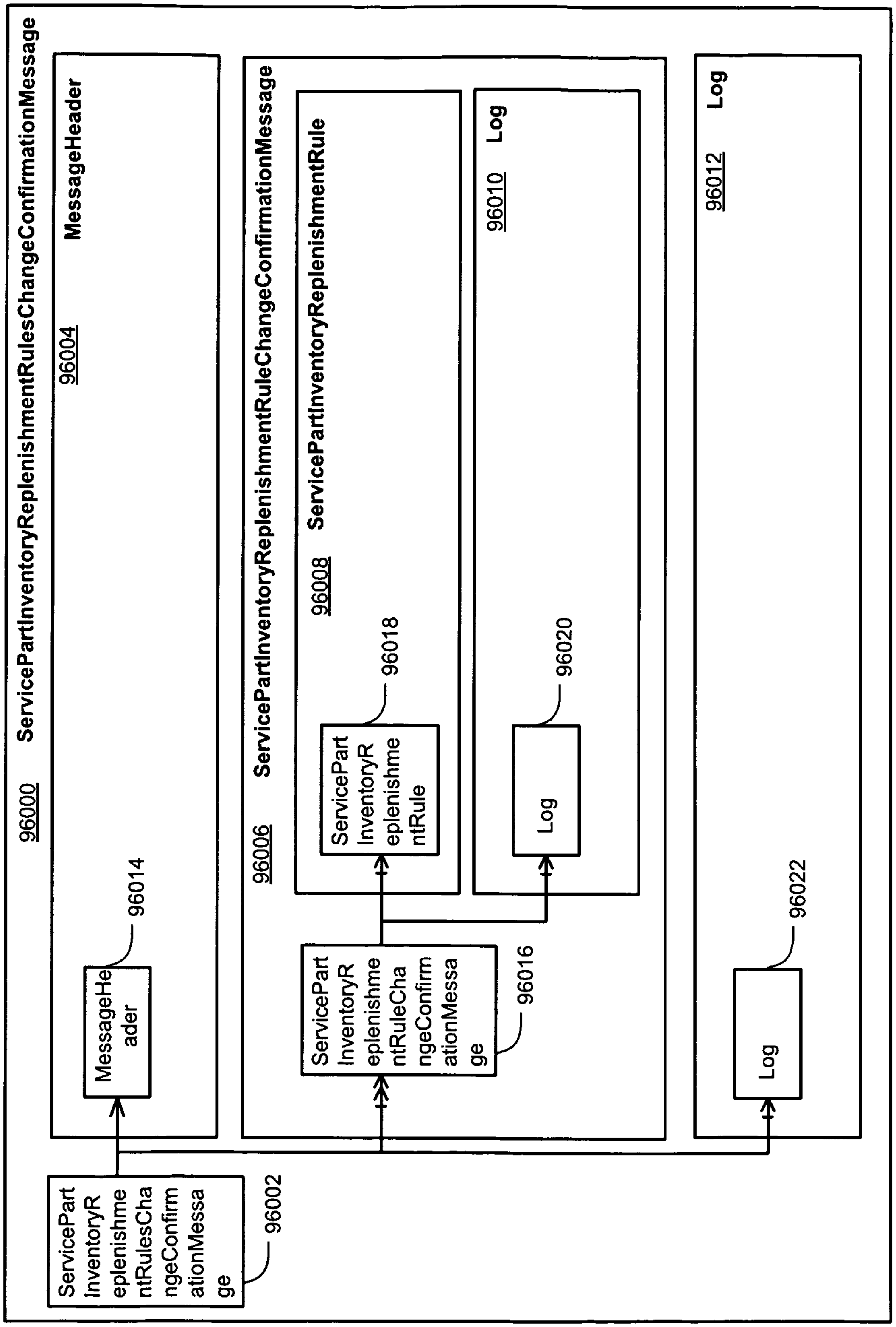
FIG. 96 shows an exemplary ServicePartInventoryReplenishmentRulesChangeConfirmationMessage Message Data Type.

Additionally, FIG. 96 illustrates one example logical configuration of ServicePartInventoryReplenishmentRulesChangeConfirmationMessage message 96000. Specifically, this figure depicts the arrangement and hierarchy of various components such as one or more levels of packages, entities, and datatypes, shown here as 96000 through 96022. As described above, packages may be used to represent hierarchy levels. Entities are discrete business elements that are used during a business transaction. Data types are used to type object entities and interfaces with a structure. For example, ServicePartInventoryReplenishmentRulesChangeConfirmationMessage message 96000 includes, among other things, ServicePartInventoryReplenishmentRuleChangeConfirmationMessage 96006. Accordingly, heterogeneous applications may communicate using this consistent message configured as such.

Figure 97:
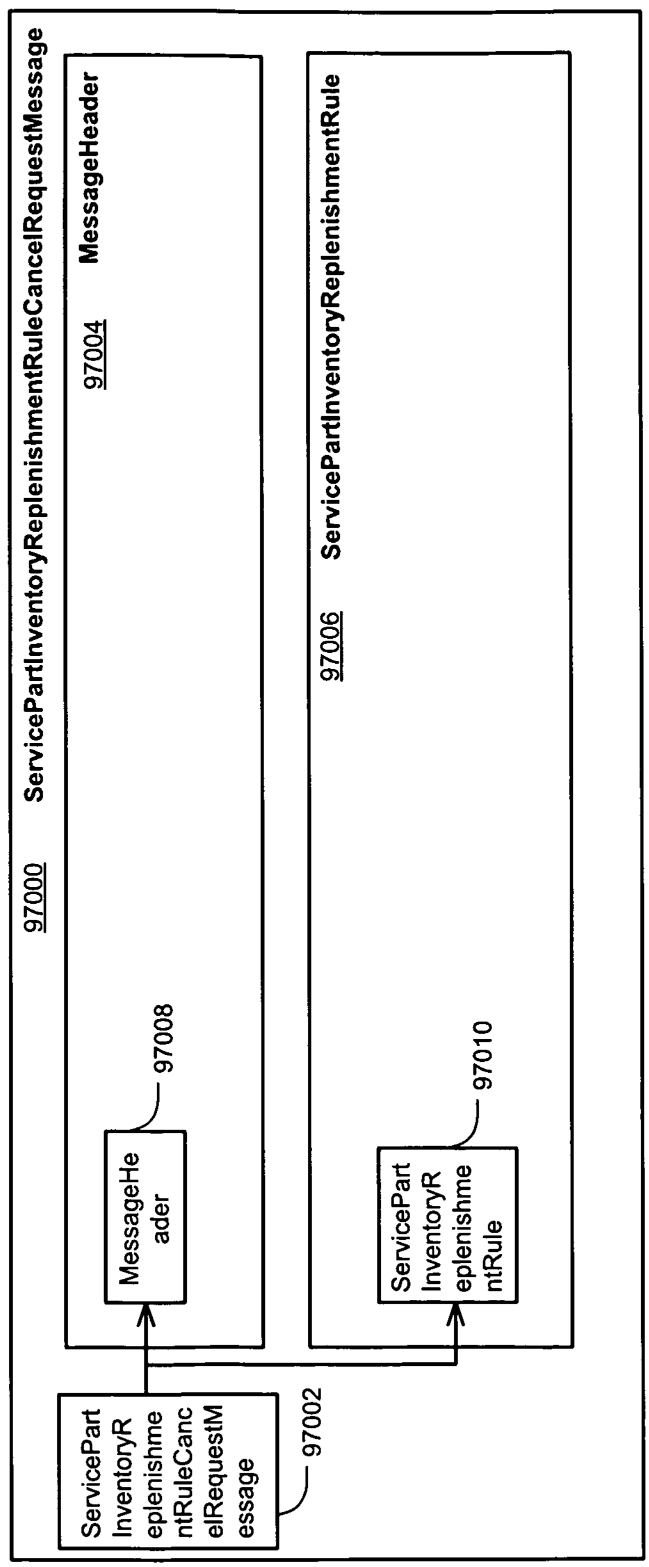
FIG. 97 shows an exemplary ServicePartInventoryReplenishmentRuleCancelRequestMessage Message Data Type.

Additionally, FIG. 97 illustrates one example logical configuration of ServicePartInventoryReplenishmentRuleCancelRequestMessage message 97000. Specifically, this figure depicts the arrangement and hierarchy of various components such as one or more levels of packages, entities, and datatypes, shown here as 97000 through 97010. As described above, packages may be used to represent hierarchy levels. Entities are discrete business elements that are used during a business transaction. Data types are used to type object entities and interfaces with a structure. For example, ServicePartInventoryReplenishmentRuleCancelRequestMessage message 97000 includes, among other things, ServicePartInventoryReplenishmentRule 97006. Accordingly, heterogeneous applications may communicate using this consistent message configured as such.

Figure 98:
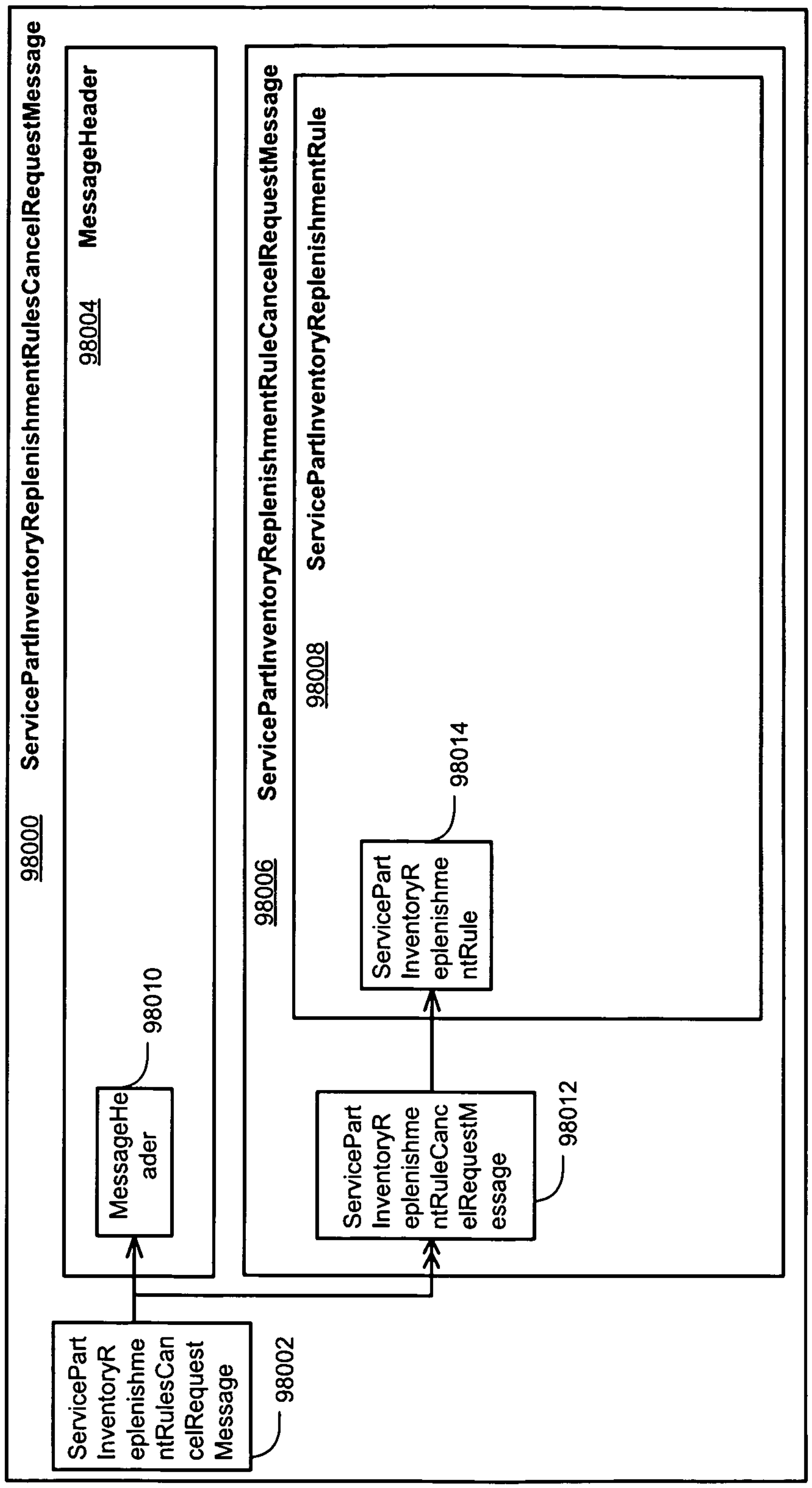
FIG. 98 shows an exemplary ServicePartInventoryReplenishmentRulesCancelRequestMessage Message Data Type.

Additionally, FIG. 98 illustrates one example logical configuration of ServicePartInventoryReplenishmentRulesCancelRequestMessage message 98000. Specifically, this figure depicts the arrangement and hierarchy of various components such as one or more levels of packages, entities, and datatypes, shown here as 98000 through 98014. As described above, packages may be used to represent hierarchy levels. Entities are discrete business elements that are used during a business transaction. Data types are used to type object entities and interfaces with a structure. For example, ServicePartInventoryReplenishmentRulesCancelRequestMessage message 98000 includes, among other things, ServicePartInventoryReplenishmentRuleCancelRequestMessage 98006. Accordingly, heterogeneous applications may communicate using this consistent message configured as such.

Figure 99:
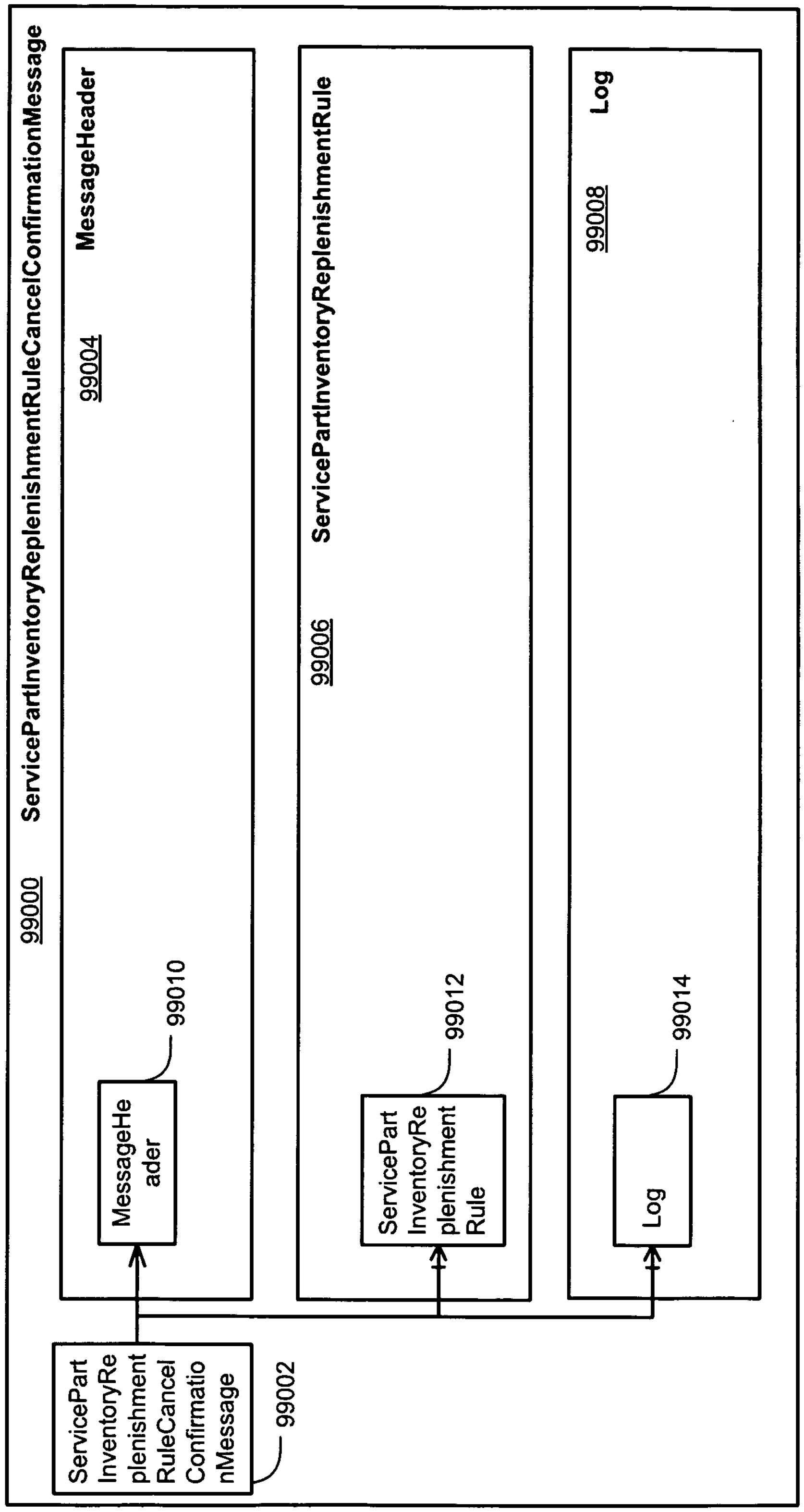
FIG. 99 shows an exemplary ServicePartInventoryReplenishmentRuleCancelConfirmationMessage Message Data Type.

Additionally, FIG. 99 illustrates one example logical configuration of ServicePartInventoryReplenishmentRuleCancelConfirmationMessage message 99000. Specifically, this figure depicts the arrangement and hierarchy of various components such as one or more levels of packages, entities, and datatypes, shown here as 99000 through 99014. As described above, packages may be used to represent hierarchy levels. Entities are discrete business elements that are used during a business transaction. Data types are used to type object entities and interfaces with a structure. For example, ServicePartInventoryReplenishmentRuleCancelConfirmationMessage message 99000 includes, among other things, ServicePartInventoryReplenishmentRule 99006. Accordingly, heterogeneous applications may communicate using this consistent message configured as such.

Figure 100:
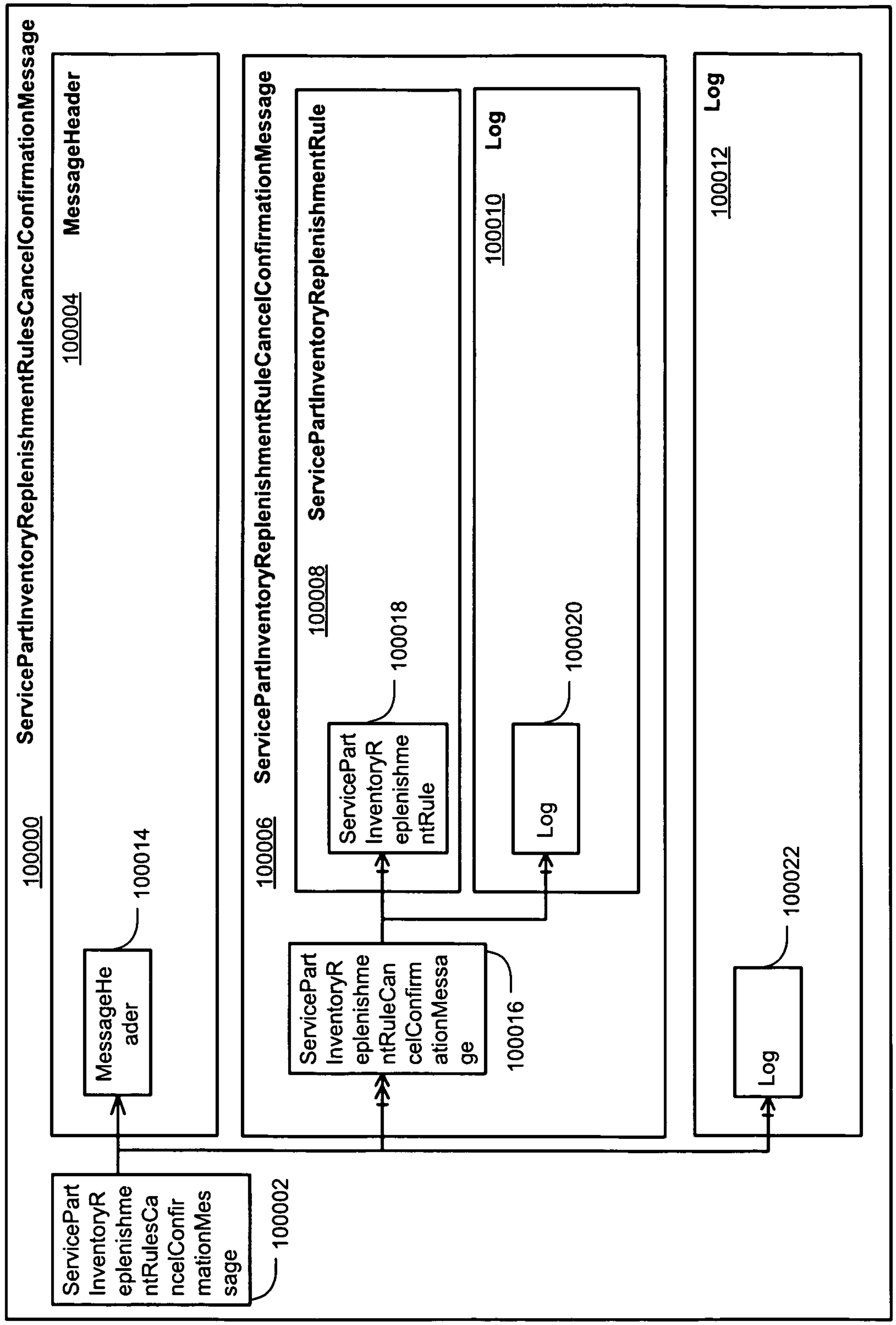
FIG. 100 shows an exemplary ServicePartInventoryReplenishmentRulesCancelConfirmationMessage Message Data Type.

Additionally, FIG. 100 illustrates one example logical configuration of ServicePartInventoryReplenishmentRulesCancelConfirmationMessage message 100000. Specifically, this figure depicts the arrangement and hierarchy of various components such as one or more levels of packages, entities, and datatypes, shown here as 100000 through 100022. As described above, packages may be used to represent hierarchy levels. Entities are discrete business elements that are used during a business transaction. Data types are used to type object entities and interfaces with a structure. For example, ServicePartInventoryReplenishmentRulesCancelConfirmationMessage message 100000 includes, among other things, ServicePartInventoryReplenishmentRuleCancelConfirmationMessage 100006. Accordingly, heterogeneous applications may communicate using this consistent message configured as such.

Figure 101:
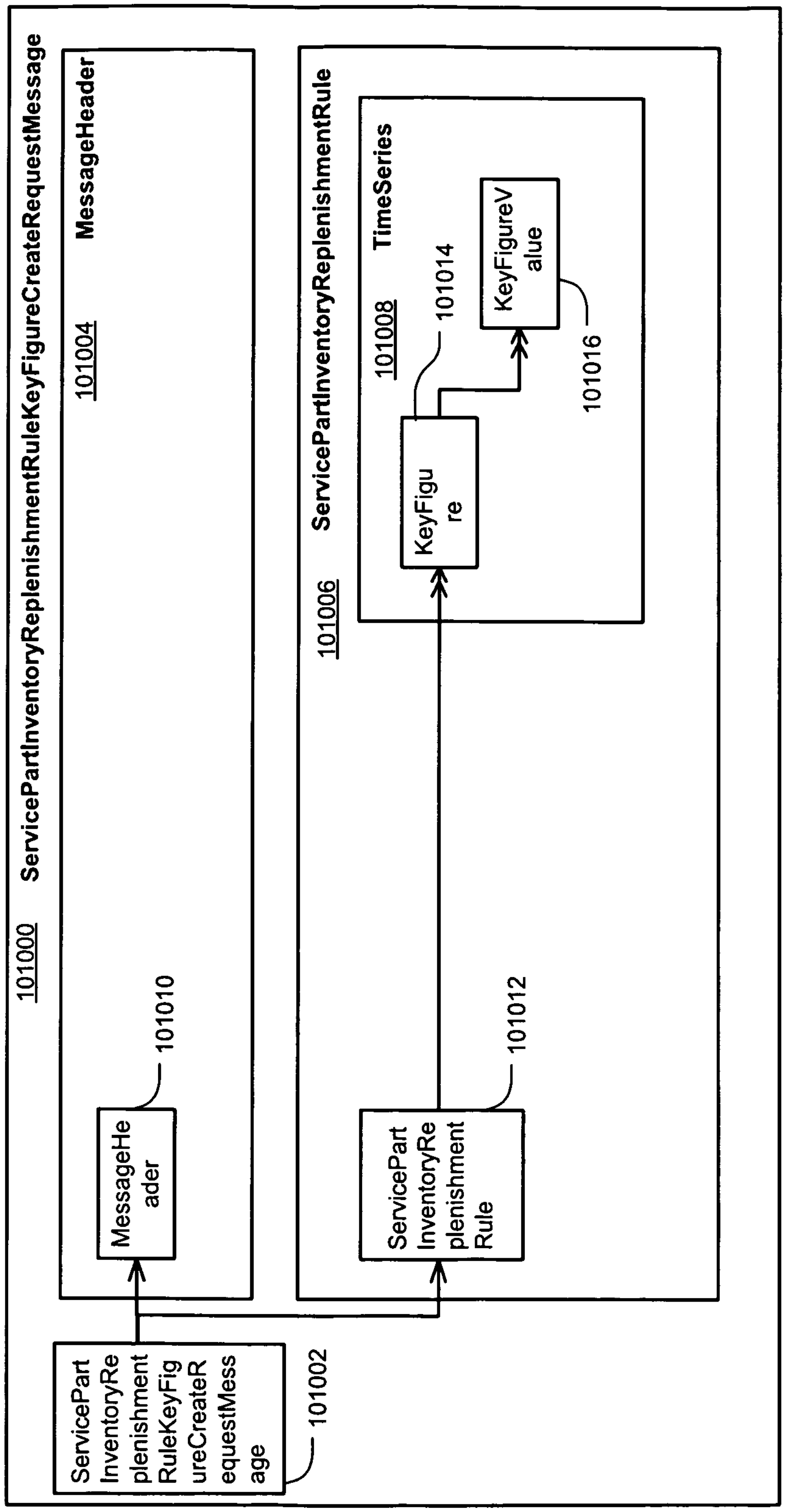
FIG. 101 shows an exemplary ServicePartInventoryReplenishmentRuleKeyFigureCreateRequestMessage Message Data Type.

Additionally, FIG. 101 illustrates one example logical configuration of ServicePartInventoryReplenishmentRuleKeyFigureCreateRequestMessage message 101000. Specifically, this figure depicts the arrangement and hierarchy of various components such as one or more levels of packages, entities, and datatypes, shown here as 101000 through 101016. As described above, packages may be used to represent hierarchy levels. Entities are discrete business elements that are used during a business transaction. Data types are used to type object entities and interfaces with a structure. For example, ServicePartInventoryReplenishmentRuleKeyFigureCreateRequestMessage message 101000 includes, among other things, ServicePartInventoryReplenishmentRule 101006. Accordingly, heterogeneous applications may communicate using this consistent message configured as such.

Figure 102:
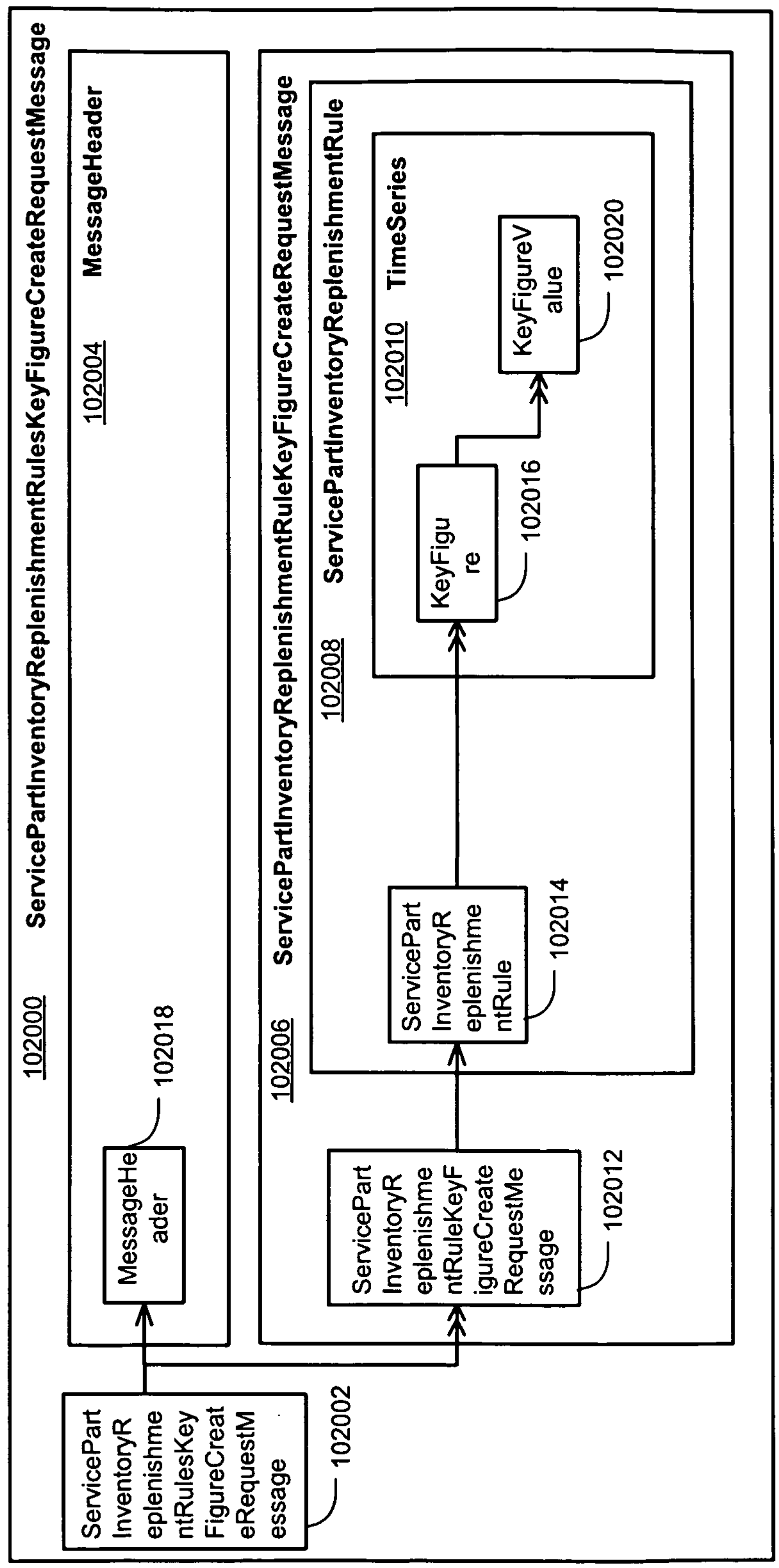
FIG. 102 shows an exemplary ServicePartInventoryReplenishmentRulesKeyFigureCreateRequestMessage Message Data Type.

Additionally, FIG. 102 illustrates one example logical configuration of ServicePartInventoryReplenishmentRulesKeyFigureCreateRequestMessage message 102000. Specifically, this figure depicts the arrangement and hierarchy of various components such as one or more levels of packages, entities, and datatypes, shown here as 102000 through 102020. As described above, packages may be used to represent hierarchy levels. Entities are discrete business elements that are used during a business transaction. Data types are used to type object entities and interfaces with a structure. For example, ServicePartInventoryReplenishmentRulesKeyFigureCreateRequestMessage message 102000 includes, among other things, ServicePartInventoryReplenishmentRuleKeyFigureCreateRequestMessage 102006. Accordingly, heterogeneous applications may communicate using this consistent message configured as such.

Figure 103:
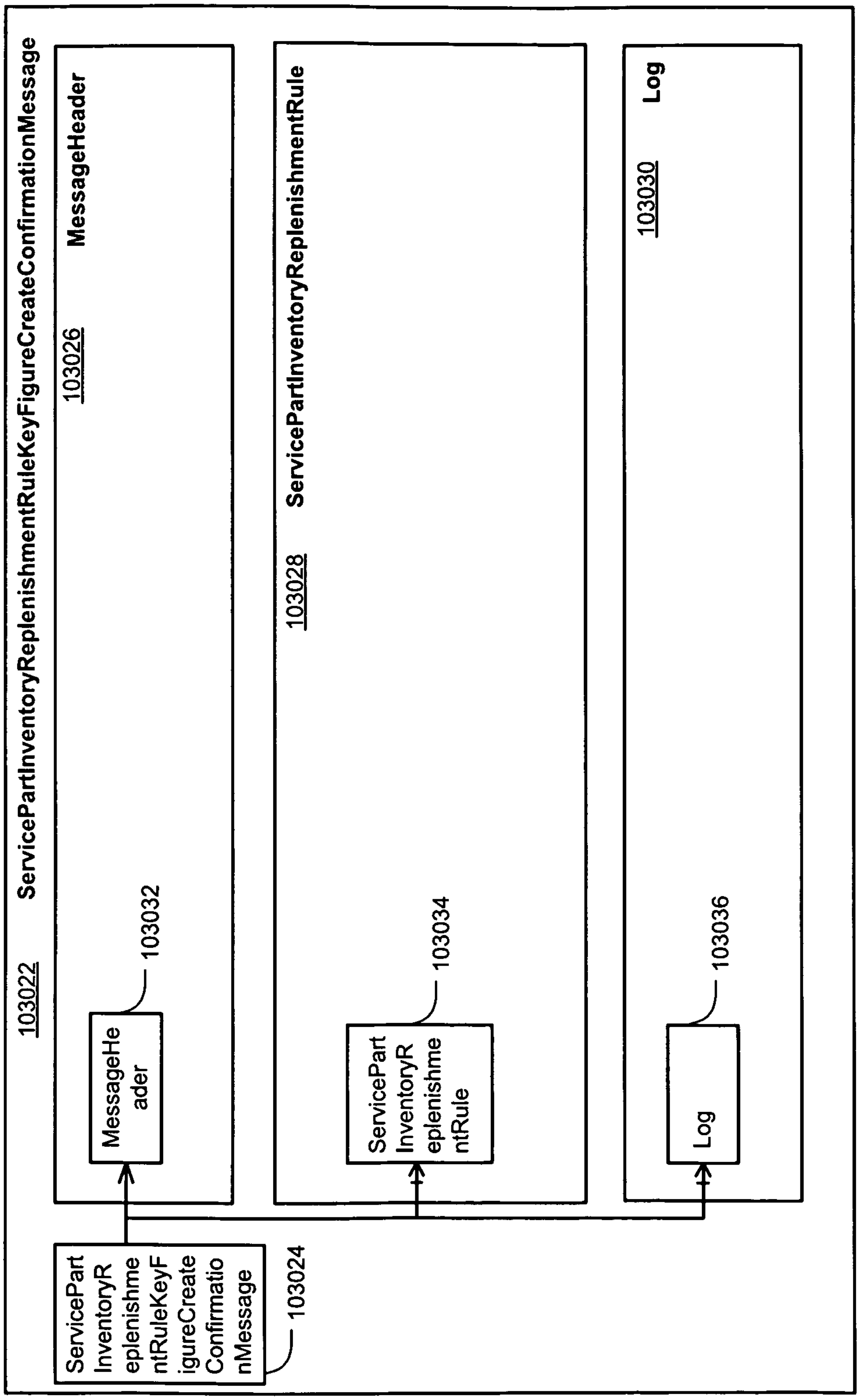
FIG. 103 shows an exemplary ServicePartInventoryReplenishmentRuleKeyFigureCreateConfirmationMessage Message Data Type.

Additionally, FIG. 103 illustrates one example logical configuration of ServicePartInventoryReplenishmentRuleKeyFigureCreateConfirmationMessage message 103000. Specifically, this figure depicts the arrangement and hierarchy of various components such as one or more levels of packages, entities, and datatypes, shown here as 103000 through 103014. As described above, packages may be used to represent hierarchy levels. Entities are discrete business elements that are used during a business transaction. Data types are used to type object entities and interfaces with a structure. For example, ServicePartInventoryReplenishmentRuleKeyFigureCreateConfirmationMessage message 103000 includes, among other things, ServicePartInventoryReplenishmentRule 103006. Accordingly, heterogeneous applications may communicate using this consistent message configured as such.

Figure 104:
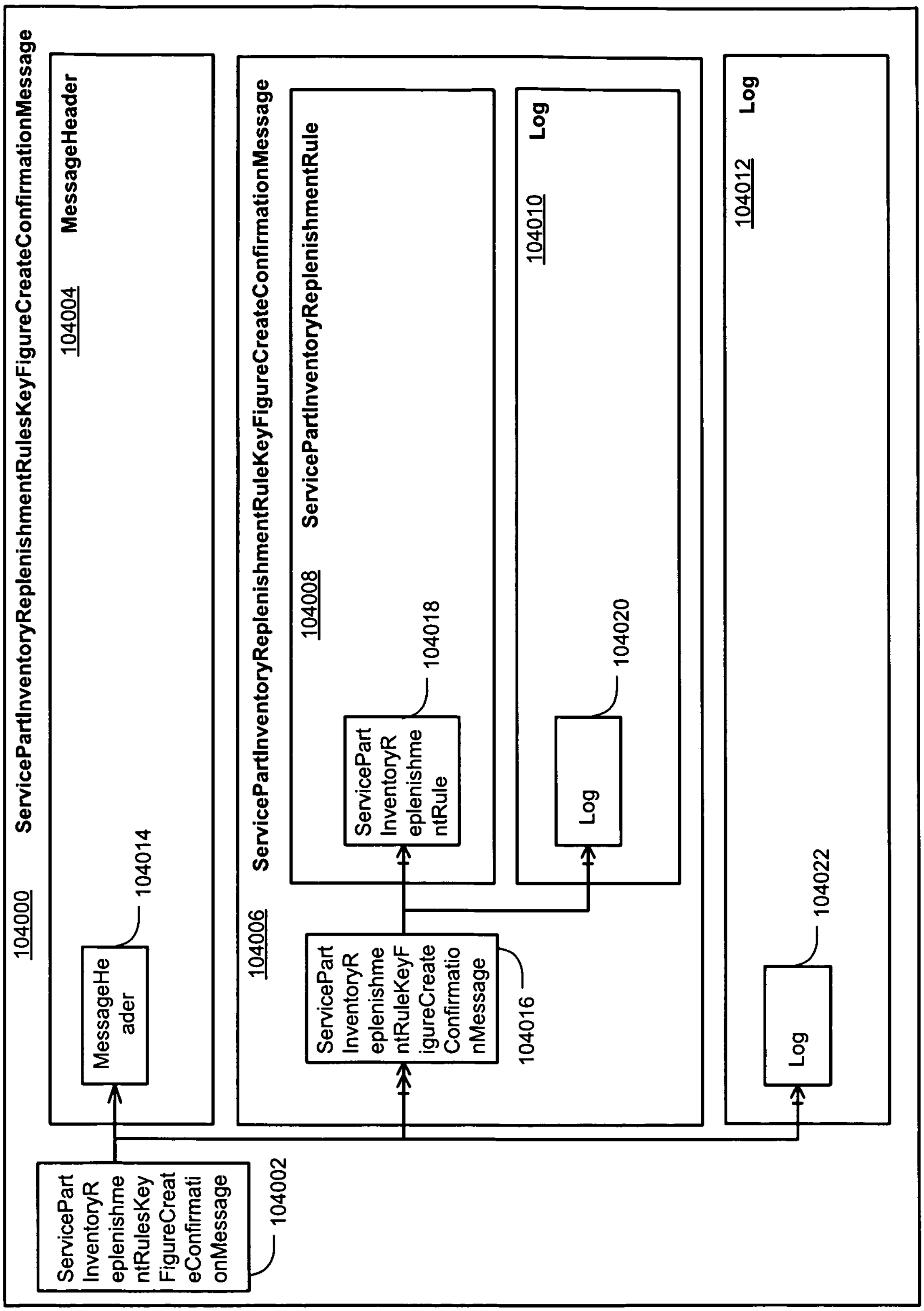
FIG. 104 shows an exemplary ServicePartInventoryReplenishmentRulesKeyFiguresCreateConfirmationMessage Message Data Type.

Additionally, FIG. 104 illustrates one example logical configuration of ServicePartInventoryReplenishmentRulesKeyFigureCreateConfirmationMessage message 104000. Specifically, this figure depicts the arrangement and hierarchy of various components such as one or more levels of packages, entities, and datatypes, shown here as 104000 through 104022. As described above, packages may be used to represent hierarchy levels. Entities are discrete business elements that are used during a business transaction. Data types are used to type object entities and interfaces with a structure. For example, ServicePartInventoryReplenishmentRulesKeyFigureCreateConfirmationMessage message 104000 includes, among other things, ServicePartInventoryReplenishmentRuleKeyFigureCreateConfirmation Message 104006. Accordingly, heterogeneous applications may communicate using this consistent message configured as such.

Figure 105:
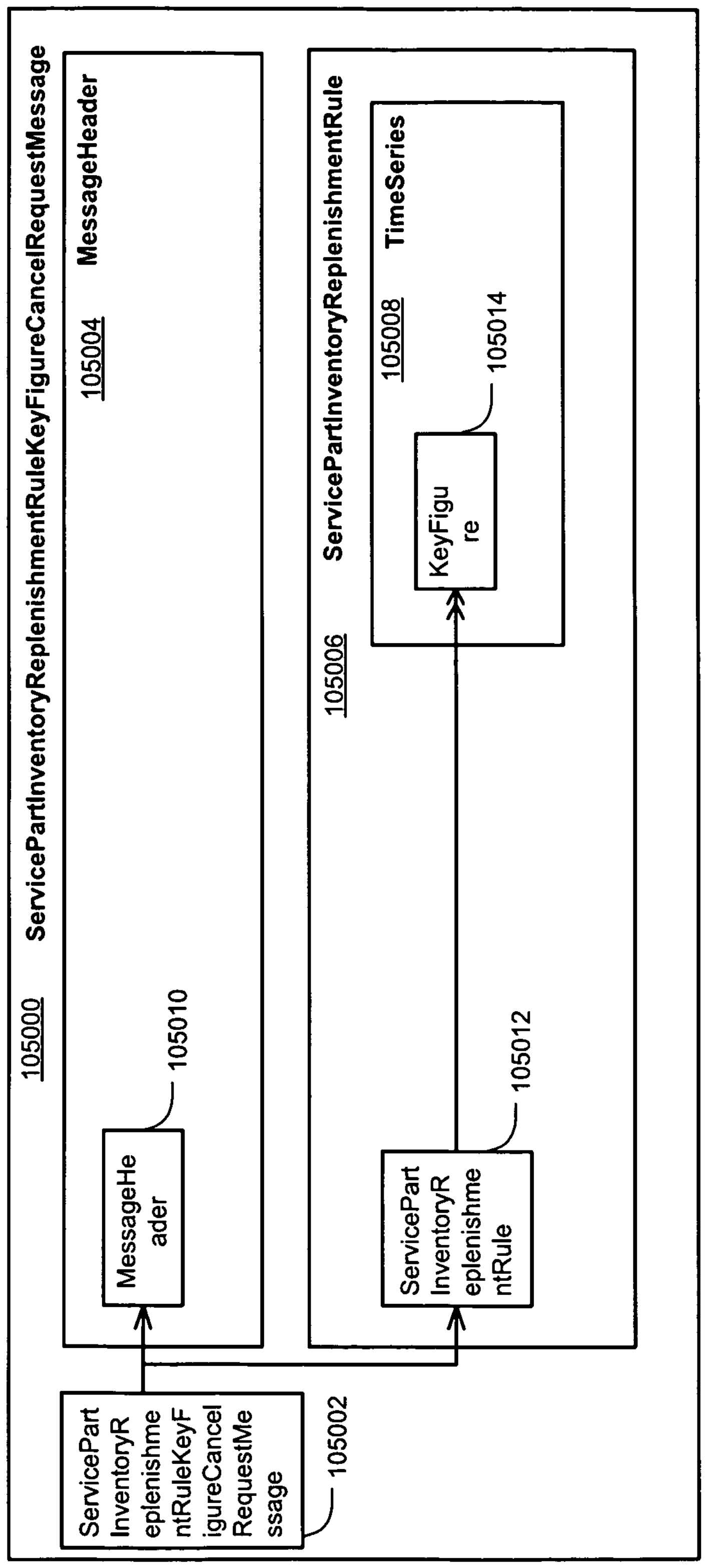
FIG. 105 shows an exemplary ServicePartInventoryReplenishmentRuleKeyFigureCancelRequestMessage Message Data Type.

Additionally, FIG. 105 illustrates one example logical configuration of ServicePartInventoryReplenishmentRuleKeyFigureCancelRequestMessage message 105000. Specifically, this figure depicts the arrangement and hierarchy of various components such as one or more levels of packages, entities, and datatypes, shown here as 105000 through 105014. As described above, packages may be used to represent hierarchy levels. Entities are discrete business elements that are used during a business transaction. Data types are used to type object entities and interfaces with a structure. For example, ServicePartInventoryReplenishmentRuleKeyFigureCancelRequestMessage message 105000 includes, among other things, ServicePartInventoryReplenishmentRule 105006. Accordingly, heterogeneous applications may communicate using this consistent message configured as such.

Figure 106:
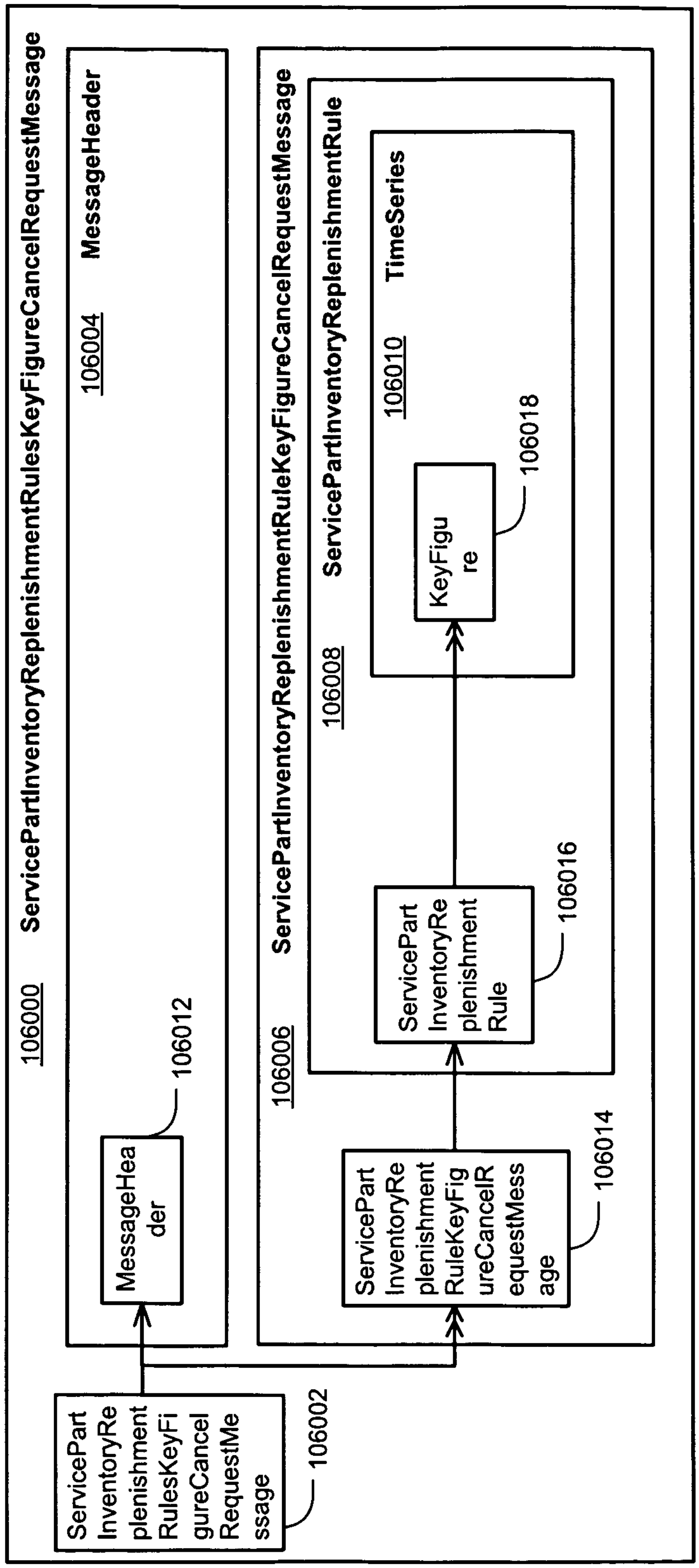
FIG. 106 shows an exemplary ServicePartInventoryReplenishmentRulesKeyFigureCancelRequestMessage Message Data Type.

Additionally, FIG. 106 illustrates one example logical configuration of ServicePartInventoryReplenishmentRulesKeyFigureCancelRequestMessage message 106000. Specifically, this figure depicts the arrangement and hierarchy of various components such as one or more levels of packages, entities, and datatypes, shown here as 106000 through 106018. As described above, packages may be used to represent hierarchy levels. Entities are discrete business elements that are used during a business transaction. Data types are used to type object entities and interfaces with a structure. For example, ServicePartInventoryReplenishmentRulesKeyFigureCancelRequestMessage message 106000 includes, among other things, ServicePartInventoryReplenishmentRuleKeyFigureCancelRequestMessage 106006. Accordingly, heterogeneous applications may communicate using this consistent message configured as such.

Figure 107:
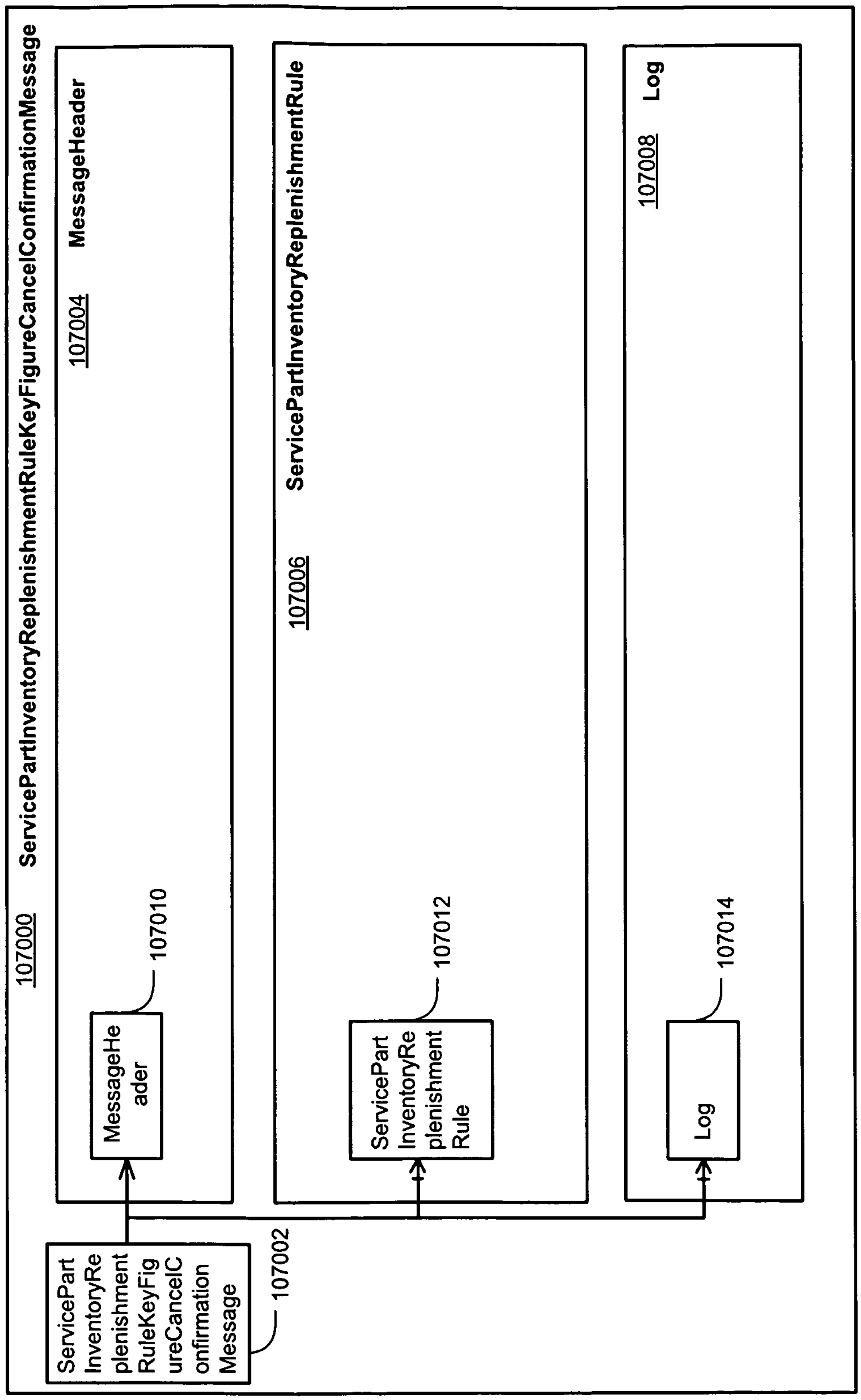
FIG. 107 shows an exemplary ServicePartInventoryReplenishmentRuleKeyFigureCancelConfirmationMessage Message Data Type.

Additionally, FIG. 107 illustrates one example logical configuration of ServicePartInventoryReplenishmentRuleKeyFigureCancelConfirmationMessage message 107000. Specifically, this figure depicts the arrangement and hierarchy of various components such as one or more levels of packages, entities, and datatypes, shown here as 107000 through 107014. As described above, packages may be used to represent hierarchy levels. Entities are discrete business elements that are used during a business transaction. Data types are used to type object entities and interfaces with a structure. For example, ServicePartInventoryReplenishmentRuleKeyFigureCancelConfirmationMessage message 107000 includes, among other things, ServicePartInventoryReplenishmentRule 107006. Accordingly, heterogeneous applications may communicate using this consistent message configured as such.

Figure 108:
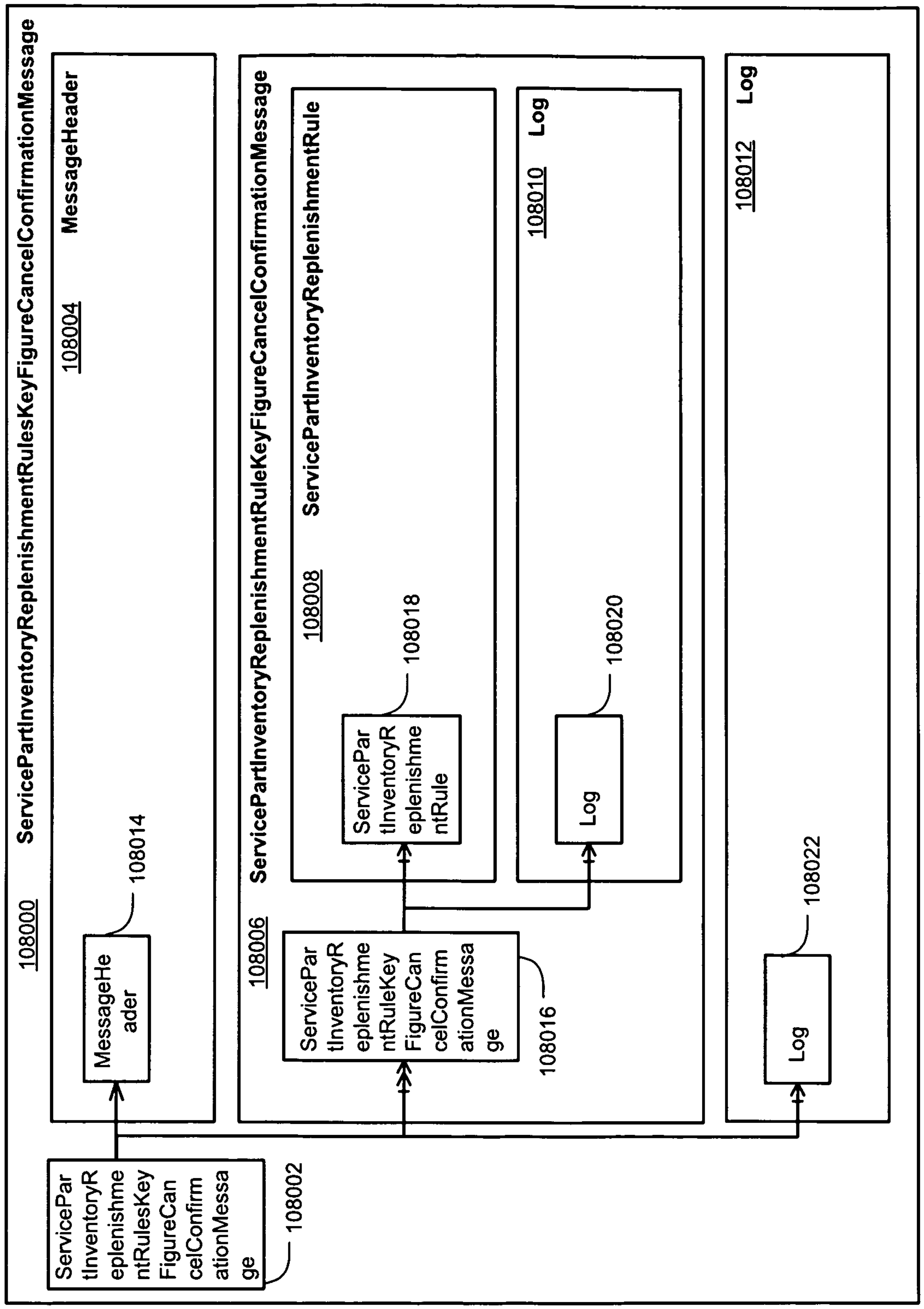
FIG. 108 shows an exemplary ServicePartInventoryReplenishmentRulesKeyFiguresCancelConfirmationMessage Message Data Type.

Additionally, FIG. 108 illustrates one example logical configuration of ServicePartInventoryReplenishmentRulesKeyFigureCancelConfirmationMessage message 108000. Specifically, this figure depicts the arrangement and hierarchy of various components such as one or more levels of packages, entities, and datatypes, shown here as 108000 through 108022. As described above, packages may be used to represent hierarchy levels. Entities are discrete business elements that are used during a business transaction. Data types are used to type object entities and interfaces with a structure. For example, ServicePartInventoryReplenishmentRulesKeyFigureCancelConfirmationMessage message 108000 includes, among other things, ServicePartInventoryReplenishmentRuleKeyFigureCancelConfirmation Message 108006. Accordingly, heterogeneous applications may communicate using this consistent message configured as such.

Figure 109:
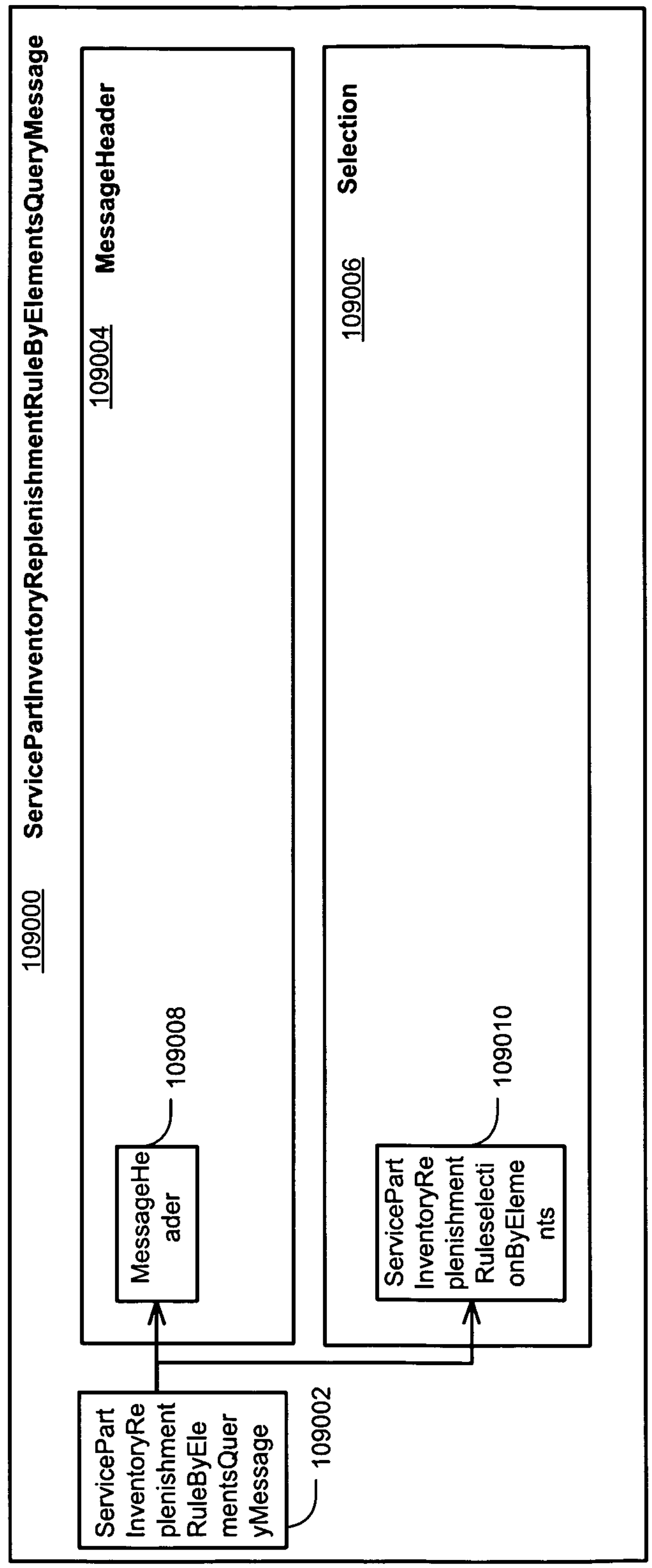
FIG. 109 shows an exemplary ServicePartInventoryReplenishmentRuleByElementsQueryMessage Message Data Type.

Additionally, FIG. 109 illustrates one example logical configuration of ServicePartInventoryReplenishmentRuleByElementsQueryMessage message 109000. Specifically, this figure depicts the arrangement and hierarchy of various components such as one or more levels of packages, entities, and datatypes, shown here as 109000 through 109010. As described above, packages may be used to represent hierarchy levels. Entities are discrete business elements that are used during a business transaction. Data types are used to type object entities and interfaces with a structure. For example, ServicePartInventoryReplenishmentRuleByElementsQueryMessage message 109000 includes, among other things, Selection 109006. Accordingly, heterogeneous applications may communicate using this consistent message configured as such.

Figure 110:
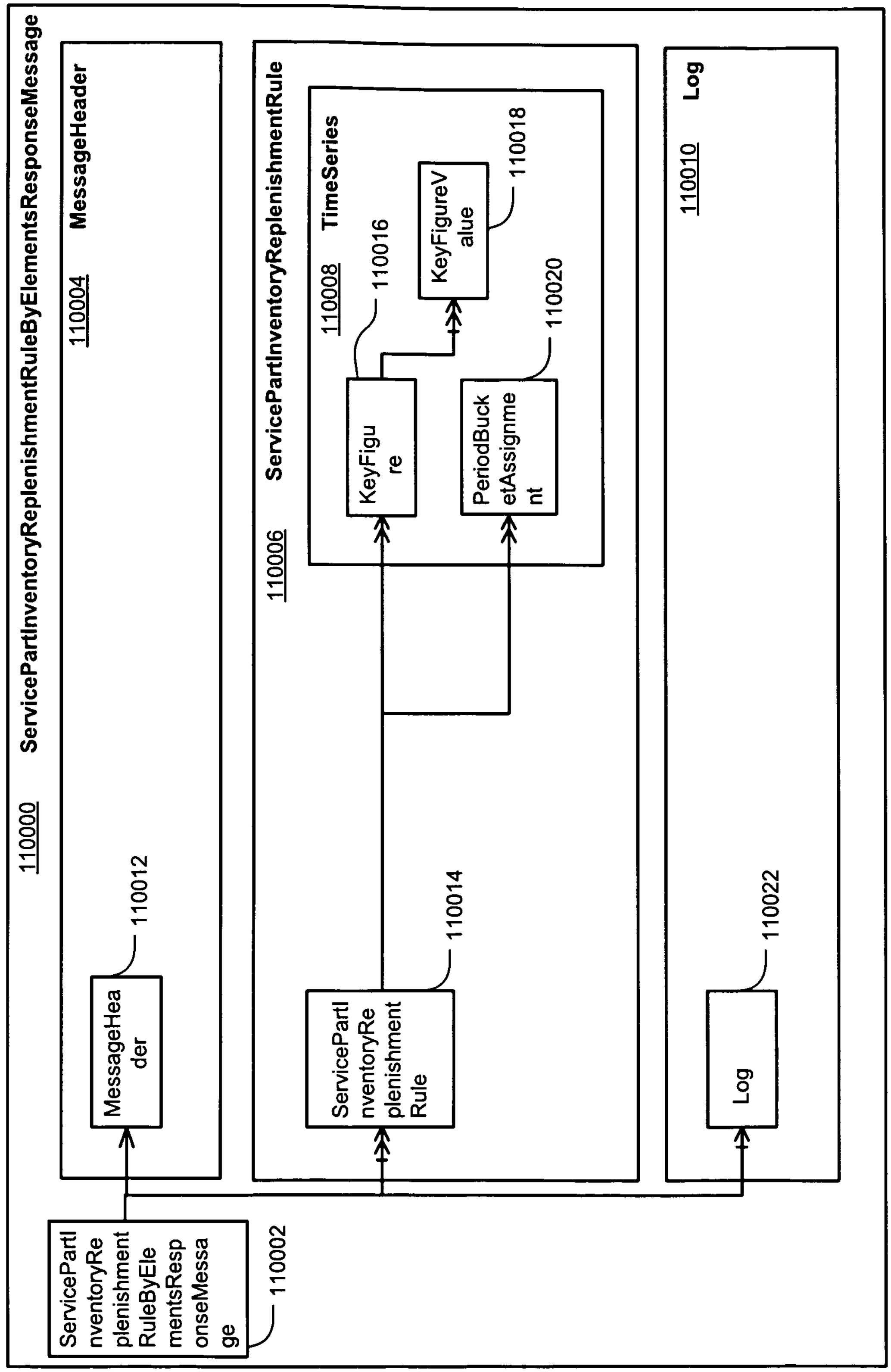
FIG. 110 shows an exemplary ServicePartInventoryReplenishmentRuleByElementsResponseMessage Message Data Type.

Additionally, FIG. 110 illustrates one example logical configuration of ServicePartInventoryReplenishmentRuleByElementsResponseMessage message 110000. Specifically, this figure depicts the arrangement and hierarchy of various components such as one or more levels of packages, entities, and datatypes, shown here as 110000 through 110022. As described above, packages may be used to represent hierarchy levels. Entities are discrete business elements that are used during a business transaction. Data types are used to type object entities and interfaces with a structure. For example, ServicePartInventoryReplenishmentRuleByElementsResponseMessage message 110000 includes, among other things, ServicePartInventoryReplenishmentRule 110006. Accordingly, heterogeneous applications may communicate using this consistent message configured as such.

FIGS. 111-1 through 111-2 illustrate one example logical configuration of a ServicePartInventoryReplenishmentRuleCancelConfirmationMessage 111000 element structure. Specifically, these figures depict the arrangement and hierarchy of various components such as one or more levels of packages, entities, and datatypes, shown here as 111000 through 111062. As described above, packages may be used to represent hierarchy levels. Entities are discrete business elements that are used during a business transaction. Data types are used to type object entities and interfaces with a structure. For example, the ServicePartInventoryReplenishmentRuleCancelConfirmationMessage 111000 includes, among other things, a ServicePartInventoryReplenishmentRuleCancelConfirmationMessage 111002. Accordingly, heterogeneous applications may communicate using this consistent message configured as such.

FIGS. 112-1 through 112-2 illustrate one example logical configuration of a ServicePartInventoryReplenishmentRuleCancelRequestMessage 112000 element structure. Specifically, these figures depict the arrangement and hierarchy of various components such as one or more levels of packages, entities, and datatypes, shown here as 112000 through 112054. As described above, packages may be used to represent hierarchy levels. Entities are discrete business elements that are used during a business transaction. Data types are used to type object entities and interfaces with a structure. For example, the ServicePartInventoryReplenishmentRuleCancelRequestMessage 112000 includes, among other things, a ServicePartInventoryReplenishmentRuleCancelRequestMessage 112002. Accordingly, heterogeneous applications may communicate using this consistent message configured as such.

FIGS. 113-1 through 113-2 illustrate one example logical configuration of a ServicePartInventoryReplenishmentRuleChangeConfirmationMessage 113000 element structure. Specifically, these figures depict the arrangement and hierarchy of various components such as one or more levels of packages, entities, and datatypes, shown here as 113000 through 113062. As described above, packages may be used to represent hierarchy levels. Entities are discrete business elements that are used during a business transaction. Data types are used to type object entities and interfaces with a structure. For example, the ServicePartInventoryReplenishmentRuleChangeConfirmationMessage 113000 includes, among other things, a ServicePartInventoryReplenishmentRuleChangeConfirmationMessage 113002. Accordingly, heterogeneous applications may communicate using this consistent message configured as such.

FIGS. 114-1 through 114-5 illustrate one example logical configuration of a ServicePartInventoryReplenishmentRuleChangeRequestMessage 114000 element structure. Specifically, these figures depict the arrangement and hierarchy of various components such as one or more levels of packages, entities, and datatypes, shown here as 114000 through 114116. As described above, packages may be used to represent hierarchy levels. Entities are discrete business elements that are used during a business transaction. Data types are used to type object entities and interfaces with a structure. For example, the ServicePartInventoryReplenishmentRuleChangeRequestMessage 114000 includes, among other things, a ServicePartInventoryReplenishmentRuleChangeRequestMessage 114002. Accordingly, heterogeneous applications may communicate using this consistent message configured as such.

FIGS. 115-1 through 115-2 illustrate one example logical configuration of a ServicePartInventoryReplenishmentRuleCreateConfirmationMessage 115000 element structure. Specifically, these figures depict the arrangement and hierarchy of various components such as one or more levels of packages, entities, and datatypes, shown here as 115000 through 115062. As described above, packages may be used to represent hierarchy levels. Entities are discrete business elements that are used during a business transaction. Data types are used to type object entities and interfaces with a structure. For example, the ServicePartInventoryReplenishmentRuleCreateConfirmationMessage 115000 includes, among other things, a ServicePartInventoryReplenishmentRuleCreateConfirmationMessage 115002. Accordingly, heterogeneous applications may communicate using this consistent message configured as such.

FIGS. 116-1 through 116-4 illustrate one example logical configuration of a ServicePartInventoryReplenishmentRuleCreateRequestMessage 116000 element structure. Specifically, these figures depict the arrangement and hierarchy of various components such as one or more levels of packages, entities, and datatypes, shown here as 116000 through 116110. As described above, packages may be used to represent hierarchy levels. Entities are discrete business elements that are used during a business transaction. Data types are used to type object entities and interfaces with a structure. For example, the ServicePartInventoryReplenishmentRuleCreateRequestMessage 116000 includes, among other things, a ServicePartInventoryReplenishmentRuleCreateRequestMessage 116002. Accordingly, heterogeneous applications may communicate using this consistent message configured as such.

FIGS. 117-1 through 117-2 illustrate one example logical configuration of a ServicePartInventoryReplenishmentRuleKeyFigureCancelConfirmationMessage 117000 element structure. Specifically, these figures depict the arrangement and hierarchy of various components such as one or more levels of packages, entities, and datatypes, shown here as 117000 through 117062. As described above, packages may be used to represent hierarchy levels. Entities are discrete business elements that are used during a business transaction. Data types are used to type object entities and interfaces with a structure. For example, the ServicePartInventoryReplenishmentRuleKeyFigureCancelConfirmationMessage 117000 includes, among other things, a ServicePartInventoryReplenishmentRuleKeyFigureCancelConfirmationMessage 117002. Accordingly, heterogeneous applications may communicate using this consistent message configured as such.

FIGS. 118-1 through 118-3 illustrate one example logical configuration of a ServicePartInventoryReplenishmentRuleKeyFigureCancelRequestMessage 118000 element structure. Specifically, these figures depict the arrangement and hierarchy of various components such as one or more levels of packages, entities, and datatypes, shown here as 118000 through 118068. As described above, packages may be used to represent hierarchy levels. Entities are discrete business elements that are used during a business transaction. Data types are used to type object entities and interfaces with a structure. For example, the ServicePartInventoryReplenishmentRuleKeyFigureCancelRequestMessage 118000 includes, among other things, a ServicePartInventoryReplenishmentRuleKeyFigureCancelRequestMessage 118002. Accordingly, heterogeneous applications may communicate using this consistent message configured as such.

FIGS. 119-1 through 119-2 illustrate one example logical configuration of a ServicePartInventoryReplenishmentRuleKeyFigureCreateConfirmationMessage 119000 element structure. Specifically, these figures depict the arrangement and hierarchy of various components such as one or more levels of packages, entities, and datatypes, shown here as 119000 through 119062. As described above, packages may be used to represent hierarchy levels. Entities are discrete business elements that are used during a business transaction. Data types are used to type object entities and interfaces with a structure. For example, the ServicePartInventoryReplenishmentRuleKeyFigureCreateConfirmationMessage 119000 includes, among other things, a ServicePartInventoryReplenishmentRuleKeyFigureCreateConfirmationMessage 119002. Accordingly, heterogeneous applications may communicate using this consistent message configured as such.

FIGS. 120-1 through 120-4 illustrate one example logical configuration of a ServicePartInventoryReplenishmentRuleKeyFigureCreateRequestMessage 120000 element structure. Specifically, these figures depict the arrangement and hierarchy of various components such as one or more levels of packages, entities, and datatypes, shown here as 120000 through 120092. As described above, packages may be used to represent hierarchy levels. Entities are discrete business elements that are used during a business transaction. Data types are used to type object entities and interfaces with a structure. For example, the ServicePartInventoryReplenishmentRuleKeyFigureCreateRequestMessage 120000 includes, among other things, a ServicePartInventoryReplenishmentRuleKeyFigureCreateRequestMessage 120002. Accordingly, heterogeneous applications may communicate using this consistent message configured as such.

FIGS. 121-1 through 121-3 illustrate one example logical configuration of a ServicePartInventoryReplenishmentRulesCancelConfirmationMessage 121000 element structure. Specifically, these figures depict the arrangement and hierarchy of various components such as one or more levels of packages, entities, and datatypes, shown here as 121000 through 121078. As described above, packages may be used to represent hierarchy levels. Entities are discrete business elements that are used during a business transaction. Data types are used to type object entities and interfaces with a structure. For example, the ServicePartInventoryReplenishmentRulesCancelConfirmationMessage 121000 includes, among other things, a ServicePartInventoryReplenishmentRulesCancelConfirmationMessage 121002. Accordingly, heterogeneous applications may communicate using this consistent message configured as such.

FIGS. 122-1 through 122-3 illustrate one example logical configuration of a ServicePartInventoryReplenishmentRulesCancelRequestMessage 122000 element structure. Specifically, these figures depict the arrangement and hierarchy of various components such as one or more levels of packages, entities, and datatypes, shown here as 122000 through 122062. As described above, packages may be used to represent hierarchy levels. Entities are discrete business elements that are used during a business transaction. Data types are used to type object entities and interfaces with a structure. For example, the ServicePartInventoryReplenishmentRulesCancelRequestMessage 122000 includes, among other things, a ServicePartInventoryReplenishmentRulesCancelRequestMessage 122002. Accordingly, heterogeneous applications may communicate using this consistent message configured as such.

FIGS. 123-1 through 123-3 illustrate one example logical configuration of a ServicePartInventoryReplenishmentRulesChangeConfirmationMessage 123000 element structure. Specifically, these figures depict the arrangement and hierarchy of various components such as one or more levels of packages, entities, and datatypes, shown here as 123000 through 123078. As described above, packages may be used to represent hierarchy levels. Entities are discrete business elements that are used during a business transaction. Data types are used to type object entities and interfaces with a structure. For example, the ServicePartInventoryReplenishmentRulesChangeConfirmationMessage 123000 includes, among other things, a ServicePartInventoryReplenishmentRulesChangeConfirmationMessage 123002. Accordingly, heterogeneous applications may communicate using this consistent message configured as such.

FIGS. 124-1 through 124-5 illustrate one example logical configuration of a ServicePartInventoryReplenishmentRulesChangeRequestMessage 124000 element structure. Specifically, these figures depict the arrangement and hierarchy of various components such as one or more levels of packages, entities, and datatypes, shown here as 124000 through 124124. As described above, packages may be used to represent hierarchy levels. Entities are discrete business elements that are used during a business transaction. Data types are used to type object entities and interfaces with a structure. For example, the ServicePartInventoryReplenishmentRulesChangeRequestMessage 124000 includes, among other things, a ServicePartInventoryReplenishmentRulesChangeRequestMessage 124002. Accordingly, heterogeneous applications may communicate using this consistent message configured as such.

FIGS. 125-1 through 125-3 illustrate one example logical configuration of a ServicePartInventoryReplenishmentRulesCreateConfirmationMessage 125000 element structure. Specifically, these figures depict the arrangement and hierarchy of various components such as one or more levels of packages, entities, and datatypes, shown here as 125000 through 125078. As described above, packages may be used to represent hierarchy levels. Entities are discrete business elements that are used during a business transaction. Data types are used to type object entities and interfaces with a structure. For example, the ServicePartInventoryReplenishmentRulesCreateConfirmationMessage 125000 includes, among other things, a ServicePartInventoryReplenishmentRulesCreateConfirmationMessage 125002. Accordingly, heterogeneous applications may communicate using this consistent message configured as such.

FIGS. 126-1 through 126-5 illustrate one example logical configuration of a ServicePartInventoryReplenishmentRulesCreateRequestMessage 126000 element structure. Specifically, these figures depict the arrangement and hierarchy of various components such as one or more levels of packages, entities, and datatypes, shown here as 126000 through 126118. As described above, packages may be used to represent hierarchy levels. Entities are discrete business elements that are used during a business transaction. Data types are used to type object entities and interfaces with a structure. For example, the ServicePartInventoryReplenishmentRulesCreateRequestMessage 126000 includes, among other things, a ServicePartInventoryReplenishmentRulesCreateRequestMessage 126002. Accordingly, heterogeneous applications may communicate using this consistent message configured as such.

FIGS. 127-1 through 127-3 illustrate one example logical configuration of a ServicePartInventoryReplenishmentRulesKeyFigureCancelConfirmationMessage 127000 element structure. Specifically, these figures depict the arrangement and hierarchy of various components such as one or more levels of packages, entities, and datatypes, shown here as 127000 through 127078. As described above, packages may be used to represent hierarchy levels. Entities are discrete business elements that are used during a business transaction. Data types are used to type object entities and interfaces with a structure. For example, the ServicePartInventoryReplenishmentRulesKeyFigureCancelConfirmationMessage 127000 includes, among other things, a ServicePartInventoryReplenishmentRulesKeyFigureCancelConfirmationMessage 127002. Accordingly, heterogeneous applications may communicate using this consistent message configured as such.

FIGS. 128-1 through 128-3 illustrate one example logical configuration of a ServicePartInventoryReplenishmentRulesKeyFigureCancelRequestMessage 128000 element structure. Specifically, these figures depict the arrangement and hierarchy of various components such as one or more levels of packages, entities, and datatypes, shown here as 128000 through 128076. As described above, packages may be used to represent hierarchy levels. Entities are discrete business elements that are used during a business transaction. Data types are used to type object entities and interfaces with a structure. For example, the ServicePartInventoryReplenishmentRulesKeyFigureCancelRequestMessage 128000 includes, among other things, a ServicePartInventoryReplenishmentRulesKeyFigureCancelRequestMessage 128002. Accordingly, heterogeneous applications may communicate using this consistent message configured as such.

FIGS. 129-1 through 129-3 illustrate one example logical configuration of a ServicePartInventoryReplenishmentRulesKeyFigureCreateConfirmationMessage 129000 element structure. Specifically, these figures depict the arrangement and hierarchy of various components such as one or more levels of packages, entities, and datatypes, shown here as 129000 through 129078. As described above, packages may be used to represent hierarchy levels. Entities are discrete business elements that are used during a business transaction. Data types are used to type object entities and interfaces with a structure. For example, the ServicePartInventoryReplenishmentRulesKeyFigureCreateConfirmationMessage 129000 includes, among other things, a ServicePartInventoryReplenishmentRulesKeyFigureCreateConfirmationMessage 129002. Accordingly, heterogeneous applications may communicate using this consistent message configured as such.

FIGS. 130-1 through 130-5 illustrate one example logical configuration of a ServicePartInventoryReplenishmentRulesKeyFigureCreateRequestMessage 130000 element structure. Specifically, these figures depict the arrangement and hierarchy of various components such as one or more levels of packages, entities, and datatypes, shown here as 130000 through 130100. As described above, packages may be used to represent hierarchy levels. Entities are discrete business elements that are used during a business transaction. Data types are used to type object entities and interfaces with a structure. For example, the ServicePartInventoryReplenishmentRulesKeyFigureCreateRequestMessage 130000 includes, among other things, a ServicePartInventoryReplenishmentRulesKeyFigureCreateRequestMessage 130002. Accordingly, heterogeneous applications may communicate using this consistent message configured as such.

Message Data Type ServicePartInventoryReplenishmentRuleTemplateMessage

The message data type ServicePartInventoryReplenishmentRuleTemplateMessage includes the ServicePartInventoryReplenishmentRule included in the business document and the business information that is relevant for sending a business document in a message. It includes the MessageHeader package, ServicePartInventoryReplenishmentRule package, and Log package. The message data type ServicePartInventoryReplenishmentRuleTemplateMessage is used as an abstract message data type, which unifies all packages and entities, for example, for the following concrete message data types: ServicePartInventoryReplenishment RuleCreateRequestMessage, ServicePartInventoryReplenishmentRuleCreateConfirmationMessage, ServicePartInventoryReplenishmentRuleChangeRequestMessage, ServicePartInventoryReplenishmentRuleChange ConfirmationMessage, ServicePartInventoryReplenishmentRule CancelRequestMessage, ServicePartInventoryReplenishment RuleCancelConfirmation Message, ServicePartInventoryReplenishmentRuleKey FigureCreateRequestMessage, ServicePartInventoryReplenishmentRuleKeyFigure CreateConfirmationMessage, ServicePartInventoryReplenishment RuleKeyFigureCancel RequestMessage, ServicePartInventoryReplenishmentRuleKeyFigureCancelConfirmation Message, and ServicePartInventoryReplenishment RuleByElementsResponseMessage.

The following table shows the packages and entities of the abstract message data type ServicePartInventoryReplenishmentRuleTemplateMessage that are used in the above mentioned concrete message data types:

| | Package/Entity | | | | | |
|---|---|---|---|---|---|---|
| Message data type | Message header | ServicePartInventoryReplenishmentRule | TimeSeries/KeyFigure | TimeSeries/KeyFigureValue | TimeSeries/PeriodBucketAssignment | Log |
| ServicePartInventoryReplenishmentRuleCreateRequestMessage | 1:1 | 1:1 | 1:n | 1:n | 1:n | |
| ServicePartInventoryReplenishmentRuleCreateConfirmationMessage | 1:1 | 1:c | | | | 1:c |
| ServicePartInventoryReplenishmentRuleChangeRequestMessage | 1:1 | 1:1 | 1:n | 1:cn | 1:n | |
| ServicePartInventoryReplenishmentRuleChangeConfirmationMessage | 1:1 | 1:c | | | | 1:c |
| ServicePartInventoryReplenishmentRuleCancelRequestMessage | 1:1 | 1:1 | | | | |
| ServicePartInventoryReplenishmentRuleCancelConfirmationMessage | 1:1 | 1:c | | | | 1:c |
| ServicePartInventoryReplenishmentRuleKeyFigureCreateRequestMessage | 1:1 | 1:1 | 1:n | 1:n | 1:n | |
| ServicePartInventoryReplenishmentRuleKeyFigureCreateConfirmationMessage | 1:1 | 1:c | 1:cn | | | 1:c |
| ServicePartInventoryReplenishmentRuleKeyFigureCancelRequestMessage | 1:1 | 1:1 | 1:n | | | |
| ServicePartInventoryReplenishmentRuleKeyFigureCancelConfirmationMessage | 1:1 | 1:c | 1:cn | | | 1:c |
| ServicePartInventoryReplenishmentRuleByElementsResponseMessage | 1:1 | 1:cn | 1:n | 1:cn | 1:n | 1:c |

FIGS. 131-1 through 131-5 illustrate one example logical configuration of a ServicePartInventoryReplenishmentRuleByElementsResponseMessage 131000 element structure. Specifically, these figures depict the arrangement and hierarchy of various components such as one or more levels of packages, entities, and datatypes, shown here as 131000 through 131124. As described above, packages may be used to represent hierarchy levels. Entities are discrete business elements that are used during a business transaction. Data types are used to type object entities and interfaces with a structure. For example, the ServicePartInventoryReplenishmentRuleByElementsResponseMessage 131000 includes, among other things, a ServicePartInventoryReplenishmentRuleByElementsResponseMessage 131002. Accordingly, heterogeneous applications may communicate using this consistent message configured as such.

A MessageHeader package groups the business information that is relevant for sending a business document in a message. It includes the MessageHeader entity. A MessageHeader groups business information from the perspective of the sending application, such as information to identify the business document in a message, information about the sender, and (possibly) information about the recipient. The MessageHeader includes SenderParty and RecipientParty. It is of type GDT:BusinessDocumentMessageHeader, whereby the following elements of the GDT are used: ID, ReferenceID, SenderParty, and RecipientParty. A SenderParty is the party responsible for sending a business document at a business application level. The SenderParty is of type GDT:BusinessDocumentMessageHeaderParty. A RecipientParty is the party responsible for receiving a business document at a business application level. The RecipientParty is of type GDT:

BusinessDocumentMessageHeaderParty. The ServicePartInventoryReplenishmentRule package groups the Service Part Inventory Replenishment Rule with the package TimeSeries. A ServicePartInventoryReplenishmentRule entity identifies a time related series of inventory planning key figures used for subsequent replenishment processes. The elements at the ServicePartInventoryReplenishmentRule entity can include: InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID is a planning version referenced by the inventory replenishment rule (key field), and may be based on GDT:PlanningVersionID. ProductID is a product referenced by the inventory replenishment rule (key field), and may be based on GDT:ProductID. LocationID is a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

The TimeSeries package groups the information used to define a grid of time-dependent Inventory Replenishment Rule key figures. It includes the KeyFigure, KeyFigureValue, and PeriodBucketAssignment entities. A KeyFigure entity represents a part of an Inventory Replenishment Rule, such as Economic Order Quantity or Safety Stock. The entity KeyFigure is of type GDT:TimeSeriesKeyFigure with the elements Code, UnitOfMeasureCode, and KeyFigureValue. Code is a coded name of the key figure, and may be based on GDT:TimeSeriesKeyFigureCode. UnitOfMeasureCode is a unit of measure of all key figure values in the time series for this specific key figure, and may be based on GDT:MeasureUnitCode. KeyFigureValue includes the values of the key figure, and may be based on GDT:TimeSeriesKeyFigureTimeBucketValue.

A KeyFigureValue entity is the value of an Inventory Replenishment Rule key figure in a time bucket. The entity KeyFigureValue is of type GDT:TimeSeriesKeyFigureTimeBucketValue with the elements TimeBucketNumberIntValue and KeyFigureFloatValue. TimeBucketNumberIntValue is a unique identifying number of a time series period. It is usually a positive number, and may be based on GDT:IntegerValue. KeyFigureFloatValue is a value of a key figure in the time bucket, and may be based on GDT:FloatValue. In some implementations, TimeBucketNumberIntValue is related to an existing period-bucket assignment.

A PeriodBucketAssignment entity defines the time range that is represented by a time bucket. The entity PeriodBucketAssignment is of type GDT:TimeSeriesPeriodTimeBucketAssignment with the elements TimeBucketNumberIntValue, StartDateTime, and EndDateTime. TimeBucketNumberIntValue is a unique identifying number of a time series period. It is usually a positive number, and may be based on GDT:IntegerValue. StartDateTime defines the start date and time of the time bucket in time zone UTC (Coordinated Universal Time), and may be based on GDT:GLOBAL_DateTime. EndDateTime defines the end date and time of the time bucket in time zone UTC, and may be based on GDT:GLOBAL_DateTime.

A log is a sequence of messages that result when an application executes a task. The entity Log is of type GDT:Log. The Log package can be used in the message data types used for outbound messages from the perspective of the Service Parts Planning owner. The following message data types use this package: ServicePartInventoryReplenishmentRuleCreateConfirmationMessage, ServicePartInventoryReplenishmentRulesCreateConfirmationMessage, ServicePartInventoryReplenishmentRuleChange ConfirmationMessage, ServicePartInventoryReplenishmentRulesChangeConfirmationMessage, ServicePartInventoryReplenishmentRuleCancel ConfirmationMessage, ServicePartInventoryReplenishmentRules CancelConfirmationMessage, ServicePartInventoryReplenishmentRuleKeyFigureCreateConfirmationMessage, ServicePartInventoryReplenishmentRulesKeyFigureCreate ConfirmationMessage, ServicePartInventory Replenishment RuleKeyFigureChangeConfirmationMessage, ServicePartInventoryReplenishmentRulesKeyFigureChange ConfirmationMessage, ServicePartInventoryReplenishment RuleKeyFigureCancelConfirmationMessage, ServicePart InventoryReplenishmentRulesKeyFigureCancel ConfirmationMessage, and ServicePartInventoryReplenishmentRuleByElementsResponseMessage.

Message Data Type ServicePartInventoryReplenishmentRuleCreateRequestMessage

The message data type ServicePartInventoryReplenishmentRuleCreateRequestMessage includes the ServicePartInventoryReplenishmentRule included in the business document and the business information that is relevant for sending a business document in a message. It includes the MessageHeader package and ServicePartInventoryReplenishmentRule package.

The ServicePartInventoryReplenishmentRule package groups the Service Part Inventory Replenishment Rule with the package TimeSeries. A ServicePartInventoryReplenishmentRule entity identifies a time related series of inventory planning key figures used for subsequent replenishment processes.

The elements at the ServicePartInventoryReplenishmentRule entity can include PlanningVersionID, ProductID, LocationID, VirtualChildIndicator, and ThirdPartyOrderProcessingIndicator. PlanningVersionID is a planning version referenced by the inventory replenishment rule (key field), and may be based on GDT:PlanningVersionID. ProductID is a product referenced by the inventory replenishment rule (key field), and may be based on GDT:ProductID. LocationID is a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

The TimeSeries package groups the information used to define a grid of time-dependent Inventory Replenishment Rule key figures. It includes the KeyFigure, KeyFigureValue, and PeriodBucketAssignment entities. A KeyFigure entity represents a part of an Inventory Replenishment Rule, such as Economic Order Quantity or Safety Stock. The entity KeyFigure is of type GDT:TimeSeriesKeyFigure with the elements Code, UnitOfMeasureCode, and KeyFigureValue. Code is a coded name of the key figure, and may be based on GDT:TimeSeriesKeyFigureCode. UnitOfMeasureCode is a unit of measure of all key figure values in the time series for this specific key figure, and may be based on GDT:MeasureUnitCode. KeyFigureValue includes the values of the key figure, and may be based on GDT:TimeSeriesKeyFigureTimeBucketValue. In some implementations, the key figures used come from the pool of key figures for Inventory Replenishment Rule at the Service Parts Planning owner side.

A KeyFigureValue entity is the value of an Inventory Replenishment Rule key figure in a time bucket. The entity KeyFigureValue is of type GDT:TimeSeriesKeyFigureTimeBucketValue with the elements TimeBucketNumberIntValue and KeyFigureFloatValue. TimeBucketNumberIntValue is a unique identifying number of a time series period. It is usually a positive number, and may be based on GDT:IntegerValue. KeyFigureFloatValue is a value of a key figure in the time bucket, and may be based on GDT:FloatValue. In some implementations, TimeBucketNumberIntValue is related to an existing period-bucket assignment.

A PeriodBucketAssignment entity defines the time range that is represented by a time bucket. The entity PeriodBucketAssignment is of type GDT:TimeSeriesPeriodTimeBucketAssignment with the elements TimeBucketNumberIntValue, StartDateTime, and EndDateTime. TimeBucketNumberIntValue is a unique identifying number of a time series period. It is usually a positive number, and may be based on GDT:IntegerValue. StartDateTime defines the start date and time of the time bucket in time zone UTC, and may be based on GDT:GLOBAL_DateTime. EndDateTime defines the end date and time of the time bucket in time zone UTC, and may be based on GDT:GLOBAL_DateTime. In some implementations, the time range definition of time bucket is the same as the definition at the Service Parts Planning owner side.

Message Data Type ServicePartInventoryReplenishmentRulesCreateRequestMessage

The message data type ServicePartInventoryReplenishmentRulesCreateRequestMessage includes ServicePartInventoryReplenishmentRuleCreateRequestMessage and the business information that is relevant for sending a business document in the message. It includes the MessageHeader package and ServicePartInventoryReplenishmentRuleCreateRequestMessage.

Message Data Type ServicePartInventoryReplenishmentRuleCreateConfirmationMessage The message data type ServicePartInventoryReplenishmentRuleCreateConfirmationMessage includes the ServicePartInventoryReplenishmentRule included in the business document and the business information that is relevant for sending a business document in a message. It includes the MessageHeader package, ServicePartInventoryReplenishmentRule package, and Log package. In some implementations, if any error occurs when creating the ServicePartInventoryReplenishmentRule, the creation of the whole ServicePartInventoryReplenishmentRule is aborted and no ServicePartInventoryReplenishmentRule entity is returned in the confirmation message.

The ServicePartInventoryReplenishmentRule package includes the Service Part Inventory Replenishment Rule. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID identifies a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

Message Data Type ServicePartInventoryReplenishmentRulesCreateConfirmationMessage The message data type ServicePartInventoryReplenishmentRulesCreateConfirmationMessage includes ServicePartInventoryReplenishmentRuleCreateConfirmationMessage and the business information that is relevant for sending a business document in the message. It includes the MessageHeader package and ServicePartInventoryReplenishmentRuleCreateConfirmationMessage.

Message Data Type ServicePartInventoryReplenishmentRuleChangeRequestMessage

The message data type ServicePartInventoryReplenishmentRuleChangeRequestMessage includes the ServicePartInventoryReplenishmentRule included in the business document and the business information that is relevant for sending a business document in a message. It includes the MessageHeader package and ServicePartInventoryReplenishmentRule package.

The ServicePartInventoryReplenishmentRule package groups the Service Part Inventory Replenishment Rule with the package TimeSeries. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID identifies a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

In some implementations, the TimeSeries package groups information used to define a grid of time-dependent Inventory Replenishment Rule key figures. It includes the KeyFigure, KeyFigureValue, and PeriodBucketAssignment entities. A KeyFigure entity represents a part of an Inventory Replenishment Rule, such as Economic Order Quantity or Safety Stock. The entity KeyFigure is of type GDT:TimeSeriesKeyFigure with the elements Code, UnitOfMeasureCode, and KeyFigureValue. Code is a coded name of the key figure, and may be based on GDT:TimeSeriesKeyFigureCode. UnitOfMeasureCode is a unit of measure of all key figure values in the time series for this specific key figure, and may be based on GDT: MeasureUnitCode. KeyFigureValue includes the values of the key figure, and may be based on GDT:TimeSeriesKeyFigureTimeBucketValue. In some implementations, the key figures used come from the pool of key figures for Inventory Replenishment Rule at the Service Parts Planning owner side. In some implementations, the provided key figures are changed, while other existing key figures remain unchanged.

A KeyFigureValue entity is the value of an Inventory Replenishment Rule key figure in a time bucket. The entity KeyFigureValue is of type GDT:TimeSeriesKeyFigureTimeBucketValue with the elements TimeBucketNumberIntValue and KeyFigureFloatValue. TimeBucketNumberIntValue is a unique identifying number of a time series period. It is usually a positive number, and may be based on GDT:IntegerValue. KeyFigureFloatValue is a value of a key figure in the time bucket, and may be based on GDT:FloatValue.

In some implementations, TimeBucketNumberIntValue is related to an existing period-bucket assignment. In some implementations, the time buckets provided in the PeriodBucketAssignment are changed, while others can remain unchanged. The content of a time bucket can be deleted, if the time bucket is provided in the PeriodBucketAssignment, but not in the KeyFigureValue entity.

A PeriodBucketAssignment entity defines the time range that is represented by a time bucket. The entity PeriodBucketAssignment is of type GDT:TimeSeriesPeriodTimeBucketAssignment with the elements TimeBucketNumberIntValue, StartDateTime, and EndDateTime. TimeBucketNumberIntValue is a unique identifying number of a time series period. It is usually a positive number, and may be based on GDT:IntegerValue. StartDateTime defines the start date and time of the time bucket in time zone UTC, and may be based on GDT:GLOBAL_DateTime. EndDateTime defines the end date and time of the time bucket in time zone UTC, and may be based on GDT:GLOBAL_DateTime. In some implementations, the time range definition of the time bucket is the same as the definition at the Service Parts Planning owner side. In some implementations, the provided time buckets are changed, while others remain unchanged.

Message Data Type ServicePartInventoryReplenishmentRulesChangeRequestMessage

The message data type ServicePartInventoryReplenishmentRulesChangeRequestMessage includes ServicePartInventoryReplenishmentRuleChangeRequestMessage and the business information that is relevant for sending a business document in the message. It includes the MessageHeader package and ServicePartInventoryReplenishmentRuleChangeRequestMessage.

Message Data Type ServicePartInventoryReplenishmentRuleChangeConfirmationMessage The message data type ServicePartInventoryReplenishmentRuleChangeConfirmationMessage includes the ServicePartInventoryReplenishmentRule included in the business document and the business information that is relevant for sending a business document in a message. It includes the MessageHeader package, ServicePartInventoryReplenishmentRule package, and Log package. In some implementations, if any error occurs when changing the ServicePartInventoryReplenishmentRule, the change of the whole ServicePartInventoryReplenishmentRule is aborted and no ServicePartInventoryReplenishmentRule entity is returned in the confirmation message.

The ServicePartInventoryReplenishmentRule package includes the Service Part Inventory Replenishment Rule. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID identifies a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

Message Data Type ServicePartInventoryReplenishmentRulesChangeConfirmationMessage The message data type ServicePartInventoryReplenishmentRulesChangeConfirmationMessage includes ServicePartInventoryReplenishmentRuleChange ConfirmationMessage and the business information that is relevant for sending a business document in the message. It includes the MessageHeader package and ServicePartInventoryReplenishmentRuleChange ConfirmationMessage.

Message Data Type ServicePartInventoryReplenishmentRuleCancelRequestMessage

The message data type ServicePartInventoryReplenishmentRuleCancelRequestMessage includes the ServicePartInventoryReplenishmentRule included in the business document and the business information that is relevant for sending a business document in a message. It includes the MessageHeader package and ServicePartInventoryReplenishmentRule package.

The ServicePartInventoryReplenishmentRule package includes the Service Part Inventory Replenishment Rule. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID identifies a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

Message Data Type ServicePartInventoryReplenishmentRulesCancelRequestMessage

The message data type ServicePartInventoryReplenishmentRulesCancelRequestMessage includes ServicePartInventoryReplenishmentRuleCancelRequestMessage and the business information that is relevant for sending a business document in the message. It includes the MessageHeader package and ServicePartInventoryReplenishmentRuleCancelRequestMessage.

Message Data Type ServicePartInventoryReplenishmentRuleCancelConfirmationMessage The message data type ServicePartInventoryReplenishmentRuleCancelConfirmationMessage includes the ServicePartInventoryReplenishmentRule included in the business document and the business information that is relevant for sending a business document in a message. It includes the MessageHeader package, ServicePartInventoryReplenishmentRule package, and Log package. In some implementations, if an error occurs when canceling the ServicePartInventoryReplenishmentRule, the cancellation of the whole ServicePartInventoryReplenishmentRule is aborted and no ServicePartInventoryReplenishmentRule entity is returned in the confirmation message.

The ServicePartInventoryReplenishmentRule package includes the Service Part Inventory Replenishment Rule. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID identifies a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

Message Data Type ServicePartInventoryReplenishmentRulesCancelConfirmationMessage The message data type ServicePartInventoryReplenishmentRulesCancelConfirmationMessage includes ServicePartInventoryReplenishmentRuleCancelConfirmationMessage and the business information that is relevant for sending a business document in the message. It includes the MessageHeader package and ServicePartInventoryReplenishmentRuleCancelConfirmationMessage.

Message Data Type ServicePartInventoryReplenishmentRuleKeyFigureCreateRequestMessage The message data type ServicePartInventoryReplenishmentRuleKeyFigureCreateRequestMessage includes the ServicePartInventoryReplenishmentRule included in the business document and the business information that is relevant for sending a business document in a message. It includes the MessageHeader package and ServicePartInventoryReplenishmentRule package. In some implementations, the operation fails if one of the KeyFigures or KeyFigureValues could not be created.

The ServicePartInventoryReplenishmentRule package groups the Service Part Inventory Replenishment Rule with the package TimeSeries. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID identifies a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

The TimeSeries package groups the information used to define a grid of time-dependent Inventory Replenishment Rule key figures. It includes the KeyFigure and KeyFigureValue entities. A KeyFigure entity represents a part of an Inventory Replenishment Rule, such as Economic Order Quantity or Safety Stock. The entity KeyFigure is of type GDT:TimeSeriesKeyFigure with the elements Code, UnitOfMeasureCode, and KeyFigureValue. Code is a coded name of the key figure, and may be based on GDT: TimeSeriesKeyFigureCode. UnitOfMeasureCode is a unit of measure of all key figure values in the time series for this specific key figure, and may be based on GDT:MeasureUnitCode. KeyFigureValue includes the values of the key figure, and may be based on GDT:TimeSeriesKeyFigureTimeBucketValue. In some implementations, the key figures used come from the pool of key figures for Inventory Replenishment Rule at the Service Parts Planning owner side.

A KeyFigureValue entity is the value of an Inventory Replenishment Rule key figure in a time bucket. The entity KeyFigureValue is of type GDT:TimeSeriesKeyFigureTimeBucketValue with the elements TimeBucketNumberIntValue and KeyFigureFloatValue. TimeBucketNumberIntValue is a unique identifying number of a time series period. It is usually a positive number, and may be based on GDT: IntegerValue. KeyFigureFloatValue is a value of a key figure in the time bucket, and may be based on GDT:FloatValue. In some implementations, TimeBucketNumberIntValue is related to an existing period-bucket assignment at the Service Parts Processing owner side.

Message Data Type ServicePartInventoryReplenishmentRulesKeyFigureCreateRequestMessage The message data type ServicePartInventoryReplenishmentRulesKeyFigureCreateRequestMessage includes ServicePartInventoryReplenishmentRuleKeyFigureCreateRequestMessage and the business information that is relevant for sending a business document in the message. It includes the MessageHeader package and ServicePartInventoryReplenishmentRuleKeyFigureCreateRequestMessage.

Message Data Type ServicePartInventoryReplenishmentRuleKeyFigureCreateConfirmationMessage The message data type ServicePartInventoryReplenishmentRuleKeyFigureCreateConfirmationMessage includes the ServicePartInventoryReplenishmentRule included in the business document and the business information that is relevant for sending a business document in a message. It includes the MessageHeader package, ServicePartInventoryReplenishmentRule package, and Log package. In some implementations, if an error occurs when creating the ServicePartInventoryReplenishmentRuleKeyFigure, the creation is aborted and no ServicePartInventoryReplenishmentRule entity is returned in the confirmation message.

The ServicePartInventoryReplenishmentRule package includes the Service Part Inventory Replenishment Rule. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID identifies a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT:Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

Message Data Type ServicePartInventoryReplenishmentRulesKeyFiguresCreateConfirmationMessage The message data type ServicePartInventoryReplenishmentRulesKeyFiguresCreateConfirmationMessage includes ServicePartInventoryReplenishmentRulesKeyFigureCreateConfirmationMessage and the business information that is relevant for sending a business document in the message. It includes the MessageHeader package and ServicePartInventoryReplenishmentRulesKeyFigureCreateConfirmationMessage.

Message Data Type ServicePartInventoryReplenishmentRuleKeyFigureCancelRequestMessage The message data type ServicePartInventoryReplenishmentRuleKeyFigureCancelRequestMessage includes the ServicePartInventoryReplenishmentRule included in the business document and the business information that is relevant for sending a business document in a message. It includes the MessageHeader package and ServicePartInventoryReplenishmentRule package. In some implementations, the operation can fail if one of the KeyFigures or KeyFigureValues could not be deleted. The ServicePartInventoryReplenishmentRule package groups the Service Part Inventory Replenishment Rule with the package TimeSeries. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID identifies a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

The TimeSeries package groups the information used to define a grid of time-dependent Inventory Replenishment Rule key figures. It includes the KeyFigure entity. A KeyFigure entity represents a part of an Inventory Replenishment Rule, such as Economic Order Quantity or Safety Stock. The entity KeyFigure is of type GDT:TimeSeriesKeyFigure with the Code element. Code is a coded name of the key figure, and may be based on GDT:TimeSeriesKeyFigureCode. In some implementations, the key figures used come from the pool of key figures for Inventory Replenishment Rule at the Service Parts Planning owner side.

Message Data Type ServicePartInventoryReplenishmentRulesKeyFigureCancelRequestMessage The message data type ServicePartInventoryReplenishmentRulesKeyFigureCancelRequestMessage includes ServicePartInventoryReplenishmentRuleKeyFigureCancelRequestMessage and the business information that is relevant for sending a business document in the message. It includes the MessageHeader package and ServicePartInventoryReplenishmentRuleKey FigureCancelRequestMessage.

Message Data Type ServicePartInventoryReplenishmentRuleKeyFigure CancelConfirmationMessage The message data type ServicePartInventoryReplenishmentRuleKeyFigureCancelConfirmationMessage includes the ServicePartInventoryReplenishmentRule included in the business document and the business information that is relevant for sending a business document in a message. It includes the MessageHeader package, ServicePartInventoryReplenishmentRule package, and Log package. In some implementations, if an error occurs when canceling the ServicePartInventoryReplenishmentRule KeyFigure, the cancellation is aborted and no ServicePartInventoryReplenishmentRule entity is returned in the confirmation message.

The ServicePartInventoryReplenishmentRule package includes the Service Part Inventory Replenishment Rule. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID is a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

Message Data Type ServicePartInventory ReplenishmentRulesKeyFiguresCancelConfirmationMessage The message data type ServicePartInventoryReplenishmentRulesKeyFiguresCancelConfirmationMessage includes ServicePartInventoryReplenishmentRulesKeyFigureCancelConfirmationMessage and the business information that is relevant for sending a business document in the message. It includes the MessageHeader package and ServicePartInventoryReplenishmentRulesKeyFigureCancelConfirmationMessage.

Message Data Type ServicePartInventoryReplenishmentRuleByElementsQueryMessage

The message data type ServicePartInventoryReplenishmentRuleByElementsQueryMessage includes the Selection included in the business document and the business information that is relevant for sending a business document in a message. It includes the MessageHeader and Selection packages.

Message Data Type SelectionPartInventoryReplenishmentRuleSelectionByElements

The SelectionPartInventoryReplenishmentRuleSelectionByElements includes the query elements for an Inventory Replenishment Rule search by common data. A ServicePartInventoryReplenishmentRule can be selected, for example, by InventoryReplenishmentRuleID, PlanningVersionID, ProductID, LocationID, VirtualChildIndicator, ThirdPartyOrderProcessingIndicator, Lower time range limit for time buckets, and Upper time range limit for time buckets.

Message Data Type ServicePartInventoryReplenishmentRuleByElementsResponseMessage The message data type ServicePartInventoryReplenishmentRuleByElementsResponseMessage includes the ServicePartInventoryReplenishmentRule included in the business document and the business information that is relevant for sending a business document in a message. It includes the MessageHeader package, ServicePartInventoryReplenishmentRule package, and Log package.

The ServicePartInventoryReplenishmentRule package groups the Inventory Replenishment Rule with the package TimeSeries. A ServicePartInventoryReplenishmentRule entity identifies a time related series of inventory planning key figures used for subsequent replenishment processes. The elements at the ServicePartInventoryReplenishmentRule entity can include InventoryReplenishmentRuleID, PlanningVersionID, ProductID, LocationID, VirtualChildIndicator, and ThirdPartyOrderProcessingIndicator. InventoryReplenishmentRuleID identifies the ServicePartInventoryReplenishmentRule, and may be based on GDT:InventoryReplenishmentRuleID. PlanningVersionID identifies a planning version referenced by the inventory replenishment rule (key field), and may be based on GDT:PlanningVersionID. ProductID identifies a product referenced by the inventory replenishment rule (key field), and may be based on GDT:ProductID. LocationID identifies a location referenced by the inventory replenishment rule (key field), and may be based on GDT:LocationID. VirtualChildIndicator indicates whether the location ID represents a virtual child location or not (key field), and may be based on GDT:Indicator and Qualifier: BODVirtualChildIndicator. ThirdPartyOrderProcessingIndicator indicates whether the product-location combination is used in the context of a third-party deal or not (key field), and may be based on GDT: Indicator and Qualifier: BusinessTransactionDocumentItemThirdParty. In some implementations, a ServicePartInventoryReplenishmentRule can be defined either by the key fields (elements) PlanningVersionID, ProductID, LocationID, VirtualChildIndicator, and ThirdPartyOrderProcessingIndicator or the InventoryReplenishmentRuleID.

The TimeSeries package groups the information used to define a grid of time-dependent Inventory Replenishment Rule key figures. It includes the KeyFigure, KeyFigureValue, and PeriodBucketAssignment entities. A KeyFigure entity represents a part of an Inventory Replenishment Rule, such as Economic Order Quantity or Safety Stock. The entity KeyFigure is of type GDT:TimeSeriesKeyFigure with the elements Code, UnitOfMeasureCode, and KeyFigureValue. Code is a coded name of the key figure, and may be based on GDT:TimeSeriesKeyFigureCode. UnitOfMeasureCode is a unit of measure of all key figure values in the time series for this specific key figure, and may be based on GDT:MeasureUnitCode. KeyFigureValue includes the values of the key figure, and may be based on GDT:TimeSeriesKeyFigureTimeBucketValue. In some implementations, the key figures used come from the pool of key figures for Inventory Replenishment Rule at the Service Parts Planning owner side.

A KeyFigureValue entity is the value of an Inventory Replenishment Rule key figure in a time bucket. The entity KeyFigureValue is of type GDT:TimeSeriesKeyFigureTimeBucketValue with the elements TimeBucketNumberIntValue and KeyFigureFloatValue. TimeBucketNumberIntValue is a unique identifying number of a time series period. It is usually a positive number, and may be based on GDT: IntegerValue. KeyFigureFloatValue is a value of a key figure in the time bucket, and may be based on GDT:FloatValue. In some implementations, TimeBucketNumberIntValue is related to an existing period-bucket assignment.

A PeriodBucketAssignment entity defines the time range that is represented by a time bucket. The entity PeriodBucketAssignment is of type GDT:TimeSeriesPeriodTimeBucketAssignment with the elements TimeBucketNumberIntValue, StartDateTime, and EndDateTime. TimeBucketNumberIntValue is a unique identifying number of a time series period. It is usually a positive number, and may be based on GDT:IntegerValue. StartDateTime defines the start date and time of the time bucket in time zone UTC, and may be based on GDT:GLOBAL_DateTime. EndDateTime defines the end date and time of the time bucket in time zone UTC, and may be based on GDT:GLOBAL_DateTime. In some implementations, the time range definition of the time bucket is the same as the definition at the Service Parts Planning data owner side.

ServicePartOrderHistory Interfaces

A ServicePartOrderHistory is a historical data of a demand order in the past in service parts planning environment. The ServicePartOrderHistory is historical data that can be derived from a business document item, such as a sales order item, a sales order schedule line, or a stock transfer order schedule line. ServicePartOrderHistory also provides the data basis at the most detailed level for creating service parts demand history.

The message choreography of FIG. 132 describes a possible logical sequence of messages that can be used to realize a Service Part Order History business scenario. A "Service Parts Planning Processor" system 132000 can query Service Part Order History Supply Chain Management (SCM) elements using a ServicePartOrderHistorySCMByElementsQuery_In message 132004 as shown, for example, in FIG. 132. A "Service Parts Planning" (owner) system 132002 can respond to the query using a ServicePartOrderHistorySCMByElementsResponse_Out message 132006 as shown, for example, in FIG. 132.

FIG. 133 illustrates one example logical configuration of ServicePartOrderHistorySCMByElementsQueryMessage message 133000. Specifically, this figure depicts the arrangement and hierarchy of various components such as one or more levels of packages, entities, and datatypes, shown here as 133000 through 133014. As described above, packages may be used to represent hierarchy levels. Entities are discrete business elements that are used during a business transaction. Data types are used to type object entities and interfaces with a structure. For example, ServicePartOrderHistorySCMByElementsQueryMessage message 133000 includes, among other things, Selection 133006. Accordingly, heterogeneous applications may communicate using this consistent message configured as such.

Additionally, FIG. 134 illustrates one example logical configuration of ServicePartOrderHistorySCMByElementsResponseMessage message 134000. Specifically, this figure depicts the arrangement and hierarchy of various components such as one or more levels of packages, entities, and datatypes, shown here as 134000 through 134022. As described above, packages may be used to represent hierarchy levels. Entities are discrete business elements that are used during a business transaction. Data types are used to type object entities and interfaces with a structure. For example, ServicePartOrderHistorySCMByElementsResponseMessage message 134000 includes, among other things, ServicePartOrderHistory 134006. Accordingly, heterogeneous applications may communicate using this consistent message configured as such.

A ServicePartOrderHistory interface performs various operations, namely a ServicePartOrderHistorySCMByElementsQuery_In and a ServicePartOrderHistorySCMByElementsResponse_Out. The ServicePartDemandOrderHistorySCMByElementsQuery is a query for ServicePartOrderHistory that satisfies the selection criteria specified by the query elements. The ServicePartOrderHistorySCMByElementsQuery operation can be used when two or more Service Parts Planning environments need to be linked. One represents the Service Parts Planning owner that gives transactional data back. The other, subsequently called the Service Parts Planning processor, uses the retrieved transactional data for service parts planning. The ServicePartOrderHistorySCMByElementsQuery_In operation includes a ServicePartOrderHistorySCMByElementsQuery message type. The structure of the ServicePartOrderHistorySCMByElementsQuery message type is specified by a ServicePartOrderHistorySCMByElementsQueryMessage message data type.

The ServicePartDemandOrderHistorySCMByElementsResponse is a response to the ServicePartDemandOrderHistorySCMByElementsQuery. The ServicePartOrderHistorySCMByElementsResponse operation can be used when two or more Service Parts Planning environments need to be linked. One represents the Service Parts Planning owner that gives transactional data back. The other, subsequently called the Service Parts Planning processor, uses the retrieved transactional data for service parts planning. The ServicePartOrderHistorySCMByElementsResponse_Out operation includes various message types, namely a ServicePartOrderHistorySCMByElementsQuery and a ServicePartOrderHistorySCMByElementsResponse. The structure of the ServicePartOrderHistorySCMByElementsResponse message type is specified by a ServicePartOrderHistorySCMByElementsResponseMessage message data type.

FIGS. 135-1 through 135-8 show a ServicePartOrderHistorySCMByElementsQueryMessage 135000 package. The ServicePartOrderHistorySCMByElementsQueryMessage 135000 package includes a ServicePartOrderHistorySCMByElementsQueryMessage 135002 entity. The ServicePart OrderHistorySCMByElementsQueryMessage 135000 package includes various packages, namely a MessageHeader 135004, a Selection 135012, and a ProcessingConditions 135174.

The MessageHeader 135004 package is a BusinessDocumentMessageHeader 135010 data type. The MessageHeader 135004 package includes a MessageHeader 135006 entity. The MessageHeader 135006 entity has a cardinality of 1 135008 meaning that for each instance of the MessageHeader 135004 package there is one MessageHeader 135006 entity.

The Selection 135012 package includes a ServicePart OrderHistorySelectionByElements 135014 entity. The ServicePartOrderHistorySelectionByElements 135014 entity has a cardinality of 1 135016 meaning that for each instance of the Selection 135012 package there is one ServicePart OrderHistorySelectionByElements 135014 entity. The ServicePartOrderHistorySelectionByElements comprises the query elements for a service part order history search by common data. The ServicePartOrderHistorySelectionByElements 135014 entity includes various attributes, namely a PlanningVersionID 135018, a CustomerFacingLocationVirtualChildIndicator 135084, a StockholdingLocationVirtualChildIndicator 135120, a ThirdPartyOrderProcessingIndicator 135126, a ForecastRelevantIndicator 135162 and a ChangedDateTime 135168. The ServicePart OrderHistorySelectionByElements 135014 entity includes various subordinate entities, namely a SelectionByMaterialInternalID 135024, a SelectionByCustomerFacingLocationInternalID 135054, a SelectionByStockholdingLocationInternalID 135090 and a SelectionBy ServicePartPlanningDemandGroupCode 135132.

The PlanningVersionID 135018 attribute is a PlanningVersionID 135022 data type. The PlanningVersionID 135018 attribute has a cardinality of 1 135020 meaning that for each instance of the ServicePartOrderHistorySelectionByElements 135014 entity there is one PlanningVersionID 135018 attribute. The SelectionByPlanningVersionID is a selection for Planning Version Internal ID.

The CustomerFacingLocationVirtualChildIndicator 135084 attribute is an Indicator(Qualifier:BODVirtualChildIndicator) 135088 data type. The CustomerFacingLocationVirtualChildIndicator 135084 attribute has a cardinality of 0 . . . 1 135086 meaning that for each instance of the ServicePartOrderHistorySelectionByElements 135014 entity there may be one CustomerFacingLocationVirtualChildIndicator 135084 attribute. The SelectionByCustomerFacingLocationVirtualChildIndicator indicates whether the query selects only the customer facing locations with virtual child location indicator.

The StockholdingLocationVirtualChildIndicator 135120 attribute is an Indicator(Qualifier:BODVirtualChildIndicator) 135124 data type. The StockholdingLocationVirtualChildIndicator 135120 attribute has a cardinality of 0 . . . 1 135122 meaning that for each instance of the ServicePart OrderHistorySelectionByElements 135014 entity there may be one StockholdingLocationVirtualChildIndicator 135120 attribute. The SelectionByStockingHoldingLocationVirtualChildIndicator indicates whether the query selects only the stock holding locations with virtual child location indicator.

The ThirdPartyOrderProcessingIndicator 135126 attribute is an Indicator(Qualifier:BusinessTransactionDocumentItemThirdParty) 135130 data type. The ThirdPartyOrderProcessingIndicator 135126 attribute has a cardinality of 0 . . . 1 135128 meaning that for each instance of the ServicePart OrderHistorySelectionByElements 135014 entity there may be one ThirdPartyOrderProcessingIndicator 135126 attribute. The SelectionByThirdPartyOrderProcessingIndicator indicates whether the query selects only the product with specified attribute for Third Party Order Processing.

The ForecastRelevantIndicator 135162 attribute is an Indicator(Qualifier:RelevanceIndicator) 135166 data type. The ForecastRelevantIndicator 135162 attribute has a cardinality of 0 . . . 1 135164 meaning that for each instance of the ServicePartOrderHistorySelectionByElements 135014 entity there may be one ForecastRelevantIndicator 135162 attribute. The Indicator indicates whether the service part order history is for forecasting relevant.

The ChangedDateTime 135168 attribute is a GLOBAL_DateTime(Qualifier:changed) 135172 data type. The ChangedDateTime 135168 attribute has a cardinality of 0 . . . 1 135170 meaning that for each instance of the ServicePart OrderHistorySelectionByElements 135014 entity there may be one ChangedDateTime 135168 attribute. The SelectionByChangedDateTime specifies that only the ServicePartOrderHistory which are changed after the changed date time are selected.

The SelectionByMaterialInternalID 135024 entity has a cardinality of 0 . . . 1 135026 meaning that for each instance of the ServicePartOrderHistorySelectionByElements 135014 entity there may be one SelectionByMaterialInternalID 135024 entity. The SelectionByMaterialInternalID is a selection range for Material Internal ID. The SelectionByMaterialInternalID 135024 entity includes various attributes, namely an InclusionExclusionCode 135030, an IntervalBoundaryTypeCode 135036, a LowerBoundaryMaterialInternalID 135042 and an UpperBoundaryMaterialInternalID 135048.

The InclusionExclusionCode 135030 attribute is an InclusionExclusionCode 135034 data type. The InclusionExclusionCode 135030 attribute has a cardinality of 1 135032 meaning that for each instance of the SelectionByMaterialInternalID 135024 entity there is one InclusionExclusionCode 135030 attribute. The InclusionExclusionCode is a coded representation of the inclusion of a set into a result set or the exclusion of it.

The IntervalBoundaryTypeCode 135036 attribute is an IntervalBoundaryTypeCode 135040 data type. The IntervalBoundaryTypeCode 135036 attribute has a cardinality of 1 135038 meaning that for each instance of the SelectionByMaterialInternalID 135024 entity there is one IntervalBoundaryTypeCode 135036 attribute. The IntervalBoundaryTypeCode is a coded representation of an interval boundary type.

The LowerBoundaryMaterialInternalID 135042 attribute is a ProductInternalID 135046 data type. The LowerBoundaryMaterialInternalID 135042 attribute has a cardinality of 1 135044 meaning that for each instance of the SelectionByMaterialInternalID 135024 entity there is one LowerBoundaryMaterialInternalID 135042 attribute. The LowerBoundaryMaterialInternalID is the lower boundary of selection range for SelectionByMaterialInternalID.

The UpperBoundaryMaterialInternalID 135048 attribute is a ProductInternalID 135052 data type. The UpperBoundaryMaterialInternalID 135048 attribute has a cardinality of 0 . . . 1 135050 meaning that for each instance of the SelectionByMaterialInternalID 135024 entity there may be one UpperBoundaryMaterialInternalID 135048 attribute. The UpperBoundaryMaterialInternalID is the upper boundary of selection range for SelectionByMaterialInternalID.

The SelectionByCustomerFacingLoactionInternalID 135054 entity has a cardinality of 0 . . . 1 135056 meaning that for each instance of the ServicePartOrderHistorySelectionByElements 135014 entity there may be one SelectionByCustomerFacingLoactionInternalID 135054 entity. The SelectionByCustomerFacingLoactionInternalID is a selection range for CustomerFacingLocationInternalID. The SelectionByCustomerFacingLoactionInternalID 135054 entity includes various attributes, namely an InclusionExclusionCode 135060, an IntervalBoundaryTypeCode 135066, a LowerBoundaryCustomerFacingLocationInternalID 135072 and an UpperBoundaryCustomerFacingLocationInternalID 135078.

The InclusionExclusionCode 135060 attribute is an InclusionExclusionCode 135064 data type. The InclusionExclusionCode 135060 attribute has a cardinality of 1 135062 meaning that for each instance of the SelectionByCustomerFacingLoactionInternalID 135054 entity there is one InclusionExclusionCode 135060 attribute. The InclusionExclusionCode is a coded representation of the inclusion of a set into a result set or the exclusion of it.

The IntervalBoundaryTypeCode 135066 attribute is an IntervalBoundaryTypeCode 135070 data type. The IntervalBoundaryTypeCode 135066 attribute has a cardinality of 1 135068 meaning that for each instance of the SelectionByCustomerFacingLoactionInternalID 135054 entity there is one IntervalBoundaryTypeCode 135066 attribute. The IntervalBoundaryTypeCode is a coded representation of an interval boundary type.

The LowerBoundaryCustomerFacingLocationInternalID 135072 attribute is a LocationInternalID(Qualifier:CustomerFacing) 135076 data type. The LowerBoundaryCustomerFacingLocationInternalID 135072 attribute has a cardinality of 1 135074 meaning that for each instance of the SelectionByCustomerFacingLoactionInternalID 135054 entity there is one LowerBoundaryCustomerFacingLocationInternalID 135072 attribute. The LowerBoundaryCustomerFacingLocationInternalID is the lower boundary of selection range for SelectionByCustomerFacingLocationInternalID.

The UpperBoundaryCustomerFacingLocationInternalID 135078 attribute is a LocationInternalID(Qualifier:CustomerFacing) 135082 data type. The UpperBoundaryCustomerFacingLocationInternalID 135078 attribute has a cardinality of 0 . . . 1 135080 meaning that for each instance of the SelectionByCustomerFacingLoactionInternalID 135054 entity there may be one UpperBoundaryCustomerFacingLocationInternalID 135078 attribute. The UpperBoundaryCustomerFacingLocationInternalID is the upper boundary of selection range for SelectionBycustomerFacingInternalID.

The SelectionByStockholdingLocationInternalID 135090 entity has a cardinality of 0 . . . 1 135092 meaning that for each instance of the ServicePartOrderHistorySelectionByElements 135014 entity there may be one SelectionByStockholdingLocationInternalID 135090 entity. The SelectionByStockholdingLocationInternalID is a selection range for StockHoldingLocationInternalID. The SelectionByStockholdingLocationInternalID 135090 entity includes various attributes, namely an InclusionExclusionCode 135096, an IntervalBoundaryTypeCode 135102, a LowerBoundaryStockholdingLocationInternalID 135108 and an UpperBoundaryStockholdingLocationInternalID 135114.

The InclusionExclusionCode 135096 attribute is an InclusionExclusionCode 135100 data type. The InclusionExclusionCode 135096 attribute has a cardinality of 1 135098 meaning that for each instance of the SelectionByStockholdingLocationInternalID 135090 entity there is one InclusionExclusionCode 135096 attribute. The InclusionExclusionCode is a coded representation of the inclusion of a set into a result set or the exclusion of it.

The IntervalBoundaryTypeCode 135102 attribute is an IntervalBoundaryTypeCode 135106 data type. The IntervalBoundaryTypeCode 135102 attribute has a cardinality of 1 135104 meaning that for each instance of the SelectionByStockholdingLocationInternalID 135090 entity there is one IntervalBoundaryTypeCode 135102 attribute. The IntervalBoundaryTypeCode is a coded representation of an interval boundary type.

The LowerBoundaryStockholdingLocationInternalID 135108 attribute is a LocationInternalID(Qualifier:Stockholding) 135112 data type. The LowerBoundaryStockholdingLocationInternalID 135108 attribute has a cardinality of 1 135110 meaning that for each instance of the SelectionByStockholdingLocationInternalID 135090 entity there is one LowerBoundaryStockholdingLocationInternalID 135108 attribute. The LowerBoundaryStockholdingLocationInternalID is the lower boundary of selection range for SelectionByStockHoldingLocationInternalID.

The UpperBoundaryStockholdingLocationInternalID 135114 attribute is a LocationInternalID(Qualifier: Stockholding) 135118 data type. The UpperBoundaryStockholdingLocationInternalID 135114 attribute has a cardinality of 0 . . . 1 135116 meaning that for each instance of the SelectionByStockholdingLocationInternalID 135090 entity there may be one UpperBoundaryStockholdingLocationInternalID 135114 attribute. The UpperBoundaryStockholdingLocationInternalID is the upper boundary of selection range for SelectionByStockHoldingInternalID.

The SelectionByServicePartPlanningDemandGroupCode 135132 entity has a cardinality of 0 . . . 1 135134 meaning that for each instance of the ServicePartOrderHistorySelectionByElements 135014 entity there may be one SelectionByServicePartPlanningDemandGroupCode 135132 entity. The SelectionByServicePartPlanningDemandGroupCode is a selection range for ServicePartPlanningDemandGroupCode. The SelectionByServicePartPlanningDemandGroupCode 135132 entity includes various attributes, namely an InclusionExclusionCode 135138, an IntervalBoundaryTypeCode 135144, a LowerBoundaryServicePartPlanningDemandGroupCode 135150 and an UpperBoundaryServicePartPlanningDemandGroupCode 135156.

The InclusionExclusionCode 135138 attribute is an InclusionExclusionCode 135142 data type. The InclusionExclusionCode 135138 attribute has a cardinality of 1 135140 meaning that for each instance of the SelectionByServicePartPlanningDemandGroupCode 135132 entity there is one InclusionExclusionCode 135138 attribute. The InclusionExclusionCode is a coded representation of the inclusion of a set into a result set or the exclusion of it.

The IntervalBoundaryTypeCode 135144 attribute is an IntervalBoundaryTypeCode 135148 data type. The IntervalBoundaryTypeCode 135144 attribute has a cardinality of 1 135146 meaning that for each instance of the SelectionByServicePartPlanningDemandGroupCode 135132 entity there is one IntervalBoundaryTypeCode 135144 attribute. The IntervalBoundaryTypeCode is a coded representation of an interval boundary type.

The LowerBoundaryServicePartPlanningDemandGroupCode 135150 attribute is an applied, in Review 135154 data type. The LowerBoundaryServicePartPlanningDemandGroupCode 135150 attribute has a cardinality of 1 135152 meaning that for each instance of the SelectionByServicePartPlanningDemandGroupCode 135132 entity there is one LowerBoundaryServicePartPlanningDemandGroupCode 135150 attribute. The LowerBoundaryServicePartPlanningDemandGroupCode is the lower boundary of selection range for SelectionByServicePartPlanningDemandGroupCode.

The UpperBoundaryServicePartPlanningDemandGroupCode 135156 attribute is an applied, in Review 135160 data type. The UpperBoundaryServicePartPlanningDemandGroupCode 135156 attribute has a cardinality of 0 . . . 1 135158 meaning that for each instance of the SelectionByServicePartPlanningDemandGroupCode 135132 entity there may be one UpperBoundaryServicePartPlanningDemandGroupCode 135156 attribute. The UpperBoundaryServicePartPlanningDemandGroupCode is the upper boundary of selection range for SelectionByServicePartPlanningDemandGroupCode.

The ProcessingConditions 135174 package includes a ProcessingConditions 135176 entity. The ProcessingConditions 135176 entity has a cardinality of 1 135178 meaning that for each instance of the ProcessingConditions 135174 package there is one ProcessingConditions 135176 entity. The ProcessingConditions 135176 entity includes various attributes, namely a QueryHitsMaximumNumberValue 135180, an UnlimitedHitsIndicator 135186 and a LastProvidedBusinessTransactionDocumentReferenceItemID 135192.

The QueryHitsMaximumNumberValue 135180 attribute is a NumberValue 135184 data type. The QueryHitsMaximumNumberValue 135180 attribute has a cardinality of 0 . . . 1 135182 meaning that for each instance of the ProcessingConditions 135176 entity there may be one QueryHitsMaximumNumberValue 135180 attribute. The UnlimitedHitsIndicator 135186 attribute is an Indicator 135190 data type. The UnlimitedHitsIndicator 135186 attribute has a cardinality of 1 135188 meaning that for each instance of the ProcessingConditions 135176 entity there is one UnlimitedHitsIndicator 135186 attribute.

The LastProvidedBusinessTransactionDocument ReferenceItemID 135192 attribute is a UUID 135196 data type. The LastProvidedBusinessTransactionDocument ReferenceItemID 135192 attribute has a cardinality of 0 . . . 1 135194 meaning that for each instance of the ProcessingConditions 135176 entity there may be one LastProvidedBusinessTransactionDocumentReferenceItemID 135192 attribute.

FIGS. 136-1 through 136-8 show a ServicePartOrderHistorySCMByElementsResponseMessage 136000 package. The ServicePartOrderHistorySCMByElementsResponse Message 136000 package includes a ServicePartOrderHistorySCMByElementsResponseMessage 136002 entity. The ServicePartOrderHistorySCMByElementsResponse Message 136000 package includes various packages, namely a MessageHeader 136004, a ServicePartOrderHistory 136012, a ProcessingConditions 136154, and a Log 136178.

The MessageHeader 136004 package is a BusinessDocumentMessageHeader 136010 data type. The MessageHeader 136004 package includes a MessageHeader 136006 entity. The MessageHeader 136006 entity has a cardinality of 1 136008 meaning that for each instance of the MessageHeader 136004 package there is one MessageHeader 136006 entity.

The ServicePartOrderHistory 136012 package includes a ServicePartOrderHistory 136014 entity. The ServicePart OrderHistory 136012 package includes a BTDReference 136078 package. The ServicePartOrderHistory 136014 entity has a cardinality of 0 . . . n 136016 meaning that for each instance of the ServicePartOrderHistory 136012 package there may be one or more ServicePartOrderHistory 136014 entities. The ServicePartOrderHistory 136014 entity includes various attributes, namely a PlanningVersionID 136018, a MaterialInternalID 136024, a StockHoldingLocationInternalID 136030, a StockingHoldingLocationVirtualChildIndicator 136036, a CustomerFacingLocationInternalID 136042, a CustomerFacingLocationVirtual ChildIndicator 136048, a ThirdPartyOrderProcessingIndicator 136054, a ServicePartPlanningDemandGroupCode 136060, a ServicePartPlanningDemandGroupName 136066 and a ForecastRelevantIndicator 136072.

The PlanningVersionID 136018 attribute is a PlanningVersionID 136022 data type. The PlanningVersionID 136018 attribute has a cardinality of 1 136020 meaning that for each instance of the ServicePartOrderHistory 136014 entity there is one PlanningVersionID 136018 attribute. PlanningVersionID identifies a Planning Version in service part order history. The MaterialInternalID 136024 attribute is a ProductInternalID 136028 data type. The MaterialInternalID 136024 attribute has a cardinality of 1 136026 meaning that for each instance of the ServicePartOrderHistory 136014 entity there is one MaterialInternalID 136024 attribute. ProductInternal ID identifies a material in service part order history.

The StockHoldingLocationInternalID 136030 attribute is a LocationInternalID(Qualifier:StockHolding) 136034 data type. The StockHoldingLocationInternalID 136030 attribute has a cardinality of 1 136032 meaning that for each instance of the ServicePartOrderHistory 136014 entity there is one StockHoldingLocationInternalID 136030 attribute. LocationInternalID identifies a stock holding location in service part order history.

The StockingHoldingLocationVirtualChildIndicator 136036 attribute is an Indicator(Qualifier:BODVirtualChildIndicator,applied) 136040 data type. The StockingHoldingLocationVirtualChildIndicator 136036 attribute has a cardinality of 1 136038 meaning that for each instance of the ServicePartOrderHistory 136014 entity there is one StockingHoldingLocationVirtualChildIndicator 136036 attribute. Indicator identifies a stock holding location with virtual child location indicator in service part order history.

The CustomerFacingLocationInternalID 136042 attribute is a LocationInternalID(Qualifier:CustomerFacing) 136046 data type. The CustomerFacingLocationInternalID 136042 attribute has a cardinality of 1 136044 meaning that for each instance of the ServicePartOrderHistory 136014 entity there is one CustomerFacingLocationInternalID 136042 attribute. LocationInternalID identifies a customer facing location in service part order history.

The CustomerFacingLocationVirtualChildIndicator 136048 attribute is an Indicator(Qualifier:BODVirtualChildIndicator,applied) 136052 data type. The CustomerFacingLocationVirtualChildIndicator 136048 attribute has a cardinality of 1 136050 meaning that for each instance of the ServicePartOrderHistory 136014 entity there is one CustomerFacingLocationVirtualChildIndicator 136048 attribute. Indicator identifies a customer facing location with virtual child location indicator in service part order history.

The ThirdPartyOrderProcessingIndicator 136054 attribute is an Indicator(Qualifier:BusinessTransactionDocumentItemThirdParty) 136058 data type. The ThirdPartyOrderProcessingIndicator 136054 attribute has a cardinality of 1 136056 meaning that for each instance of the ServicePartOrderHistory 136014 entity there is one ThirdPartyOrderProcessingIndicator 136054 attribute. Indicator indicates the the product with specified attribute for Third Party Order in service part order history.

The ServicePartPlanningDemandGroupCode 136060 attribute is a ServicePartPlanningDemandGroupCode 136064 data type. The ServicePartPlanningDemandGroupCode 136060 attribute has a cardinality of 1 136062 meaning that for each instance of the ServicePartOrderHistory 136014 entity there is one ServicePartPlanningDemandGroupCode 136060 attribute. ServicePartPlanningDemandGroupCode is a coded representation of a demand group in service part order history.

The ServicePartPlanningDemandGroupName 136066 attribute is a LANGUAGEINDEPENDENT_MEDIUM_Name 136070 data type. The ServicePartPlanningDemandGroupName 136066 attribute has a cardinality of 0 . . . 1 136068 meaning that for each instance of the ServicePartOrderHistory 136014 entity there may be one ServicePartPlanningDemandGroupName 136066 attribute. LANGUAGEINDEPENDENT_MEDIUM_Name is a name of the coded representation of service part demand group.

The ForecastRelevantIndicator 136072 attribute is an Indicator(Qualifier:RelevanceIndicator) 136076 data type. The ForecastRelevantIndicator 136072 attribute has a cardinality of 1 136074 meaning that for each instance of the ServicePartOrderHistory 136014 entity there is one ForecastRelevantIndicator 136072 attribute. Indicator indicates whether the service part order history is for forecasting relevant.

The BTDReference 136078 package includes a BTDReference 136080 entity. The BTDReference 136080 entity has a cardinality of 1 . . . n 136082 meaning that for each instance of the BTDReference 136078 package there are one or more BTDReference 136080 entities. The BTDReference 136080 entity includes a BusinessTransactionDocumentReference 136084 attribute. The BTDReference 136080 entity includes an ActualValues 136090 subordinate entity.

The BusinessTransactionDocumentReference 136084 attribute is a BusinessTransactionDocumentReference 136088 data type. The BusinessTransactionDocumentReference 136084 attribute has a cardinality of 1 136086 meaning that for each instance of the BTDReference 136080 entity there is one BusinessTransactionDocumentReference 136084 attribute. A BusinessTransactionDocumentReference is a unique reference to other business documents or business document items that are of significance within each respective business process.

The ActualValues 136090 entity has a cardinality of 1 136092 meaning that for each instance of the BTDReference 136080 entity there is one ActualValues 136090 entity. ActualValues contains data (quantities and values) of a referenced BusinessTransactionDocument. The ActualValues 136090 entity includes various attributes, namely a BusinessTransactionDocumentProcessingTypeCode 136094, a ProductRecipientPartyInternalID 136100, an AbnormalDemandIndicator 136106, a RushOrderIndicator 136112, an OrderCreationDate 136118, a RequestedDeliveryDate 136124, an OrderLineNumberValue 136130, a Quantity 136136, a QuantityRoleCode 136142 and a ChangedDateTime 136148.

The BusinessTransactionDocumentProcessingTypeCode 136094 attribute is a BusinessTransactionDocumentProcessingTypeCode 136098 data type. The BusinessTransactionDocumentProcessingTypeCode 136094 attribute has a cardinality of 1 136096 meaning that for each instance of the ActualValues 136090 entity there is one BusinessTransactionDocumentProcessingTypeCode 136094 attribute. BusinessTransactionDocumentProcessingTypeCode is the coded representation of the way in which a business document is processed.

The ProductRecipientPartyInternalID 136100 attribute is a PartyInternalID(Qualifier:ProductRecipientParty) 136104 data type. The ProductRecipientPartyInternalID 136100 attribute has a cardinality of 1 136102 meaning that for each instance of the ActualValues 136090 entity there is one ProductRecipientPartyInternalID 136100 attribute. PartyInternalID identifies ProductRecipientParty.

The AbnormalDemandIndicator 136106 attribute is an Indicator(Qualifier:AbnormalDemand) 136110 data type. The AbnormalDemandIndicator 136106 attribute has a cardinality of 1 136108 meaning that for each instance of the ActualValues 136090 entity there is one AbnormalDemandIndicator 136106 attribute. Indicator indicates Abnormal Demand.

The RushOrderIndicator 136112 attribute is an Indicator (Qualifier:applied) 136116 data type. The RushOrderIndicator 136112 attribute has a cardinality of 1 136114 meaning that for each instance of the ActualValues 136090 entity there is one RushOrderIndicator 136112 attribute. Indicator indicates the rush order. The OrderCreationDate 136118 attribute is a Date(Qualifier:creation) 136122 data type. The OrderCreationDate 136118 attribute has a cardinality of 1 136120 meaning that for each instance of the ActualValues 136090 entity there is one OrderCreationDate 136118 attribute. Date represents the created date.

The RequestedDeliveryDate 136124 attribute is a Date (Qualifier:Delivery) 136128 data type. The RequestedDeliveryDate 136124 attribute has a cardinality of 1 136126 meaning that for each instance of the ActualValues 136090 entity there is one RequestedDeliveryDate 136124 attribute. Date represents the requested delivery date.

The OrderLineNumberValue 136130 attribute is a NumberValue 136134 data type. The OrderLineNumberValue 136130 attribute has a cardinality of 1 136132 meaning that for each instance of the ActualValues 136090 entity there is one OrderLineNumberValue 136130 attribute. NumberValue represents the number of order lines. The Quantity 136136 attribute is a Quantity 136140 data type. The Quantity 136136 attribute has a cardinality of 1 136138 meaning that for each instance of the ActualValues 136090 entity there is one Quantity 136136 attribute. represents quantity. The QuantityRoleCode 136142 attribute is a QuantityRoleCode 136146 data type. The QuantityRoleCode 136142 attribute has a cardinality of 0 . . . 1 136144 meaning that for each instance of the ActualValues 136090 entity there may be one QuantityRoleCode 136142 attribute. QuantityRoleCode represents the role of the quantity.

The ChangedDateTime 136148 attribute is a GLOBAL_DateTime(Qualifier:changed) 136152 data type. The ChangedDateTime 136148 attribute has a cardinality of 1 136150 meaning that for each instance of the ActualValues 136090 entity there is one ChangedDateTime 136148 attribute. GLOBAL_DateTime specifies the changed date time for service part order history. The ProcessingConditions 136154 package includes a ProcessingConditions 136156 entity.

The ProcessingConditions 136156 entity has a cardinality of 1 136158 meaning that for each instance of the ProcessingConditions 136154 package there is one ProcessingConditions 136156 entity. The ProcessingConditions 136156 entity includes various attributes, namely a ReturnedQueryHitsNumberValue 136160, a MoreElementsAvailableIndicator 136166 and a LastProvidedBusinessTransactionDocumentReferenceItemID 136172.

The ReturnedQueryHitsNumberValue 136160 attribute is a NumberValue 136164 data type. The ReturnedQueryHitsNumberValue 136160 attribute has a cardinality of 1 136162 meaning that for each instance of the ProcessingConditions 136156 entity there is one ReturnedQueryHitsNumberValue 136160 attribute.

The MoreElementsAvailableIndicator 136166 attribute is an Indicator 136170 data type. The MoreElementsAvailableIndicator 136166 attribute has a cardinality of 1 136168 meaning that for each instance of the ProcessingConditions 136156 entity there is one MoreElementsAvailableIndicator 136166 attribute. The LastProvidedBusinessTransactionDocumentReferenceItemID 136172 attribute is a BusinessTransactionDocumentID 136176 data type. The LastProvidedBusinessTransactionDocumentReferenceItemID 136172 attribute has a cardinality of 0 . . . 1 136174 meaning that for each instance of the ProcessingConditions 136156 entity there may be one LastProvidedBusinessTransactionDocumentReferenceItemID 136172 attribute.

The Log 136178 package is a Log 136184 data type. The Log 136178 package includes a Log 136180 entity. The Log 136180 entity has a cardinality of 1 136182 meaning that for each instance of the Log 136178 package there is one Log 136180 entity.

ServicePartSupplyPlan Interfaces

A service part supply plan is derived from the service part planning. This business object ServicePartSupplyPlan contains operations that can be used to create, update or retrieve information about service part supply plan. A specific supply plan is, for example, the shortage information derived from the service part shortage analysis and provides information on shortage situations in service part planning.

The message choreography of FIG. 137 describes a possible logical sequence of messages that can be used to realize a Service Part Supply Plan business scenario.

A "Service Parts Planning Processor" system 137000 can query Service Part Supply Plan Supply Chain Management (SCM) shortage overview elements using a ServicePartSupplyPlanSCMShortageOverviewByElementsQuery_sync message 137004 as shown, for example, in FIG. 137. A "Service Parts Planning Owner" system 137002 can respond to the query using a ServicePartSupplyPlanSCMShortageOverviewByElementsResponse_sync message 137006 as shown, for example, in FIG. 137.

The "Service Parts Planning Processor" system 137000 can query Service Part Supply Plan Supply Chain Management (SCM) shortage elements using a ServicePartSupplyPlanSCMShortageByElementsQuery_sync message 137008 as shown, for example, in FIG. 137. The "Service Parts Planning Owner" system 137002 can respond to the query using a ServicePartSupplyPlanSCMShortageByElementsResponse_sync message 137010 as shown, for example, in FIG. 137.

FIG. 138 illustrates one example logical configuration of ServicePartSupplyPlanSCMShortageOverviewByElementsQueryMessage_sync message 138000. Specifically, this figure depicts the arrangement and hierarchy of various components such as one or more levels of packages, entities, and datatypes, shown here as 138000 through 138006. As described above, packages may be used to represent hierarchy levels. Entities are discrete business elements that are used during a business transaction. Data types are used to type object entities and interfaces with a structure. For example, ServicePartSupplyPlanSCMShortageOverviewByElementsQueryMessage_sync message 138000 includes, among other things, Selection 138002. Accordingly, heterogeneous applications may communicate using this consistent message configured as such.

Additionally, FIG. 139 illustrates one example logical configuration of ServicePartSupplyPlanSCMShortageOverviewByElementsResponseMessage_sync message 139000. Specifically, this figure depicts the arrangement and hierarchy of various components such as one or more levels of packages, entities, and datatypes, shown here as 139000 through 139014. As described above, packages may be used to represent hierarchy levels. Entities are discrete business elements that are used during a business transaction. Data types are used to type object entities and interfaces with a structure. For example, ServicePartSupplyPlanSCMShortageOverviewByElementsResponseMessage_sync message 139000 includes, among other things, ServicePartSupplyPlan 139004. Accordingly, heterogeneous applications may communicate using this consistent message configured as such.

Additionally, FIG. 140 illustrates one example logical configuration of ServicePartSupplyPlanSCMByElementsQueryMessage_sync message 140000. Specifically, this figure depicts the arrangement and hierarchy of various components such as one or more levels of packages, entities, and datatypes, shown here as 140000 through 140006. As described above, packages may be used to represent hierarchy levels. Entities are discrete business elements that are used during a business transaction. Data types are used to type object entities and interfaces with a structure. For example, ServicePartSupplyPlanSCMByElementsQueryMessage_sync message 140000 includes, among other things, Selection 140004. Accordingly, heterogeneous applications may communicate using this consistent message configured as such.

Additionally, FIG. 141 illustrates one example logical configuration of ServicePartSupplyPlanSCMByElementsResponseMessage message 141000. Specifically, this figure depicts the arrangement and hierarchy of various components such as one or more levels of packages, entities, and datatypes, shown here as 141000 through 141014. As described above, packages may be used to represent hierarchy levels. Entities are discrete business elements that are used during a business transaction. Data types are used to type object entities and interfaces with a structure. For example, ServicePartSupplyPlanSCMByElementsResponseMessage message 141000 includes, among other things, ServicePartSupplyPlan 141004. Accordingly, heterogeneous applications may communicate using this consistent message configured as such.

A ServicePartSupplyPlan interface performs various operations, namely a ServicePartSupplyPlanSCMShortageOverviewByElementsQueryResponse_In and a ServicePartSupplyPlanSCMShortageByElementsQuery Response_In. The ServicePartSupplyPlanSCMShortage OverviewByElementsQueryResponse_In operation is a query to and response from the Service Parts Planning owner to get shortage overview information which is derived from the Service Part Shortage Analysis. The ServicePartSupply- PlanSCMShortageOverviewByElementsQueryResponse_In operation is used to query an overview of shortage information of service parts from Service Part Shortage Analysis. The ServicePartSupplyPlanSCM-ShortageOverviewByElementsQueryResponse_In operation includes various message types, namely a ServicePartSupplyPlanSCMShortageOverviewByElementsQuery_sync and a ServicePartSupplyPlanSCM-ShortageOverviewByElementsResponse_sync. The structure of the ServicePartSupplyPlanSCM-ShortageOverviewByElementsQuery_sync message type is specified by a ServicePartSupplyPlanSCM-ShortageOverviewByElementsQueryMessage_sync message data type. The structure of the ServicePartSupplyPlan-SCMShortageOverviewByElementsResponse_sync message type is specified by a ServicePartSupplyPlanSCM-ShortageOverviewByElementsResponseMessage_sync message data type.

The ServicePartSupplyPlanSCMShortageByElements QueryResponse_In operation is a query to and response from the Service Parts Planning owner to get shortage information which is derived from the Service Part Shortage Analysis. The ServicePartSupplyPlanSCM-ShortageByElementsQueryResponse_In operation is used to query detailed shortage information of service parts from Service Part Shortage Analysis. The ServicePartSupplyPlan-SCMShortageByElementsQueryResponse_In operation includes various message types, namely a ServicePartSupplyPlanSCMShortageByElementsQuery_sync and a ServicePartSupplyPlanSCMShortage-ByElementsResponse_sync. The structure of the ServicePartSupplyPlanSCM-ShortageByElementsQuery_sync message type is specified by a ServicePartSupplyPlanSCMShortageBy ElementsQueryMessage_sync message data type. The structure of the ServicePartSupplyPlanSCMShort-ageByElementsResponse_sync message type is specified by a ServicePartSupplyPlanSCMShortage ByElementsResponseMessage_sync message data type.

FIGS. 142-1 through 142-6 show a ServicePartSupply-PlanSCMShortageOverviewByEle-mentsQueryMessage_sync 142000 package. The Service-PartSupplyPlanSCMShortageOverviewByElementsQuery Message_sync 142000 package includes a ServicePartSupplyPlanSCMShortageOverview-ByElementsQueryMessage_sync 142002 entity. The ServicePartSupplyPlanSCMShortageOverviewByElements QueryMessage_sync 142000 package includes a Selection 142004 package.

The Selection 142004 package includes a ServicePartSupplyPlanSCMShortageOverviewSelectionByElements 142006 entity. The ServicePartSupplyPlanSCM-ShortageOverviewSelectionByElements 142006 entity has a cardinality of 1142008 meaning that for each instance of the Selection 142004 package there is one ServicePartSupply-PlanSCMShortageOverviewSelectionByElements 142006 entity. The ServicePartSupplyPlanSCM-ShortageOverviewSelectionByElements 142006 entity includes a SelectionByActualResultIndicator 142130 attribute. The ServicePartSupplyPlanSCM-ShortageOverviewSelectionByElements 142006 entity includes various subordinate entities, namely a SelectionBy-DemandPlannerGroupCode 142010 entity, a SelectionBy-ServicePartPlanningProductGroupCode 142040 entity, a SelectionByShipFromLocationInternalID 142070 entity and a SelectionByShipToLocationInternalID 142100 entity.

The SelectionByActualResultIndicator 142130 attribute is an Indicator(Qualifier:result) 142134 data type. The SelectionByActualResultIndicator 142130 attribute has a cardinality of 1 142132 meaning that for each instance of the ServicePartSupplyPlanSCMShortageOverviewSelectionBy Elements 142006 entity there is one SelectionByActualResultIndicator 142130 attribute. The SelectionByActualResultIndicator is the selection whether the latest or the penultimate shortage information is requested.

The SelectionByDemandPlannerGroupCode 142010 entity has a cardinality of 0 . . . 1 142012 meaning that for each instance of the ServicePartSupplyPlanSCM-ShortageOverviewSelectionByElements 142006 entity there may be one SelectionByDemandPlannerGroupCode 142010 entity. The SelectionByDemandPlannerGroupCode is the range of DemandPlannerGroupCodes for selection by the Planner responsible for the supply plan. The SelectionByDemandPlannerGroupCode 142010 entity includes various attributes, namely an InclusionExclusionCode 142016 attribute, an IntervalBoundaryTypeCode 142022 attribute, a LowerBoundaryDemandPlannerGroupCode 142028 attribute and an UpperBoundaryDemandPlannerGroupCode 142034 attribute.

The InclusionExclusionCode 142016 attribute is an InclusionExclusionCode 142020 data type. The InclusionExclusionCode 142016 attribute has a cardinality of 1 142018 meaning that for each instance of the SelectionByDemandPlannerGroupCode 142010 entity there is one InclusionExclusionCode 142016 attribute. The InclusionExclusionCode is the inclusion in or exclusion from selection range for SelectionByDemandPlannerGroupCode.

The IntervalBoundaryTypeCode 142022 attribute is an IntervalBoundaryTypeCode 142026 data type. The IntervalBoundaryTypeCode 142022 attribute has a cardinality of 1 142024 meaning that for each instance of the SelectionByDemandPlannerGroupCode 142010 entity there is one IntervalBoundaryTypeCode 142022 attribute. The IntervalBoundaryTypeCode is the interval Boundary Type for SelectionByDemandPlannerGroupCode.

The LowerBoundaryDemandPlannerGroupCode 142028 attribute is a DemandPlannerGroupCode 142032 data type. The LowerBoundaryDemandPlannerGroupCode 142028 attribute has a cardinality of 1 142030 meaning that for each instance of the SelectionByDemandPlannerGroupCode 142010 entity there is one LowerBoundaryDemandPlannerGroupCode 142028 attribute. The LowerBoundaryDemandPlannerGroupCode is the lower boundary of selection range for SelectionByDemandPlannerGroupCode.

The UpperBoundaryDemandPlannerGroupCode 142034 attribute is a DemandPlannerGroupCode 142038 data type. The UpperBoundaryDemandPlannerGroupCode 142034 attribute has a cardinality of 0 . . . 1 142036 meaning that for each instance of the SelectionByDemandPlannerGroupCode 142010 entity there may be one UpperBoundaryDemandPlannerGroupCode 142034 attribute. The UpperBoundaryDemandPlannerGroupCode is the upper boundary of selection range for SelectionByDemandPlannerGroupCode.

The SelectionByServicePartPlanningProductGroupCode 142040 entity has a cardinality of 0 . . . 1 142042 meaning that for each instance of the ServicePartSupplyPlanSCM-ShortageOverviewSelectionByElements 142006 entity there may be one SelectionByServicePartPlanningProductGroupCode 142040 entity. The SelectionByServicePartPlanningProductGroupCode is the range of ServicePartPlanningProductGroupCodes for selection by the Product Group. The SelectionByServicePartPlanningProductGroupCode 142040 entity includes various attributes, namely an InclusionExclusionCode 142046 attribute, an IntervalBoundaryTypeCode 142052 attribute, a LowerBoundaryServicePartPlanningProductGroupCode 142058 attribute and an UpperBoundaryServicePartPlanningProductGroupCode 142064 attribute.

The InclusionExclusionCode 142046 attribute is an InclusionExclusionCode 142050 data type. The InclusionExclusionCode 142046 attribute has a cardinality of 1 142048 meaning that for each instance of the SelectionByServicePartPlanningProductGroupCode 142040 entity there is one InclusionExclusionCode 142046 attribute. The InclusionExclusionCode is the inclusion in or exclusion from selection range for SelectionByServicePartPlanningProductGroupCode.

The IntervalBoundaryTypeCode 142052 attribute is an IntervalBoundaryTypeCode 142056 data type. The IntervalBoundaryTypeCode 142052 attribute has a cardinality of 1 142054 meaning that for each instance of the SelectionByServicePartPlanningProductGroupCode 142040 entity there is one IntervalBoundaryTypeCode 142052 attribute. The IntervalBoundaryTypeCode is the interval Boundary Type for SelectionByServicePartPlanningProductGroupCode.

The LowerBoundaryServicePartPlanningProductGroupCode 142058 attribute is a ServicePartPlanningProductGroupCode 142062 data type. The LowerBoundaryServicePartPlanningProductGroupCode 142058 attribute has a cardinality of 1 142060 meaning that for each instance of the SelectionByServicePartPlanningProductGroupCode 142040 entity there is one LowerBoundaryServicePartPlanningProductGroupCode 142058 attribute. The LowerBoundaryServicePartPlanningProductGroupCode is the lower boundary of selection range for SelectionByServicePartPlanningProductGroupCode.

The UpperBoundaryServicePartPlanningProductGroupCode 142064 attribute is a ServicePartPlanningProductGroupCode 142068 data type. The UpperBoundaryServicePartPlanningProductGroupCode 142064 attribute has a cardinality of 0 . . . 1 142066 meaning that for each instance of the SelectionByServicePartPlanningProductGroupCode 142040 entity there may be one UpperBoundaryServicePartPlanningProductGroupCode 142064 attribute. The UpperBoundaryServicePartPlanningProductGroupCode is the upper boundary of selection range for SelectionByServicePartPlanningProductGroupCode.

The SelectionByShipFromLocationInternalID 142070 entity has a cardinality of 0 . . . 1 142072 meaning that for each instance of the ServicePartSupplyPlanSCMShortageOverviewSelectionByElements 142006 entity there may be one SelectionByShipFromLocationInternalID 142070 entity. The SelectionByShipFromLocationInternalID is the range of LocationInternalIDs for selection by the Location from which the shipment is made. The SelectionByShipFromLocationInternalID 142070 entity includes various attributes, namely an InclusionExclusionCode 142076 attribute, an IntervalBoundaryTypeCode 142082 attribute, a LowerBoundaryShipFromLocationInternalID 142088 attribute and an UpperBoundaryShipFromLocationInternalID 142094 attribute.

The InclusionExclusionCode 142076 attribute is an InclusionExclusionCode 142080 data type. The InclusionExclusionCode 142076 attribute has a cardinality of 1 142078 meaning that for each instance of the SelectionByShipFromLocationInternalID 142070 entity there is one InclusionExclusionCode 142076 attribute. The InclusionExclusionCode is the inclusion in or exclusion from selection range for SelectionByShipFromLocationInternalID.

The IntervalBoundaryTypeCode 142082 attribute is an IntervalBoundaryTypeCode 142086 data type. The IntervalBoundaryTypeCode 142082 attribute has a cardinality of 1 142084 meaning that for each instance of the SelectionByShipFromLocationInternalID 142070 entity there is one IntervalBoundaryTypeCode 142082 attribute. Interval Boundary Type for SelectionByShipFromLocationInternalID.

The LowerBoundaryShipFromLocationInternalID 142088 attribute is a LocationInternalID 142092 data type. The LowerBoundaryShipFromLocationInternalID 142088 attribute has a cardinality of 1 142090 meaning that for each instance of the SelectionByShipFromLocationInternalID 142070 entity there is one LowerBoundaryShipFromLocationInternalID 142088 attribute. The LowerBoundaryShipFromLocationInternalID is the lower boundary of selection range for SelectionByShipFromLocationInternalID.

The UpperBoundaryShipFromLocationInternalID 142094 attribute is a LocationInternalID 142098 data type. The UpperBoundaryShipFromLocationInternalID 142094 attribute has a cardinality of 0 . . . 1 142096 meaning that for each instance of the SelectionByShipFromLocationInternalID 142070 entity there may be one UpperBoundaryShipFromLocationInternalID 142094 attribute. The UpperBoundaryShipFromLocationInternalID is the upper boundary of selection range for SelectionByShipFromLocationInternalID.

The SelectionByShipToLocationInternalID 142100 entity has a cardinality of 0 . . . 1 142102 meaning that for each instance of the ServicePartSupplyPlanSCMShortageOverviewSelectionByElements 142006 entity there may be one SelectionByShipToLocationInternalID 142100 entity. The SelectionByShipToLocationInternalID is the range of LocationInternalIDs for selection by the Location to which the shipment is made. The SelectionByShipToLocationInternalID 142100 entity includes various attributes, namely an InclusionExclusionCode 142106 attribute, an IntervalBoundaryTypeCode 142112 attribute, a LowerBoundaryShipToLocationInternalID 142118 attribute and an UpperBoundaryShipToLocationInternalID 142124 attribute.

The InclusionExclusionCode 142106 attribute is an InclusionExclusionCode 142110 data type. The InclusionExclusionCode 142106 attribute has a cardinality of 1 142108 meaning that for each instance of the SelectionByShipToLocationInternalID 142100 entity there is one InclusionExclusionCode 142106 attribute. The InclusionExclusionCode is the inclusion in or exclusion from selection range for SelectionByShipToLocationInternalID.

The IntervalBoundaryTypeCode 142112 attribute is an IntervalBoundaryTypeCode 142116 data type. The IntervalBoundaryTypeCode 142112 attribute has a cardinality of 1 142114 meaning that for each instance of the SelectionByShipToLocationInternalID 142100 entity there is one IntervalBoundaryTypeCode 142112 attribute. Interval Boundary Type for SelectionByShipToLocationInternalID.

The LowerBoundaryShipToLocationInternalID 142118 attribute is a LocationInternalID 142122 data type. The LowerBoundaryShipToLocationInternalID 142118 attribute has a cardinality of 1 142120 meaning that for each instance of the SelectionByShipToLocationInternalID 142100 entity there is one LowerBoundaryShipToLocationInternalID 142118 attribute. The LowerBoundaryShipToLocationInternalID is the lower boundary of selection range for SelectionByShipToLocationInternalID.

The UpperBoundaryShipToLocationInternalID 142124 attribute is a LocationInternalID 142128 data type. The UpperBoundaryShipToLocationInternalID 142124 attribute has a cardinality of 0 . . . 1 142126 meaning that for each instance of the SelectionByShipToLocationInternalID 142100 entity there may be one UpperBoundaryShipToLocationInternalID 142124 attribute. The UpperBoundaryShipToLocationInternalID is the upper boundary of selection range for SelectionByShipToLocationInternalID.

FIGS. 143-1 through 143-3 show a ServicePartSupplyPlanSCMShortageOverviewByElementsResponseMessage_sync 143000 package. The ServicePartSupplyPlanSCMShortageOverviewByElements ResponseMessage_sync 143000 package includes a ServicePartSupplyPlanSCMShortageOverviewByElementsResponseMessage_sync 143002 entity. The ServicePartSupplyPlanSCMShortageOverviewByElementsResponseMessage_sync 143000 package includes various packages, namely a ServicePartSupplyPlan 143004 package and a Log 143070 package.

The ServicePartSupplyPlan 143004 package includes a ServicePartSupplyPlan 143006 entity. The ServicePartSupplyPlan 143004 package includes a KeyFigureValue 143040 package. The ServicePartSupplyPlan 143006 entity has a cardinality of 0 . . . n 143008 meaning that for each instance of the ServicePartSupplyPlan 143004 package there may be one or more ServicePartSupplyPlan 143006 entities. The ServicePartSupplyPlan 143006 entity includes various attributes, namely a DemandPlannerGroupCode 143010 attribute, a ServicePartPlanningProductGroupCode 143016 attribute, a ShipFromLocationInternalID 143022 attribute, a ShipToLocationInternalID 143028 attribute and an ActualResultIndicator 143034 attribute.

The DemandPlannerGroupCode 143010 attribute is a DemandPlannerGroupCode 143014 data type. The DemandPlannerGroupCode 143010 attribute has a cardinality of 1 143012 meaning that for each instance of the ServicePartSupplyPlan 143006 entity there is one DemandPlannerGroupCode 143010 attribute. DemandPlannerGroupCode is a coded representation of a demand planner group in service part supply plan.

The ServicePartPlanningProductGroupCode 143016 attribute is a ServicePartPlanningProductGroupCode 143020 data type. The ServicePartPlanningProductGroupCode 143016 attribute has a cardinality of 1 143018 meaning that for each instance of the ServicePartSupplyPlan 143006 entity there is one ServicePartPlanningProductGroupCode 143016 attribute. ServicePartPlanningProductGroupCode is a coded representation of a Product Group in service part supply plan.

The ShipFromLocationInternalID 143022 attribute is a LocationInternalID 143026 data type. The ShipFromLocationInternalID 143022 attribute has a cardinality of 1 143024 meaning that for each instance of the ServicePartSupplyPlan 143006 entity there is one ShipFromLocationInternalID 143022 attribute. LocationInternalID is an ID for a Location from which a shipment is made.

The ShipToLocationInternalID 143028 attribute is a LocationInternalID 143032 data type. The ShipToLocationInternalID 143028 attribute has a cardinality of 1 143030 meaning that for each instance of the ServicePartSupplyPlan 143006 entity there is one ShipToLocationInternalID 143028 attribute. LocationInternalID is an ID for a Location to which a shipment is made.

The ActualResultIndicator 143034 attribute is an Indicator (Qualifier:result) 143038 data type. The ActualResultIndicator 143034 attribute has a cardinality of 1 143036 meaning that for each instance of the ServicePartSupplyPlan 143006 entity there is one ActualResultIndicator 143034 attribute. Indicator indicates whether the latest or the penultimate shortage information is given.

The KeyFigureValue 143040 package includes a KeyFigureValue 143042 entity. The KeyFigureValue 143042 entity has a cardinality of 1 143044 meaning that for each instance of the KeyFigureValue 143040 package there is one KeyFigureValue 143042 entity. KeyFigureValue contains values which are derived from service part supply plan. The KeyFigureValue 143042 entity includes various attributes, namely a CriticalProductNumberValue 143046 attribute, a PotentiallyCriticalProductNumberValue 143052 attribute, a BackOrderItemNumberValue 143058 attribute and a BackOrderProductNumberValue 143064 attribute.

The CriticalProductNumberValue 143046 attribute is a NumberValue 143050 data type. The CriticalProductNumberValue 143046 attribute has a cardinality of 1 143048 meaning that for each instance of the KeyFigureValue 143042 entity there is one CriticalProductNumberValue 143046 attribute. NumberValue is a number of products with critical shortage status in the Service Part Supply Plan. The PotentiallyCriticalProductNumberValue 143052 attribute is a NumberValue 143056 data type. The PotentiallyCriticalProductNumberValue 143052 attribute has a cardinality of 1 143054 meaning that for each instance of the KeyFigureValue 143042 entity there is one PotentiallyCriticalProductNumberValue 143052 attribute. NumberValue is a number of products with potentially critical shortage status in the Service Part Supply Plan.

The BackOrderItemNumberValue 143058 attribute is a NumberValue 143062 data type. The BackOrderItemNumberValue 143058 attribute has a cardinality of 1 143060 meaning that for each instance of the KeyFigureValue 143042 entity there is one BackOrderItemNumberValue 143058 attribute. NumberValue is a number of backorder items in the Service Part Supply Plan.

The BackOrderProductNumberValue 143064 attribute is a NumberValue 143068 data type. The BackOrderProductNumberValue 143064 attribute has a cardinality of 1 143066 meaning that for each instance of the KeyFigureValue 143042 entity there is one BackOrderProductNumberValue 143064 attribute. NumberValue is a number of backorder products in the Service Part Supply Plan.

The Log 143070 package is a Log 143076 data type. The Log 143070 package includes a Log 143072 entity. The Log 143072 entity has a cardinality of 1 143074 meaning that for each instance of the Log 143070 package there is one Log 143072 entity.

FIGS. 144-1 through 144-9 show a ServicePartSupplyPlanSCMShortageByElementsQueryMessage_sync 144000 package. The ServicePartSupplyPlanSCMShortageByElementsQueryMessage_sync 144000 package includes a ServicePartSupplyPlanSCMShortageByElementsQueryMessage_sync 144002 entity. The ServicePartSupplyPlanSCMShortageByElementsQueryMessage_sync 144000 package includes a Selection 144004 package.

The Selection 144004 package includes a ServicePartSupplyPlanSCMShortageSelectionByElements 144006 entity. The ServicePartSupplyPlanSCMShortageSelectionByElements 144006 entity has a cardinality of 1 144008 meaning that for each instance of the Selection 144004 package there is one ServicePartSupplyPlanSCMShortageSelectionByElements 144006 entity. The ServicePartSupplyPlanSCMShortageSelectionByElements 144006 entity includes a SelectionByActualResultIndicator 144220 attribute. The ServicePartSupplyPlanSCMShortageSelectionByElements 144006 entity includes various subordinate entities, namely a SelectionByDemandPlannerGroupCode 144010 entity, a SelectionByMaterialInternalID 144040 entity, a SelectionByShipFromLocationInternalID 144070 entity, a SelectionByShipToLocationInternalID 144100 entity, a SelectionByCriticalityCode 144130 entity, a SelectionBySupplyPlanningShortageResolutionCode 144160 entity and a SelectionByBackOrderItemQuantity 144190 entity.

The SelectionByActualResultIndicator 144220 attribute is an Indicator(Qualifier:result) 144224 data type. The SelectionByActualResultIndicator 144220 attribute has a cardinality of 1 144222 meaning that for each instance of the ServicePartSupplyPlanSCMShortageSelectionByElements 144006 entity there is one SelectionByActualResultIndicator 144220 attribute. Indicator (Qualifier: result) is a Selection whether the latest or the penultimate shortage information is requested. Default value='X' means the actual results.

The SelectionByDemandPlannerGroupCode 144010 entity has a cardinality of 0 . . . 1 144012 meaning that for each instance of the ServicePartSupplyPlanSCMShortageSelectionByElements 144006 entity there may be one SelectionByDemandPlannerGroupCode 144010 entity. SelectionByDemandPlannerGroupCode is a Range of DemandPlannerGroupCodes for selection by the Planner responsible for the supply plan. The SelectionByDemandPlannerGroupCode 144010 entity includes various attributes, namely an InclusionExclusionCode 144016 attribute, an IntervalBoundaryTypeCode 144022 attribute, a LowerBoundaryDemandPlannerGroupCode 144028 attribute and an UpperBoundaryDemandPlannerGroupCode 144034 attribute.

The InclusionExclusionCode 144016 attribute is an InclusionExclusionCode 144020 data type. The InclusionExclusionCode 144016 attribute has a cardinality of 1 144018 meaning that for each instance of the SelectionByDemandPlannerGroupCode 144010 entity there is one InclusionExclusionCode 144016 attribute. InclusionExclusionCode is an Inclusion in or exclusion from selection range for SelectionByDemandPlannerGroupCode.

The IntervalBoundaryTypeCode 144022 attribute is an IntervalBoundaryTypeCode 144026 data type. The IntervalBoundaryTypeCode 144022 attribute has a cardinality of 1 144024 meaning that for each instance of the SelectionByDemandPlannerGroupCode 144010 entity there is one IntervalBoundaryTypeCode 144022 attribute. IntervalBoundaryTypeCode is an Interval Boundary Type for SelectionByDemandPlannerGroupCode.

The LowerBoundaryDemandPlannerGroupCode 144028 attribute is a DemandPlannerGroupCode 144032 data type. The LowerBoundaryDemandPlannerGroupCode 144028 attribute has a cardinality of 1 144030 meaning that for each instance of the SelectionByDemandPlannerGroupCode 144010 entity there is one LowerBoundaryDemandPlannerGroupCode 144028 attribute. DemandPlannerGroupCode is a Lower Boundary of selection range for SelectionByDemandPlannerGroupCode.

The UpperBoundaryDemandPlannerGroupCode 144034 attribute is a DemandPlannerGroupCode 144038 data type. The UpperBoundaryDemandPlannerGroupCode 144034 attribute has a cardinality of 0 . . . 1 144036 meaning that for each instance of the SelectionByDemandPlannerGroupCode 144010 entity there may be one UpperBoundaryDemandPlannerGroupCode 144034 attribute. DemandPlannerGroupCode is an Upper Boundary of selection range for SelectionByDemandPlannerGroupCode.

The SelectionByMaterialInternalID 144040 entity has a cardinality of 0 . . . 1 144042 meaning that for each instance of the ServicePartSupplyPlanSCMShortageSelectionByElements 144006 entity there may be one SelectionByMaterialInternalID 144040 entity. SelectionByMaterialInternalID is a Range of ProductInternalIDs for selection by Material. The SelectionByMaterialInternalID 144040 entity includes various attributes, namely an InclusionExclusionCode 144046 attribute, an IntervalBoundaryTypeCode 144052 attribute, a LowerBoundaryMaterialInternalID 144058 attribute and an UpperBoundaryMaterialInternalID 144064 attribute.

The InclusionExclusionCode 144046 attribute is an InclusionExclusionCode 144050 data type. The InclusionExclusionCode 144046 attribute has a cardinality of 1 144048 meaning that for each instance of the SelectionByMaterialInternalID 144040 entity there is one InclusionExclusionCode 144046 attribute. InclusionExclusionCode is an Inclusion in or exclusion from selection range for SelectionByMaterialInternalID.

The IntervalBoundaryTypeCode 144052 attribute is an IntervalBoundaryTypeCode 144056 data type. The IntervalBoundaryTypeCode 144052 attribute has a cardinality of 1 144054 meaning that for each instance of the SelectionByMaterialInternalID 144040 entity there is one IntervalBoundaryTypeCode 144052 attribute. IntervalBoundaryTypeCode is an Interval Boundary Type for SelectionByMaterialInternalID.

The LowerBoundaryMaterialInternalID 144058 attribute is a ProductInternalID 144062 data type. The LowerBoundaryMaterialInternalID 144058 attribute has a cardinality of 1 144060 meaning that for each instance of the SelectionByMaterialInternalID 144040 entity there is one LowerBoundaryMaterialInternalID 144058 attribute. ProductInternalID is a Lower Boundary of selection range for SelectionByMaterialInternalID.

The UpperBoundaryMaterialInternalID 144064 attribute is a ProductInternalID 144068 data type. The UpperBoundaryMaterialInternalID 144064 attribute has a cardinality of 0 . . . 1 144066 meaning that for each instance of the SelectionByMaterialInternalID 144040 entity there may be one UpperBoundaryMaterialInternalID 144064 attribute. ProductInternalID is an Upper Boundary of selection range for SelectionByMaterialInternalID.

The SelectionByShipFromLocationInternalID 144070 entity has a cardinality of 0 . . . 1 144072 meaning that for each instance of the ServicePartSupplyPlanSCMShortageSelectionByElements 144006 entity there may be one SelectionByShipFromLocationInternalID 144070 entity. SelectionByShipFromLocationInternalID is a Range of LocationInternalIDs for selection by the Location from which the shipment is made. The SelectionByShipFromLocationInternalID 144070 entity includes various attributes, namely an InclusionExclusionCode 144076 attribute, an IntervalBoundaryTypeCode 144082 attribute, a LowerBoundaryShipFromLocationInternalID 144088 attribute and an UpperBoundaryShipFromLocationInternalID 144094 attribute.

The InclusionExclusionCode 144076 attribute is an InclusionExclusionCode 144080 data type. The InclusionExclusionCode 144076 attribute has a cardinality of 1 144078 meaning that for each instance of the SelectionByShipFromLocationInternalID 144070 entity there is one InclusionExclusionCode 144076 attribute. InclusionExclusionCode is an Inclusion in or exclusion from selection range for SelectionByShipFromLocationInternalID.

The IntervalBoundaryTypeCode 144082 attribute is an IntervalBoundaryTypeCode 144086 data type. The IntervalBoundaryTypeCode 144082 attribute has a cardinality of 1 144084 meaning that for each instance of the SelectionByShipFromLocationInternalID 144070 entity there is one IntervalBoundaryTypeCode 144082 attribute. IntervalBoundaryTypeCode is an Interval Boundary Type for SelectionByShipFromLocationInternalID.

The LowerBoundaryShipFromLocationInternalID 144088 attribute is a LocationInternalID 144092 data type. The LowerBoundaryShipFromLocationInternalID 144088 attribute has a cardinality of 1 144090 meaning that for each instance of the SelectionByShipFromLocationInternalID 144070 entity there is one LowerBoundaryShipFromLocationInternalID 144088 attribute. LocationInternalID is a Lower Boundary of selection range for SelectionByShipFromLocationInternalID.

The UpperBoundaryShipFromLocationInternalID 144094 attribute is a LocationInternalID 144098 data type. The UpperBoundaryShipFromLocationInternalID 144094 attribute has a cardinality of 0 . . . 1 144096 meaning that for each instance of the SelectionByShipFromLocationInternalID 144070 entity there may be one UpperBoundaryShipFromLocationInternalID 144094 attribute. LocationInternalID is an Upper Boundary of selection range for SelectionByShipFromLocationInternalID.

The SelectionByShipToLocationInternalID 144100 entity has a cardinality of 0 . . . 1 144102 meaning that for each instance of the ServicePartSupplyPlanSCMShortageSelectionByElements 144006 entity there may be one SelectionByShipToLocationInternalID 144100 entity. SelectionByShipToLocationInternalID is a Range of LocationInternalIDs for selection by the Location to which the shipment is made. The SelectionByShipToLocationInternalID 144100 entity includes various attributes, namely an InclusionExclusionCode 144106 attribute, an IntervalBoundaryTypeCode 144112 attribute, a LowerBoundaryShipToLocationInteralID 144118 attribute and an UpperBoundaryShipToLocationInternalID 144124 attribute.

The InclusionExclusionCode 144106 attribute is an InclusionExclusionCode 144110 data type. The InclusionExclusionCode 144106 attribute has a cardinality of 1 144108 meaning that for each instance of the SelectionByShipToLocationInternalID 144100 entity there is one InclusionExclusionCode 144106 attribute. InclusionExclusionCode is an Inclusion in or exclusion from selection range for SelectionByShipToLocationInternalID.

The IntervalBoundaryTypeCode 144112 attribute is an IntervalBoundaryTypeCode 144116 data type. The IntervalBoundaryTypeCode 144112 attribute has a cardinality of 1 144114 meaning that for each instance of the SelectionByShipToLocationInternalID 144100 entity there is one IntervalBoundaryTypeCode 144112 attribute. IntervalBoundaryTypeCode is an Interval Boundary Type for SelectionByShipToLocationInternalID.

The LowerBoundaryShipToLocationInteralID 144118 attribute is a LocationInternalID 144122 data type. The LowerBoundaryShipToLocationInteralID 144118 attribute has a cardinality of 1 144120 meaning that for each instance of the SelectionByShipToLocationInternalID 144100 entity there is one LowerBoundaryShipToLocationInteralID 144118 attribute. LocationInternalID is a Lower Boundary of selection range for SelectionByShipToLocationInternalID.

The UpperBoundaryShipToLocationInternalID 144124 attribute is a LocationInternalID 144128 data type. The UpperBoundaryShipToLocationInternalID 144124 attribute has a cardinality of 0 . . . 1 144126 meaning that for each instance of the SelectionByShipToLocationInternalID 144100 entity there may be one UpperBoundaryShipToLocationInternalID 144124 attribute. LocationInternalID is an Upper Boundary of selection range for SelectionByShipToLocationInternalID.

The SelectionByCriticalityCode 144130 entity has a cardinality of 0 . . . 1 144132 meaning that for each instance of the ServicePartSupplyPlanSCMShortageSelectionByElements 144006 entity there may be one SelectionByCriticalityCode 144130 entity. SelectionByShortageStatus is a Range of CriticalityCodes for selection by the Criticality of the shortage status. The SelectionByCriticalityCode 144130 entity includes various attributes, namely an InclusionExclusionCode 144136 attribute, an IntervalBoundaryTypeCode 144142 attribute, a LowerBoundaryCriticalityCode 144148 attribute and an UpperBoundaryCriticalityCode 144154 attribute.

The InclusionExclusionCode 144136 attribute is an InclusionExclusionCode 144140 data type. The InclusionExclusionCode 144136 attribute has a cardinality of 1 144138 meaning that for each instance of the SelectionByCriticalityCode 144130 entity there is one InclusionExclusionCode 144136 attribute. InclusionExclusionCode is an Inclusion in or exclusion from selection range for SelectionByCriticalityCode.

The IntervalBoundaryTypeCode 144142 attribute is an IntervalBoundaryTypeCode 144146 data type. The IntervalBoundaryTypeCode 144142 attribute has a cardinality of 1 144144 meaning that for each instance of the SelectionByCriticalityCode 144130 entity there is one IntervalBoundaryTypeCode 144142 attribute. IntervalBoundaryTypeCode is an Interval Boundary Type for SelectionByCriticalityCode.

The LowerBoundaryCriticalityCode 144148 attribute is a CriticalityCode 144152 data type. The LowerBoundaryCriticalityCode 144148 attribute has a cardinality of 1 144150 meaning that for each instance of the SelectionByCriticalityCode 144130 entity there is one LowerBoundaryCriticalityCode 144148 attribute. CriticalityCode is a Lower Boundary of selection range for SelectionByCriticalityCode.

The UpperBoundaryCriticalityCode 144154 attribute is a CriticalityCode 144158 data type. The UpperBoundaryCriticalityCode 144154 attribute has a cardinality of 0 . . . 1 144156 meaning that for each instance of the SelectionByCriticalityCode 144130 entity there may be one UpperBoundaryCriticalityCode 144154 attribute. CriticalityCode is an Upper Boundary of selection range for SelectionByCriticalityCode.

The SelectionBySupplyPlanningShortageResolutionCode 144160 entity has a cardinality of 0 . . . 1 144162 meaning that for each instance of the ServicePartSupplyPlanSCMShortageSelectionByElements 144006 entity there may be one SelectionBySupplyPlanningShortageResolutionCode 144160 entity. SelectionBySupplyPlanningShortageResolutionCode is a Range of SelectionBySupplyPlanningShortageResolutionCodes for selection by the processing status of the Service Part Supply Plan Shortage. The SelectionBySupplyPlanningShortageResolutionCode 144160 entity includes various attributes, namely an InclusionExclusionCode 144166 attribute, an IntervalBoundaryTypeCode 144172 attribute, a LowerBoundarySupplyPlanningShortageResolutionCode 144178 attribute and an UpperBoundarySupplyPlanningShortageResolutionCode 144184 attribute.

The InclusionExclusionCode 144166 attribute is an InclusionExclusionCode 144170 data type. The InclusionExclusionCode 144166 attribute has a cardinality of 1 144168 meaning that for each instance of the SelectionBySupplyPlanningShortageResolutionCode 144160 entity there is one InclusionExclusionCode 144166 attribute. InclusionExclusionCode is an Inclusion in or exclusion from selection range for SelectionBySupplyPlanningShortageResolutionCode.

The IntervalBoundaryTypeCode 144172 attribute is an IntervalBoundaryTypeCode 144176 data type. The IntervalBoundaryTypeCode 144172 attribute has a cardinality of 1 144174 meaning that for each instance of the SelectionBySupplyPlanningShortageResolutionCode 144160 entity there is one IntervalBoundaryTypeCode 144172 attribute. IntervalBoundaryTypeCode is an Interval Boundary Type for SelectionBySupplyPlanningShortageResolutionCode.

The LowerBoundarySupplyPlanningShortageResolutionCode 144178 attribute is a SupplyPlanningShortageResolutionCode 144182 data type. The LowerBoundarySupplyPlanningShortageResolutionCode 144178 attribute has a cardinality of 1 144180 meaning that for each instance of the SelectionBySupplyPlanningShortageResolutionCode 144160 entity there is one LowerBoundarySupplyPlanningShortageResolutionCode 144178 attribute. SupplyPlanningShortageResolutionCode is a Lower Boundary of selection range for SelectionBySupplyPlanningShortageResolutionCode.

The UpperBoundarySupplyPlanningShortageResolutionCode 144184 attribute is a SupplyPlanningShortageResolutionCode 144188 data type. The UpperBoundarySupplyPlanningShortageResolutionCode 144184 attribute has a cardinality of 0 . . . 1 144186 meaning that for each instance of the SelectionBySupplyPlanningShortageResolutionCode 144160 entity there may be one UpperBoundarySupplyPlanningShortageResolutionCode 144184 attribute. SupplyPlanningShortageResolutionCode is an Upper Boundary of selection range for SelectionBySupplyPlanningShortageResolutionCode.

The SelectionByBackOrderItemQuantity 144190 entity has a cardinality of 0 . . . 1 144192 meaning that for each instance of the ServicePartSupplyPlanSCMShortageSelectionByElements 144006 entity there may be one SelectionByBackOrderItemQuantity 144190 entity. SelectionByBackOrderItemQuantity is a Range of Quantitys for selection by the Quantity in Backorder Items in the Service Part Supply Plan. The SelectionByBackOrderItemQuantity 144190 entity includes various attributes, namely an InclusionExclusionCode 144196 attribute, an IntervalBoundaryTypeCode 144202 attribute, a LowerBoundaryBackOrderItemQuantity 144208 attribute and an UpperBoundaryBackOrderItemQuantity 144214 attribute.

The InclusionExclusionCode 144196 attribute is an InclusionExclusionCode 144200 data type. The InclusionExclusionCode 144196 attribute has a cardinality of 1 144198 meaning that for each instance of the SelectionByBackOrderItemQuantity 144190 entity there is one InclusionExclusionCode 144196 attribute. InclusionExclusionCode is an Inclusion in or exclusion from selection range for SelectionByBackOrderItemQuantity.

The IntervalBoundaryTypeCode 144202 attribute is an IntervalBoundaryTypeCode 144206 data type. The IntervalBoundaryTypeCode 144202 attribute has a cardinality of 1 144204 meaning that for each instance of the SelectionByBackOrderItemQuantity 144190 entity there is one IntervalBoundaryTypeCode 144202 attribute. IntervalBoundaryTypeCode is an Interval Boundary Type for SelectionByBackOrderItemQuantity.

The LowerBoundaryBackOrderItemQuantity 144208 attribute is a Quantity 144212 data type. The LowerBoundaryBackOrderItemQuantity 144208 attribute has a cardinality of 1 144210 meaning that for each instance of the SelectionByBackOrderItemQuantity 144190 entity there is one LowerBoundaryBackOrderItemQuantity 144208 attribute. Quantity is a Lower Boundary of selection range for SelectionByBackOrderItemQuantity.

The UpperBoundaryBackOrderItemQuantity 144214 attribute is a Quantity 144218 data type. The UpperBoundaryBackOrderItemQuantity 144214 attribute has a cardinality of 0 . . . 1 144216 meaning that for each instance of the SelectionByBackOrderItemQuantity 144190 entity there may be one UpperBoundaryBackOrderItemQuantity 144214 attribute. Quantity is an Upper Boundary of selection range for SelectionByBackOrderItemQuantity.

FIGS. 145-1 through 145-7 show a ServicePartSupplyPlanSCMShortageByElementsResponseMessage_sync 145000 package. The ServicePartSupplyPlanSCMShortageByElementsResponseMessage_sync 145000 package includes a ServicePartSupplyPlanSCMShortageByElementsResponseMessage_sync 145002 entity. The ServicePartSupplyPlanSCMShortageByElementsResponseMessage_sync 145000 package includes various packages, namely a ServicePartSupplyPlan 145004 package and a Log 145160 package.

The ServicePartSupplyPlan 145004 package includes a ServicePartSupplyPlan 145006 entity. The ServicePartSupplyPlan 145004 package includes a KeyFigureValue 145100 package. The ServicePartSupplyPlan 145006 entity has a cardinality of 0 . . . n 145008 meaning that for each instance of the ServicePartSupplyPlan 145004 package there may be one or more ServicePartSupplyPlan 145006 entities. The ServicePartSupplyPlan 145006 entity includes various attributes, namely a DemandPlannerGroupCode 145010 attribute, a MaterialInternalID 145016 attribute, a ShipFromLocationInternalID 145022 attribute, a ShipToLocationInternalID 145028 attribute, a CriticalityCode 145034 attribute, a SupplyPlanningShortageResolutionCode 145040 attribute, an ActualResultIndicator 145046 attribute, a ScheduledAgreementOldestDeliveryDateTime 145052 attribute, a SupplierMultipleIndicator 145058 attribute, a FirstServicePartPlanningProductGroupCode 145064 attribute, a SecondServicePartPlanningProductGroupCode 145070 attribute, a ThirdServicePartPlanningProductGroupCode 145076 attribute, a FourthServicePartPlanningProductGroupCode 145082 attribute, a FifthServicePartPlanningProductGroupCode 145088 attribute and a MeasureUnitCode 145094 attribute.

The DemandPlannerGroupCode 145010 attribute is a DemandPlannerGroupCode 145014 data type. The DemandPlannerGroupCode 145010 attribute has a cardinality of 1 145012 meaning that for each instance of the ServicePartSupplyPlan 145006 entity there is one DemandPlannerGroupCode 145010 attribute. DemandPlannerGroupCode is a Coded representation of a demand planner group in service part supply plan.

The MaterialInternalID 145016 attribute is a ProductInternalID 145020 data type. The MaterialInternalID 145016 attribute has a cardinality of 1 145018 meaning that for each instance of the ServicePartSupplyPlan 145006 entity there is one MaterialInternalID 145016 attribute. ProductInternalID is an ID for a Material in service part supply plan.

The ShipFromLocationInternalID 145022 attribute is a LocationInternalID 145026 data type. The ShipFromLocationInternalID 145022 attribute has a cardinality of 1 145024 meaning that for each instance of the ServicePartSupplyPlan 145006 entity there is one ShipFromLocationInternalID 145022 attribute. LocationInternalID is an ID for a Location from which a shipment is made.

The ShipToLocationInternalID 145028 attribute is a LocationInternalID 145032 data type. The ShipToLocationInternalID 145028 attribute has a cardinality of 1 145030 meaning that for each instance of the ServicePartSupplyPlan 145006 entity there is one ShipToLocationInternalID 145028 attribute. LocationInternalID is an ID for a Location to which a shipment is made.

The CriticalityCode 145034 attribute is a CriticalityCode 145038 data type. The CriticalityCode 145034 attribute has a cardinality of 1 145036 meaning that for each instance of the ServicePartSupplyPlan 145006 entity there is one CriticalityCode 145034 attribute. CriticalityCode is a Coded representation of the Criticality of shortage status.

The SupplyPlanningShortageResolutionCode 145040 attribute is a SupplyPlanningShortageResolutionCode 145044 data type. The SupplyPlanningShortageResolutionCode 145040 attribute has a cardinality of 1 145042 meaning that for each instance of the ServicePartSupplyPlan 145006 entity there is one SupplyPlanningShortageResolutionCode 145040 attribute. SupplyPlanningShortageResolutionCode is a Coded representation of the resolution status of a service part supply plan shortage situation.

The ActualResultIndicator 145046 attribute is an Indicator (Qualifier:result) 145050 data type. The ActualResultIndicator 145046 attribute has a cardinality of 1 145048 meaning that for each instance of the ServicePartSupplyPlan 145006 entity there is one ActualResultIndicator 145046 attribute. Indicator(Qualifier:result) is an Indicates whether the latest or the penultimate shortage information is given.

The ScheduledAgreementOldestDeliveryDateTime 145052 attribute is a GLOBAL_DateTime(Qualifier:delivery) 145056 data type. The ScheduledAgreementOldestDeliveryDateTime 145052 attribute has a cardinality of 0 . . . 1 145054 meaning that for each instance of the ServicePartSupplyPlan 145006 entity there may be one ScheduledAgreementOldestDeliveryDateTime 145052 attribute. GLOBAL_DateTime(Qualifier:delivery) is an Oldest delivery date and time of scheduled agreements in backlog.

The SupplierMultipleIndicator 145058 attribute is an Indicator(Qualifier:Multiple) 145062 data type. The SupplierMultipleIndicator 145058 attribute has a cardinality of 1 145060 meaning that for each instance of the ServicePartSupplyPlan 145006 entity there is one SupplierMultipleIndicator 145058 attribute. Indicator(Qualifier:Multiple) is an Indicates multiple suppliers.

The FirstServicePartPlanningProductGroupCode 145064 attribute is a ServicePartPlanningProductGroupCode 145068 data type. The FirstServicePartPlanningProductGroupCode 145064 attribute has a cardinality of 0 . . . 1 145066 meaning that for each instance of the ServicePartSupplyPlan 145006 entity there may be one FirstServicePartPlanningProductGroupCode 145064 attribute. ServicePartPlanningProductGroupCode is a Coded representation of first product group the material is part of.

The SecondServicePartPlanningProductGroupCode 145070 attribute is a ServicePartPlanningProductGroupCode 145074 data type. The SecondServicePartPlanningProductGroupCode 145070 attribute has a cardinality of 0 . . . 1 145072 meaning that for each instance of the ServicePartSupplyPlan 145006 entity there may be one SecondServicePartPlanningProductGroupCode 145070 attribute. ServicePartPlanningProductGroupCode is a Coded representation of second product group the material is part of.

The ThirdServicePartPlanningProductGroupCode 145076 attribute is a ServicePartPlanningProductGroupCode 145080 data type. The ThirdServicePartPlanningProductGroupCode 145076 attribute has a cardinality of 0 . . . 1 145078 meaning that for each instance of the ServicePartSupplyPlan 145006 entity there may be one ThirdServicePartPlanningProductGroupCode 145076 attribute. ServicePartPlanningProductGroupCode is a Coded representation of third product group the material is part of.

The FourthServicePartPlanningProductGroupCode 145082 attribute is a ServicePartPlanningProductGroupCode 145086 data type. The FourthServicePartPlanningProductGroupCode 145082 attribute has a cardinality of 0 . . . 1 145084 meaning that for each instance of the ServicePartSupplyPlan 145006 entity there may be one FourthServicePartPlanningProductGroupCode 145082 attribute. ServicePartPlanningProductGroupCode is a Coded representation of fourth product group the material is part of.

The FifthServicePartPlanningProductGroupCode 145088 attribute is a ServicePartPlanningProductGroupCode 145092 data type. The FifthServicePartPlanningProductGroupCode 145088 attribute has a cardinality of 0 . . . 1 145090 meaning that for each instance of the ServicePartSupplyPlan 145006 entity there may be one FifthServicePartPlanningProductGroupCode 145088 attribute. ServicePartPlanningProductGroupCode is a Coded representation of fifth product group the material is part of.

The MeasureUnitCode 145094 attribute is a MeasureUnitCode 145098 data type. The MeasureUnitCode 145094 attribute has a cardinality of 1 145096 meaning that for each instance of the ServicePartSupplyPlan 145006 entity there is one MeasureUnitCode 145094 attribute. MeasureUnitCode is a Coded representation of the unit of measure for the quantities in a service part supply plan.

The KeyFigureValue 145100 package includes a KeyFigureValue 145102 entity. The KeyFigureValue 145102 entity has a cardinality of 0 . . . 1 145104 meaning that for each instance of the KeyFigureValue 145100 package there may be one KeyFigureValue 145102 entity. is a KeyFigureValue contains values which are derived from service part supply plan. The KeyFigureValue 145102 entity includes various attributes, namely a StockOnHand 145106 attribute, an OpenQuantity 145112 attribute, a DaysSupplyDuration 145118 attribute, a SalesOrderItemNumberValue 145124 attribute, a SalesOrderItemQuantity 145130 attribute, a RushOrderItemNumberValue 145136 attribute, a RushOrderItemQuantity 145142 attribute, a BackOrderItemNumberValue 145148 attribute and a BackOrderItemQuantity 145154 attribute.

The StockOnHand 145106 attribute is a Quantity 145110 data type. The StockOnHand 145106 attribute has a cardinality of 0 . . . 1 145108 meaning that for each instance of the KeyFigureValue 145102 entity there may be one StockOnHand 145106 attribute. Quantity is a Quantity of stock on hand. The OpenQuantity 145112 attribute is a Quantity 145116 data type. The OpenQuantity 145112 attribute has a cardinality of 0 . . . 1 145114 meaning that for each instance of the KeyFigureValue 145102 entity there may be one OpenQuantity 145112 attribute. Quantity is a Quantity needed for a product to change shortage status from critical to uncritical.

The DaysSupplyDuration 145118 attribute is a Duration (Qualifier:DaysSupply) 145122 data type. The DaysSupplyDuration 145118 attribute has a cardinality of 0 . . . 1 145120 meaning that for each instance of the KeyFigureValue 145102 entity there may be one DaysSupplyDuration 145118 attribute. Duration(Qualifier:DaysSupply) is a Duration for which the current stock will cover demands.

The SalesOrderItemNumberValue 145124 attribute is a NumberValue 145128 data type. The SalesOrderItemNumberValue 145124 attribute has a cardinality of 0 . . . 1 145126 meaning that for each instance of the KeyFigureValue 145102 entity there may be one SalesOrderItemNumberValue 145124 attribute. NumberValue is a Number of sales order items in the Service Part Supply Plan.

The SalesOrderItemQuantity 145130 attribute is a Quantity 145134 data type. The SalesOrderItemQuantity 145130 attribute has a cardinality of 0 . . . 1 145132 meaning that for each instance of the KeyFigureValue 145102 entity there may be one SalesOrderItemQuantity 145130 attribute. Quantity is a Quantity in sales order items in the Service Part Supply Plan.

The RushOrderItemNumberValue 145136 attribute is a NumberValue 145140 data type. The RushOrderItemNumberValue 145136 attribute has a cardinality of 0 . . . 1 145138 meaning that for each instance of the KeyFigureValue 145102 entity there may be one RushOrderItemNumberValue 145136 attribute. NumberValue is a Number of rush order items in the Service Part Supply Plan.

The RushOrderItemQuantity 145142 attribute is a Quantity 145146 data type. The RushOrderItemQuantity 145142 attribute has a cardinality of 0 . . . 1 145144 meaning that for each instance of the KeyFigureValue 145102 entity there may be one RushOrderItemQuantity 145142 attribute. Quantity is a Quantity in rush order items in the Service Part Supply Plan.

The BackOrderItemNumberValue 145148 attribute is a NumberValue 145152 data type. The BackOrderItemNumberValue 145148 attribute has a cardinality of 0 . . . 1 145150 meaning that for each instance of the KeyFigureValue 145102 entity there may be one BackOrderItemNumberValue 145148 attribute. NumberValue is a Number of backorder items in the Service Part Supply Plan.

The BackOrderItemQuantity 145154 attribute is a Quantity 145158 data type. The BackOrderItemQuantity 145154 attribute has a cardinality of 0 . . . 1 145156 meaning that for each instance of the KeyFigureValue 145102 entity there may be one BackOrderItemQuantity 145154 attribute. Quantity is a Quantity in backorder items in the Service Part Supply Plan.

The Log 145160 package is a Log 145166 data type. The Log 145160 package includes a Log 145162 entity. The Log 145162 entity has a cardinality of 1 145164 meaning that for each instance of the Log 145160 package there is one Log 145162 entity.

A number of implementations have been described. Nevertheless, it will be understood that various modifications may be made without departing from the spirit and scope of the disclosure. For example, processing can mean creating, updating, deleting, or some other massaging of information. Accordingly, other implementations are within the scope of the following claims.

What is claimed is:

1. A non-transitory computer readable medium including program code for providing a message-based interface for performing a service part demand forecast service, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for querying service part demand forecasts in a supply chain management system according to particular criteria, the first message including a first message package derived from the common business object model and hierarchically organized as:

a service part demand forecast supply chain management for approval by elements query message entity; and at a first hierarchical level within the first message package, a selection package, where the selection package includes, at a second hierarchical level within the first message package, a service part demand forecast supply chain management for approval by elements entity, where the service part demand forecast supply chain management for approval by elements entity includes, at a third hierarchical level within the first message package, a planning version identifier (ID), at least one selection by material internal ID, and at least one selection by supply planning area ID, where each selection by material internal ID includes, at a fourth hierarchical level within the first message package, an inclusion exclusion code, an interval boundary type code, and a lower boundary material internal ID, and where each selection by supply planning area ID includes, at the fourth hierarchical level within the first message package, an inclusion exclusion code, an interval boundary type code, and a lower boundary material internal ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The medium of claim 1, wherein the service part demand forecast supply chain management for approval by elements entity further includes at least one of a virtual child indicator, a third party order processing indicator, or a selection by demand forecast deviation factor value.

3. The medium of claim 1, wherein the second message comprises a service part demand forecast supply chain management for approval by elements response message.

4. A distributed system operating in a landscape of computer systems providing message-based services defined in a service registry, the system comprising:

a graphical user interface embodied by computer readable instructions executable by at least one processor, embedded on tangible media, for querying service part demand forecasts in a supply chain management system according to particular criteria, using a request;

a first memory storing a user interface controller for processing the request and involving a message including a message package derived from a common business object model, where the common business object model includes business objects having relationships that enable derivation of message-based service interfaces and message packages, the message package hierarchically organized as:

a service part demand forecast supply chain management for approval by elements query message entity; and at a first hierarchical level within the first message package, a selection package, where the selection package includes, at a second hierarchical level within the first message package, a service part demand forecast supply chain management for approval by elements entity, where the service part demand forecast supply chain management for approval by elements entity includes, at a third hierarchical level within the first message package, a planning version identifier (ID), at least one selection by material internal ID, and at least one selection by supply planning area ID, where each selection by material internal ID includes, at a fourth hierarchical level within the first message package, an inclusion exclusion code, an interval boundary type code, and a lower boundary material internal ID, and where each selection by supply planning area ID includes, at the fourth hierarchical level within the first message package, an inclusion exclusion code, an interval boundary type code, and a lower boundary material internal ID; and a second memory, remote from the graphical user interface, storing a plurality of message-based service interfaces derived from the common business object model to provide consistent semantics with messages derived from the common business object model, where one of the message-based service interfaces is operable to process the message via the service interface, where processing the message includes unpacking the first message package based on the common business object model.

5. The distributed system of claim 4, wherein the first memory is remote from the graphical user interface.

6. The distributed system of claim 4, wherein the first memory is remote from the second memory.

7. A non-transitory computer readable medium including program code for providing a message-based interface for performing a service part demand history service, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting creation of a service part demand history by a service parts planning system, the first message including a first message package derived from the common business object model and hierarchically organized as:

a service part demand history create request message entity; and at a first hierarchical level within the first message package, a service part demand history package, where the service part demand history package includes, at a second hierarchical level within the first message package, a service part demand history entity and a time series package, where the service part demand history entity includes, at a third hierarchical level within the first message package, a planning version identifier (ID), a product ID, a location ID, a virtual child indicator, and a third party order processing indicator, where the time series package includes, at the third hierarchical level within the first message package, at least one key figure entity and at least one period bucket assignment entity, where each key figure entity includes, at a fourth hierarchical level within the first message package, a time series key figure code and at least one key figure value, where each key figure value includes, at a fifth hierarchical level within the first message package, a time bucket number integer value and a key figure floating value, and where the period bucket assignment entity includes, at the fourth hierarchical level within the first message package, a time bucket number integer value, a start date/time, and an end date/time;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

8. The medium of claim 7, wherein each key figure entity further includes a unit of measure.

9. A distributed system operating in a landscape of computer systems providing message-based services defined in a service registry, the system comprising:

a graphical user interface embodied by computer readable instructions executable by at least one processor, for requesting creation of a service part demand history by a service parts planning system, using a request;

a first memory storing a user interface controller for processing the request and involving a message including a message package derived from a common business object model, where the common business object model includes business objects having relationships that enable derivation of message-based service interfaces and message packages, the message package hierarchically organized as:

a service part demand history create request message entity; and at a first hierarchical level within the first message package, a service part demand history package, where the service part demand history package includes, at a second hierarchical level within the first message package, a service part demand history entity and a time series package, where the service part demand history entity includes, at a third hierarchical level within the first message package, a planning version identifier (ID), a product ID, a location ID, a virtual child indicator, and a third party order processing indicator, where the time series package includes, at the third hierarchical level within the first message package, at least one key figure entity and at least one period bucket assignment entity, where each key figure entity includes, at a fourth hierarchical level within the first message package, a time series key figure code and at least one key figure value, where each key figure value includes, at a fifth hierarchical level within the first message package, a time bucket number integer value and a key figure floating value, and where the period bucket assignment entity includes, at the fourth hierarchical level within the first message package, a time bucket number integer value, a start date/time, and an end date/time; and a second memory, remote from the graphical user interface, storing a plurality of message-based service interfaces derived from the common business object model to provide consistent semantics with messages derived from the common business object model, where one of the message-based service interfaces is operable to process the message via the service interface, where processing the message includes unpacking the first message package based on the common business object model.

10. The distributed system of claim 9, wherein the first memory is remote from the graphical user interface.

11. The distributed system of claim 9, wherein the first memory is remote from the second memory.

12. A non-transitory computer readable medium including program code for providing a message-based interface for performing a service part inventory replenishment rule service, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting creation of a replenishment rule for at least one service part inventory, the first message including a first message package derived from the common business object model and hierarchically organized as:

a service part inventory replenishment rule create request message entity; and at a first hierarchical level within the first message package, a service part inventory replenishment rule package, where the service part inventory replenishment rule package includes, at a second hierarchical level within the first message package, a service part inventory replenishment rule entity and a time series package, where the service part inventory replenishment rule entity includes, at a third hierarchical level within the first message package, a planning version identifier (ID), a product ID, a location ID, a virtual child indicator, and a third party order processing indicator, where the time series package includes, at the third hierarchical level within the first message package, at least one key figure entity and at least one period bucket assignment entity, where each key figure entity includes, at a fourth hierarchical level within the first message package, a time series key figure code and at least one key figure value, where each key figure value includes, at a fifth hierarchical level within the first message package, a time bucket number integer value and a key figure floating value, and where the period bucket assignment entity includes, at the fifth hierarchical level within the first message package, a time bucket number integer value, a start date/time, and an end date/time;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

13. The medium of claim 12, wherein each key figure entity further includes a unit of measure.

14. A distributed system operating in a landscape of computer systems providing message-based services defined in a service registry, the system comprising:

a graphical user interface embodied by computer readable instructions executable by at least one processor, for requesting creation of a replenishment rule for at least one service part inventory, using a request;

a first memory storing a user interface controller for processing the request and involving a message including a message package derived from a common business object model, where the common business object model includes business objects having relationships that enable derivation of message-based service interfaces and message packages, the message package hierarchically organized as:

a service part inventory replenishment rule create request message entity; and at a first hierarchical level within the first message package, a service part inventory replenishment rule package, where the service part inventory replenishment rule package includes, at a second hierarchical level within the first message package, a service part inventory replenishment rule entity and a time series package, where the service part inventory replenishment rule entity includes, at a third hierarchical level within the first message package, a planning version identifier (ID), a product ID, a location ID, a virtual child indicator, and a third party order processing indicator, where the time series package includes, at the third hierarchical level within the first message package, at least one key figure entity and at least one period bucket assignment entity, where each key figure entity includes, at a fourth hierarchical level within the first message package, a time series key figure code and at least one key figure value, where each key figure value includes, at a fifth hierarchical level within the first message package, a time bucket number integer value and a key figure floating value, and where the period bucket assignment entity includes, at the fifth hierarchical level within the first message package, a time bucket number integer value, a start date/time, and an end date/time; and a second memory, remote from the graphical user interface, storing a plurality of message-based service interfaces derived from the common business object model to provide consistent semantics with messages derived from the common business object model, where one of the message-based service interfaces is operable to process the message via the service interface, where processing the message includes unpacking the first message package based on the common business object model.

15. The distributed system of claim 14, wherein the first memory is remote from the graphical user interface.

16. The distributed system of claim 14, wherein the first memory is remote from the second memory.

17. A non-transitory computer readable medium including program code for providing a message-based interface for performing a service part order history service, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for querying supply chain management for service part order histories satisfying a set of selection criteria specified by a set of query elements, the first message including a first message package derived from the common business object model and hierarchically organized as:

a service part order history supply chain management by elements query message entity; and at a first hierarchical level within the first message package, a selection package and a processing conditions package, where the selection package includes, at a second hierarchical level within the first message package, a service part order history selection by elements entity, and where the service part order history selection by elements entity includes, at a third hierarchical level within the first message package, a planning version identifier (ID), and where the processing conditions package includes, at the second hierarchical level within the first message package, a processing conditions entity, where the processing conditions entity includes, at the third second hierarchical level within the first message package, an unlimited hits indicator;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

18. The medium of claim 17, where the service part order history selection by elements entity further includes at least one of: a selection by material internal ID, a selection by customer facing location internal ID, a customer facing location virtual child indicator, a selection by stockholding location internal ID, a stockholding location virtual child indicator, a third party order processing indicator, a selection by service part planning demand group code, a forecast relevant indicator, and a changed date time.

19. The medium of claim 17, where the processing conditions entity further includes at least one of a query hits maximum number value and a last provided business transaction document reference item ID.

20. A distributed system operating in a landscape of computer systems providing message-based services defined in a service registry, the system comprising:

a graphical user interface embodied by computer readable instructions executable by at least one processor, for querying supply chain management for service part order histories satisfying a set of selection criteria specified by a set of query elements, using a request;

a first memory storing a user interface controller for processing the request and involving a message including a message package derived from a common business object model, where the common business object model includes business objects having relationships that enable derivation of message-based service interfaces and message packages, the message package hierarchically organized as:

a service part order history supply chain management by elements query message entity; and at a first hierarchical level within the first message package, a selection package and a processing conditions package, where the selection package includes, at a second hierarchical level within the first message package, a service part order history selection by elements entity, and where the service part order history selection by elements entity includes, at a third hierarchical level within the first message package, a planning version identifier (ID), and where the processing conditions package includes, at the second hierarchical level within the first message package, a processing conditions entity, where the processing conditions entity includes, at the third second hierarchical level within the first message package, an unlimited hits indicator; and a second memory, remote from the graphical user interface, storing a plurality of message-based service interfaces derived from the common business object model to provide consistent semantics with messages derived from the common business object model, where one of the message-based service interfaces is operable to process the message via the service interface, where processing the message includes unpacking the first message package based on the common business object model.

21. The distributed system of claim 20, wherein the first memory is remote from the graphical user interface.

22. The distributed system of claim 20, wherein the first memory is remote from the second memory.

23. A non-transitory computer readable medium including program code for providing a message-based interface for performing a service part supply plan, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for querying supply part shortage information associated with a service part supply plan, the shortage information derived from a service part shortage analysis, the first message including a first message package derived from the common business object model and hierarchically organized as:

a service part supply plan supply chain management shortage overview by elements query message entity; and at a first hierarchical level of the first message package, a selection package, where the selection package includes, at a second hierarchical level within the first message package, a service part supply plan supply chain management shortage overview by elements entity, and where the service part supply plan supply chain management shortage overview by elements entity includes, at a third hierarchical level within the first message package, a selection by actual result indicator and at least one of a selection by demand planner group code, a selection by service part planning product group code, a selection by ship from location internal identifier (ID), and a selection by ship to location internal ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

24. The medium of claim 23, where the service part supply plan supply chain management shortage overview by elements entity includes the selection by demand planner group code, and the selection by demand planner group code includes an inclusion exclusion code, an interval boundary type code, and a lower boundary demand planner group code.

25. A distributed system operating in a landscape of computer systems providing message-based services defined in a service registry, the system comprising:

a graphical user interface embodied by computer readable instructions executable by at least one processor, for querying supply part shortage information associated with a service part supply plan, using a request;

a first memory storing a user interface controller for processing the request and involving a message including a message package derived from a common business object model, where the common business object model includes business objects having relationships that enable derivation of message-based service interfaces and message packages, the message package hierarchically organized as:

a service part supply plan supply chain management shortage overview by elements query message entity; and at a first hierarchical level of the first message package, a selection package, where the selection package includes, at a second hierarchical level within the first message package, a service part supply plan supply chain management shortage overview by elements entity, and where the service part supply plan supply chain management shortage overview by elements entity includes, at a third hierarchical level within the first message package, a selection by actual result indicator and at least one of a selection by demand planner group code, a selection by service part planning product group code, a selection by ship from location internal identifier (ID), and a selection by ship to location internal ID; and a second memory, remote from the graphical user interface, storing a plurality of message-based service interfaces derived from the common business object model to provide consistent semantics with messages derived from the common business object model, where one of the message-based service interfaces is operable to process the message via the service interface, where processing the message includes unpacking the first message package based on the common business object model.

26. The distributed system of claim 25, wherein the first memory is remote from the graphical user interface.

27. The distributed system of claim 25, wherein the first memory is remote from the second memory.

* * * * *